US005751854A

United States Patent [19]

Saitoh et al.

[11] Patent Number: 5,751,854

[45] Date of Patent: May 12, 1998

[54] ORIGINAL-DISCRIMINATION SYSTEM FOR DISCRIMINATING SPECIAL DOCUMENT, AND IMAGE FORMING APPARATUS, IMAGE PROCESSING APPARATUS AND DUPLICATOR USING THE ORIGINAL-DISCRIMINATION SYSTEM

[75] Inventors: Takashi Saitoh; Takashi Saitoh, both of Yokohama; Hiroshi Takahashi, Kawasaki; Yoshio Kaneko, Tokyo; Shigeo Kurotaka, Sagamihara; Toshiya Hikita, Machida; Kyoji Omi, Kawasaki; Midori Aida, Yokohama; Shinji Yamakawa, Kawasaki; Hiromi Okubo, Yokohama; Kouji Ishigaki, Yokohama; Takeshi Ukai, Yokohama; Kazuo Murai, Tokyo; Haruhiko Fukuda, Kawasaki; Yukio Sakano, Fuchu; Tadato Hashiguchi; Michiyoshi Tachikawa, both of Yokohama; Hiroyasu Sumida, Ichikawa, all of Japan

[73] Assignee: Ricoh Company, Ltd., Tokyo, Japan

[21] Appl. No.: 660,464

[22] Filed: Jun. 7, 1996

Related U.S. Application Data

[63] Continuation of Ser. No. 211,266, filed as PCT/JP93/01029 Jul. 23, 1993, abandoned.

[30] Foreign Application Priority Data

| | | | |
|---|---|---|---|
| Aug. 3, 1992 | [JP] | Japan | 4-226462 |
| Aug. 6, 1992 | [JP] | Japan | 4-231436 |
| Aug. 7, 1992 | [JP] | Japan | 4-232978 |
| Aug. 11, 1992 | [JP] | Japan | 4-235380 |
| Aug. 11, 1992 | [JP] | Japan | 4-235381 |
| Aug. 13, 1992 | [JP] | Japan | 4-237751 |
| Aug. 16, 1992 | [JP] | Japan | 4-239050 |
| Aug. 16, 1992 | [JP] | Japan | 4-239052 |
| Aug. 16, 1992 | [JP] | Japan | 4-239053 |
| Aug. 16, 1992 | [JP] | Japan | 4-239054 |

[51] Int. Cl.$^{6}$ .......... G06K 9/68

[52] U.S. Cl. .......... 382/218

[58] Field of Search .......... 382/162, 165, 382/168, 170, 176, 190, 191, 192, 218, 221; 358/464, 467, 520, 522

[56] References Cited

U.S. PATENT DOCUMENTS 4,075,604 2/1978 Degasperi .......... 382/165

(List continued on next page.)

FOREIGN PATENT DOCUMENTS 0 084 780 8/1983 European Pat. Off. .

(List continued on next page.)

OTHER PUBLICATIONS

IBM Technical Disclosure Bulletin, vol. 18, No. 1, pp. 59–60, Jun. 1975, G.D. Bruce, "Unauthorized Copy Prevention".

Ricoh Technical Report No. 13, May, 1985, Digital Filter in Image Processing, by Masaki, Kogure, pp. 4–29.

*Primary Examiner*—Jose L. Couso

*Attorney, Agent, or Firm*—Oblon, Spivak, McClelland, Maier & Neustadt, P.C.

[57] ABSTRACT

An original image comprises a printed region on which a predetermined printed matter is realized and a background region on which no printed matter is realized. The shape of a peripheral zone in the original image comprises the shape of the background region, which shape exists particularly at the peripheral region of said original image. It is determined whether or not the original image comprises the special document by detecting the peripheral zone. Further, the original image has an outer-frame region, having a predetermined shape, at the peripheral region of the original image. The determination is carried out using a result of measuring the width of the outer-frame region. Further, the width of the outer-frame region comprises a width along a direction substantially perpendicular to a direction extending along the outline of the original image.

4 Claims, 96 Drawing Sheets

U.S. PATENT DOCUMENTS

| | | | |
|---|---|---|---|
| 4,090,243 | 5/1978 | Kotera et al. | 382/165 |
| 4,231,014 | 10/1980 | Ponzio | 382/165 |
| 4,269,515 | 5/1981 | Altman | 356/394 |
| 4,578,810 | 3/1986 | MacFarlane et al. | 382/141 |
| 4,790,022 | 12/1988 | Dennis | 382/165 |
| 4,908,873 | 3/1990 | Philibert et al. | 382/218 |
| 4,991,223 | 2/1991 | Bradley | 382/165 |
| 5,032,904 | 7/1991 | Murai et al. | 382/165 |
| 5,123,055 | 6/1992 | Kasdan | 382/165 |
| 5,227,871 | 7/1993 | Funada et al. | 382/165 |
| 5,343,538 | 8/1994 | Kasdan | 382/165 |
| 5,375,177 | 12/1994 | Vaidyanathan et al. | 382/165 |

FOREIGN PATENT DOCUMENTS

| | | | |
|---|---|---|---|
| 0 130 953 | 1/1985 | European Pat. Off. . | |
| 0 131 681 | 1/1985 | European Pat. Off. . | |
| 0 342 060 | 11/1989 | European Pat. Off. . | |
| 0 366 399 | 5/1990 | European Pat. Off. . | |
| 0 382 549 | 8/1990 | European Pat. Off. . | |
| 0 488 796 | 6/1992 | European Pat. Off. | G03G 21/00 |
| 0488188 A2 | 6/1992 | European Pat. Off. . | |
| 28 25 753 | 12/1979 | Germany . | |
| 37 19 373 | 12/1987 | Germany . | |
| 37 38 304 | 5/1988 | Germany . | |
| 39 04 129 | 8/1989 | Germany . | |
| 2-229572 | 11/1985 | Japan . | |
| 62-118492 | 5/1987 | Japan . | |
| 64 61777 | 3/1989 | Japan . | |
| 2-55378 | 2/1990 | Japan . | |
| 2-273283 | 3/1990 | Japan . | |
| 2-83571 | 3/1990 | Japan . | |
| 2-148382 | 6/1990 | Japan . | |
| 2171790 | 7/1990 | Japan . | |
| 2-210481 | 8/1990 | Japan . | |
| 2-210591 | 8/1990 | Japan . | |
| 2-90188 | 9/1990 | Japan . | |
| 2-288468 | 11/1990 | Japan . | |
| 3 193495 | 8/1991 | Japan . | |
| 4-54681 | 2/1992 | Japan . | |
| 488188 | 3/1992 | Japan | G01B 11/02 |
| 1442485 | 5/1974 | United Kingdom . | |
| 1442487 | 7/1976 | United Kingdom | G07D 7/00 |
| 1470737 | 4/1977 | United Kingdom | G07D 7/00 |
| 2 144 251 | 2/1985 | United Kingdom . | |
| 2219855 | 12/1989 | United Kingdom | G07D 7/00 |

REFLECTION CHARACTERISTICS IN PAPER-MONEY IMAGE

REFLECTION CHARACTERISTICS IN GEWERAL COLOR PRINTED IMAGE

FIG. 31

MAIN SCAN →

SUB-SCAN ↓

| | | | | |
|---|---|---|---|---|
| n | | | | |
| n | 1(FIRST) | 1(SECOND) | 1(THIRD) | 1(FOURTH) |
| | 1(FIFTH) | 1(SIXTH) | 1(SEVENTH) | 1(EIGHTH) |
| n | 2 | 2 | 2 | 2 |
| | 2 | 2 | 2 | 2 |
| | 3 | 3 | 3 | 3 |
| | 3 | 3 | 3 | 3 |
| | 4 | 4 | 4 | 4 |
| | 4 | 4 | 4 | 4 |
| | 5 | 5 | 5 | 5 |
| | 5 | 5 | 5 | 5 |
| | 6 | 6 | 6 | 6 |
| | 6 | 6 | 6 | 6 |
| | 7 | 7 | 7 | 7 |
| | 7 | 7 | 7 | 7 |
| | 8 | 8 | 8 | 8 |
| | 8 | 8 | 8 | 8 |
| | 9 | 9 | 9 | 9 |
| | 9 | 9 | 9 | 9 |
| | 10 | 10 | 10 | 10 |
| | 10 | 10 | 10 | 10 |
| | 11 | 11 | 11 | 11 |
| | 11 | 11 | 11 | 11 |
| | 12 | 12 | 12 | 12 |
| | 12 | 12 | 12 | 12 |

6000

THINNING PROCESSING (5×5)

FIG. 71B

FEATURE VALUE H

| | | | | | | | |
|---|---|---|---|---|---|---|---|
| NUMBER OF (CODE 1)S | NUMBER OF (CODE 2)S | NUMBER OF (CODE 3)S | NUMBER OF (CODE4)S | NUMBER OF (CODE 5)S | NUMBER OF (CODE 6)S | NUMBER OF (CODE 7)S | NUMBER OF (CODE 8)S |

ROTATION ANGLE 0 DEGREES

ROTATION ANGLE 90 DEGREES

ROTATION ANGLE 180 DEGREES

ROTATION ANGLE 270 DEGREES

FIG. 81A

| | | | | | |
|---|---|---|---|---|---|
| ADDRESS | 8000 | TB-Mag-Up: | 115 | ; FIXED MAGNIFICATION | 115 % |
| | 8002 | | 121 | ; | 121 % |
| | 8004 | | 141 | ; | 141 % |
| | 8006 | | 200 | ; | 200 % |
| | 8008 | | 300 | ; | 300 % |
| | 800A | | 400 | ; | 400 % |
| | 800C | | 800 | ; | 800 % |

FIG. 81B

| | | | |
|---|---|---|---|
| TB-Mag-Down; | 93 | ; FIXED MAGNIFICATION | 93 % |
| | 82 | ; | 82 % |
| | 71 | ; | 71 % |
| | 62 | ; | 62 % |
| | 50 | ; | 50 % |
| | 25 | ; | 25 % |

FIG. 97

| | | | | | | |
|---|---|---|---|---|---|---|
| 0 | 0 | -1 | -2 | -1 | 0 | 0 |
| 0 | -2 | -6 | -8 | -6 | -2 | 0 |
| -1 | -6 | 2 | 14 | 2 | -6 | -1 |
| -2 | -8 | 14 | 40 | 14 | -8 | -2 |
| -1 | -6 | 2 | 14 | 2 | -6 | -1 |
| 0 | -2 | -6 | -8 | -6 | -2 | 0 |
| 0 | 0 | -1 | -2 | -1 | 0 | 0 |

| | | | | | | |
|---|---|---|---|---|---|---|
| 0 | -1 | -3 | -4 | -3 | -1 | 0 |
| -1 | -2 | -2 | -2 | -2 | -2 | -1 |
| -3 | -2 | 6 | 10 | 6 | -2 | -3 |
| -4 | -2 | 10 | 16 | 10 | -2 | -4 |
| -3 | -2 | 6 | 10 | 6 | -2 | -3 |
| -1 | -2 | -2 | -2 | -2 | -2 | -1 |
| 0 | -1 | -3 | -4 | -3 | -1 | 0 |

14106

( x>a AND ALSO x>b AND ALSO x>c AND ALSO x>d )
OR
( x<a AND ALSO x<b AND ALSO x<c AND ALSO x<d )

BLOCK G IS TAKEN AS HALFTONE-DOT REGION IF PEAK PIXELS EXIST MORE THAN PREDETERMINATED AMOUNT AMONG ( A, B, C, D, E, F, G, H, )

CURRENT BLOCK A IS TAKEN AS HALFTON-DOT REGION IF EVEN ONE HALFTONE-DOT REGION EXISTS AMONG 4×3 BLOK.

ORIGINAL-DISCRIMINATION SYSTEM FOR DISCRIMINATING SPECIAL DOCUMENT, AND IMAGE FORMING APPARATUS, IMAGE PROCESSING APPARATUS AND DUPLICATOR USING THE ORIGINAL-DISCRIMINATION SYSTEM

This application is a Continuation of application Ser. No. 08/211,266, filed on Jul. 11, 1994, now abandoned which was filed as PCT application PCT/JP93/01029, filed on Jul. 23, 1993.

BACKGROUND OF THE INVENTION

1. Field of the Invention

The present invention relates to an original-discrimination system and image forming apparatus, image processing apparatus and duplicator comprising the original-discrimination system. The original-discrimination system is described. There may be an act, for example, in which a special document, such as paper money, securities and so on is duplicated using duplicating means such as a digital duplicator. Thus, the special document may be forged on recording paper containing the duplicated corresponding image. As a method for preventing such an act, it may be devised that an original-discrimination system is previously incorporated in the duplicator. This original-discrimination system has a function of determining whether or not an image is of a special document such as a predetermined paper money, the image being used as a duplication original in the duplicating means. This duplicating means may comprise an arrangement in which duplication by the duplicating means is disabled if the original-discrimination system determines that the duplication original is the predetermined special document. By comprising such an arrangement, it becomes possible to prevent the above-mentioned forgery act.

2. Background of Related Art

As is well known, recently, image processing technology and image forming technology have been improved. As a result, it is possible for a special document such as a sheet of paper money to be duplicated using a color duplication device, for example. In this case, by this duplication, the corresponding image is produced on a recording paper.

The obtained copy, that is, the recording paper on which the relevant image is produced and the relevant special document, such as a paper money, having been used as the duplication original in the relevant duplication, may closely approximate the original. In the extreme case, it may be difficult to distinguish between the copy and the special document.

In order to cope with such a situation as mentioned above, the above-mentioned original-discrimination system has been developed. One example of a method used in this original-discrimination system is disclosed in Japanese Laid-Open Application No. 2-83571, Image Recording Device. In this method, a so-called Pattern Matching Method is used. This Pattern Matching Method is a general one as such a discrimination function. In the device in the above disclosure the input image signal is compared with previously registered pattern data. The input image signal comprises a signal corresponding to a duplication original and the registered pattern data is data corresponding to a special document such as a bill of paper currency, for example. As is well known, special documents such as a paper money are only printed by a designated organ and printing thereof by an unauthorized person is prohibited. As a result of the above mentioned comparison, a case where the input image signal is identical to the registered pattern data may be detected. It is then possible to prevent duplication of the duplication original corresponding to the input image signal, in this case, using the determination result.

Further, Japanese Laid-Open Patent Application No. 60-229572 discloses Image Processing Apparatus using, as the criterion, image data itself of a determination-object paper-money acting a reference.

In an original-discrimination system such as above, there are the following problems: As is well known, images used in a special document such as paper money, for example, are extremely intricate. Further, to realize the image of the paper money, that is, to print the bill of paper money, various colors and intricate patterns are used. Accordingly, the amount of the above-mentioned pattern data, corresponding to the paper money in which the intricate and various colors and patterns are used, is very large. In order to store the thus large amount of data, a memory having a very large capacity is required accordingly. The thus very large capacity memory is required for the original-discrimination system. The original-discrimination system is extremely expensive. In addition, the comparison operation for determination, using the large amount of pattern data, is accordingly complex. The complex operation requires a correspondingly complex construction accordingly. Such a complex construction adds to the expense of the original-discrimination system. Furthermore, the original-discrimination operation using the complex construction takes a very long time to perform.

Also, since the manner in which an original acting as the determination object is placed on a platen glass of an apparatus such as a duplicator is chosen by a user, the manner may be predicted to be any manners. The placement manner relates to a placement position and placement angle (the original may be placed obliquely). This impossibility of placement manner prediction may also cause the construction of the relevant apparatus to be complex.

In an apparatus having such a complex construction, as described above, a considerable working time may be required for the relevant processing accordingly. As a result, real-time processing may not be possible. Real-time processing comprises a processing in which various processing required for the relevant duplication work may be smoothly performed without any delay in a case where an original is duplicated in a duplicator, for example. In these series of processing, data to be processed is processed soon after it is input without having to wait. Disablement of such a real-time processing may degrade the efficiency of the relevant apparatus.

Further, in an apparatus having such a complex construction, it may be difficult to immediately cope with the following cases, for example: A case where e new version of paper money is issued by the Bank of Japan; and a case where it is required to immediately deal with currencies and/or paper money of various foreign countries.

Another example of such an apparatus used for preventing a special document such as a paper money from being forged is disclosed in Japanese Laid-Open Patent Application No. 2-210591. An image processing apparatus disclosed therein detects the placement condition of an original placed on a platen glass of the apparatus. The apparatus, using the detected placement condition, extracts only partial original-image data corresponding to a predetermined region of the original. Then, the apparatus compares this partial original-image data with reference image information previously registered in the apparatus. Then, the apparatus, as a result of the comparison, determines to what degree the partial original-image data and the reference image information approximate one another. Then, from the result of the determination, the apparatus detects whether or not the original placed on the platen glass comprises the relevant special document.

Further, this image processing apparatus detects four corners (that is, four vertexes of a rectangle, hereinafter) of the original placed on the platen glass. By the detection the apparatus detects the position at which the original is placed and the rotation angle at which the original is placed, as mentioned above. It is possible, for example, with the apparatus using a method such as mentioned above, to place a plurality of paper money bills of a same denomination on the platen glass such that there is no space between the paper money bills; and the bills are arranged in both vertical and horizontal directions. In this case, the apparatus detects the four corners of the contiguous entirety. Such four-corner detection may not enable detection of the four corners of each bill from among the placed plurality of bills. As a result, the position of each bill cannot be detected. As a result, this apparatus cannot detect that the bills comprise paper money.

Further, in such a conventional original-discrimination system, in a case where a paper money sheet is duplicated for example, if something such as an unexpected meaningless scribble mark exists on the paper money bill, for example, noise corresponding to the mark is included in its image data. Such an included noise may cause error discrimination in the original-discrimination system.

If the error discrimination is made in the original-discrimination system, duplication operation for the original image is halted and an incomplete duplication operation is thus performed on the original image which should not be prevented from being duplicated. As a result of such an incomplete duplication operation, an unnecessarily poor copy may be produced, or the above-mentioned halting of the duplication operation may cause shutdown of the duplicator itself, resulting in degrading of work efficiency in duplication work.

In Japanese Laid-Open Patent Application No. 4-54681, a Color Image Processing Apparatus is disclosed. In this apparatus, a color original image is converted into the corresponding image data signal, and then the signal is output after being processed digitally. The image data signal is converted into predetermined code information and a histogram is produced, with respect to predetermined characteristics, using the code information, for a predetermined region of the color original image. By using this histogram, it is determined whether or not the color original image corresponds to a special document such as paper money.

However, in such an apparatus, since the determination is made in accordance with a histogram produced using only image data from a limited predetermined region, the discriminations accuracy is relatively low and thus error discriminations are liable to occur. Such error discrimination degrade work efficiency of work performed using the relevant apparatus.

Further, in such an original-discrimination system, the discrimination operation is particularly performed on image data input through a scanner. Therefore, the discrimination operation is not performed in a system in which another data inputting means is used for transferring image data corresponding to paper money or so.

Further, in such a conventional original-discrimination system, proper discrimination processing is not performed for all of various formats of image-data inputting. The various image-data inputting formats are, for example, the three color image data inputting formats in which image data is input as image data in each of three colors R, G, and B, or of three colors Y, M, and of four colors C, or Y, M, C and K. Further, in addition to classifications according to differences in color components, there are various inputting formats classified according to differences in data transfer systems as follows, for example: a system in which image data of respective color components are input in parallel; and a system in which image data is successively input, for each color element, in a so-called area sequence, line sequence, or point sequence.

Further, in such a conventional original-discrimination system, the higher the discrimination accuracy is made to become, the longer the time required for the discrimination operation becomes. As a result, in a case where the data replacement system is applied to a duplicator, the duplication operation requires a long time accordingly, resulting in degraded work efficiency original of the duplicator. Further, in such a conventional original-discrimination system, the discrimination accuracy is fixed even though differences in various duplication modes (single-color duplication and multi-color duplication, for example) are needed in the duplicator. However, the likelihood seems to be relatively low that a prohibited duplication act is carried out in the case of the above-mentioned single-color duplication mode, for example. Therefore, it seems to be possible to naturally reduce the discrimination accuracy for that mode. Maintaining the discrimination accuracy in such a case at the same level as that in other cases unnecessarily degrades the working efficiency original of the duplicator.

Technology regarding methods for processing image data which has been determined, by means of such a data replacement system, to correspond to a special document will now be described.

In Japanese Laid-Open Patent Application 2-288468, an Image Forming Apparatus is disclosed. This image forming apparatus performs certain processing on image data, to be used for a printing operation using specific printer toner color, from among the image data determined to be a special document. The above processing is such that image manipulation such as size modification, italicizing or obliquing, and/or mirroring operation, for example, is performed on the image corresponding to the image data to be performed the certain processing.

In Japanese Laid-Open Patent application No. 2-210481, an Image Forming Apparatus is disclosed in which an output of an image is not carried out, the image corresponding to image data determined to correspond to a special document.

In Japanese Laid-Open Patent Application 2 -171790, Color Duplication Apparatus Preventing Various Sorts of Paper Money from being Forged is disclosed, in which a toner-fixing property is intentionally degraded in printing image data corresponding to a special document.

In Japanese Laid-Open Patent Application No. 2-73283, an Image Forming Apparatus is disclosed, in which a region of an image corresponding to image data is filled solid in printing using image data determined to correspond to a special document.

In such conventional methods, if the data replacement system makes a discrimination error so that the original image is determined to correspond to such a special document for which duplication is prohibited even though the original image is originally not one prohibited to duplicate, the following phenomenon occurs as a result: the copy of the relevant original image obtained has various image manipulations such as mentioned above performed on it. As a result, it is impossible to use the obtained copy for the original purpose, in particular, as a result of the abovementioned solid filling processing being performed. As a result, wasting of a sheet of paper and working time occurs, resulting in degrading of cost-effectiveness.

Among such conventional original-discrimination systems, there is a system which uses, as its criterion, information concerning a seal mark region or a watermark region existing in an image associated with paper money. However, such a system does not have the capability of discrimination regarding an official document having neither a seal mark region nor a watermark region.

SUMMARY OF THE INVENTION

An object of a first aspect of the present invention is to provide an economical data replacement system in which a short time is required for the discrimination processing, in consideration of the above problems.

To achieve the above object of the first aspect of the present invention, a data replacement system according to the first aspect of the present invention is characterized by carrying out the determination using the shape of a peripheral zone of the original image.

By the above construction, it is possible to reduce the amount of pattern data necessary for the discrimination. Further, as a result, it is possible to simplify the construction of the original-discrimination system. Further, as a result, it is possible to reduce the time required for the original discrimination.

An object of a second aspect of the present invention is to provide a data replacement system in which the discrimination is enabled even if a plurality of paper money bills are arranged and placed without any spaces existing between the sheets as mentioned above for example.

To achieve the above object of the second aspect of the present invention, the following features are provided: Prior to the discrimination of an original, if the original comprises a combination of a plurality of sub-originals, the original image is separated into the sub-original images. This separation is carried out using reference partial density information concerning the density of a predetermined region of a reference image. Then, each separated sub-original image is compared with the predetermined reference image and as a result it is determined whether or not the original image corresponds to the predetermined reference image.

By the above construction, proper discrimination processing may be performed on such an original comprising a plurality of sub-originals.

An object of a third aspect of the present invention is to provide a data replacement system in which reliable discrimination processing is performed even with a relatively simple construction.

To achieve the above object of the third aspect of the present invention, the discrimination is characterized by using a partial image comprising a part of the reference image and also using a surrounding image located around the partial image.

By the above construction, since such limited information is used for the discrimination, it is possible to make the system simple and also reliable discrimination is possible because the surrounding image is also used for the determination materials.

Objects of fourth and fifth aspects of the present invention are to provide a data replacement system and an image forming apparatus using the data replacement system, which system comprises a simple construction, has the capability of dealing with fast duplication processing, and also has the capability of detecting special documents independently of the positioning of the original.

Further, above objects are to provide a data replacement system and an image forming apparatus using the data replacement system, which system has the capability of detecting various sorts of special documents including foreign country's paper money. Further, the above system is to have the capability of coping with a situation in which new versions of paper money are produced.

To achieve the above objects, the determination is characterized by: sampling original pixel data associated with a plurality of pixels at predetermined intervals on the original image, from image data associated with respective pixels of the original image; and then comparing the sampled original pixel data associated with the plurality of pixels with corresponding reference pixel information associated with the reference image.

The determination has further characteristics as follows: The system comprises a plurality of reference images; and the determination is made by carrying out in parallel respective comparisons between the sampled original pixel data and information concerning the plurality of the reference images.

In the fifth aspect of the invention, the determination is characterized by being made by comparing original background image data concerning a background region of the original image with reference background image information concerning a background region of the reference image.

Further, the determination is made by: counting a number of contiguous pixels within the original image, the pixels to be counted being ones from among original background pixels corresponding to the background region of the reference image; and comparing the obtained number of pixels with reference contiguous background pixels.

By the above constructions, the above two objects may be achieved.

Further, an object of the sixth aspect of the present invention is to provide a data replacement system in which it is achieved to improve the discrimination accuracy for the special document so as to improve the work efficiency of the apparatus.

To achieve the above object, in the sixth aspect of the present invention, the determination is characterized by being made by counting the number of data items corresponding to a specific color or a specific hue associated with the reference image, from among data items concerning a predetermined region of the original image.

Further, the above determination is characterized by being carried out on a plurality of regions of the original image; and if at least a first result of the determination among the corresponding plurality of determination results is that the original image is identical to the reference image, a final determination is then made in accordance with the first determination result and another determination result.

Further, the above determination is characterized by comparing image information concerning each color associated with the reference image with image data concerning each color associated with the original image.

An object of a seventh aspect of the present invention is to provide a data replacement system, having a simple construction, in which it is possible to carry out reliable discrimination of predetermined special documents.

To achieve such an object, in the seventh aspect of the present invention, it is characterized by being made detecting the width of a line and the number of lines having a predetermined width, the lines being included in the original image, or by detecting the interval between lines of a plurality included in the original image.

Such a construction achieves the above object and improves the work efficiency.

Further, an eighth aspect of the present invention is characterized by a shape comparison and a hue comparison, the shape comparison comprising a comparison made between the shape of a specific-hue region having a predetermined specific hue in the original image from data concerning the original image, and the shape of a corresponding specific-hue region in the reference image, the hue comparison comprising a comparison made between hue data concerning the specific-hue region of the original image and hue data concerning the corresponding specific-hue region of the reference image.

Alternatively, this aspect is characterized by a predetermined-region peripheral-shape comparison and a connection-point comparison, the predetermined-region peripheral-shape comparison comprising a comparison made between the peripheral shape of a predetermined region of the original image and the peripheral shape of a corresponding predetermined region of the reference image, the connection-point comparison comprising a comparison between data concerning a connection point, at which a plurality of lines intersect, the plurality of lines being included in the predetermined region of the original image in a peripheral region thereof, and information concerning a connection point, at which a plurality of lines intersect, the plurality of lines being included in the corresponding predetermined region of the reference image in a peripheral region thereof.

Further, an object of a ninth aspect of the present invention is to provide an image processing apparatus in which predetermined discrimination processing may be used independently from the abovementioned various sorts of data and various image-data inputting formats. Further, that may be used even if the image data is input via a communication network, magnetic, optical or magneto-optical storage media, for example, or even if the image data, after having been processed in an image processing apparatus, is output via a communication network, magnetic, optical, magneto-optical storage media.

An object of a tenth aspect of the present invention is to provide a data replacement system which does not cause a duplicator's original work efficiency to be degraded if the data replacement system is used in the duplicator.

To achieve such an object, the tenth aspect of the present invention is characterized by controlling the discrimination accuracy in accordance with the duplication mode of the duplicator.

An eleventh aspect of the present invention is characterized by performing processing on data associated with the original image such that a predetermined spatial frequency in the original image is emphasized; and then detecting a periodicity existing in an image corresponding to data associated with said original image but on which data said processing has been performed. Further, it is an image forming apparatus characterized by outputting an image corresponding to data concerning the original image but on which data said processing has been performed.

With the above construction, a simple construction enables reliable detection of prohibited duplication of special documents. Further, even if the discrimination is erroneous, since the processing to be performed only emphasizes a spatial frequency in the image, the copy seems to be as if it is waiving. Thus, it is generally possible to use the copy for its original purpose. Thus, wasting of a sheet of paper and wasting of duplication working time, for example, can be eliminated so that the cost effectiveness can be improved.

In a twelfth aspect of the present invention, the discrimination is made by detecting of a region in which the spatial frequency is constant in the original image. In this way, it is possible to discriminate securities and official documents other than paper money. Further, such discrimination processing may be carried out in real time with a simple construction.

Other objects and further features of the present invention will become more apparent from the following detailed description when read in conjunction with the accompanying drawings.

BRIEF DESCRIPTION OF THE DRAWINGS

FIG. 31 shows an operation example of reading data from the repeat memory of FIG. 26;

FIGS. 71A and 71B show direction codes and a histogram of character codes, used in the processing in the unit of FIG. 69;

FIG. 64 shows, a diagram illustrating a construction of an operation/display unit of the duplicator in the third embodiment among the four kinds of duplicators of FIG. 63;

FIGS. 81A and 81B show data tables used in the duplicator in the third embodiment of the tenth aspect of the present invention;

FIG. 97 shows a 7×7 band pass filter for emphasizing a spatial frequency of 100 lines/inch used in each embodiment of the eleventh aspect of the present invention;

FIG. 98 shows a 7×7 band pass filter for emphasizing a spatial frequency of 70 lines/inch used in each embodiment of the eleventh aspect of the present invention;

DESCRIPTION OF THE PREFERRED EMBODIMENTS

Figure 1:
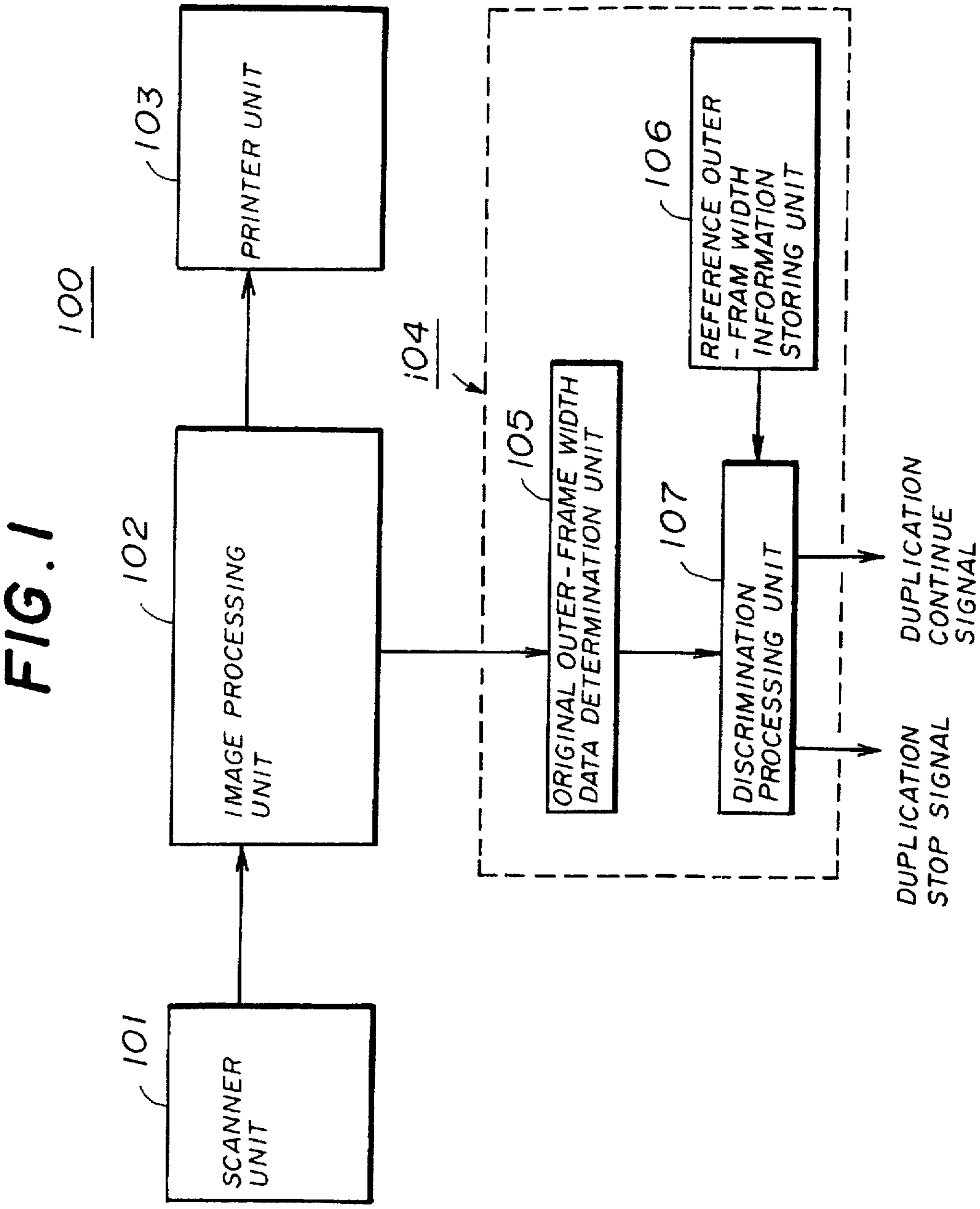
FIG. 1 shows a block diagram of an image forming apparatus including data replacement system in one embodiment of the first aspect of the present invention.

Embodiments for respective aspects of the present invention will be described. However, these descriptions are only by way illustration and the present invention will not be limited in its scope due to these illustrations. Various modified embodiments may be allowed as the scope of the present invention if they are in the scope claimed in the claims of the present invention and also are in accordance with the spirit of the present invention.

Here, in various cases in each embodiment described below, description will use Bank of Japan currency as the special document, that is, as the object to be discriminated. However, the special document is not limited to such paper money. It is possible to apply, to the 'special document' in the present invention, all documents of which copying is prohibited, such as various paper money bills, securities, checks, traveler's checks, etc. of Japan and any country. That is, the present invention allows application of any such documents to an original-discrimination system, and to an image forming system, image processing system and duplicator including it, each of which uses the document as the object to be discriminated.

The above documents are different from the Bank of Japan currency in characteristics such as colors, shapes and so on, and in their seal marks or in the existence or not of a seal mark, for example. However, it is believed that the basic principles, and concepts presented may be applied to such documents having different characteristics. This is because such papers are required to have characteristics in common, namely, a 'construction which is difficult to forge' fundamentally, due to their inherent purposes such as those mentioned above.

[EMBODIMENT ACCORDING TO A FIRST ASPECT OF THE PRESENT INVENTION]

An embodiment of the original-discrimination system according to the first aspect of the present invention has the following general construction. In the embodiment of the first aspect, the special document as the object to be discriminated comprises a note of paper money. The embodiment of the original-discrimination system of the first aspect comprises the following means: original outer-frame width determining means; reference outer-frame width information storing means; and discriminating means. The above original outer-frame width determination means extracts only data concerning edge parts of an original image corresponding to an original to be duplicated. Further, the original outer-frame width determining means determines, if it is necessary, as described below, the original outer-frame width using the extracted data. The above reference outer-frame width information storing means previously stores reference outer-frame width information described below for the various denominations of the currency as a discrimination base. The above discriminating means compares the original outer-frame width data and the reference outer-frame width information. If the discriminating means determines that the original outer-frame width data is identical to the reference outer-frame width information, the original-discrimination system determines that that original to be duplicated is identical to the denomination as the discrimination base.

The original-discrimination system in the embodiment according to the first aspect of the present invention will be described in detail.

The general construction of the image forming apparatus 100 (comprising a duplicator, for example, if it is to be mentioned as a concrete device) will be described with reference to FIG. 1. The image forming apparatus 100 comprises a scanner unit 101, an image processing unit 102, a printer unit and forgery prevention unit 104.

The scanner unit 102 reads an original image acting as an original to be duplicated. The image data concerning the original image input by means of the scanner unit 101 is input to the image processing unit 102. The image processing unit 102 performs, on the input image data, various well-known various kinds of image processing such as shading correction processing, γ-correction processing, tone processing and so on. The processed image data is then input to the printer unit 103. The printer unit 103 prints out the image corresponding to this input image data on a sheet of recording paper.

The well-known image processing performed by the above image processing unit 102 is performed generally for the well-known purpose of efficiently achieving the object of the image forming apparatus 100 taking into consideration various characteristics of the scanner unit 101 and the printer unit 103. The above object of the image forming apparatus 100 is to produce a duplicate (copy) image more resembling the original image. The meaning of the term 'resembling' is 'resembling as far as the human eye can sense'.

Concretely, the above well-known shading correction processing corrects certain undesirable characteristics of the scanner unit 101. The above undesirable characteristics are well-known ones which arise due to inferior reflection efficiency for the outside in the main scanning direction in comparison to the inside, in reading of an original image by means of the scanner unit 101. The above well-known γ-correction is correction for eliminating unnecessary quantization of data in the limits of the human eye's ability to sense, in quantization of the above image data. By such an elimination, it is possible to minimize the amount of the image data existing after the quantization. The above well-known tone processing converts the image data input as a result of reading by means of the scanner unit 101 into a form which is easily printed out by means of the printer unit 103. Image data corresponding to three colors R (red), G (green), and B (blue) is converted into image data respectively corresponding to the three colors Y (yellow), M (magenta), and C (chrome), for example. The above three colors of Y, M and C are colors of inks which the printer unit 103 uses.

Next, the above forgery prevention unit 104 functions as the original-discrimination system according to the first aspect of the present invention. That is, the image data of the original image input through the scanner unit 101 is input to the forgery prevention unit 104. The forgery prevention unit 104 determines whether or not the input image data is of paper money.

The forgery prevention unit 104 comprises, as shown in FIG. 1, an original outer-frame width determination unit 105, a discrimination processing unit 107 and a reference outer-frame width information storing unit 106.

Figure 11:
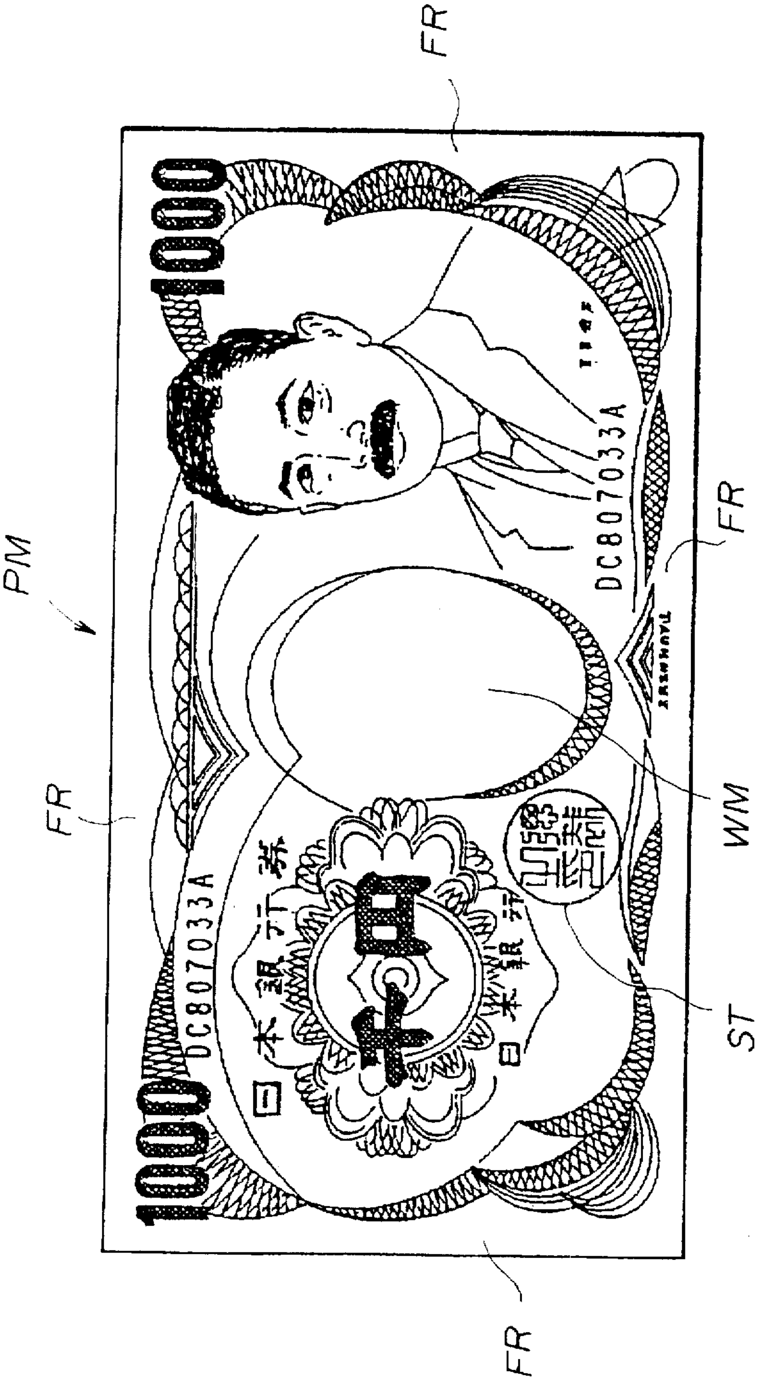
FIG. 11 shows a diagram of a Bank of Japan one-thousand-yen note as one example of an original which a digital-color-image inputting unit in the system of FIG. 9 inputs; a FIG. 12 shows an image pattern example previously registered by a pattern registering unit in the system of FIG. 9.

The original outer-frame width data determination unit 105 extracts a part of image data as 'original outer-frame layout data' from the image data input to the forgery prevention unit 104. The extracted part of image data comprises image data corresponding to a background region existing at the edge parts of the original image. If paper money is used as the original image for example, the above background region is a part of the paper money existing on the edge parts of the note and on which nothing is printed. In an example where the one-thousand-yen note PM of the Bank of Japan paper currency shown in FIG. 11 is used, a blank part FR (the hatched part in FIG. 3) existing at the four sides of the paper money PM is the 'background region in the edge parts'. In other words, the 'background region in the edge parts' is the area starting from the four outside edges of the paper money note and extending to positions where the first significant printed parts appear. The above significant printed parts comprise letters, numerals, picture patterns, and so on, for example. The above original outer-frame width data determination unit further determines, if it is appropriate, original outer-frame width data in accordance with the below described method.

The above reference outer-frame width storing unit 106 previously stores information as 'reference outer-frame width information' as follows: The image forming apparatus 100 adopts one or a plurality of denominations (two denominations being the ten-thousand-yen note and the one-thousand-yen note of the Bank of Japan currency, for example) as the discrimination bases. Each of these denominations has a background region in edge parts as mentioned above. Using information concerning the background region in edge parts of this denomination as described below, the reference outer-frame width information to be stored by the above reference outer-frame width information is formed.

The discrimination unit 107 compares the original outer-frame width data determined by the original outer-frame width determination unit 105 with the reference outer-frame width information of the paper money which has been previously stored by means of the reference outer-frame width information storing unit 106. If the result of the comparison is the determination result that the original outer-frame width data is identical to the reference outer-frame information, the forgery prevention unit 104 determines that the original image corresponding to the original outer-frame width data corresponds to the denomination acting as the discrimination object.

The general operation will now be described of the image forming apparatus in the embodiment, according to the first aspect of the present invention, having the above-described construction. Image data input through the scanner unit 101 is input into the image processing unit 102. The image processing unit 102 performs the above various kinds of image processing on the input image data. The image data, after being processed, is input into the printer unit 103. The printer unit 103 may render the image corresponding to the input image data. Whether or not the printer unit 103 carries out the printing operation for the original image depends on the result of the below described discrimination operation of the above forgery prevention unit. Through the series of operation, the image forming apparatus 100 forms the duplicate image as a result of duplicating the duplication-original image.

Figure 2:
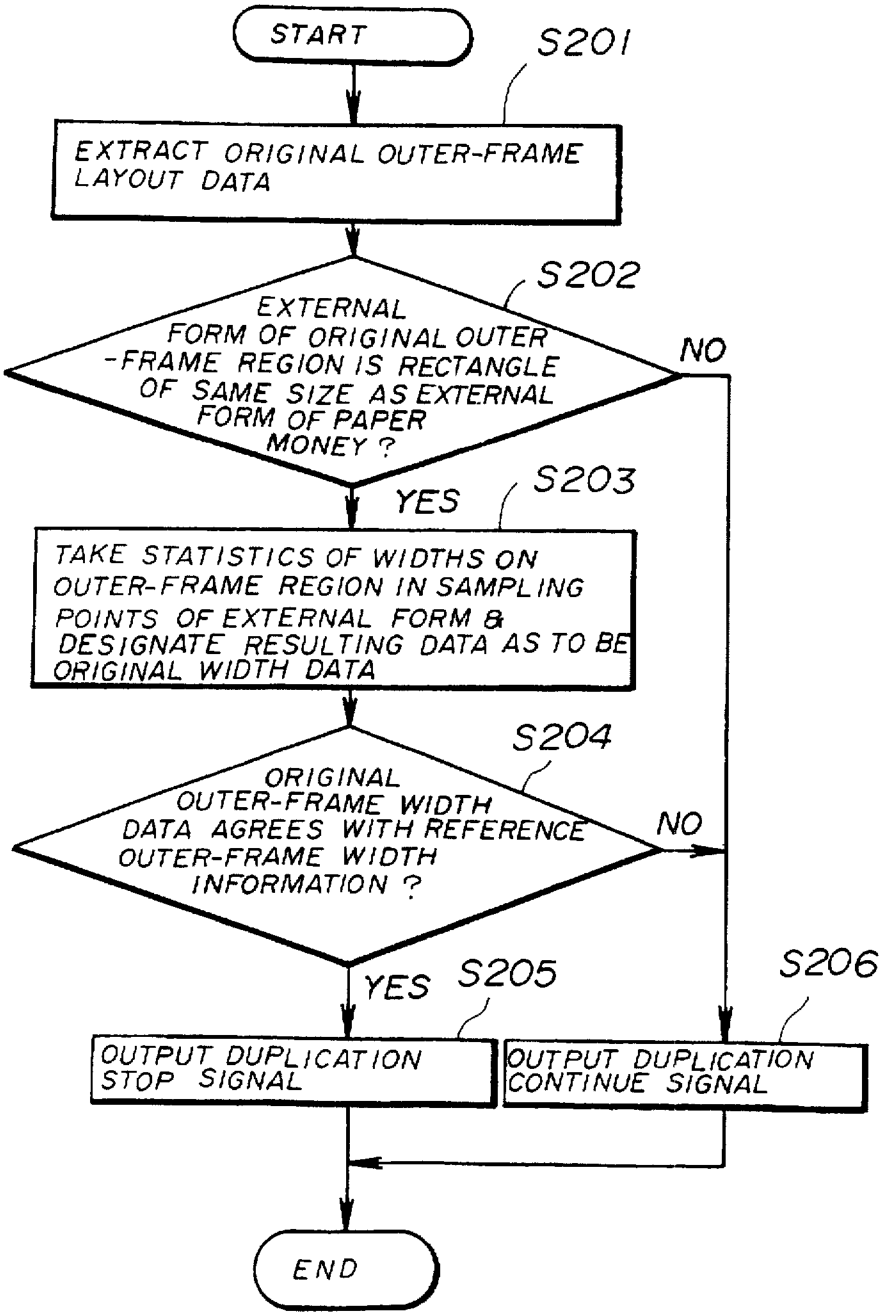
FIG. 2 shows a flow chart illustrating processing carried out by a forgery prevention unit used in the image forming apparatus.

The image data input through the scanner unit 101, simultaneously to being input into the image processing unit 102, is input to the forgery prevention unit 104. Next, the processing in the forgery prevention unit 104 will be described in detail with reference to FIG. 2.

In a step S201, the original outer-frame layout data in the image data input to the forgery prevention unit 104 is extracted as described above by the original outer-frame width data determination unit 105.

Next, in S202, the original outer-frame width data determination unit 105 uses a rectangular shape having the shape of the outline of the corresponding background region in edge parts (referred to as the original outer-frame layout region, hereinafter) in the extracted original outer-frame layout data, that is, having certain dimensions. The shape of the outline is compared with the corresponding outline of the background region in edge parts of the paper money in the above reference outer-frame layout information. This outline of the reference outer-frame layout information is also a rectangular shape having certain dimensions. These two rectangular shapes are compared with respect to their dimensions. As a result of this comparison, if it is determined that the rectangular shapes are not identical, S206 is carried out. In that case, it can be said that a probability that the original image to which the original outer-frame layout data corresponds is money of the same denomination as the paper money to which the reference outer-frame layout information corresponds is very low. In S206, the discrimination unit 107 outputs a duplication continuation signal and thus allows the image forming apparatus 100 to continue the duplication operation. Further, in S202, there is a case where the original outer-frame width determination unit 105 determines that the above two rectangular shapes are identical. In this case, the original outer-frame width determination unit 105 then carries out S203. In S203, the original outer-frame width determination unit 105 uses the above extracted original outer-frame layout data, by having the discrimination processing unit 107 gather statistics regarding the widths h of the original outer-frame layout region at a plurality of predetermined sampling positions. The sampling positions are arranged at predetermined intervals along the outline of the original outer-frame layout region.

Figure 3:
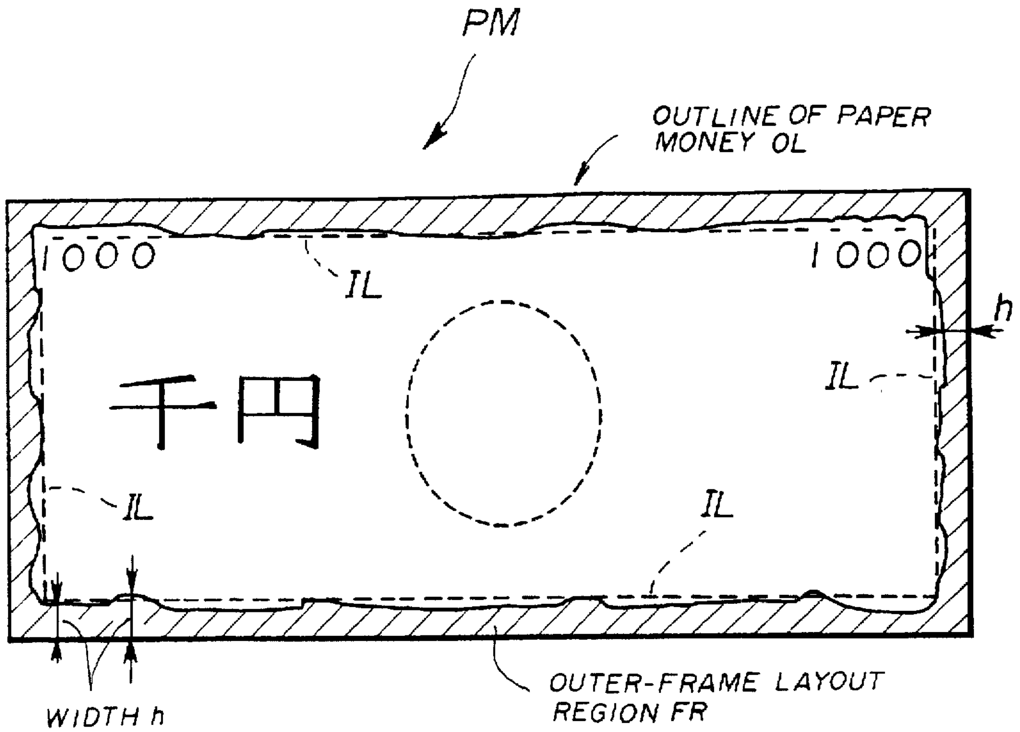
FIG. 3 shows a concept of an outer-frame layout region which the forgery prevention unit uses.

If the original in that comprises paper money, for example, as shown in FIG. 3, the width h is the distance at each sampling position above between the outline of the original and the printed part such as mentioned above. The distance is one measured along a direction substantially perpendicular to the above outline.

Figure 4:
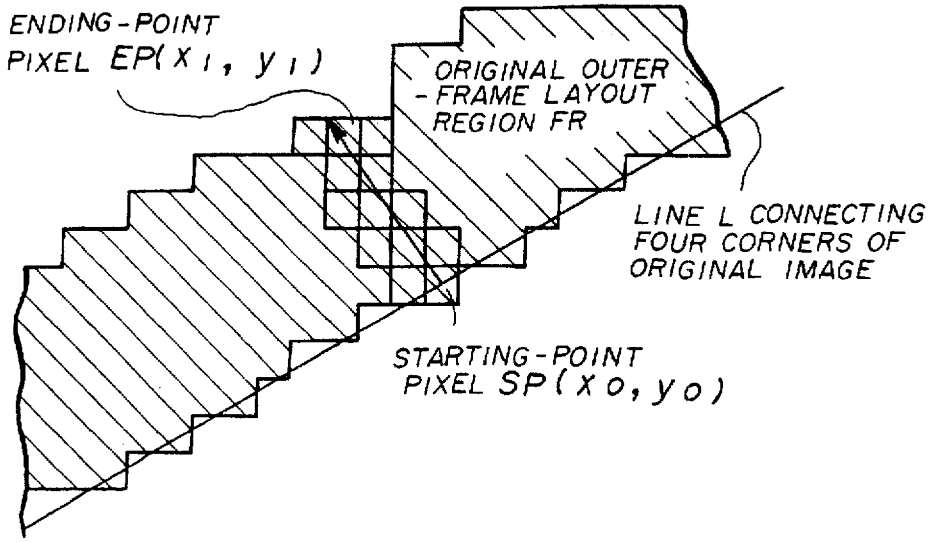
FIG. 4 shows a diagram for illustrating a method of obtaining a width h of an outer-frame layout region which the forgery unit uses in a discrimination processing, FIG. 4 resulting from magnifying the outer-frame layout region shown in FIG. 3.

The width h may be obtained by the following method, for example. FIG. 4 is to be referred to. A reference line L is formed by connecting between adjacent corners of the four corners out of the original image. (X, Y) coordinates of a pixel (referred to as a starting pixel SP hereinafter) constituting the outer edge of the above original outer-frame layout region are referred to as ($x_O$, $y_O$. This starting point pixel SP corresponds to one position among the above plurality of sampling positions. A line is extended from this starting point SP along a direction perpendicular to the above reference line L toward the inside of the original.

There is a pixel at a point at which the extended line and the inside edge of the above outer-frame layout region cross. This pixel forms the inside edge part of this outer-frame layout region. This pixel is referred to as an ending point pixel EP and the coordinates of this pixel EP are referred to as $(x_1, y_1)$. In this case, the width h of this outer-frame layout region corresponding to that sampling position may be obtained by the following equation (1-1).

$$h=\{(x_1-x_0)^2+(y_1-y_0)^2\}^{1/2} \quad (1\text{-}1)$$

Thus the width h (referred to as an original outer-frame width h, hereinafter) of the original outer-frame layout region is obtained for the above plurality of sampling positions. In S203, further, predetermined statistics are obtained using the plurality of original outer-frame widths h obtained as described above. The statistics are obtained by the original outer-frame determination unit 105. These predetermined statistics will be referred to as 'original outer-frame width data', hereinafter.

A method for gathering the predetermined statistics as the above original outer-frame width data will be described below.

Further, statistics, of the widths h at a plurality of predetermined sampling positions at predetermined intervals along the outline of the reference outer-frame layout region, in the corresponding background region in edge parts (referred to as a reference outer-frame layout region, hereinafter) of the above reference outer-frame layout information, are previously obtained. The same method to obtain the above plurality of 'original outer-frame widths h' may be used. Hereinafter, the widths h thus obtained will be referred to as 'reference outer-frame widths h'.

The maximum among the thus obtained plurality of 'reference outer-frame widths h' is referred to as $h_{max}$. The $h_{max}$ is divided into a predetermined number of M equal pieces. The length resulting from the above M-equal-division will be referred to as H. The series of calculations work starting from the above obtaining of the plurality of reference outer-frame widths h and up to the obtaining of the above value H may be carried out previously.

Then, each of the above-mentioned plurality of original outer-frame widths h is used. In this use, an integer i is to be successively varied in a scope of $1<i<M$ for each of the original outer-frame widths h and each time of this variation, it is determined that $(i-1)\ M<h\leqq i\cdot M$ each time. As a result, the corresponding i is determined for each h. Next, i is to be varied in a scope of $1<i<M$ on all original outer-frame widths h, and each time of this variation, the number C(i) of the original outer-frame widths corresponding to the value i is counted. Thus the above-mentioned predetermined statistics are taken and thus the above-mentioned 'original outer-frame width data C(i)' may be obtained.

Figure 5:
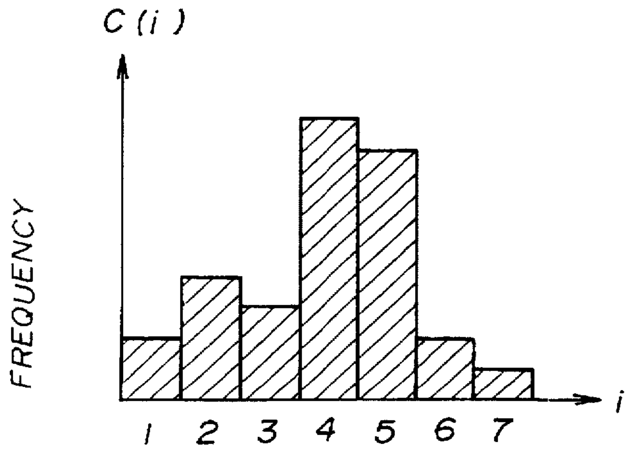
FIG. 5 shows a bar graph illustrating statistics of the width h of the outer-frame layout region.

An example of C(i) where M=7 is shown in FIG. 5. In the example of FIG. 5, C(4) is the maximum where i=4. That is, in this example, it can be said that most of the original outer-frame widths h are greater than the maximum value 3/7 and equal to or smaller than the value 4/7.

Further, by a method identical to the statistics in which the above original outer-frame width data C(i) has been obtained, statistics may be previously obtained for the reference outer-frame widths h, and stored as 'reference outer-frame width information D(i)' in the outer-frame width storing unit 106.

After the original outer-frame width data is thus determined in S203, the above discrimination processing unit 107 compares the original outer-frame width data C(i) with the reference outer-frame width information D(i) previously stored in the outer-frame information storing unit 106. This operation corresponds to S204 in FIG. 2. The determination in S204 is carried out using the below described 'resemblance degree'. The resemblance degree is obtained by using the following equation (2):

$$\text{resemblance degree} = \frac{\sum_{i=1}^{M} |C(i) - D(i)|}{\sum_{i=1}^{M} D(i)} \quad (2)$$

The discrimination processing unit 107 compares this resemblance degree with a predetermined threshold value a. The discrimination processing unit 107, if (resemblance degree)<α, determines that the above original outer-frame width data agrees with the above reference outer-frame width information.

In the equation (2), the closer the resemblance degree is to 0, the more closely the original image approximates the denomination (one-thousand-yen note, for example) being used as the discrimination base, and thus the more likely it is that the original image is in fact a note of this denomination. It is possible to adjust the discrimination accuracy in the discrimination processing unit 107 by adjusting the above threshold value α. The closer a is to 0, the higher the match probability between an original and money of the relevant denomination must be before the original is determined to be money of the relevant denomination.

If the discrimination processing unit 107 provides the determination result of 'agreement' in S204, the unit 107 determines that the original comprises money of the relevant denomination. The discrimination processing unit 107 then outputs a 'duplication stop signal'. This output operation corresponds to S205. Further, the discrimination unit 107, if it provides the determination result of 'disagreement' in S204, determines that the original does not comprise the money denomination. As a result of this determination, the discrimination processing unit 107 outputs a 'duplication continuation signal'. This output operation corresponds to S206. The forgery prevention unit 104 terminates the paper-money discrimination operation for this duplication-original image after the above described operations.

Thus, the above embodiment according to the first aspect of the present invention obtains the original outer-frame width data by taking statistics of the plurality of widths in the outer-frame layout region of the duplication-original image. Further, this embodiment compares this original outer-frame width data with the reference outer-frame width information previously stored for each money denomination. This embodiment, using the result of this comparison, determines whether or not the duplication original comprises that money denomination. The present embodiment uses only data concerning the widths of the outer-frame layout region of an original. Therefore, it is possible to achieve a low-cost forgery prevention unit having a simple construction. Further, in a forgery prevention unit having such a simple construction, it is possible to make its operation speed high. Therefore, it is possible to speedily carry out the paper-money discrimination.

The present invention is not limited to such an embodiment. That is, data to be used for the discrimination is not limited to such things as the 'original outer-frame width data', and the 'reference outer-frame width information' used in the present embodiment. As shown in FIG. 3 for example, a rectangle IL is determined for each of the duplication original and a certain money denomination by inward shifting four sides of its outline by an appropriate width. Each of these rectangles IL naturally comprises a similar figure to the original outline. Then, the area of the 'background region' such as described above existing between the rectangle IL and the outline is measured. The thus measured 'original outer-frame area' measured in the duplication original and the 'reference outer-frame area' measured in that money denomination may be compared. Such a method is also included in the first aspect of the present invention.

In a method using such 'outer-frame areas', the above 'reference outer-frame area' corresponds to the 'reference outer-frame width information' in the above embodiment and may be previously stored in a part corresponding to the above reference outer-frame width information storing unit 106.

The first aspect of the present invention is not limited to the discrimination of paper money, and comprises systems for discriminating other special documents such as securities.

[EMBODIMENT OF THE SECOND ASPECT OF THE PRESENT INVENTION]

An original-discrimination system in an embodiment of the above-mentioned second aspect of the present invention has the following general construction.

The system in this embodiment comprises reference background-edge length storing means which previously stores reference background-edge length information concerning the length of a below described background-edge characteristic of paper money of predetermined denominations. The background-edge is associated with a background region of the relevant paper money. A background region refers to a region where nothing is printed. The background region here corresponds, as shown in FIG. 11, for a one-thousand-yen note of the Bank of Japan, to an elliptic water mark region WM located at the center thereof, for example. Further, the same system comprises original background-edge detecting means for detecting an image of a background edge such as described above in an original image to be duplicated. The data concerning the image of this background edge of the original will be referred to as original background-edge data, hereinafter. This detection is carried out by comparing the density level in the background region of the paper money of the above predetermined denomination with the density level at each position in the image of the above original. Then, if the result of the comparison for a certain region in the original image is that they are approximate in a predetermined degree, the relevant region is determined to comprise the original background-edge.

Further, the same system comprises background-edge length determining means. The background-edge length determining means detects from the above original background-edge data, the length of the image to which the same data corresponds. The above length will be referred to as original background-edge length data, hereinafter. The same background-edge length determining means compares the reference background-edge length information stored in the above background-edge length storing means with the above original background-edge length data. The same background-edge length determining means outputs the result of the comparison, that is, whether or not they agree.

Further, the system comprises original position detecting means. The original position detecting means, if the result of the determination by means of the above original background-edge determining means is agreement, determines that the position, to which the relevant original background-edge length data corresponds, is a position which corresponds to the paper money of the above denomination. The position will be referred to as a paper-money corresponding position, hereinafter. Further, the system comprises discrimination means. The discrimination means compares the reference image information corresponding to the paper money of the above predetermined denomination, which has been previously registered, with the image of the above original at the paper-money corresponding position detected by the above original position detecting means. The discrimination means uses the result of the comparison and thus determines whether or not the relevant original is identical to the paper money of the above predetermined denomination.

The discrimination means, under the condition where a specific position of a specific pattern in the above previously stored reference image information matches the corresponding specific position of the specific pattern detected in the relevant original image, determines whether or not the above stored specific pattern and the corresponding specific pattern of the original image agree.

Further, the above original position detecting means of the same system having such a construction, in order to detect a paper-money corresponding position such as mentioned above, detects the center of gravity of the corresponding background-edge image. Then, the original position detecting means outputs the position of the center of gravity as the relevant paper-money corresponding position.

The above embodiment of the first aspect of the present invention will now be described with reference to relevant drawings.

Figure 6:
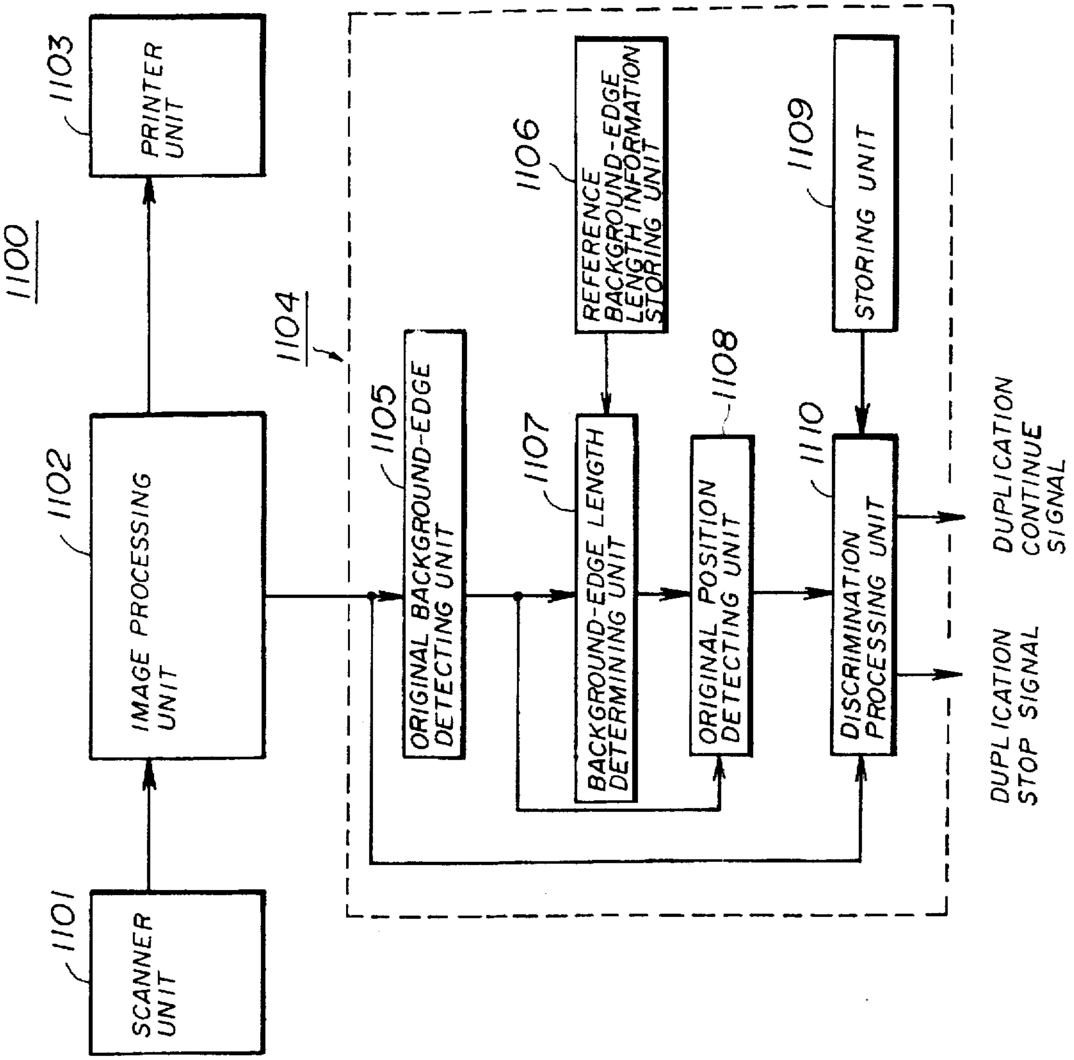
FIG. 6 shows a block diagram of an image forming apparatus including a data replacement system in one embodiment of the second aspect of the present invention.

In FIG. 6, an image forming apparatus 1100 comprises a scanner unit 1101, an image processing unit 1102 and a printer unit 1103. These units have constructions similar to those of the scanner unit 101, image processing unit 102 and printer unit 103. Therefore, description concerning the constructions and operations of these units is omitted.

Further, the apparatus 1100 comprises a forgery preventing unit 1104. The forgery preventing unit 1104 acts as the original discrimination system according to the first aspect of the present invention. The forgery preventing unit 1104 determines whether or not an original image input through the scanner unit 1101 is identical to a paper money note of a predetermined denomination.

The forgery preventing unit 1104 comprises an original background-edge detecting unit 1105, a background-edge length determining unit 1107, an original position detecting unit 1108, a reference background-edge length information storing unit 1106, a discrimination processing unit 1110 and a storing unit 1109.

The above original background-edge detecting unit 1105 acts as the above original background-edge detecting means. The background-edge length determining unit 1107 acts as the above background-edge length determining means. The original position detecting unit 1108 acts as the above original position detecting means. The reference background-edge length information storing unit 1106 acts as the above reference background-edge storing means. The discrimination processing unit 1110 acts as the above discrimination means. The storing unit 1109 previously stores the above reference image information to be used in the determining operation by the above discrimination means.

The original-image data input through the above scanner unit 1101 is provided to the above forgery preventing unit 1104. Similarly to the above embodiment of the first aspect of the present invention, whether or not the printer unit 1103 performs the printing operation of the relevant original image is determined from the result of the below described determining operation by the above forgery preventing unit 1104. The forgery preventing unit 1104 determines whether or not the relevant original is paper money of a predetermined denomination, and if the result of the determining is that the paper money is of the predetermined denomination, inhibits the printing of the relevant original from being performed, thus preventing the forgery of the paper money.

Figure 7:
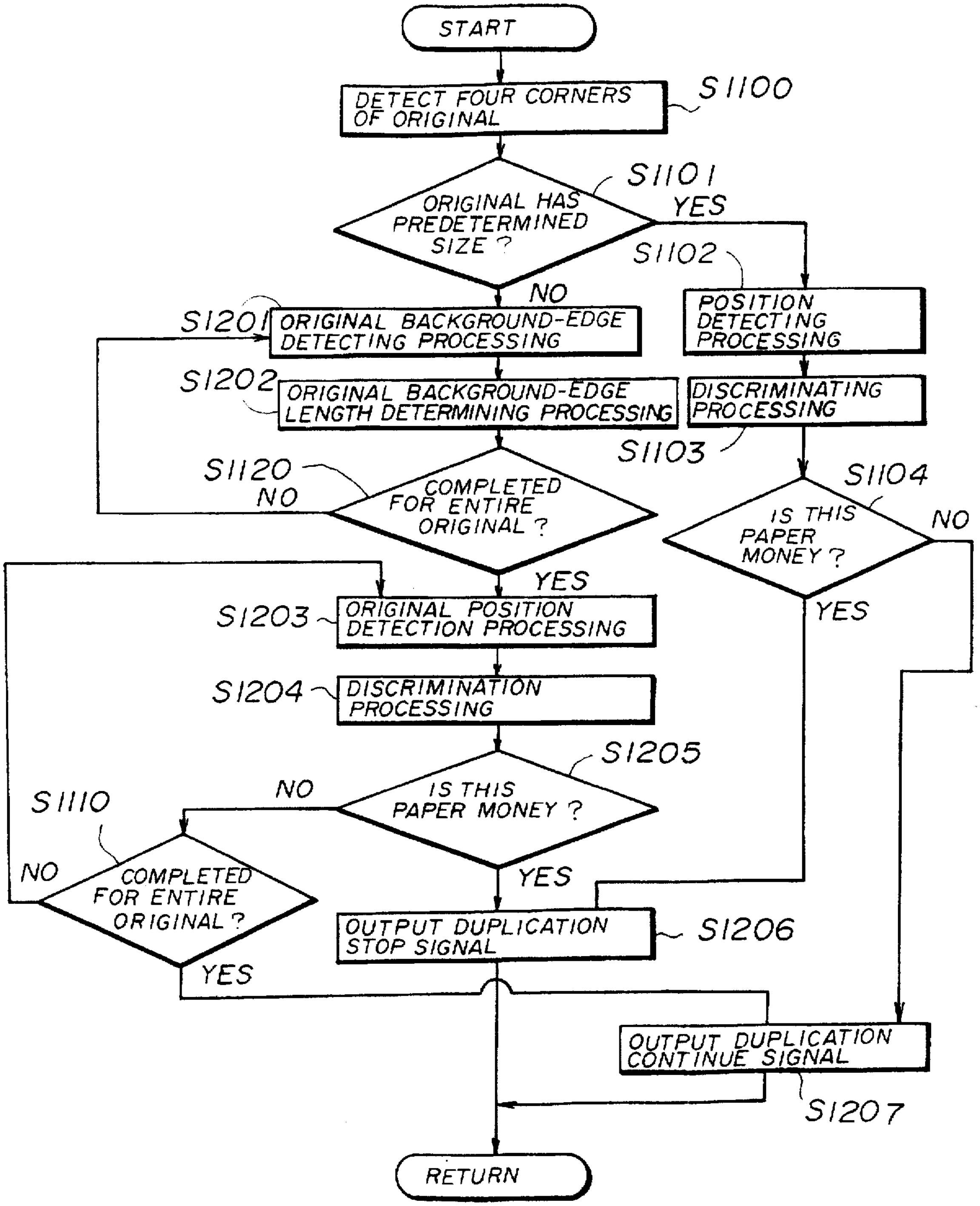
FIG. 7 shows a flow chart of processing carried out by a forgery prevention unit in the image forming apparatus.

With reference to FIG. 7, an operation carried out by the same forgery preventing unit 1104 will be described. The above original background-edge detecting unit 1105, when the relevant original-image data is input thereto from the scanner unit 1101, carries out the operation of steps S1100 and S1101. That is, in S1100, it detects the four corners of the relevant original. Subsequently, in S1101, from the spatial relationship between the thus detected four corners, the same determines the size of the relevant original. Further, in S1101, it compares the size of the relevant original with the previously stored reference size of the paper money of the predetermined denomination.

If the result of the comparison in S1101 is that the reference size and the size of the relevant original agree, the original position detecting unit 1108 carries out S1102. That is, the detected data concerning the original's four corners is used to detect the position of the original on the platen glass of the same apparatus 1100. Subsequently, the above discrimination processing unit 1110 carries out S1103. That is, the above reference image information stored in the above storing unit 1109 is compared with the original-image data such as mentioned above of the original.

In the case of this comparison, if it cannot be found at which position the original is placed on the above platen glass, it cannot be determined which region in the image data input through the scanner unit 1101 corresponds to the original. This is because, as is well-known, the size of such a platen glass is considerably larger than the size of a paper money bill. The scanner unit 1101 inputs image data corresponding to the size of the platen glass.

Thus, for the comparison in the discrimination processing unit 1110, determination of position by means of the original position determining unit 1108 is required. After the position of the original image relative to the entire image of the platen glass is thus determined, it is possible to determine whether or not the original image is identical to the reference image by comparison by superimposing the reference image, for example.

Subsequently, the discrimination processing unit 1110 carries out S1104. That is, it outputs the result of the above comparison. The contents of the comparison is whether or not the original matches the paper money of the above predetermined denomination. If the comparison comprises matching the paper money of the predetermined denomination, the discrimination processing unit 1110 then outputs a duplication stop signal in S1206. If the comparison comprises not matching the paper money of the predetermined denomination, the discrimination processing unit 1110 outputs in S1207 a duplication continuation signal.

Further, in S1101, if the size of the original is not the predetermined size, that is, the size of the original does not agree with the size of the paper money of the predetermined denomination, the original background-edge detecting unit 1105 carries out S1201. The step comprises the operation of the above background-edge detecting means as described above. There, the density level of a background region such as mentioned above may be obtained by using the density level in the image data at the watermark region WM in the paper money illustrated in FIG. 11 for example.

The density data of the background region comprises, as is well-known, density data concerning respective colors, R (red), G (green), and B (blue). The density data of the background region may be previously stored in the original background-edge detecting unit 1105. As shown in FIG. 6, the image data input through the scanner unit 1101 is processed in the image processing unit 1102 and also processed in the discrimination processing unit 1110 simultaneously.

The data concerning the background edge detected by the original background-edge detecting unit 1105 is sent to the background-edge length detecting unit 1107 and the original position detecting unit 1108. The background-edge detecting unit 1107 measures in S1202 of FIG. 7 the length of the background edge detected by the original background-edge detecting unit 1105. Further, the background-edge detecting unit 1107, in the same S1202, compares the measured length of the background edge with the information concerning the corresponding reference background-edge length previously stored in the reference background-edge length storing unit 1105. As a result of this comparison, the background-edge detecting unit 1107, in the same S1202, determines whether or not the measured original background-edge length agrees with the previously stored reference background-edge length. It outputs the determination result to the original position detecting unit 108. There, in S1120, in order to cause the above steps S1201 and S1202 to be performed on all of the below described sub-originals, it is determined whether these steps are completed for the entire original.

The original position detecting unit 1108 which has received the determination result, if the result is agreement, uses the data concerning the background edge detected by the background-edge detecting unit 1105 and thus determines the center of gravity of the background-edge region.

The case where the determination result is agreement may be in cases as below. Plural paper money bills may be arranged on the platen glass of the same apparatus 1100 without any spaces between them. In this case, the above background-edge regions, that is, the watermark regions WM of the paper money of FIG. 11 for example, lie there in the number of them corresponding to the number of the bills. One of them may be detected, and it may agree with the above reference background-edge length. In contrast to the original formed by placing such a plurality of paper money bills, for example, without any space existing therebetween, the regions corresponding to the respective bills will be referred to as sub-originals, hereinafter.

Figure 8:
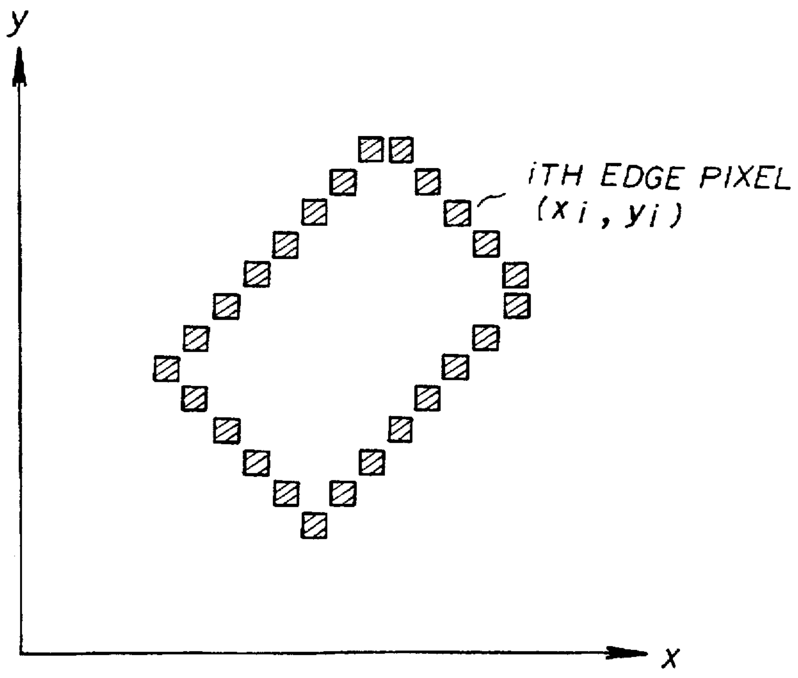
FIG. 8 shows an X-Y coordinate graph for illustrating processing for obtaining coordinates of center of gravity using respective coordinate values of a plurality of edge pixels, which processing a position detecting unit in the image forming apparatus executes.

The above determination of the center of gravity is carried out by a method shown in FIG. 8, for example. That is, respective numbers are sequentially assigned to the pixels (referred to as edge pixels, hereinafter) in the image data corresponding to the background edge. It is assumed that the thus assigned numbers comprise 1-N. That is, the total number of these edge pixels is N. It is assumed that the coordinates of the edge pixel corresponding to one of the numbers are $(x_i, y_i)$. In this case, the coordinates (*x, *y) of the center of gravity of the above edge pixels may be obtained by the following equations (2-1) and (2-2).

$$*x = \frac{1}{N} \sum_{i=1}^{N} x_i \quad (2\text{-}1)$$

-continued $$*y = \frac{1}{N}\sum_{i=1}^{N} y_i \qquad (2\text{-}2)$$

Then, the discrimination processing unit 1110, in S1204, uses the thus obtained center of gravity coordinates of the edge pixels associated with the corresponding sub-original and thus compares the image data concerning the sub-original with the above reference image information previously stored in the storing unit 1109. Further, in this comparison, the four-corner data of the relevant original is also used. It is used for determining the rotation orientation, that is, the inclination of the same sub-original. Thus, as a result of determining the rotation orientation and position of the relevant sub-original, the above comparison can be performed by superimposing the reference image and the sub-original image.

Further, the discrimination processing unit 25 1110, in S1205, if the result of the above comparison is that the original-image data agrees with the reference image information, determines that the sub-original is identical to the paper money of the above predetermined denomination. In this case, in S1206, a duplication stop signal is output and the processing shown in FIG. 7 is terminated. The duplication stop signal being thus output causes the printer unit 1103 to stop the printing operation for the image data concerning the relevant sub-original, thus preventing the relevant sub-original from being normally duplicated.

If the determination in S1205 is that the sub-original is not the paper money, S1110 is then carried out. That is, it is determined whether or not the series of steps S1203–S1205 have been performed on the entirety of the original placed on the platen glass of the same system 1100. If the relevant original consists of a combination of many sub-originals for example, it is determined whether these steps have been performed on all of these sub-originals. That is, it is checked that none of these sub-originals comprises paper money of the above predetermined denomination. As a result, if even one of these sub-originals is the paper money of the predetermined denomination, the operation is such that the relevant original is not duplicated. That is, in such a case, in S1206, the duplication stop signal is output. On the other hand, if the result of the above inspection for all of the sub-originals is that there is no sub-original identical to the paper money of the predetermined denomination in the original, in S1207, the duplication continue signal is output, and then the printing operation for the image data concerning the relevant original is carried out by means of the printer unit 1103, and the original is thus duplicated.

Thus, according to the second aspect of the present invention, even if a duplication original comprises a combination of a plurality of sub-originals, the respective positions of these sub-originals are detected, and then the determination operation of whether or not any of them is the special document is performed for the respective sub-originals. Therefore, if such an original comprises one resulting from combining a plurality of bills of predetermined paper money for example, the possibility that it is determined that the overall original does not comprise paper money, and as a result the original is duplicated and the paper money is undesirably duplicated. Even in such a case, such an erroneous operation can be prevented by the second aspect of the present invention.

[EMBODIMENT OF THIRD ASPECT OF THE PRESENT INVENTION]

The general construction of an embodiment of the third aspect of the present invention will now be described.

Figure 9:
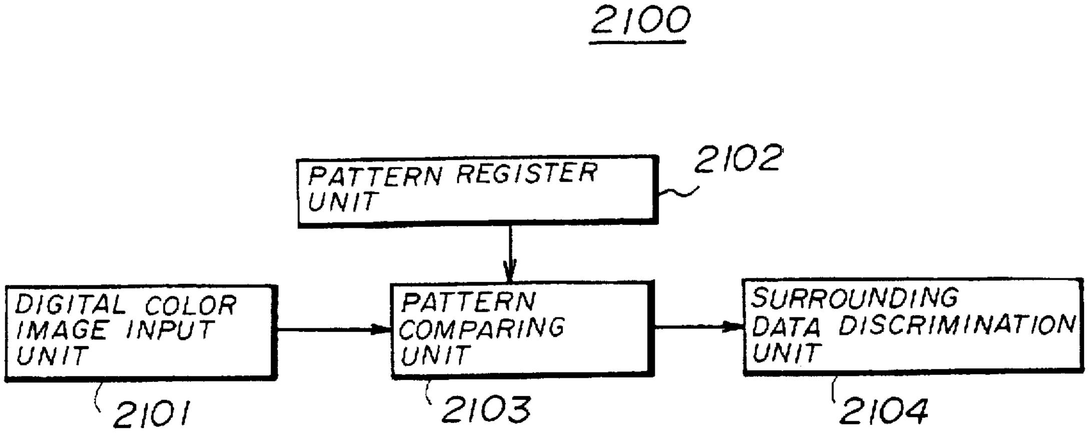
FIG. 9 shows a general-construction block diagram of a data replacement system in one embodiment of the third aspect of the present invention.

An original discrimination system 2100, see FIG. 9, in the embodiment of the third aspect of the present invention comprises image input means for inputting digital image data, and pattern register means which previously registers predetermined reference pattern image information in a predetermined reference image. The original discrimination system 2100 further comprises comparing means. The comparing means compares the above reference pattern image information with the above digital image data. Further, the comparing means extracts partial image data which has been determined to be identical to the reference pattern image information in the above comparison. The extracted partial image data comprises a part of the above digital image data.

Further, the original discrimination system 2100 comprises discrimination means. The discrimination means uses image data concerning a surrounding region of the partial image to which the above extracted partial image data corresponds and thus performs the discrimination. The discrimination refers to whether or not the above digital image data is identical to the special document. Further, the above used surrounding region refers to a region in the original image corresponding to the relevant digital image data.

The above special document refers to paper money of a predetermined denomination and/or securities, for example.

Further, the above predetermined reference pattern image information refers to a seal mark on a paper money note of a predetermined denomination, for example.

The discrimination wherein image data concerning the above surrounding region is used refers to a determination whether or not the image of the surrounding region of the seal mark corresponds to a picture pattern, for example.

Further, the discrimination wherein the above seal mark is used refers to such detection as described below. The image concerning the round outline of the seal mark ST in the paper money of FIG. 11 is used as a reference for the relevant determination, where the image concerning the round outline is previously stored in a memory, and then it is detected whether or not an image identical to that image exists in the input digital image. There, in this detection, the color of the outline as well as the shape of the outline is used.

Then, as a result of the same detection, if an image identical to the reference image is included in the relevant digital image, the identical region is extracted from the digital image. Then, the image of the surrounding region of the extracted image is used and the discrimination is carried out. The surrounding region refers to a region in the relevant digital image. The discrimination wherein the surrounding region is used is, as described above, carried out by determining whether the surrounding region comprises a picture pattern. By this discrimination, it is determined whether or not the relevant digital image corresponds to the above special document.

An original discrimination apparatus 2100 in an embodiment of the third aspect of the present invention will now be described in detail. In FIG. 9, a digital color input unit 2101 acts as the above image input means. The digital color input unit 2101 comprises a color scanner, for example, and reads an image associated with a desired original. The desired original may comprise paper money, for example. The digital color input unit 2101 inputs the image of the read original as digital image data of R (red), G (green), and B (blue), each comprising 8 bits, for example, into the apparatus 2100.

Further, the apparatus 2100 comprises a pattern register unit 2102. The pattern register unit 2100 acts as the above pattern register means. The unit 2100 comprises a ROM (read only memory), for example.

The pattern register unit 2100 previously registers the color of the seal mark on a paper money note of a predetermined denomination, for example. In this registering of the color, the color of the seal mark has the following distribution, for example:

R: 130–140

G: 10–20

B: 5–15.

The above numerical values of the respective colors represent density values in a density scale of 256 tones, for example.

The apparatus 2100 comprises a pattern comparing unit 2103 acting as the above pattern comparing means. The part 2103, similarly to the above operation of the above pattern comparing means, compares the above input digital color image data with the above previously registered reference pattern information. As a result, if the reference pattern information comprises information corresponding to the outline of the seal mark ST of the paper money of FIG. 11 as mentioned above, for example, there is a case where data, identical to the reference pattern information concerning the shape and color of the outline, exists in the digital color image data. In this case, the pattern comparing unit 2103 determines that this identical part, in the relevant digital color image data, is identical to the seal mark of the paper money of the above predetermined denomination.

Further, the apparatus 2100 comprises a surrounding-data discrimination unit 2104. This part 2104 uses the surrounding region of the part, in the above digital color image data, corresponding to the seal mark of the paper money of the above predetermined denomination, which part has been detected by the comparison operation by means of the pattern comparing unit 2103 as described above, and thus carries out the discrimination operation as described above. The discrimination determines whether or not the surrounding region comprises a picture pattern, for example.

The determination whether or not it comprises a picture pattern is carried out as described below. It is determined how great is the difference between respective density data sets different among respective positions in the above surrounding region and the average thereof.

An operation of the apparatus 2100 having the above construction will be described with reference to FIG. 10. In this case, the above paper money of the predetermined denomination is taken to be a one-thousand-yen note of the Bank of Japan (referred to as simply one-thousand-yen note, hereinafter) shown in FIG. 11. Further, an example will be considered where the original, which the above digital color image input unit 2101 reads, comprises such a one-thousand-yen note.

First, the digital color image input unit 2101 reads and thus obtains the image data concerning the one-thousand-yen note. As a result, The digital color image input unit 2101, in S2201, converts the obtained image data to the corresponding digital color image data of R, G, and B, each comprising 8 bits, and then outputs it.

Figure 12:
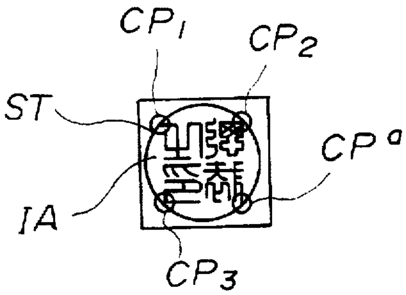

Subsequently, the pattern comparing unit 2103 reads, from the pattern register unit 2102, the previously registered reference pattern information concerning the outline of the round seal mark ST in the one-thousand-yen note as shown in FIG. 12. The pattern comparing unit 2103, in S2202, compares the read reference pattern information with the digital color image data which has been input through the above digital color image input unit 2101. Thus, the pattern comparing unit 2103 determines whether or not the digital color image data concerning the above original comprises image data matching the reference image information concerning the seal mark ST.

As a result, if it is determined that the digital color image data comprises the data corresponding to the reference image information concerning the seal mark ST, subsequently, as described above, the discrimination is carried out as described below. The data concerning the surrounding region surrounding the region which has been determined to correspond to the seal mark ST is used. The surrounding data refers to image data such as the surrounding data PD shown in FIG. 13. The surrounding discrimination unit 2104 extracts such surrounding data PD from the digital color image data concerning the original, and uses the extracted surrounding data PD, in S2203, to determine whether or not a picture pattern exists surrounding the region which has been determined to correspond to the seal mark ST.

Figure 13:
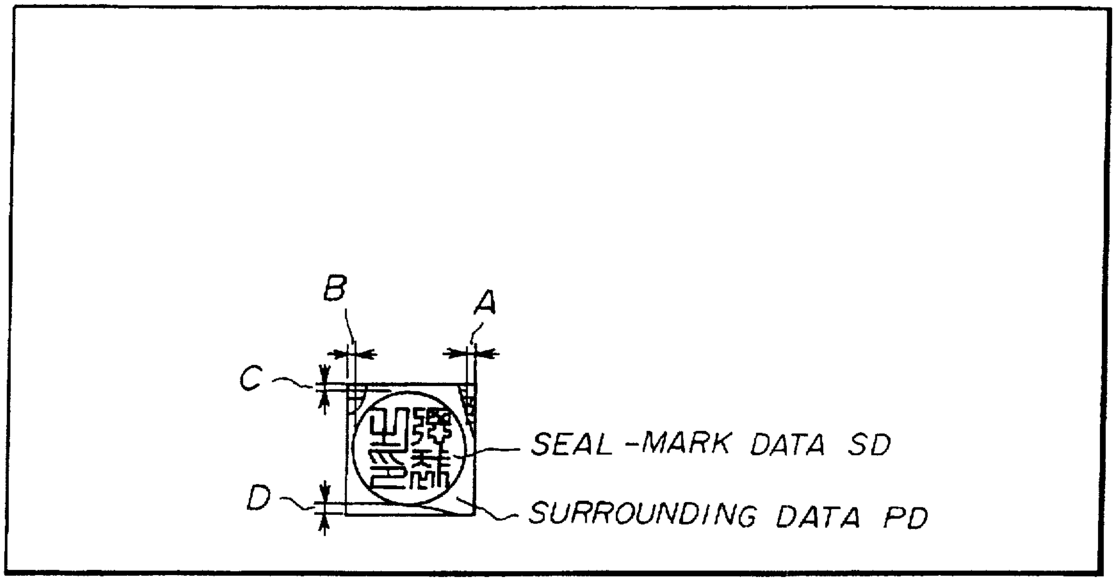
FIG. 13 shows a diagram of a seal mark and a surrounding region thereof as a digital color image extracted by a pattern comparing unit in the system of FIG. 9.

This determination consists of extracting appropriate pixels (about ten) from each of areas A, B, C and D shown in FIG. 13. The sets of numbers comprising density values of these respective 40 pixels will be referred to as surrounding data sets A, B, C and D, hereinafter. Subsequently, the average density value of all the 40 pixels of the above surrounding data sets A, B, C and D is calculated. Then, the total 40 kinds of differences between each of the density values of the surrounding data sets and the above average of the density values is calculated. Then, if none of the total 40 kinds of the differences exceeds a predetermined threshold value, it is determined that the relevant surrounding data PD does not correspond to a picture pattern.

Figure 14:
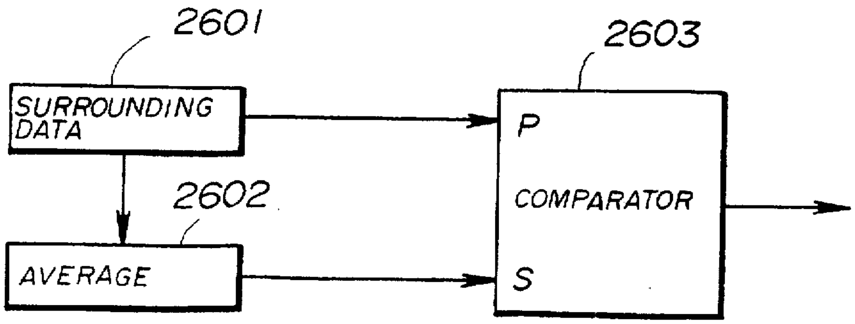
FIG. 14 shows a general-construction block diagram of a surrounding-data discriminating unit in the system of FIG. 9.
Figure 15:
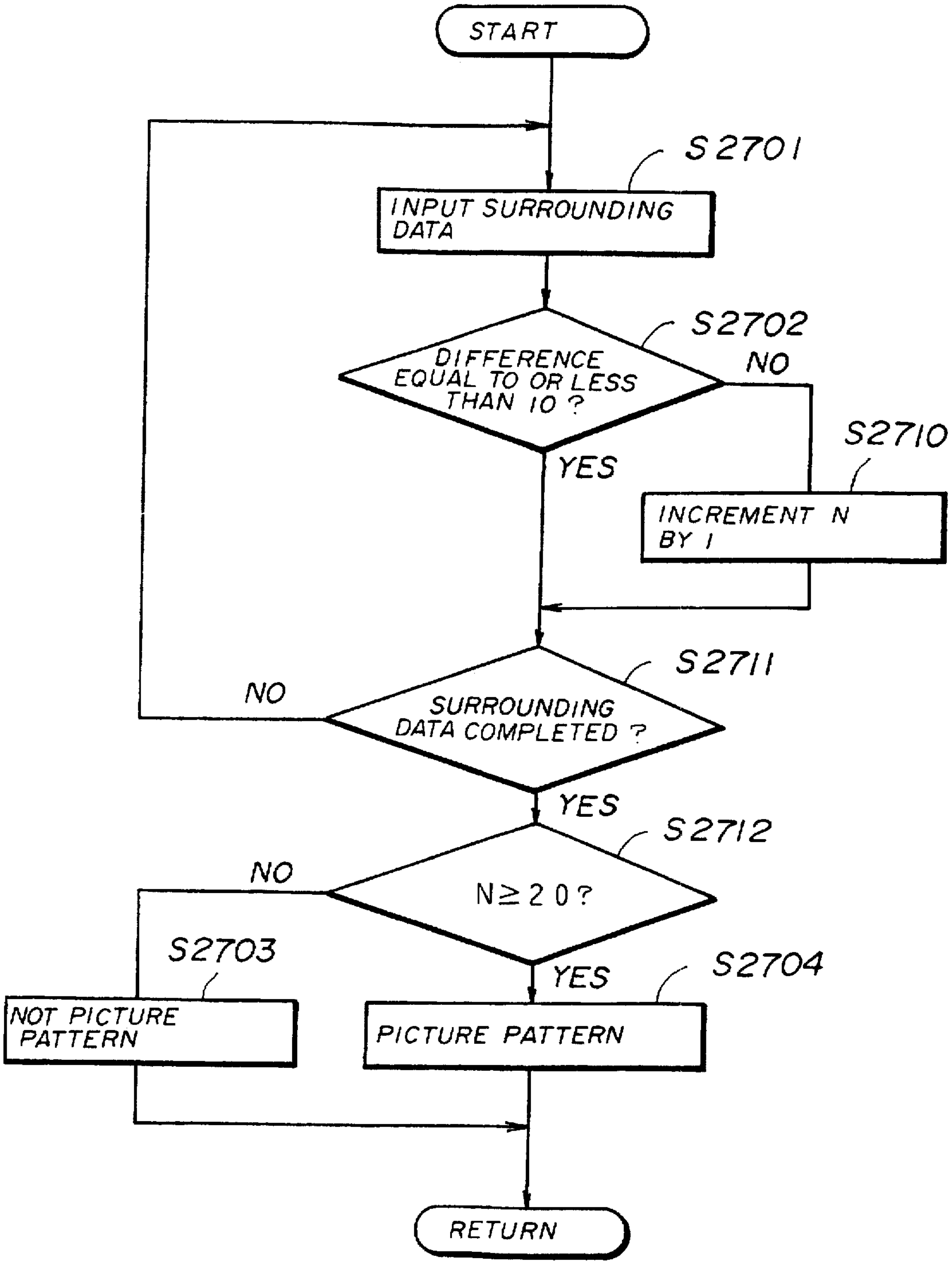
FIG. 15 shows an operation flow chart which the surrounding-data discriminating unit of FIG. 14 carries out.

With reference to FIGS. 14 and 15, the general construction and operation of the surrounding-data discrimination unit 2104 will be described. The surrounding-data discrimination unit comprises a comparator 2603. In S2701, the above surrounding data sets (A, B, C, and D) 2601 and the above average of these surrounding data sets are input to a P terminal and an S terminal of the comparator 2603, respectively. The comparator 2603 calculates the difference between the data input to the P terminal and data input to the S terminal. This calculation is carried out for the above 40 density values of the surrounding data sets.

Then, in S2702, S2710, and S2711, among the thus obtained 40 differences, the number of the differences, exceeding 10 in a scale of 64 tones, for example, is counted. (There, for the purpose that the pattern register unit should recognize the color seal mark, the above limited tone scale is sufficient to be registered.). The variable N is made to hold the count value obtained above. That is, if, in S2702, the relevant difference is not equal to nor less than 10, N is incremented by 1 in S2710. The value of N was initialized to 0 at the start of the processing of FIG. 15. Then, in S2711, it is determined whether the determination in S2702 has been performed on all density values of the surrounding data sets.

After the above processing has been completed for all surrounding data sets, in S2712, it is determined whether or not the value of N is equal to or greater than 20, for example. If it is equal to or greater than 20, in S2704, it is determined that the relevant surrounding data comprises a picture pattern. On the other hand, if the above result is less than 20, in S2703 it is determined that the relevant surrounding data does not comprise a picture pattern.

This determination is based on the following way of thinking: the fact that thus there are few large difference values can be said to indicate little density variation in the relevant surrounding data, and if there is little density variation, in the majority of cases, the probability that the relevant surrounding data comprises a picture pattern is low. In other words, a picture pattern gives rise to relatively large variations in density values with respect to varying position in the majority of cases.

Figure 16A:
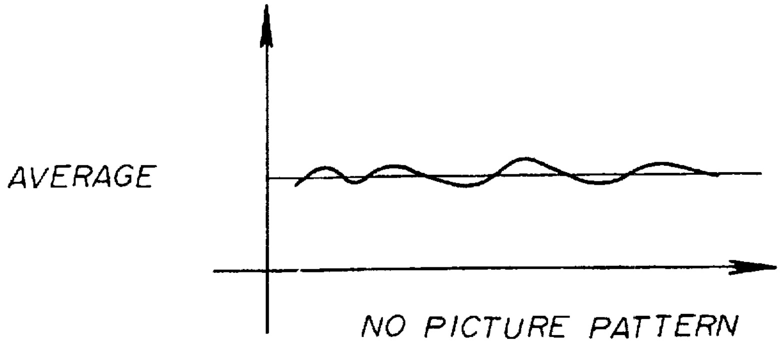
FIGS. 16A and 16B show graphs of density data for a case where the surrounding region includes a picture pattern and a case where it does not include, respectively, which data may be used as a criterion in the surrounding-data discriminating unit of FIG. 14.
Figure 16B:
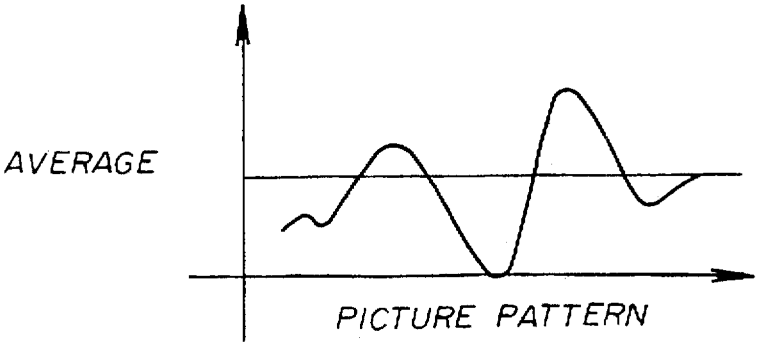

The above principle may be described with reference to FIGS. 16A and 16B, for example. In the graphs of FIGS. 16A and 16B, the vertical axes indicate density values of image data and the horizontal axes indicate the position variation of the image data. As shown in FIG. 16A, in a region where no picture pattern exists, the relevant density value varies moderately about the average value, the difference from the average being thus generally small. In contrast to this, as shown in FIG. 16B, in a region where a picture pattern exists, the relevant density value greatly varies, the difference from the average being thus generally large.

Thus, the reason, in determination about whether or not the relevant original is a paper money of a predetermined denomination, for use of the result of determination about whether or not the surrounding region around its seal mark comprises a picture pattern will now be described. If there exists a seal mark in an image other than paper money, there is no printed matter surrounding the seal mark, that is, the surrounding region comprises a background region, in the majority of cases. In contrast to this, as is well known, in almost all paper money, there exists a picture pattern at the regions surrounding their seal marks.

Thus, in the embodiment of the third aspect of the present invention, both the pattern check (a check wherein the outline of the seal mark is used) performed by the pattern comparing unit 2103 and the check of its surrounding region, performed by the surrounding-data discrimination unit 2104, are performed.

Performance of this double check results in the advantages as follows. A case is taken where paper money is the original to be read by means of the digital color image input unit 2101 and there exist scribbles on the paper money. In this case, the noise due to the scribble is included in the image data input by means of the digital color image input unit 2101. Even in such a case, by the above double check, the influence of noise on the relevant discrimination by the same noise may be reduced.

A case will be considered where the scribble occurs at the seal mark region of the paper money and is not made in its surrounding region, for example. In this case, in the above pattern check, the relevant noise affects the relevant discrimination and as a result a determination may be made, approximate to a determination that the original comprising even the real paper money is not paper money. However, the above check of the surrounding data naturally results in the determination that the original is paper money and as a result of combining both determinations, determination will be made, approximate to determination that the original is paper money.

In FIG. 14, the comparison operation by the comparator 2603 enables improved accuracy in this discrimination by, in the above surrounding data, individually comparing for the respective colors R, G and B, and also causing the discrimination operation of FIG. 15 to be independently performed for the respective colors R, G and B.

Figure 10:
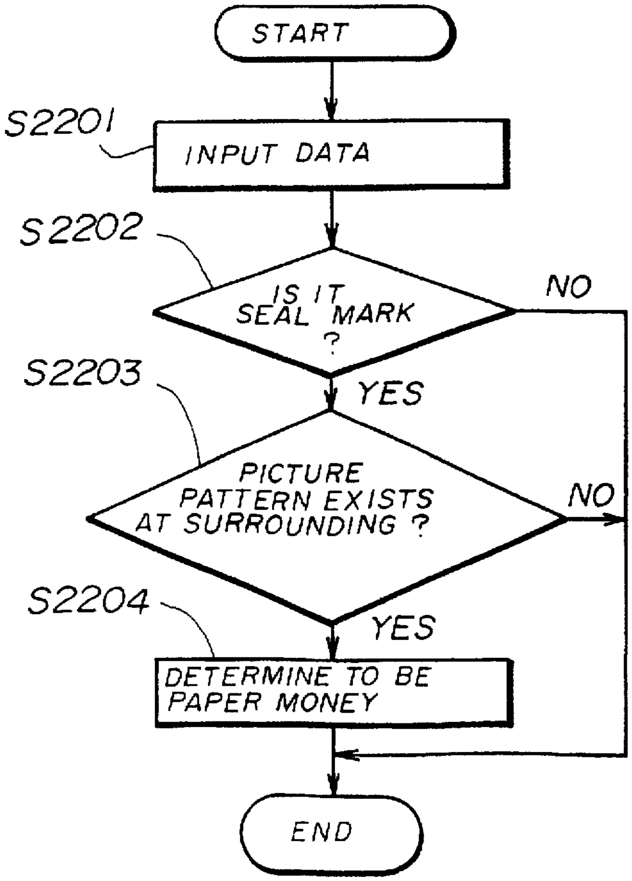
FIG. 10 shows an operation flow chart which the system of FIG. 9 carries out.

Further, the operation flow charts of FIGS. 10 and 15 may comprise a part of another flow chart not shown in the drawings. That is, the third aspect of the present invention may comprise not only the operation corresponding to the flow charts shown in the drawings but also other well-known operation for duplication, and it is possible to think that a part this other well-known operation is shown in these drawings. If so, the following operation may be performed. After the discrimination operation corresponding to the flow charts shown in these drawings have been finished, and if the result of this discrimination indicates that the relevant original is not identical to the special document such as paper money, duplicating of the relevant original is performed subsequently.

[EMBODIMENT OF FOURTH AND FIFTH ASPECTS]

The general construction of the fourth aspect in an image forming apparatus in an embodiment of the fourth and fifth aspects of the present invention will now be described. This embodiment comprises a full-color digital duplicator 3000, for example, see FIG. 17. The duplicator 3000 includes image reading means for reading a duplication original image by sampling by a pixel unit and thus color separation. Further, the duplicator 3000 includes image forming means for forming a color image by placing, on a recording medium, a plurality of colors for each pixel. Further, the duplicator 3000 includes color-characteristics detecting means for comparing the color characteristics for a plurality of pixels sampled of predetermined intervals on the relevant image from the image data corresponding to the original image read through the above image reading means, with color characteristics of the corresponding reference pixel information concerning a predetermined special document. The color-characteristics detecting means uses a result of the comparison and thus determines whether or not the relevant original image is identical to the predetermined special document. The predetermined special document means one of which third party's duplication is inhibited as described above, such as paper money, securities or so, for example. Further, the duplicator 3000 comprises control means which, if the result of the discrimination by the above color-characteristics detecting means is that the relevant original is identical to the predetermined special document, restricts the image forming processing for the relevant original.

Further, the color characteristics associated with the above special document to be used by the above color characteristics detecting means in its discrimination processing may comprise a plurality of respective color-characteristics sets associated with reference pixel information of a plurality of special documents. In this case, the relevant discrimination processing, performs parallel discriminations between the above respective reference color-characteristics sets and the color characteristics of the relevant original. The above control means, if discrimination by a result of comparison of at least one of the above plurality of color-characteristics sets to be references with the color-characteristics of the original is that the relevant original matches the predetermined special document, restricts the image forming processing for the original.

Further, preferably, the above color characteristics detecting means comprises color resembling degree determining means, color resembling pixel counting means and comparing means. The color resembling degree determining means detects to what degree the pixel data sampled from the above original image data resembles the above reference pixel information. The color resemble pixel counting means counts the number of pixels, in the relevant original image, which have been determined to resemble to a degree more than a predetermined one as a result of the determination by means of the same color resemble degree determining means. Further, the above comparing means obtains the above discrimination result by comparing the above counted pixel number with a predetermined threshold value.

In such a construction of the duplicator 3000, for the purpose of the discrimination, pixel data concerning a plurality of pixels separated by predetermined intervals from one another is used by the above color characteristics detecting means.

The general construction, with respect to the fifth aspect, in the image forming apparatus in the embodiment of the fourth and fifth aspects of the present invention will now be described.

The duplicator 3000 comprises background characteristics collating means for comparing and collating the image data concerning the background region of the relevant duplication original with previously stored image information concerning the background region of the above special document. The above control means, if the result of the above comparison and collation is disagreement, allows the image forming processing for the relevant original, and if a result of the comparison and collation is identical, restricts the image forming processing for the relevant original.

Further, preferably, the image information concerning the background region of the special document, to be used for the comparison and collation by means of the above background characteristics collating means comprises respective image information sets for respective regions of a plurality of special documents. In this case, if at least one of results of the relevant plurality of comparisons and collations is identical, the image forming processing for the relevant original is restricted, and if every one of the same results of the plurality of comparisons and collations is disagreement, the image forming processing for the relevant original is restricted.

Further, preferably, the above background characteristics collating means comprises background color information storing means, background pixel number storing means, determining means, background pixel number counting means, and background pixel number collating means. The above background color information storing means previously stores the color information, concerning the background region, of the image information concerning the above special document. The background region refers, as described above, to a region where nothing has been printed. Further, the background pixel number storing means previously stores the number of the background region pixels, included in the image of the above special document. The determining means determines for each pixel whether the color data, concerning the background region in the image data read by means of the above image reading means resembles, within predetermined limits, the color information stored by means of the above background color information storing means.

The background pixel number counting means counts the number of pixels which have been determined as resembling within the predetermined limits. Further, the above background pixel number collating means compares and collates the number of pixels counted by the above background pixel number counting means with the number of pixels stored in the above background pixel number storing means, and then determines whether resembling within the predetermined limits occurs.

The background characteristics collating means preferably comprises background run-length storing means, background run-length counting means and limit determining means. The background run-length storing means previously stores the upper limit value and lower limit value of the number of contiguous pixels of the background region in the image of the above special document, that is a run length. Further, the above background run-length counting means counts the number of contiguous pixels of the background region in the original image, that is the run length. The above limit determining means compares the run length counted by the above run-length counting means with the run-length upper and lower limit values stored by means of the above run-length storing means, and thus determines whether or not the same is between the upper and lower limit values.

In the duplicator 3000 having such a construction as described above, discrimination processing for a plurality of special documents is performed in parallel.

The embodiment of the fourth and fifth aspects of the present invention will be described in detail. In the description of the same embodiment, the following abbreviations will be used: R: red, G: green, B: blue, C: cyan, M: magenta, Y: yellow, K: black, LED: light emitting diode, LEDA: light emitting diode array, CCD: charge coupled device, SC: image read means (scanner or scanner module), and PR: image forming means (printer or printer module).

Constructions of respective modules will be described.

Figure 17:
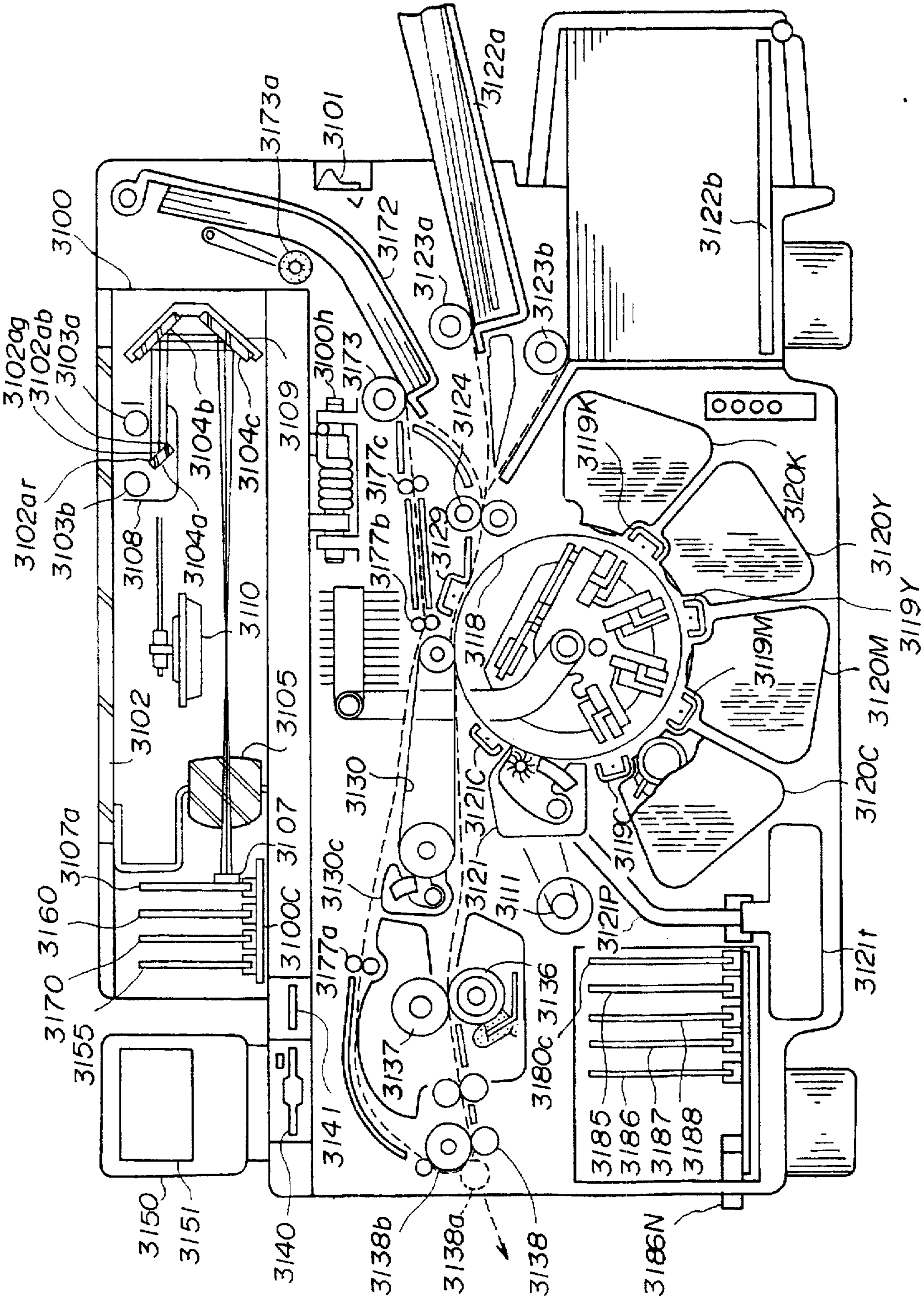
FIG. 17 shows a construction of a digital duplicator in one embodiment of the fourth and fifth aspects of the present invention.

As shown in FIG. 17, the digital duplicator 3000 may be generally divided into two modules, a scanner module SC 3100 and a printer module PR3180 from the viewpoint of the mechanism thereof. The SC 3100 comprises the above image reading means, and PR3180 comprises the above image forming means. These SC 3100 and PR3180 are rotatably connected with one another by means of a hinge 3110*h* at the rear end of the SC 3100 and the rear end of the PR3180.

The SC 3100 will now be described in detail.

The SC 3100 comprises a scanner control circuit 3100*c*, a platen glass 3102, a first carriage 3108, a second carriage 3109, original lighting lamps 3103*a*, *b*, first, second, and third mirrors 3104*a* and *b*, and *c*, an image formation lens 3105, a CCD color sensor (referred to as CCD, hereinafter) 3107, an original reading circuit 3107*a*, an original-image scanning motor 3110, a console device 3150, a control panel 3151 mounted on the device 3150 and comprising transparent touch switches and liquid-crystal display means, a system control circuit 3155, a basic image processing circuit 3160 and special original detecting circuit 3170.

The image reading operation of the SC 3100 will now be described.

The SC 3100 samples an original image to be duplicated, with a sampling density of 1/16 mm (that is, 16 dots/mm) in each of both main scanning and subscanning directions. Subsequently, the same quantizes, to 256 tones, the respective sampled image data values for each color R, G and B. Thus, the SC 3100 reads the original image.

Concretely, first, as is well known, one sheet of paper, for example, acting as an original to be duplicated is placed on the platen glass 3102. In this case, the original is placed on the platen glass 3102 so that the side thereof to be duplicated faces downward, needless to say. Subsequently, by means of the image formation lens 3105, the relevant original image is formed on the light-reception surface of the CCD 3107 after the size thereof has been reduced.

The same CCD 3107 comprises an R image-pickup unit which is covered by a red film and on which elements corresponding to 4752 pixels are arranged in one dimension, a G image-pickup unit which is covered by a green film and on which elements corresponding to 4752 pixels are arranged in one dimension, and a B image-pickup unit which is covered by a blue film and on which elements corresponding to 4752 pixels are arranged in one dimension, and these three image-pickup units are arranged parallel to one another. In FIG. 17, the respective positions 3102*ar*, 3102*ag*, and 3102*ab* represent positions of scan lines for image-reading relevant to the respective colors R, G and B, on the platen glass 3102. The mutual spatial relationship between respective positions 3102*ar*, 3103*ag* and 3102*ab* is shown, for the sake of easy understanding, so that the spaces between them are exaggeratedly magnified, but the positions are actually so close to one another that they cannot be distinguished from one another, concretely approximately 3/16 mm apart. The CCD 3107 samples by dividing the single main scan line of each color projected by means of the image formation lens 3105 into 16 pixels/mm in terms of original image size, and thus reads the original image as described above.

On the first carriage 3108, the lighting lamps 103*a*, and *b* and first mirror 3104*a* are mounted. Further, on the second carriage 3109, the second mirror 3104*b* and third mirror 3104*c* are mounted. Under a condition where an optical conjugate relation is maintained between the first carriage 3108 and second carriage 3109, the first carriage 3108 is driven at a sub-scanning speed Vsub and the second carriage is driven at the speed of Vsub/2, by means of the original-image scanning motor 3210, and thus they perform a scanning operation for the purpose of original-image reading.

The CCD 3107, receiving reflected light in the respective colors of R, G and B from a sheet of paper or so comprising an original image, then converts the same into an analog voltage corresponding thereto for each pixel and outputs the same. Further, the relevant analog-voltage signal is converted by means of the reading circuit 3107*a* into a digital signal having 8 bits and thus the relevant original image is quantized to 256 tones for each color of each pixel.

Further, the reading circuit 3107*a* is provided with a monochrome binarizing mode wherein, when it receives a monochrome binarizing processing command from the system control circuit 3155, outputs a monochrome density, after simply binarizing it, as the signal corresponding to the relevant original image. This mode is mainly used for efficient intelligent image processing to be performed on text images etc.

The image data thus obtained by quantizing each color R, G and B is output to the basic image processing circuit 3160 and to the special document detecting circuit (paper money detecting means) 3170.

The basic image processing operation will now be described.

The R, G and B image data corresponding to the original image read as described above is input to the basic image processing circuit 3160. The function of the circuit 3160 may be divided into two categories for the sake of convenience in description. The first category comprises not a function of directly controlling the image data signal but a function of helping the image control. The first category comprises, for example, image-region separating processing for discriminating and thus separating the original image into a text-image region and a tone-image region, original size detecting processing, color/black and white original discriminating processing, and so on. Some processing, such as the original size detecting processing, requires a pre-scanning prior to the relevant image forming processing. That is, by means of the pre-scanning, the entire area of a sheet of paper comprising an original image placed on the platen glass 3102 is scanned and thus the size of the original image may be detected.

The second category of the above two categories comprises processing for directly controlling the image data signal. The second category comprises processing such as variation of image size, image trimming, image shifting, color correction, tone conversion and so on. Such processing may be further separated into two kinds. Namely, processing dependent on differences in image regions, for example text-region/tone region, and the other is fixed processing independent of image region. The above processing dependent on image region comprises, for example, size variation processing, and the processing independent of image region comprises, for example, tone processing.

The above-described processing of the second category may be further divided into three kinds from another viewpoint. That is, a first kind is processing automatically initiated as a result of the processing of the first category, a second kind is that initiated by operator control through the console device 3150, and a third kind is that initiated by a combination of the processing of the first category and the operator's control.

The RGB image data signal input into the basic image processing circuit 3160 is thus processed, and finally converted into respective CMYK image data signals, to be used for printing. The C, M, Y, and K image data signals to be used for printing are then input into the recording interface circuit 3212*a* (see FIG. 18) acting as an input part of the PR3180. There, if the relevant original image is determined to be a black-and-white image in the basic image processing circuit 3160, a value zero is substituted for the above respective C, M and Y image data signals other than the K image data signal.

The construction of the PR3180 will now be described.

The PR3180 comprises the following elements: a power switch 3101, a driving motor 3111, a system controller 3185, an external interface circuit 3186, an external-equipment connector 3186N, an interface memory 3187, a bit-map expanding circuit 3188, a printer control circuit 3180*c*, a paper supply cassette 3122*a*, paper supply tray 3122*b*, paper supply roller 3123*a* and b, a registration roller 3123*a*, a pair of registration rollers 3124, a photosensitive-element drum 3118, electrification scorotrons 3119C, M, Y and K, developing devices 3120C, M, Y and K for the respective colors cyan, yellow, magenta and black, a transfer corotron 3129, a cleaning device 3121, a collection pipe 3121*p*, a waste toner tank 3121*t*, an electricity-removing corotron 3121*c*, a separating and carrying belt 3130, a belt cleaner 3130*c*, a fixing roller 3136, a fixing backup roller 3137, an ejecting roller 3138*b*, an ejection change-over roller 3138, a double-side tray 3172, a double-side paper supply roller 3173, a group of carrying-roller pairs 3177*a*, b and *c*, and a stacking roller 3173*a*.

The image forming unit will now be described in detail.

Figure 18:
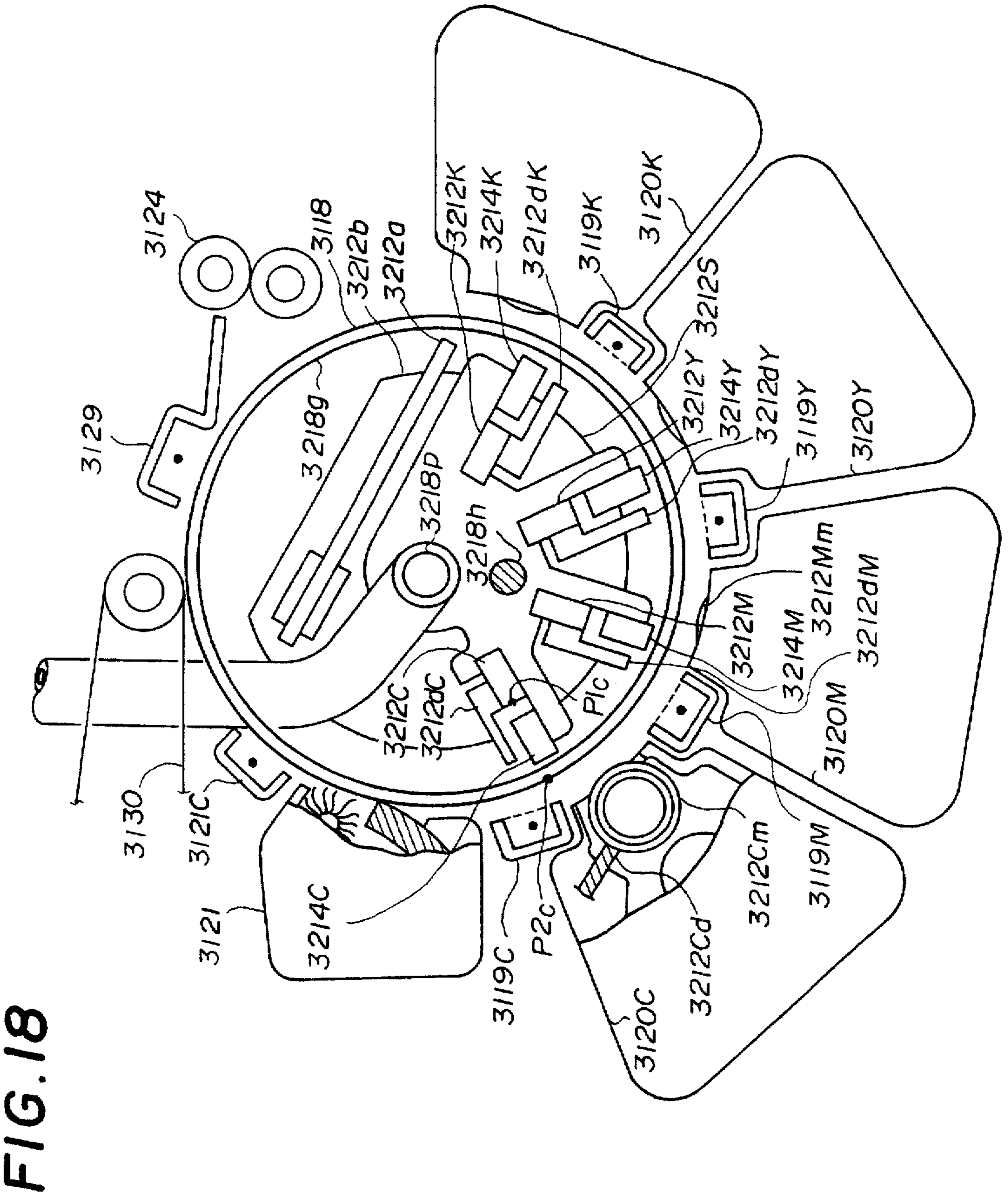
FIG. 18 shows an internal construction of a photosensitive-element drum and a construction of a peripheral portion thereof in the duplicator of FIG. 17.

The internal and peripheral construction of the photosensitive-element drum 3118 will be described with reference to FIG. 18. In FIG. 18, the photosensitive-element drum 3118 comprises light emitting diode arrays (referred to as LEDA, hereinafter) 3212C, M, Y, and K, a recording interface circuit 3212*a*, a delay memory circuit 3212*b*, recording control circuits 3212dC, dM, dY, and dK, and focusing light transfer element arrays 3124C, M, Y and K.

The inside 3128*g* of the photosensitive-drum body 3118 is formed of a glass tube or the like having good transmission quality for the emitted light wavelengths of the LEDAs 212C, M, Y, and K, 720 nm, for example. On the outside surface of this glass tube 3128*b*, a transparent conductive layer, and an organic photosensitive layer (OPC) are provided. The transparent conductive layer is grounded to 0 potential in the duplicator 3000.

The photosensitive-element drum 3118 rotates. Inside the photosensitive-element drum 3118, an exposure module is fixed. This exposure module comprises a heat conductive body 3212s, a heater 3218h, a heat pipe 3218p, a recording interface circuit 3212a, delay memory circuits 3212b, recording control circuits 3212dC, dM, dY, dK, LEDAs 3212C, M, Y and K, and focusing transfer element arrays 3214C, M, Y and K. Each of the LEDA 3212C, M, Y and K consists of 14256 light emitting diodes, and these light emitting diodes are arranged in one dimension along the direction perpendicular to the plane of FIG. 17. Further, the light-emitting-point density of the light emitting diodes is 48 dots/mm. The light-emitting shape of each light emitting diode has a flat ellipse shape with the long axis aligned with the light emitting diodes row direction and the short axis aligned with the direction perpendicular thereto. These light emitting diodes comprise a plurality of divided semiconductor chips and a ceramic base on which these semiconductor chips are mounted.

In FIG. 18, the positions of the focusing transfer element arrays 3214 are previously adjusted so that an optical conjugate relationship may be maintained between the respective light emitting points Plc, Ply, Plm, and Plk of the LEDAs 3212C, M, Y and K, and the corresponding exposure points P2c, P2y, P2m and P2k (however, for the sake of convenience in the description, in the drawing, only the light emitting point P1c and exposure point P2c for the LEDA 3212C is shown, as the representative) on the photosensitive-element drum 3118.

The delay memory 3212b is electrically arranged between the recording interface circuit 3212a and the recording control circuits 3212dC, dM, dY and dK. This delay memory circuit 3212b has a function of delaying the respective image data signals concerning M, Y and K, among the image data signals of the four colors C, M, Y and K input into the recording interface circuit 3212a, compared with the image data signal concerning C, by respective time intervals. These delays correspond to the times required for rotating the photosensitive-element drum 3118, by the circumferential distances from C exposure point P2c to the respective M, Y and K exposure points P2m, P2y, and P2k, respectively.

Inside the respective developing devices 3120C, M, Y and K, respective developing rollers 3212Cm, Mm, Ym, and Km, and doctor blades 3212Cd, Md, Yd and Kd are disposed (however, in FIG. 18, for the sake of convenience, only the developing roller 3212Cm and doctor blade 3212Cd are shown, as representative).

Next, the image forming operation performed by the PR 3180 will be described. The image data signal input into the recording interface circuit 3212a of the PR 3180 is one corresponding to, for each of the colors C, M, Y and K, a pixel density of 1/16 mm (that is, 16 dots/mm) for both the main scanning direction and sub-scanning direction, and is quantized to 256 tones as described above. Such an image data signal is used and a full color visible image is then realized on a recording sheet of paper, which image comprises dot patterns having a recording dot density of 1/48 mm (that is, 48 dots/mm), for each of the main scanning direction and sub-scanning direction, for each of the colors C, M, Y and K.

When the image forming process leading to such image realization begins, first the photosensitive-element drum 3118 is rotated by means of the driving motor 3111 in the counterclockwise direction in FIG. 18. Together with this rotation, the following respective processes are sequentially performed: C latent image formation, C toner image formation, M latent image formation, M toner image formation, Y latent image formation, Y toner image formation, K latent image formation, and K toner image formation. Thus, finally the respective toner images of C, M, Y and K are placed on the photosensitive-element drum 3118 on one another in the same sequence and thus the entire toner image is formed.

The above C latent image and toner image formation is performed as follows. The electrification corotron 3119C, by means of corona discharge, charges the photosensitive-element drum 3118 uniformly with negative charge to −700V, for example. Subsequently, the LEDA 3212C performs the corresponding raster exposure with the C image data signal. Such an image data signal for the purpose of latent image formation is supplied by the basic image processing circuit 3160 in the general duplication mode.

This supplied image data signal is first input into the recording interface circuit 3212a. Then, in accordance with this signal, the recording control circuit 3121dC controls the LEDA 3212C so as to cause it to perform the following light emitting operation for each pixel in this input image data signal, for example. That is, for example, if the C image data signal indicates the maximum density, the 3×3 LEDs which have been made to correspond to one pixel is made to emit light at full capability. (Such LEDs are provided in an array formation for the width of A4.) Further, for example, if the C image data signal comprises a signal corresponding to a white pixel, the corresponding LEDs do not emit light at all. Further, for example, if the C image data signal indicates a intermediate density, the number of LEDs made to emit light is proportional to the density, or the LEDs are made to emit light for a time period proportional to the density.

When the photosensitive-element drum 3118 is exposed with the raster image as the result of such a light emitting operation, the electric charge is neutralized in proportion to the light incident on the thus exposed region on the photosensitive-element drum 3118 which has been uniformly charged as described above. Such neutralizing of electric charge proportional to the light exposure forms the electrostatic latent image on the relevant region.

The toner in the developing device 3120C is negatively charged by the doctor blade 3212Cd. The developing roller 3212Cm in the developing device 3120C is biased to a predetermined potential compared with a metal base element layer of the photosensitive-element drum 3118. This predetermined potential comprises a potential resulting from overlaying a negative direct-current potential and an alternating current potential, and is supplied by power source means not shown in the drawing.

By such a construction, at the time of toner image formation, on the photosensitive-element drum 3118, the C toner does not adhere at a region at which the electric charge has not been neutralized, and adheres at a region which has been exposed and thus neutralized, the amount adhering corresponding to the degree of neutralization. Thus the visible C toner image similar to the above electrostatic latent image is formed. Such a developing system may in general be referred to as a reverse developing system.

The above M latent image and toner image formation is performed as follows. First, the corresponding electrification corotron 119M, by means of the corona discharge, uniformly charges the photosensitive-element drum 3118 to −700V. The photosensitive-element drum 3118 is in the state where the C toner image has already been formed by the above-described process.

Subsequently, the corresponding LEDA 3212M, in accordance with the M image data signal, performs the raster exposure of the photosensitive-element drum 3118. This M image data signal was in synchronization with the above C image data signal at the time of input into the recording interface circuit 3212*a*, and then by means of the delay memory circuit 3212*b*, as described above, is delayed by the amount of time required for the rotation of the photosensitive-element drum 3118 from the exposure position corresponding to C to the exposure position corresponding to M. The M image data signal is thus delayed and then input to the recording control circuit 212dC. Thereby, the LEDA 212M is controlled to perform the corresponding light emitting operation in accordance with this delayed M image data signal, and thus the corresponding position in the C toner image, which has been formed with the sampled C image data, as described above, corresponding to a certain region in the original image to which the relevant image data signal corresponds to precisely agree with the exposure position for the M latent image to be similarly formed with the sampled M image data corresponding to the same region on the original image.

When thus the exposed region on the photosensitive-element drum 2118, which has been uniformly charged, is exposed with the M raster image, the electric charge is neutralized in the amount proportional to the amount of light. Thus, the M electrostatic latent image is formed.

Further, the toner in the developing device 3120M has been negatively charged. Further, the developing roller 3212Mm in the same developing device 3120M is, without being in contact with the photosensitive-element drum 3118, biased to a potential similar to that in the above case of the C developing.

By such a construction, when the toner image is formed on the photosensitive-element drum 3118, the region at which the charge has not neutralized, is not adhered by the C toner, and the region, which is exposed and thus neutralized, is adhered by the M toner as a result of toner flying, the amount adhering corresponding to the degree of neutralization. Thus, the visible M toner image is formed similar to the above electrostatic latent image.

Similarly, the Y latent image and toner image are further overlaid on the region where the respective C and M toner images have been overlayingly formed, and then the K latent image and toner image are overlaid on the region where the respective C, M and Y toner images have been overlayingly formed. There, since the basic image processing circuit 3160 previously performs the well-known UCR (under color removing) processing on the respective colors' image data signals, there is little possibility that one pixel is developed by the toner of all four colors at the time of toner image formation for the respective colors as described above.

The full color image thus formed on the photosensitive-element drum 3118 is then transferred to a section, in which the below-described transfer process is performed, with the rotation of the photosensitive-element drum 3118. Meanwhile, at the time when the toner image formation as described above is begun, a sheet of a recording sheet is fed and then sent from any one of the three supply portions, namely the paper supply cassette 3122*a*, the paper supply tray 3122*b* or the double-sided feeding roller 3172, by the feeding operation of the feeding roller 3123*a* and *b* or double-sided feeding roller 3172. After this supply and sending, the recording sheet is made to wait at the nip of the registration roller pair 3124. Then, when the advancing edge of the above toner image on the photosensitive-element drum 3118 approaches the transfer separating corotron 3129, the registration roller pair 3124 is again driven so that the advancing edge of the recording sheet may coincide with the advancing edge of the same toner image. Thus, the registration between the toner image and the recording sheet is performed.

Thus, the same recording sheet is placed over the toner image on the photosensitive-element drum and then is passed under the transfer separating corotron 3129. The transfer separating corotron 3129 is connected to a positive-potential power-source. When the recording sheet together with the toner image is passed under the transfer corotron, the recording sheet is charged to a positive potential by corona discharge, and as a result the toner image is transferred onto the relevant recording sheet.

Subsequently, when the recording sheet onto which the toner image has been thus transferred is passed over the separating and carrying belt 3130 with the rotation of the photosensitive-element drum 3118, an attracting force comes into effect between the separating and carrying belt and the recording sheet. The attracting force is stronger than that in effect between the recording sheet and the photosensitive-element drum. Therefore, the recording sheet is removed from the photosensitive-element drum 3118 and transferred onto the separating and carrying belt 3130.

It is assumed that the toner image is not one identical to the special document such as paper money but comprises a general image. Under this assumption, the recording sheet on which the same toner image is placed is carried by means of the separating and carrying belt 3130 and then transferred to the fixing roller 3136. The fixing roller 3136 is previously heated to a predetermined temperature. Accordingly, heat and pressure are applied at the nip portion between the fixing roller 3136 and the fixing backup roller 3137. As a result, the toner, forming the toner image placed on the recording sheet, melts, and then penetrates among the fibers of the same recording sheet. Thus, the same toner image is fixed on the recording sheet and the duplicated image is formed.

The recording sheet on which the duplicated image has been thus formed (referred to as a copy, hereinafter) is ejected from the duplicator 3000 by means of the ejecting roller 3138*b* and the change-over roller. The thus ejected copies are stacked, after being turned over, on the ejected paper tray, not shown in the drawing.

Further, in the same duplicator 3000, if the double-sided duplication mode has been selected, the change-over roller 3138 is shifted into a position 3138*a* indicated by a broken line in FIG. 17. This causes the relevant copy to be guided into the double-sided tray 3172. In this case, as described above, the recording sheet on which the duplicated image has been once formed is passed under the fixing portion (the belt 3130, for example), then passed through the carrying roller group 3177*a*, *b* and *c*, and then stacked, the side having duplicated-image being made to face upward in FIG. 17, on the double-sided tray 3172.

There is an opening portion on the top of the double-sided tray 3172 enabling an operator to remove the thus stacked recording sheet easily under the operator's normal operating posture. Further, the same double-sided tray 3172 may be used as an ejecting tray during a non-double-sided duplication as a result of a predetermined mode-setting specification made by an operator through the operation panel 3151.

After toner-image formation and transfer thereof onto recording sheet such as described above has been completed, the small amount of residual toner is cleaned by the cleaning device 3121 so that the photosensitive-element drum 3118 may be again used for the next toner-image formation and transfer processing. The residual toner thus collected by means of the cleaning device 3121 is sent to the waste toner tank 3121*t* via the collecting pipe 3121*p* and is then stored there.

Operation of the PR 3180 will now be described, in a case where, by determination of the special document detecting circuit 3170, it is determined that 'a paper sheet or the like comprising an original image placed on the platen glass 1302 comprises the special document such as paper money, securities or so'.

In this case, a detection signal indicating the above determination result is sent to the system control circuit 3155. The system control circuit 3155 receiving the detection signal immediately sends, to the PR 3180, an image-forming-operation stop command. The command is, in the majority of cases, sent at a step where the above-described image transfer processing has been performed part of the way. In this case, the printer control means 3180c causes the relevant recording sheet to remain in the duplicator 3000. Then, the same writes, in a memory of the printer control means 3180c, appropriate contents so that the processing which has been performed onto the same recording sheet is not to be performed again. Thus, forgery of a special document such as paper money, securities or the like of which duplication is prohibited is prevented. Further, it is prevented that a once-halted image forming operation concerning such a special document is again started.

Figure 19:
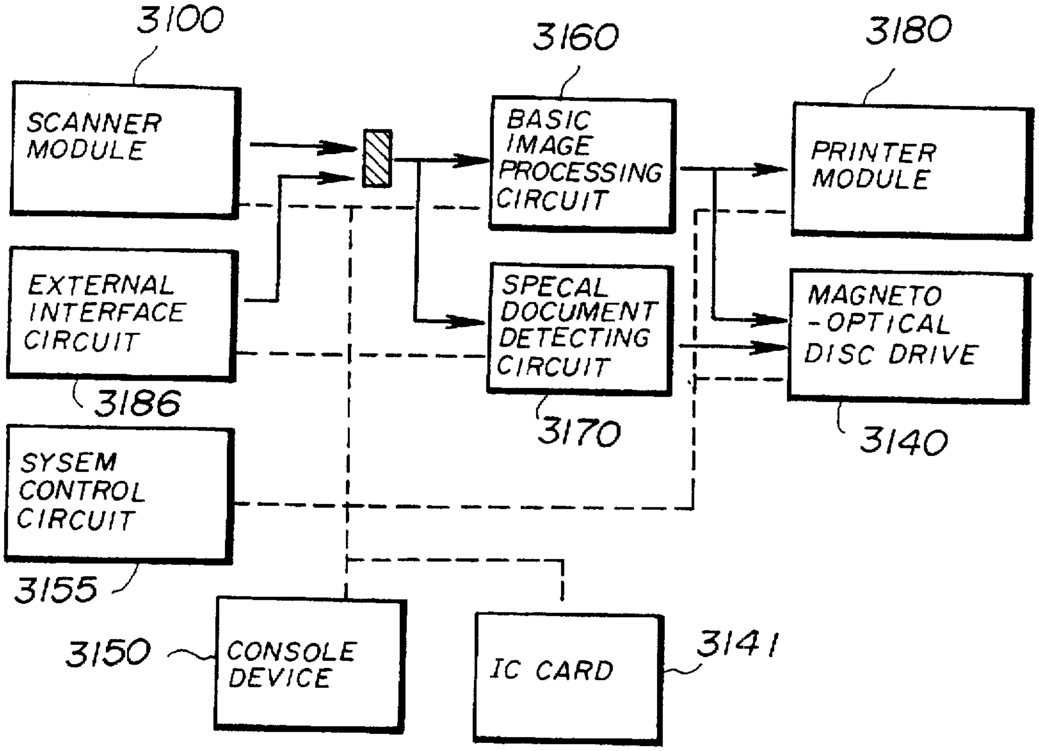
FIG. 19 shows a block diagram illustrating signal flows among a plurality of function blocks constituting the duplicator of FIG. 17.

In FIG. 19, where the construction of the duplicator 3000 is considered to comprise a plurality of function blocks resulting from functional decomposition of the system, the general construction of these function blocks and signal flows between these function blocks is described.

The above plurality of function blocks comprise, in general, the scanner module SC 3100 acting as the above image reading means and the printer module PR 3180 acting as the image forming means, and further comprise the basic image processing circuit 3160, special document detecting circuit 3170, external interface circuit 3186, console device 3150 and system control circuit 3155.

Among them, the basic image processing circuit 3160 and special document detecting circuit 3170 are, from the viewpoint of mechanism thereof, included in the SC 3100, and the console device 3150 is disposed above the SC 3100, the external interface circuit 3186 and system control unit 3155 are disposed in the PR 3180.

A general construction of these function blocks and signal flows between these function blocks will now be described. In FIG. 19, solid-line drawn arrows represent essential image-data signal flows, and the broken lines represent control-signal line connections. The system control circuit 3155 has a function of totally controlling the entirety of the system of the digital duplicator 3000. This total control is performed by sending commands to and/or receiving responses from, via the signal lines represented by the broken lines, other sub-systems included in the same duplicator 3000, such as SC 3100, PR 3180, special document detecting circuit 3170 or the like.

If the special document detecting circuit 3170 sends out the detection signal concerning a special document such as described above, the system control circuit 3155 immediately sends out the above image-forming-operation stop command to the PR 3180.

The same system control circuit 3155 has a function such that, when an optional module such as an original carrying device, a sorter, or the like is additionally provided on the duplicator 3000, the same also controls such an optional module.

The console device 3150 outputs messages addressed to an operator who operates this duplicator 3000. Further, the same device 3150 is used when the operator inputs various specifications to the duplicator. The scanner module SC 3100 has, as described above, a function of reading a color original, and then sends an image data signal, for each color R, G and B, concerning the read original image, via the original reading circuit 3107*a*, to the basic image processing circuit 3160.

The basic image processing circuit 3160 performs predetermined image processing on the thus provided R, G, and B original image data signals, and then converts the signals into image data signals of C, M, Y and K to be used for image forming. The C, M, Y and K image data signals are sent to the PR 3180 and/or a magneto-optical disc drive 3140.

The PR 3180 forms a permanent visible image in accordance with the C, M, Y and K image data signals provided to the recording interface circuit 3212*a* as described above.

The external interface circuit 3186 receives, from outside of the duplicator 3000, an image data signal or character code signal, then converts the received signal into the C, M, Y and K image data signals for image formation, and then sends the converted signals to the PR 3180. The processing of image formation according to the thus externally-provided received signals will be referred to as printer mode processing, and the other process of forming an image corresponding to an image read through the scanner module SC 3100 will be referred to as copy mode processing.

The magneto-optical disc drive 3140 stores, onto the relevant magneto-optical disc, not only image data such as described above but also illegal-duplication information concerning the special document such as paper money or the like. An IC card, in which operator information is stored, is inserted into an IC card disc drive and therewith the same device prevents the relevant duplicator 3000 from being used by a person other than the specific operator.

Figure 20:
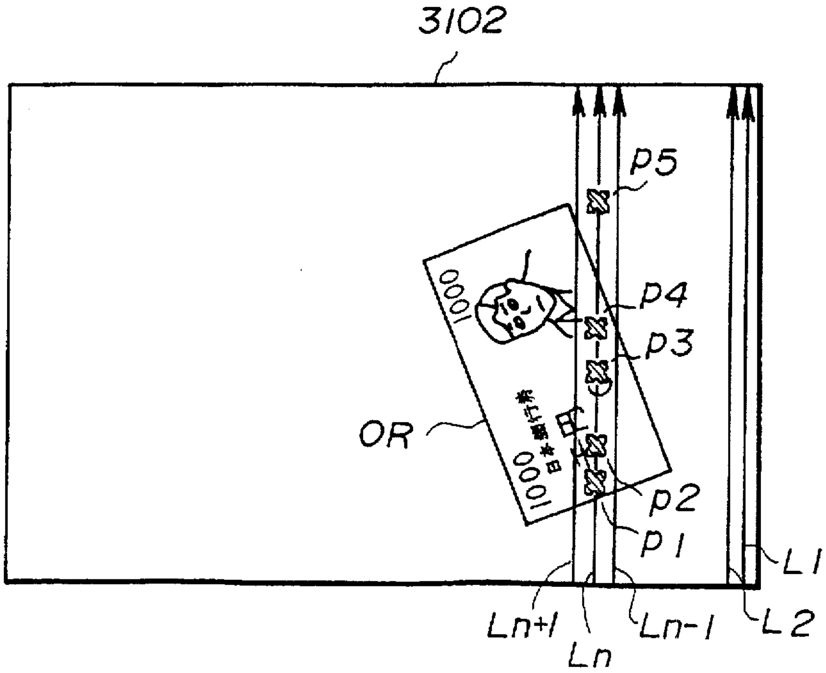
FIG. 20 shows a diagram illustrating a state where an original is placed on a platen glass of the duplicator of FIG. 17, and the duplicator scans this original.

FIG. 20 shows the duplicator 3000's operation of scanning of a paper sheet or the like comprising an original image to be duplicated, placed on the platen glass 3102 of the duplicator 3000.

FIG. 20 is the drawing as viewed from the bottom, in FIG. 17, of the platen glass 3102, and in the drawing, a sheet of paper or the like OR, comprises, in this case, a one-thousand-yen note of the Bank of Japan, and is placed on the platen glass 3102. Vertical lines L1, L2, Ln-1 . . . and so forth are schematic representation of main scan lines used for the above scanning operation. The region p1 on the main scan line Ln exists at a background region such as described above in the same one-thousand-yen note OR, the region p2 indicates a character-image printed region in the one-thousand-yen note OR, the region p3 indicates a seal-mark region such as described above in the one-thousand-yen note OR, the region p4 indicates a below-described myriad-line pattern region, and the region p5 indicates a region where nothing is placed.

Figure 21:
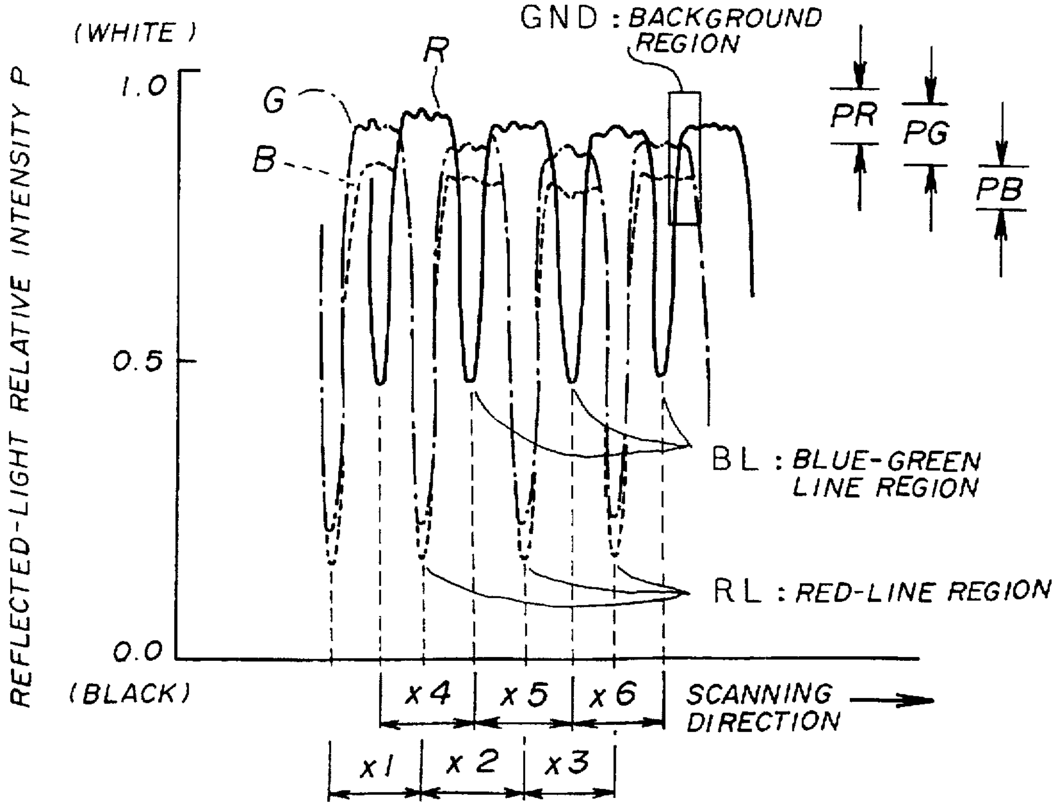
FIG. 21 shows a graph illustrating reflectance characteristics associated with an image of paper money which may be used as an original in the duplicator of FIG. 17.
Figure 22:
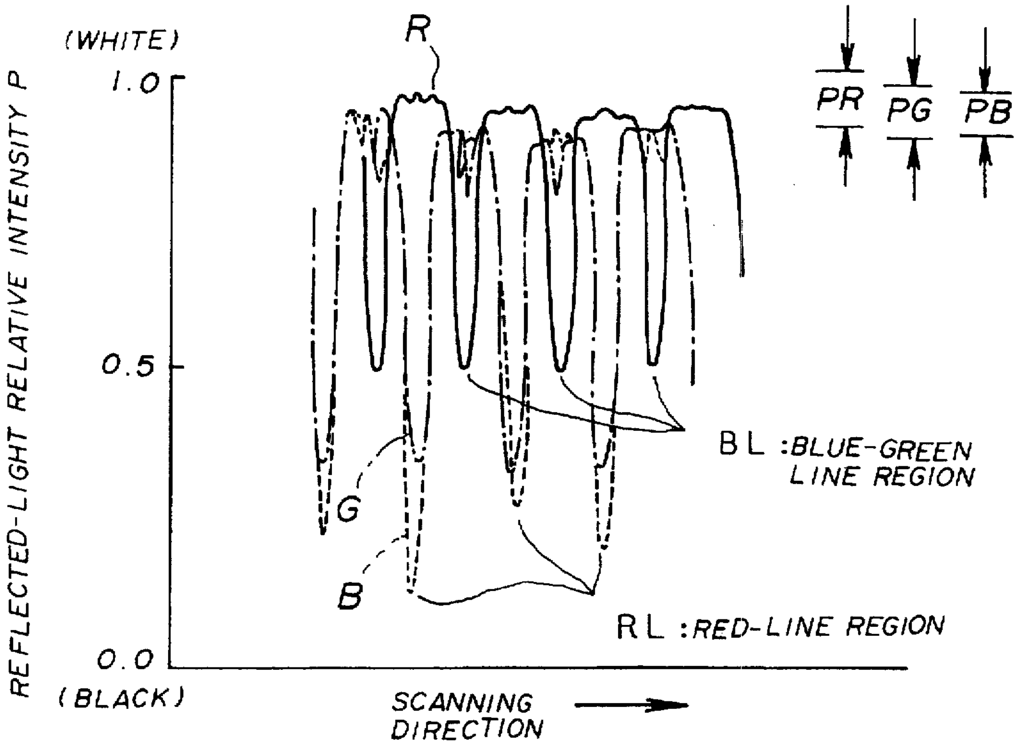
FIG. 22 shows a graph of reflectance characteristics associated with a general color halftone-dot (mesh) printed image other than paper money which may be used as an original in the duplicator of FIG. 17.

With reference to FIGS. 21 and 22, reflection characteristics in an image comprising the special document such as paper money or the like and another general image is described.

The image reflection characteristic shown in FIG. 21 corresponds to the image at the region p4 in the one-thousand-yen note OR shown in FIG. 20 and illustrates the R, G and B image data input through the scanner module SC 3100. However, the scale along the main scanning direction, i.e. the horizontal axis, in FIG. 21 is greatly magnified in comparison to the scale in FIG. 20.

As is well known, there are drawn fine myriad-line patterns exactly at the region corresponding to p4 of FIG. 20 on the front side of the one-thousand-yen note, for example. These myriad-line patterns comprise red-brown colored lines RL and blue-green colored lines BL and these lines RL and BL are alternately arranged so as to respectively extend along gentle parallel curved lines. Regions corresponding to these lines RL and BL are indicated by reference letters RL and BL. Further, the background region corresponds to the region indicated by the reference letters GND in FIG. 21.

However, precisely speaking, the background region in FIG. 21 is a narrower region than the region enclosed by the block of GND. That is, in the respective curves of the R, G and B image data, the background region is a region at which the respective flat portions of these curves overlap with one another.

As shown in FIG. 21, in the background region GND, the respective R, G and B image data values are within respective limits in reflection levels indicated by reference letters PR, PG, and PB. The background region has been input as being a color slightly inclining to red and green. The same background region is a blank region located between the above lines RL and BL. Since a plurality of the flat regions located at the top of each of the R, G and B image data values exist in the scanning direction and the levels vary among these flat regions, the respective limits indicated by PR, PG and PB are made to include these variations.

In contrast to this, reflection characteristics in an image shown in FIG. 22 comprise R, G and B image data corresponding to an image, formed as a result of general color halftone-dot (mesh) printing, other than the special document such as mentioned above. However, the general image used there has been selected so as to be meaningfully compared with the paper-money image of FIG. 21, so that red-and-brown colored lines RL and blue-and-green colored lines BL intentionally appear alternately.

In comparison between the data concerning the paper money shown on FIG. 21 and the data concerning the general image shown in FIG. 22, there can be seen difference in the spectrums of the above lines RL and BL. That is, in the data of FIG. 21 concerning the paper money, between the plurality of RL regions or between the plurality of BL regions, the corresponding R, G and B reflecting light relative intensity P is approximately fixed. In contrast to this, in the data of FIG. 22 concerning the general image, the corresponding R, G and B reflected light relative intensity P is not fixed. In particular, the reflected light relative intensity P concerning B image data is greatly different in its levels among the three positions accompanied by the reference letters RL.

The reason why such phenomena occur in FIG. 22 is as follows. In the general color halftone-dot printing, desired color mixing is performed by printing a corresponding halftone dot with use of screens having arrangements different from one another for the respective colors of C, Y, and M. In such a method, if there are many lines RL which seem to be the same in their colors when seen with the naked eye, there arise great differences among the their respective reflected light relative intensities in R, G and B image data obtained as a result of sampling of 1/16 mm intervals, for example.

In contrast to this, the image comprising the paper money shown in FIG. 21 or other special document such as securities or the like has line-drawing patterns using fine curves. Such patterns are different from either halftone-dot patterns of a well-known kind realized by a general gravure or offset printing or myriad-line patterns (realized by a method of printing with a set of straight lines of vertical and horizontal directions). Further, such line-drawing patterns included in the image of the special document are characterized in that directions of lines forming them are not fixed and comprise various directions.

In FIG. 21, the intervals between the respective BLs and RLs are, as shown in the drawing, x1, x2, x3, x4, x5 and x6. As shown FIG. 21, the six intervals are approximately equal. That is, in other words, it can be said that a background region located between these lines RL and BL appears at intervals approximately half the size of x1.

The intervals (may be referred to as cycles, hereinafter) of these background regions in the p4 region in the paper-money image may vary depending on the placed direction in which the paper money OR is placed on the platen glass 3102 in FIG. 20. That is, in contrast to the state of FIG. 20, if it is placed so that the top of the person's face is directed forward the top-left, for example, the background regions are expected to occur at intervals different from FIG. 21.

However, as described above, the lines RL and BL forming these line-based patterns comprise curves and their directions are diverse. Therefore, variation, depending on the variation in the above placement direction, in the spatial frequency at which the relevant background regions appear, and/or the appearance frequency of the relevant background regions in a predetermined distance has a predetermined limit. Spatial frequency means, in contrast to the generally used term frequency concerning the time axis, an expression produced as a result of replacing the relevant time axis by the spatial axis. That is, the spatial frequency in this case means how many times the above background regions appear within a predetermined interval.

Figure 23:
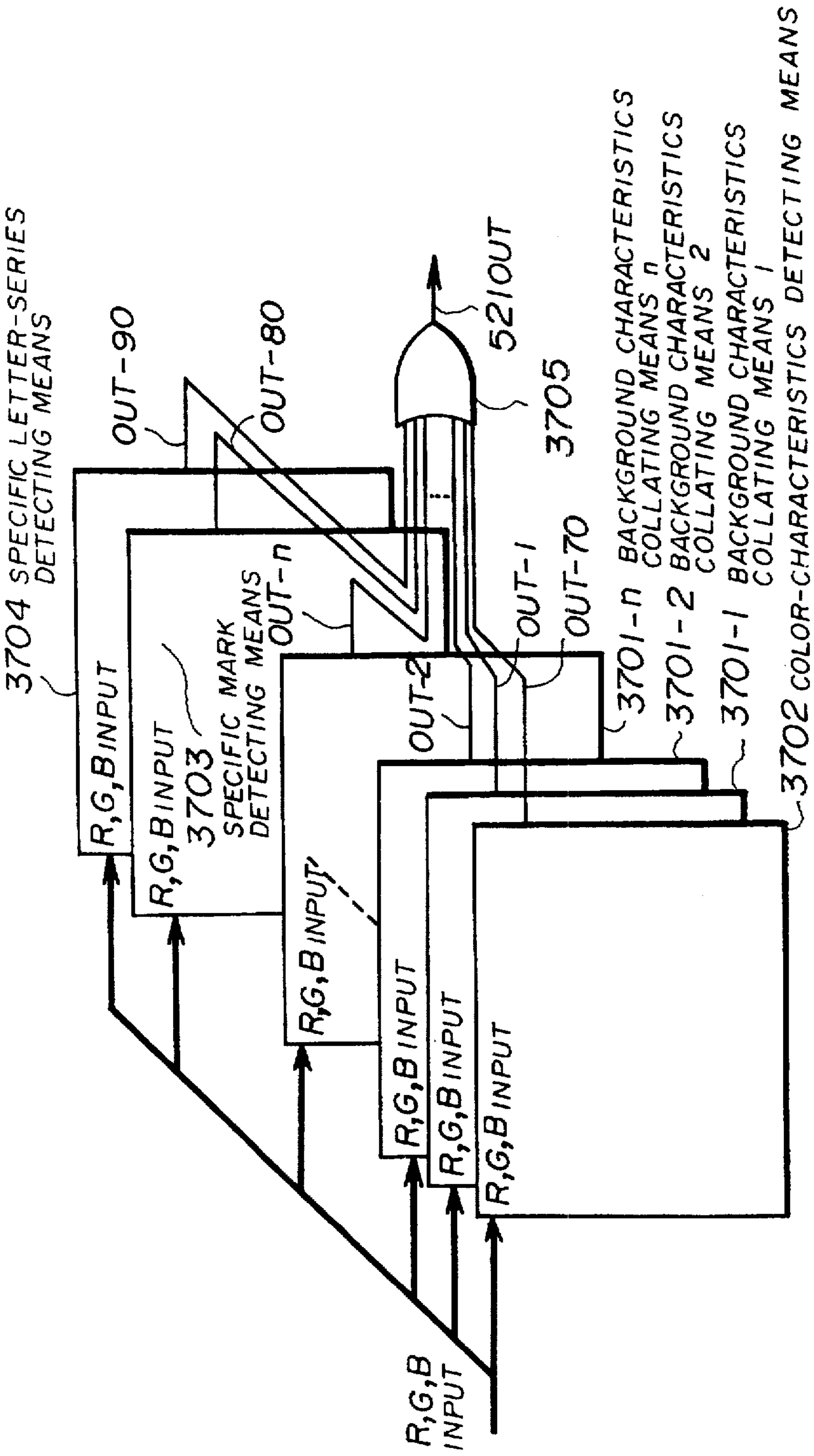
FIG. 23 shows a construction of a special-document detecting unit in the duplicator of FIG. 17.

Next, with reference to FIG. 23, a construction and operation associated with the above-mentioned special document detecting circuit 3170 will be described.

The special document detecting circuit 3170 comprises: n background-characteristics collating means 3701-1, -2, . . . -n; color-characteristics detecting means 3702; specific mark detecting means 3703; specific letter-series detecting means 3704; and a logical-OR circuit 3705. The output values of these circuit modules are connected to the input terminals of the logical-OR circuit 3705.

Next, the operation associated with this special document detecting circuit 3170 will be described. If any of the above respective collating and detecting means 3701-1 through 3701-n, 3702, and 3703 determines that 'a paper sheet or the like, comprising an original image and placed on the platen glass 3102, is a special document', then the relevant means sends a signal indicating this matter.

These respective collating and detecting means 3701-1 through 3701-n, 3702, 3703 and 3704 comprise PCB (printed circuit board) cards, and are inserted into respective connectors on a motherboard PCB, not shown in the drawing. Therefore, these cards may be inserted into and removed from the same mother board PCB, as is desired. Such insertion and drawing removal enable adjustment of the detecting criteria in the detecting operation associated with the special document detecting circuit 3170.

Further, it is preferable to provide a spare connector(s) on the same motherboard PCB so as to provide for the case such as the Bank of Japan producing new paper money. Further, it is also preferable to provide functions such as that described below. The information as to which cards are installed on the motherboard PCB is stored in a non-volatile memory in the system control circuit 3155 . As a result, at the time of power-on of the duplicator 3000, that stored information is used for checking the loaded state of the cards. Then, if at least one of the cards are drawn out, the duplicator is placed in a condition where no operation can be performed.

Next, the basic constructions of means 3701 typical among the above-mentioned n background-characteristics collating means 3701-1, -2, . . . -n will be described with reference to FIG. 24.

The background-characteristics collating means 3701 is a circuit used to determine whether or not an original image on a paper sheet or the like placed on the platen glass 3102 is identical to, for example, the front surface or rear surface of a paper money note of one denomination among the above-mentioned special documents.

The background-characteristics collating means 3701 comprises background color information storing means 3801*r*, 3801*g*, and 3801*b*. In these storing means, the upper limits and lower limits of the respective ranges associated with PR, PG, and PB such as described above in the description for FIGS. 21 and 22 are previously stored. These concern the R, G and B image data signals which are output by the SC 3100 when background regions such as described above for the above denomination paper money note are read by the SC 3100. To put it concretely, in an example, they are stored as digital values, each value having 8 bits. It is preferable that this stored information indicates ranges to take into account slight 'unevenness' (variation) in density which may appear on the surface of the paper money.

Further, the above background-characteristics collating means 3701 comprises background pixel number storing means 3802. This means 3802 previously stores the total number of pixels corresponding to background regions, among the plurality of pixels constituting the image comprising the paper money's surface. Also in this case, it is preferable that the value to be stored is a range comprising upper limits and lower limits to allow for variations due to stains or the like.

Further, the above background-characteristics collating means 3701 comprises color-range comparing means 3803*r*, 3803*g*, and 3803*b*. These means comprise, for example, well-known window comparators. The means compare, for each pixel, the R, G and B image data from the original image OR read by the scanner module SC 3100 with the respective upper limits and lower limits stored by the above background color information storing means 3801*r*, 3801*g* and 3801*b*. Then, these means determine whether or not the same image data falls in the range between the upper and lower limits.

Further, the above background characteristics collating means 3701 comprises a logical-AND circuit 3804. This circuit 3804 outputs 'true' if all of the above respective R, G and B image data are within the ranges stored in the background color information storing means 3801. Further, the background characteristics collating means 3701 comprises background-pixel counting means 3805 for counting the number of pixels causing the output of the above circuit 3804 to be 'true'.

Further, the background characteristics collating means 3701 comprises background pixel-number collating means 3806 for determining whether or not the number of pixels counted by the above means 3805 is in the range between the upper and lower limits stored in the above background pixel-number storing means 3802. Further, the means 3806 outputs, via its OUT terminal, a signal of 'true', that is, paper money detecting means, if the result of the above determination is that of 'within the range'.

Next, the operation of the background characteristics collating means having this basic construction will be described.

The image data obtained as a result of the original image OR in FIG. 20 being read is compared, for each pixel, with the information concerning the background region of the above paper money, by means of color range comparing means 3803*r*, 3803*g* and 3803*b*. As an example, since the original image in FIG. 20 corresponds to the one-thousand-yen note in this case, and further if the background characteristics collating means 3701 takes the same one-thousand-yen note as its collating object, then, since the original image OR is identical to this collating object, the pixels concerning the p1 region are naturally within the relevant limits in the respective three colors.

Accordingly, the background pixel-number counting means 3805 counts the relevant pixels. Further, in each of the regions p1, p3 and p4 on the image OR of FIG. 20, areas where ink is used for printing and areas constituting the relevant counting object are alternately repeated at close intervals. These ink-printed areas are naturally not the relevant counting object, the corresponding pixels being not counted.

The counted value obtained by means of this background pixel-number counting means 3805 is always used for determining, by collating as described above by means of the background pixel-number collating means 3806, whether or not it is within the limits stored in the background pixel-number storing means 3802. Then, if the result of this determination is 'within the limits', that is, that 'the original image OR is identical to the paper money which the background characteristics collating means 3701 takes as the collating object, (the one-thousand-yen note in this case)', the above paper-money detecting signal is immediately sent to the system control circuit 3155.

The system control circuit 3155, immediately after receiving this paper-money detecting signal, sends the above image-formation stop command to the PR 3180. Thus, forgery of paper money may be prevented. Thus, in the present embodiment, by using the characteristics associated with the line-based patterns in paper money or the like, the necessary discrimination operation may be implemented independently from the placement direction on the platen glass 3102 of paper money or the like comprising the original image.

In the majority of cases, the background regions in general color printed images other than the above-mentioned special document, and the edge regions in normal silver photographs are white. The colors in such regions are different from the colors in the above background regions of paper money and are easy for the above background characteristics collating means 3701 to discriminate. Further, there may be a rare case where a colored region is included in such a general image, the colored region resembling or substantially identical to the color of the background region of paper money. However, it can be seen the case is extremely rare that the number of pixels of such a similar or identical colored region, matches that of the paper money.

Further, an original cover (not shown in the drawing) is in general provided on a duplicator so as to be used to prevent external light from entering. This is to be used to cover the platen glass 3102 after paper or so comprising an original image is placed on the platen glass 3102 and before the duplicator 3000 is actually made to begin the duplication operation. The surface, of the original cover facing the platen glass 3102 comprises, for example, aluminum coated plate of a specular-reflection element. Accordingly, image data, obtained as a result of being scanned by the SC 3100, indicates an approximately black value. Further, if the duplication action is carried out under a condition where this original cover is not used and the platen glass 3102 is open outside, approximately black image data may be obtained. It can be seen that, whether the original cover is in either of the above-mentioned states, there is no possibility of image data resulting resembling to the background region in paper money or the like.

Further, as described above, there may be a case where plural sheets of paper money are placed on the platen glass 3102 in a manner that there is no space between them. In such a case, the whole size of the thus formed original image is detected by means of the size detecting function in the basic image processing circuit 3160. Then, by using information obtained by this detection, the discrimination process, according to the above detecting signal from the special document detecting circuit 3170, may be performed appropriately by means of the system control circuit 3155.

Next, another construction in the background characteristics collating means 3701 will be described.

This other construction is used to further improve the detection accuracy in the special-document discrimination performed as described above. The construction comprises a memory 3807. The memory 3807 stores the upper limit and lower limit of the number of pixels successively lying along an axis in a predetermined direction, that is, the number (referred to simply as run, hereinafter) of successive pixels, among pixels corresponding to the background region in the myriad-line printed pattern region existing in special document (such as a paper money note used as the discrimination object in the background characteristics collating means 3701).

The images associated with general printed papers other than special documents such as paper money are formed of halftone dots. However, there may be a rare case where such an image is formed of parallel fine lines. However, the fine lines in the paper money are different from them and comprise an image formed of waved fine lines. Such a region in the paper-money image corresponds to the above-mentioned 'myriad-line printed pattern region'.

Further, the above other construction in the above background characteristics collating means 3701 comprises run-length counting means 3808. The means 3808 counts the number of pixels successively lying along a predetermined direction, that is, a run, among the pixels concerning the background region in the original image OR in FIG. 20. The above other construction further comprises limits comparing means 3809. The means 3809 determines whether or not the above run of the background region in the above original image OR is in the range between the above upper and lower limits stored in the memory 3807.

The output of the limits comparing means 3809 is applied to the enable terminal 3805na of the above background pixel-number counting means 3805. The background pixel-number counting means 3805 performs the above predetermined counting operation only when the output indicating the determination result 'within the limits' is provided by the limits comparing means 3809.

It is preferable that the number of pixels constituting the background region in the paper-money's region where the above myriad-line printed patterns exist is stored in the background pixel-number storing means 3802. By doing so, it is possible to cause certain pixels, even though constituting the background region, to be prevented from being counted by the background pixel-number counting means 3805. These certain pixels constitute the region, such as the watermark region WM in the one-thousand-yen note in FIG. 11, where, in a relatively large area, there exists no printed pattern. It is thus possible to make the value obtained by the counting in the background pixel-number counting means 3805 relatively small.

Next, operation of this other construction of the background characteristics collating means 3701 is described.

The above functions of the run-length counting means 3808 and limits comparing means 3809 discriminate the data concerning pixels constituting the background region in the above myriad-line patterns in the image data concerning the original image OR. As a result of this discrimination, the background pixel-number counting means 3805 counts only pixels corresponding to image data which has been determined to comprise data concerning the pixels constituting the background region in the myriad-line patterns. By performing such an operation, it is possible to reduce the possibility of an erroneous determination of a general image other than the special document such as paper money is determined to be paper money.

The above discrimination operation assumes one side of a paper money bill of a single denomination as the discrimination object. Next, a discrimination operation for plural kinds of special documents, for example, plural denominations of paper money will be described with reference to FIG. 23.

Figure 24:
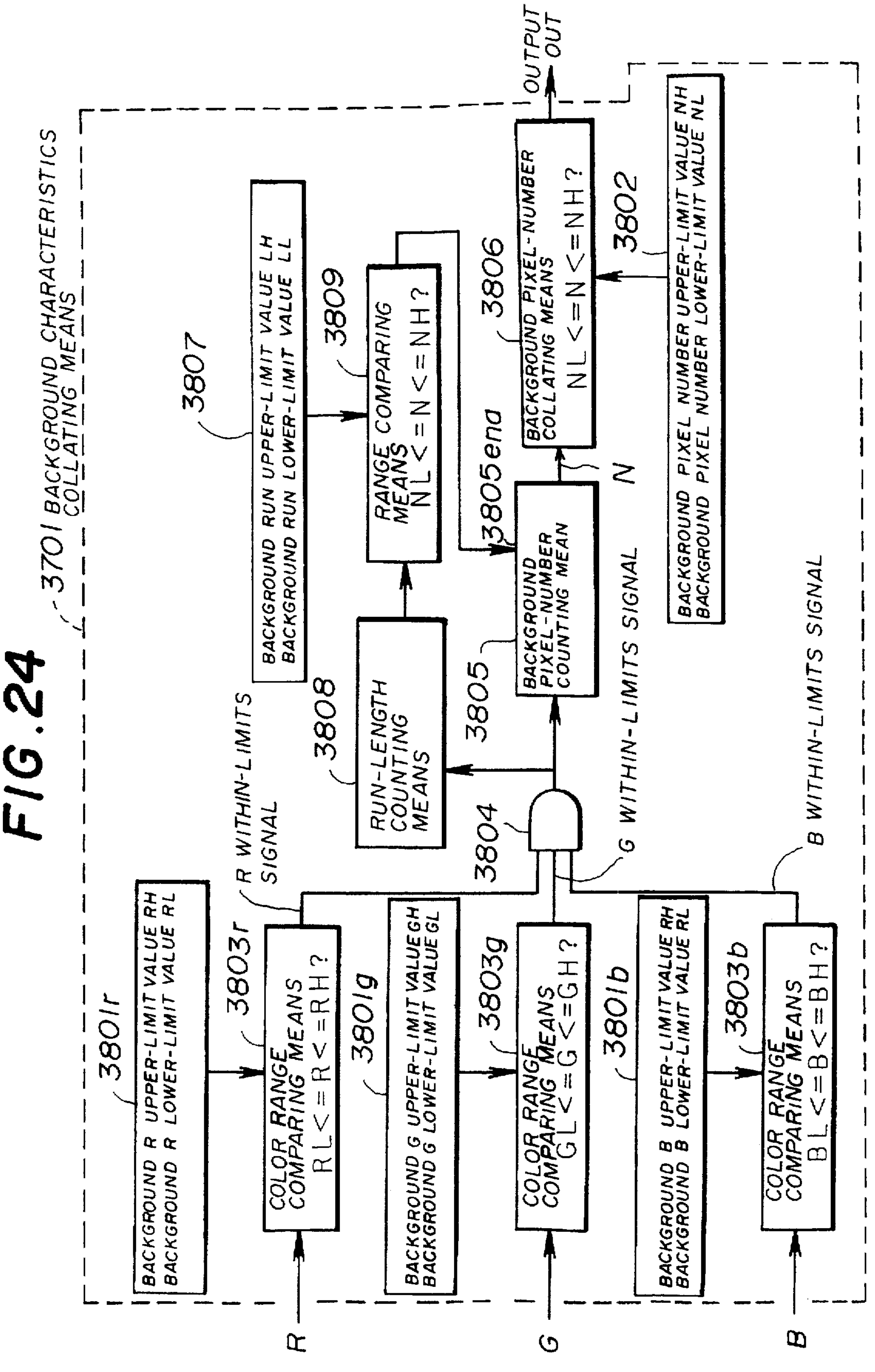
FIG. 24 shows a construction block diagram of background characteristics collating means in the duplicator of FIG. 17.

Each of the background characteristics collating means 3701-1, 3701-2, 3701-3, . . . , 3701-n has a construction similar to the construction of the typical background characteristics collating means 3701 shown in FIG. 24. However, certain information is stored in the corresponding background color-information storing means 3801 and background pixel-number storing means 3802 included in each of the background characteristics collating means 3701-1, 3701-2, 3701-3, . . . , 3701-n. The above certain information comprises information of the image comprising the respective one of the front surface or the rear surface of the paper money or so, which the respective one takes as the discrimination object, for example, the background-region information concerning the front surface of the one-thousand-yen note of the Bank of Japan, the background-region information concerning the rear surface thereof, the background-region information concerning the five-thousand-yen note thereof, the background-region information concerning the rear side thereof, . . . .

The R, G and B image data concerning the original image OR input through the SC 3100 is simultaneously provided to the respective detecting/collating means 3701-1, 3701-2, 3701-3, . . . , 3701-n, 3703, and 3704. Thus, the respective discrimination operations with respect to the plural kinds of special documents are simultaneously and in parallel performed. Approximately the same time is required for such parallel processing as for the discrimination operation concerning the front side or rear side of single kind of special document.

Figure 25:
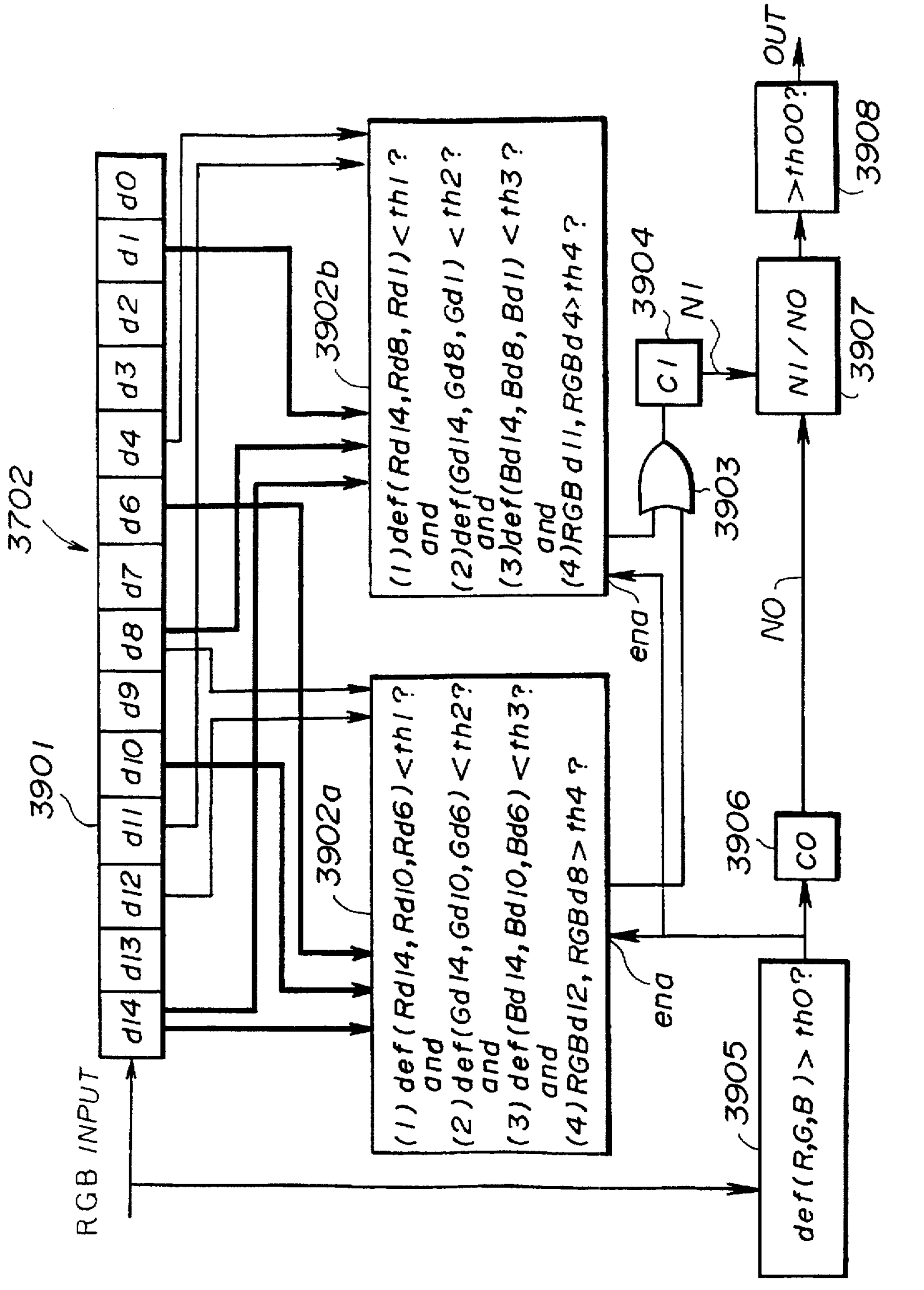
FIG. 25 shows a construction diagram of color characteristics detecting means in the duplicator of FIG. 17.

Next, with reference to FIG. 25, the construction of color-characteristics detecting means 3702 is described.

The color-characteristics detecting means 3702 comprises: a shift register 3901 having 15 24-bit stages; color resemblance degree determining means 3901*a*, and 3901*b*; a logical-OR circuit 3903; a color resembling pixel counter (CI) 3904; chromatic-color determining means 3905; chromatic-color pixel counter (CO) 3906; a divider 3907; and a comparator 3908.

The shift register 3901 successively receives image data units comprising 8 bits for each of R, G and B at its stage d14 and successively shifts the received image data units to other stages in sequence. The color resemblance degree determining means 3902*a* and 3902*b* determine the degree of resemblance between two pixels, located apart from one another by a predetermined distance, among a plurality of pixels lying on a certain scan line. The logical OR circuit 3903 performs the logical OR operation on the respective output values of the color resemblance degree determining means 3902*a* and 3902*b*. The chromatic-color determining means 3905 determines whether or not the pixel corresponding to the provided image data has a chromatic (i.e. is other than black, white or a shade of gray) color.

Next, the operation of the color characteristics detecting means having this construction will be described.

RGB image data input through the SC 3100 is provided to the shift register 3901 and the chromatic-color determining means 3905. The chromatic-color determining means 3905 extracts two values from the R, G and B three image data values. Then, the same obtains the absolute value of the difference between the R image data value and the G image data value, and the absolute value of the difference between the R image data value and the B image data value. These image data values are proportional to the relevant reflectivity density value in the image.

Subsequently, it is determined whether or not at least one of the thus obtained differences between R and G and between R and B is greater than a predetermined threshold value thO (def(R, G, B)>th0?). If the result of this determination is 'greater than', it is determined that the relevant pixel has a chromatic color, and the value 1 is output as the relevant result. This output is counted by the chromatic-color counter 3906 in the subsequent step. It is assumed that this counter 3906 is cleared to have 0 prior to the image reading by means of the above-mentioned SC 3100.

The shift register 3901 successively receives image data units at the stage d14 side, each unit comprising 8 bits for each of R, G and B, as described above. Then, each time the SC 3100 reads one pixel, the image data value is provided at the stage d14 correspondingly. Further, each unit of the thus provided image data units is shifting stages to the right in FIG. 25, at the above-mentioned time when one pixel is read.

The image data units thus supplied to the respective stages of the 15-stage shift register 3901 may be read in parallel from the outside. Further, the image data units thus supplied to the shift register 3901 are cleared each time when the main scan line is updated.

The color resemblance degree determining means 3901*a* and 3901*b* are, as described above, for determining the resemblance degree between a plurality of pixels, apart from one another by a predetermined distance, among a plurality of pixels lying along a certain main scan line. With reference to FIGS. 21 and 22, in the image associated with the special document such as paper money of FIG. 21, securities or the like, certain pixels repeatedly appear, the reflected-light relative intensities P in each of R, G and B being approximately uniform among the repeating pixels. In contrast, in another general image of FIG. 22, even though a plurality of pixels are seen even with the naked eye, the image data concerning them may be different among the respective pixels in their reflecting-light intensities P in each of R, G and B.

Further, in general, in an image associated with a special document such as paper money, securities or the like, in particular in an image comprising myriad-line patterns, portions comprising relatively high-density chromatic color and background portions are repeated at a relatively high 'spatial frequency'(described above). In contrast, in a general image, such images are in the minority. If exists, it may be seen in a photograph or the like showing chestnut hairs, for example. However, even if such an image showing chestnut hairs is considered, it can be seen to be extremely rare, that the image will have a region where background portions and chestnut-hair portions are repeated with high contrast. Thus, it can be seen that such an image as that of the chestnut hairs and the region in the above-mentioned paper-money image where the chromatic-color portions and the background portions are repeated may be discriminated. The discrimination may be made if the image data such as those shown in FIGS. 21 and 22 are obtained therefrom.

The color resemblance degree determining means 3902*a* and 3902*b* comprises circuits which can implement a discriminating algorithm devised in consideration of differences in image characteristics between special documents and other images. The color resemblance degree determining means 3902*a*, at the time the SC 3100 reads the image data in each pixel, samples image data values, associated with three pixels spaced four pixels apart, that is, the pixels stored in the respective stages d14, d1O and d6 of the shift register 3901, from among the pixel image data stored in the shift register 3901. Then, the degrees of resemblance between the pixel data values are obtained. However, it is assumed that cases where these obtained results are valid are limited to the image data values associated with those central intermediate pixels, that is, the data values stored in the stages d12 and d18 of the shift register 3901, comprise R, G and B data corresponding to the background region.

The color resemblance degree determining means 3902*b* has a circuit construction the same as that of the above color resemblance degree determining means 3902*a*. The color resemblance degree determining means 3902*b*, at the time the SC 3100 reads the image data for each pixel, samples image data values associated with three pixels spaced six pixels apart, that is, pixels stored in the respective stages d14, d8 and d1 of the shift register 3901, from among the pixel image data values, stored in the stages of the shift registers 3901. Then, the degrees of resemblance between these pixel image data values are obtained. However, it is assumed that the cases where these obtained results are valid are limited to those where the image data values associated with the central intermediate pixels, that is, the data values stored in the stages d11 and d4 of the shift register 3901, comprise R, G and B data corresponding to the background region.

The method for sampling image data associated with a plurality of pixels from among pixels on a main scan line is not limited to the above. In an example, if a foreign country's paper money is taken as the relevant discrimination object, it is possible to set other sampling intervals so as to correspond to that paper money. For such a case, a third color resemblance degree determining means may be provided other than the above two color resemblance degree means 3902*a* and 3902*b* wherein the sampling intervals particular to the foreign country's paper money are set.

Further, such a color resemblance degree determining operation by means of the color resemblance degree determining means 3902*a* and 3902*b* is performed only when the value 1 is input to an end terminal provided to each of these means 3902*a* and 3902*b*. The case where the value 1 is respectively provided to these end terminals is a case where the chromatic-color determining means 3905 determines that the pixel image data value input to the shift register 3901 at the relevant time, that is the data stored in the step d14, corresponds to a pixel having a chromatic color.

Each of these color resemblance degree determining means 3902a and 3902b outputs the value 1 as the resemblance degree when the logical AND of the results of the four determinations (1), (2), (3) and (4) mentioned below is true (that is, in a case where every determination result is true (yes)). The same outputs the value 0 as the resemblance degree in any of the other cases.

(1) With respect to R data, is every one of the absolute values of the differences between the above-mentioned three sampled pixel image data values equal to or lower than a threshold value th1?

(2) With respect to G data, is every one of the absolute values of the differences between the above-mentioned three sampled pixel image data units equal to or lower than a threshold value th1?

(3) With respect to R data, is every one of the absolute values of the differences between the above-mentioned three sampled pixel image data values equal to or lower than a threshold value th1?

(4) Is every one of the R, G and B data values associated with every one of the image data values associated with the above central intermediate pixels greater than th4?

The image data may comprise either values corresponding to the density associated with the image or values corresponding to the reflectivity thereof.

The logical OR circuit 3903 performs a logical OR on the output values of the two color resemblance degree determining means 3902a and 3902b. Further, the color-resembling pixel counter 3904 counts the number of pixels which are determined to have color-resemblance degree 1 by the above-described functions of the color resemblance determining means 3902a and 3902b and logical OR circuit 3903. The number obtained by this counting will be referred to as N1. The divider 907 calculates the ratio N1/NO between the above counted value N1 and a chromatic-color pixel count NO. This chromatic-color pixel count NO comprises a counted value obtained as a result of counting by means of the above chromatic-color pixel number counter 3906.

The comparator 3908 compares the thus obtained ratio N1/NO with a predetermined threshold value thOO. If this ratio is greater than the threshold value, it determines that the relevant original image OR comprises an image such as paper money or so which is prohibited from being duplicated. The signal indicating this matter is output via the OUT terminal. The subsequent image-formation operation stop procedure is similar to the procedure to be performed when the above-described background characteristic collating means 3701-1 or the like makes the similar determination, the description therefor being thus omitted.

[EMBODIMENT IN SIXTH ASPECT]

Next, an image processing apparatus in a first embodiment in a sixth aspect of the present invention will be described in general.

This image processing apparatus comprises: extracting means for extracting, for each pixel, data concerning a specific color or specific hue from image data concerning a predetermined region in an original image; counting means for counting the number of pixels corresponding to the thus extracted image data; calculating means for calculating, using the counted value obtained by the counting means, the ratio of the area occupied by pixels of the specific color or specific hue to the area of the above-mentioned predetermined regions; and discriminating means for discriminating, using the calculation result obtained by the calculating means, as to whether or not the relevant original image comprises a special document such as paper money, securities or so.

Further, a plurality of the above-mentioned specific colors or specific hues may be specified so that the above-mentioned extracting means and counting means may be provided in the corresponding plurality of sets. Further, the above-mentioned calculating means may calculate ratios for the areas respectively occupied by pixels of the relevant plurality of specific colors or specific hues in the above-mentioned predetermined region.

Further, the above-mentioned plurality of specific colors or specifics hue may include colors or hues associated with background portions in the predetermined region and other specific colors or specific hues.

Further, the above-mentioned predetermined regions may be specified. Then, among the respective discrimination results concerning the plurality of predetermined regions, if at least one first discrimination result comprises 'the relevant original image is identical to the special document', the relevant first discrimination result and other discrimination result(s) may be used for making the final decision.

Further, the image processing apparatus in a second embodiment in the sixth aspect of the present invention comprises: storing means for previously storing R, G and B values peculiar to the image information concerning the special document such as paper money, securities or so; comparing means for comparing the thus stored values with the R, G and B values in the image data concerning the relevant original image; and control means for altering the regular image forming process if necessary in accordance with this comparison result.

The image processing apparatus 4000 in the first embodiment of the sixth aspect of the present invention will be described.

Figure 26:
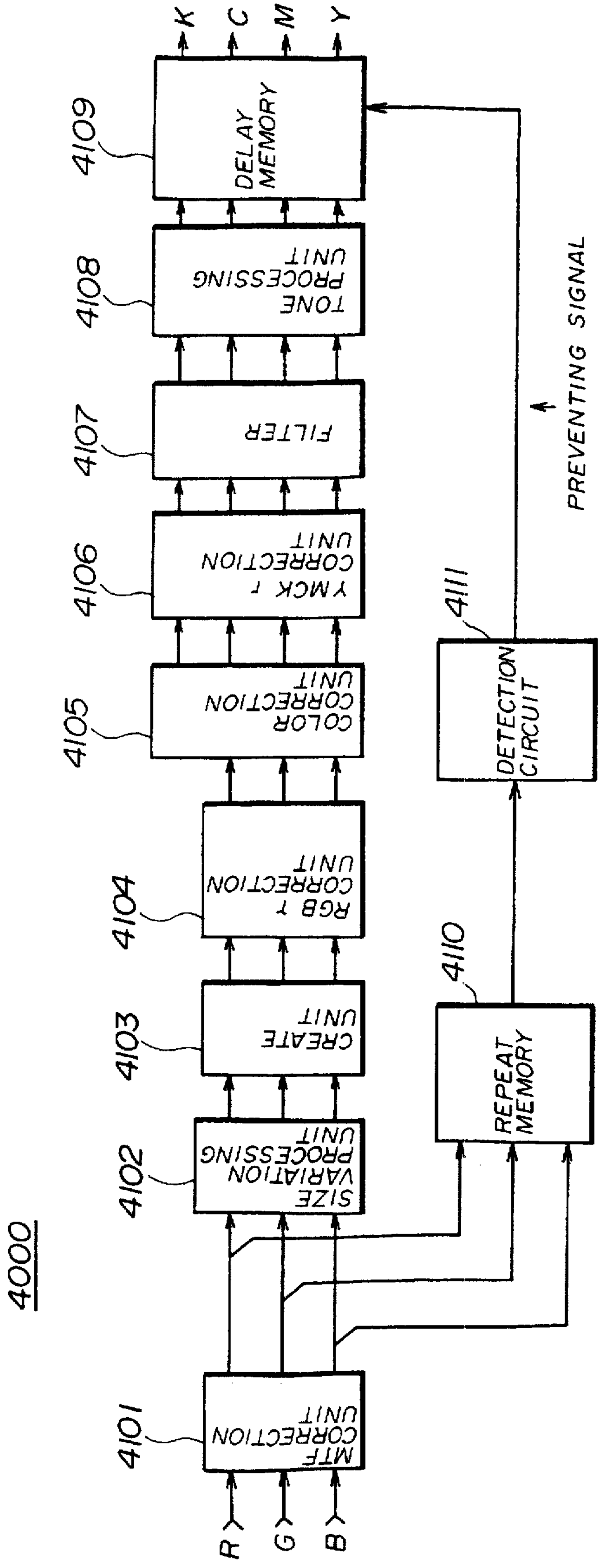
FIG. 26 shows a general-construction block diagram of an image processing apparatus in a first embodiment of the sixth aspect of the present invention.

With reference to FIG. 26, the image processing apparatus 4000 has MTF (modifying transfer filter) correction unit 4101, size variation unit 4102, create unit 4103, RGB γ correction unit 4104, color correction unit 4105, YMCK γ correction unit, filter 4107, tone processing unit 4108, delay memory 4109, repeat memory 4110, and detection circuit 4111.

The MTF correction unit 4101 corrects a dimming phenomenon which may occur, when an original image is read, due to the lens system inside the image processing apparatus 4000. Thereby, a clear image may be formed. The size variation unit 4102 determines the size-variation ratio in the main scan direction of the image to be formed to the original image. The similar size-variation ratio in the sub-scan direction is determined by controlling the scan speed in the relevant scanner.

The create unit 4103 is used for implementing various image modifying processing such as mirroring, inclining or italicizing, inside removal and so forth, in the well-known art. Further, the RGB γ correction unit 4104, in a method well-known to the art, logarithmically converts input image data in the form of reflectance into the corresponding density data. The color correction unit 4105 converts, with the well-known masking method technology, R, G and B image data such as described above into the corresponding Y, M, C and K image data such as described above. The YMCK γ correction unit 4106 performs a γ correction processing as described above on the image data in Y, M, C and K density values so as to make the data adaptable to the relevant printer.

The filter 4107 performs the well-known sharpening processing and smoothing processing appropriately to the state in the relevant image. The tone processing unit 4108 performs the well-known half-tone processing (dither processing) and then outputs the resulting image data to the printer. The delay memory 4109 causes the corresponding image data for each toner color Y, M, C and K to be delayed by predetermined time periods from one another. The purpose of this delay is described below. In the case of this embodiment, the printer comprises 4 drums in total, each drum being provided for the respective one of the above-mentioned color toners. The corresponding image data is to be delayed by a time period corresponding to the interval between the respective drums. As a result, the relevant image is printed with the corresponding color toners as a recording paper sheet passes the respective drums in the sequence.

The repeat memory 4110 is used for repeatedly reading image data concerning a specific region in the relevant original image. The detection circuit 4111 determines whether or not the relevant original image is identical to the special document such as paper money, securities or so.

Next, with reference to FIG. 27, the construction of the delay memory will be described. In the figure, the image forming sequence by means of image data in the respective colors, Y, M, C and K is K, C, M, and Y. The corresponding drums are arranged at fixed intervals in the same sequence. Each memory block 4201 has the capacity for storing the relevant image data for the time necessary to allow the time delay corresponding to the relevant drum interval.

A duplication preventing signal which the detection circuit 4111 outputs when the circuit determines 'the relevant original image is identical to the special document' is input to an AND gate 4203 via an inverter 4202. The Y image data is connected to the other input terminal of the AND gate 4203 via the three memory blocks 4201.

By such a construction, while the above-mentioned duplication preventing signal input to the AND gate 4203 is "H", the Y image data at the other input of the AND gate 4203 is prevented from passing therethrough due to the gating operation in the AND gate 4203. That is, "0", (that is, "L") rather than the image data $y_a$ is output from the AND gate 4203.

The reason why the above-mentioned duplication preventing signal is used only to gate the Y image data will be described. The Y image data must pass the three memory blocks as shown in the drawing. Thus, its time delay is long. Accordingly, the sending of the duplication preventing signal can be delayed for that delay time. That is, even if the sending of the duplication preventing signal is delayed, it is possible to alter the regular duplication operation. Thereby, the forgery can be prevented. However, the sixth aspect of the present invention is not necessarily limited to such an input course of the duplication preventing signal and an arbitrary course may be employed. In one example, in a case where the generation of the duplication preventing signal by means of the detecting circuit 4111 does not require a significant amount of time, a construction may be employed in which the signal is used to gate image data for different color.

Figure 27:
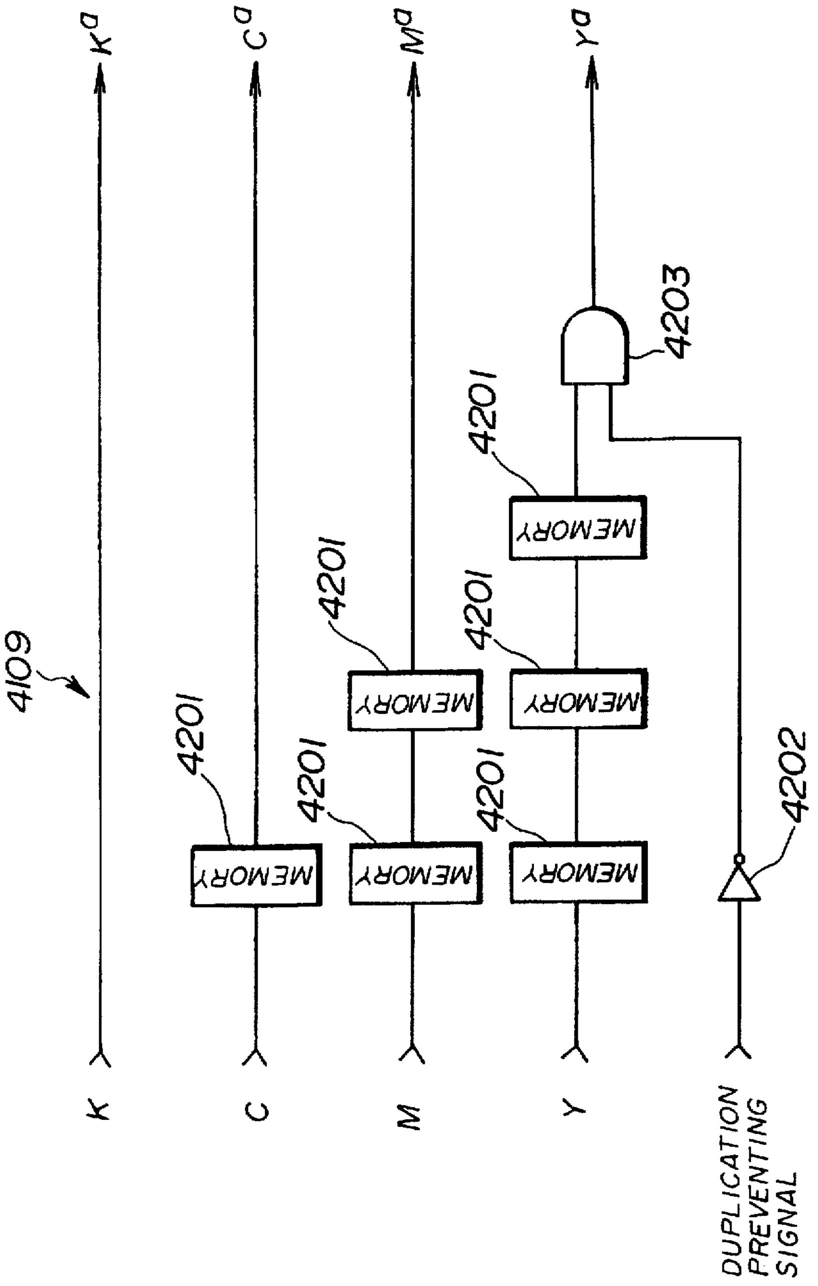
FIG. 27 shows a block diagram illustrating a general construction of a delay memory in the apparatus of FIG. 26.

Further, in the construction shown in FIG. 27, if the duplication preventing signal is "L", the Y image data input to the AND gate 4203 is passed through the AND gate 4203 without alteration and becomes the output image data $Y^a$.

Figure 28:
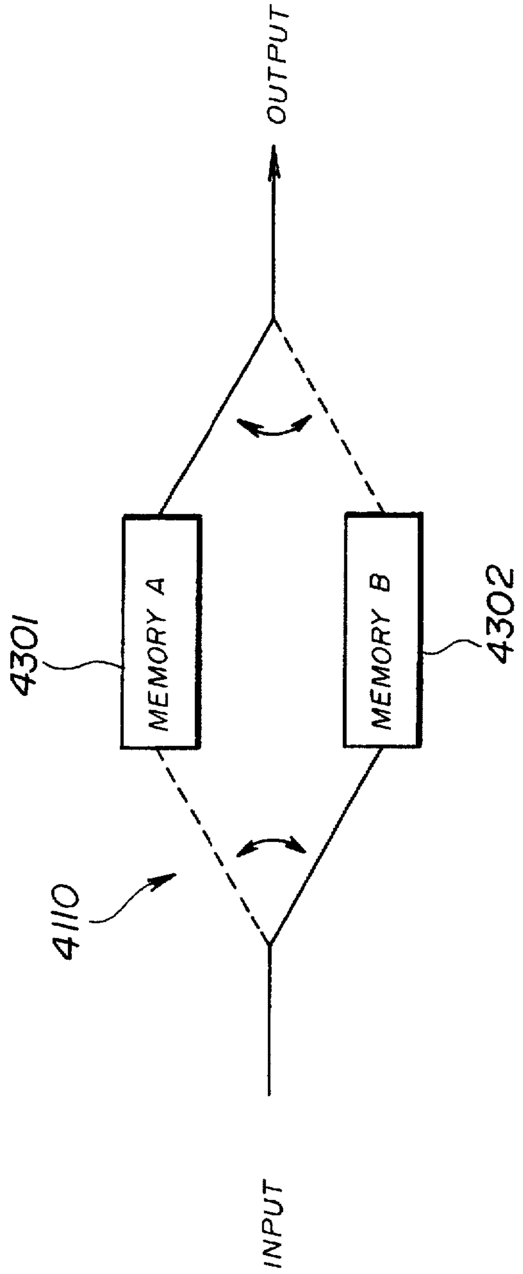
FIG. 28 shows a block diagram illustrating a general construction of a repeat memory in the apparatus of FIG. 26.

With reference to FIG. 28, the construction of the repeat memory 4110 will be described. The repeat memory 4110 comprises a so-called toggle memory comprising two memories A 4301 and B 4301.

Figure 30:
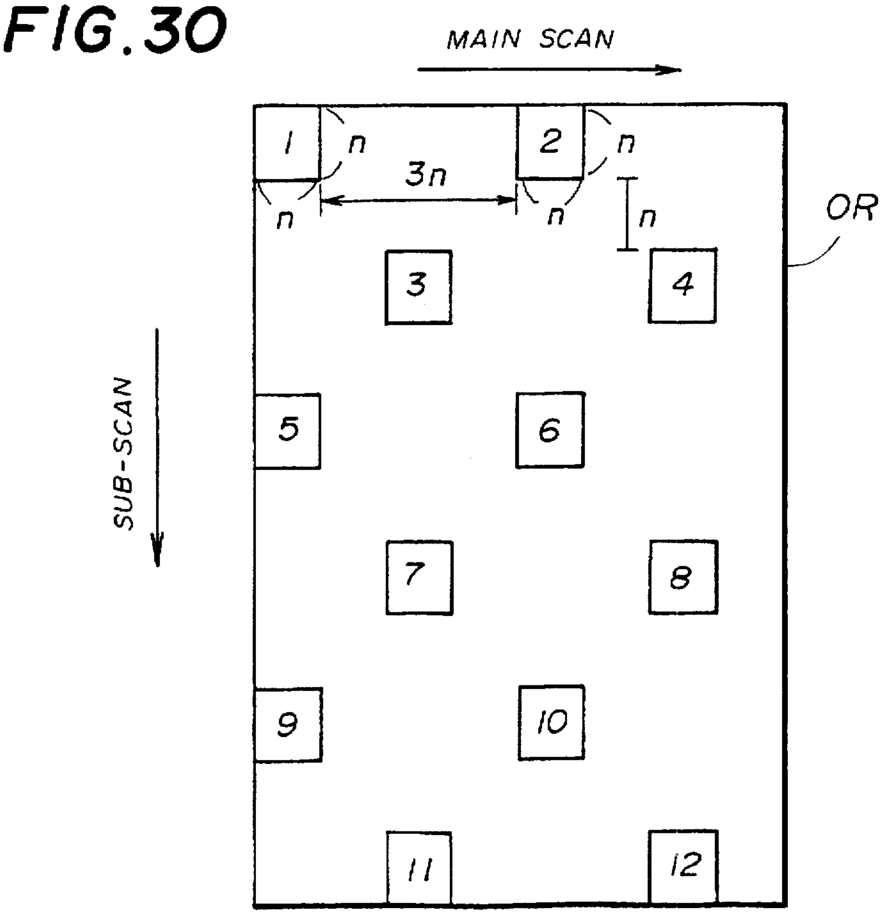
FIG. 30 shows an example of an original-image reading operation carried out by the apparatus of FIG. 26.

With reference to FIG. 30, it is assumed that, for an original image OR, a plurality of square areas indicated by the numerals 1–12 are used for the detection operation in the detection circuit 4111.

When the image forming operation in the image processing apparatus 4000 is started, in the repeat memory shown in FIG. 18, respective connections are made so that the input image data is input to the memory A 4301 and the output of the memory B 4302 is output from the repeat memory 4110. Such connections are indicated with broken lines in FIG. 28.

Under such a state in the repeat memory 4110, image data concerning the above-described areas 1 and 2 to be used is input to the repeat memory 4110. As a result, the memory A 4301 stores the input areas 1 and 2. Thus, the $n^2$ pixels of image data, when n is the number of pixels in both the main scan direction and the sub-scan direction are stored for each of the areas 1 and 2.

Thereafter, in the repeat memory 4110, respective connections are made so that the image data input to the repeat memory 4110 is input to the memory B 4302 and the output of the memory A 4301 is output from the repeat memory 4110, as shown with solid lines in FIG. 28.

Then, as described above, the image data stored in the memory A 4301 is output from the repeat memory 4110. In this output operation, the n×n pixel image data items in the above-mentioned area 1 in FIG. 30 to be used are successively output. This output operation is, as shown in FIG. 31, repeated a total 8 times.

FIG. 31 corresponds to FIG. 30. In each of FIGS. 30 and 31, the horizontal direction, that is, main-scan direction corresponds to the longitudinal direction with respect to the CCD and the vertical direction, that is sub-scan direction, corresponds to the direction along which the scanner containing the CCD mechanically scans the relevant original image. That is, in FIG. 30, the original image OR is read from the top to the bottom in the sequence by means of the CCD. Simultaneously with the reading of the original image OR, the above-mentioned areas 1–12 to be used are being extracted as described above. Simultaneously with the extraction, the extracted data pieces are sent in sequence to the detection circuit 4111 via the toggle memory 4110.

In such an operation, the extracted data pieces respectively correspond to a quite small area of the image in the entire original image OR as shown in FIG. 30. Therefore, even though identical data pieces are sent to the detection circuit 4111 *b* 8 times as shown in FIG. 31 for example, and the speed at which the CCD is scanning the original image OR can be synchronized with the speed at which data concerning the above-mentioned areas to be used is being sent to the detection circuit 4111. For example, the time at which the data for a strip of width 2n has been read by means of the CCD starting from the top in FIG. 30 will be considered. At this time, extraction of the above-mentioned areas 1 and 2 should have been completed in FIG. 30. That is, it is the precise time the relevant area 2 has been completely stored in the repeat memory 4110.

The corresponding time in FIG. 31, that is, after reaching a distance of 2n from the top, is the time the relevant area 1 has been completely sent to the detection circuit 4111 from the repeat memory 4110, 8 times. This time is the precise time reading of the relevant area 2 from the repeat memory 4110 is being started. Thus, the synchronization is achieved.

In such an operation, there is no case where the repeat memory 4110 overflows nor does it become idle, thus being efficiently used. The reason why the top strip of width n in FIG. 31 is blank is as follows. During the relevant time, the relevant area 1 is being read into the memory A 4301. Simultaneously, the data is being sent to the detection circuit 4111 from the memory B 4302. However, since no data has been stored in the memory B, the above-mentioned blank is shown.

After the above-mentioned 8 times' output operation has been completed, the data concerning the above-mentioned area 2 in FIG. 30 to be used, which data has been also stored in the memory A 4301 is output from the repeat memory 4110. In this time, assuming that the data being input to the repeat memory 4110 comprises the data concerning the above-mentioned areas 3 and 4 to be used, the data thus input is stored in the memory B 4302 accordingly in accordance with the relevant connections. The input operation into the repeat memory 4110 is performed simultaneously with the above-described output operation from the same and also they finish simultaneously.

Next, in the repeat memory 4110, the input data is input to the memory A 4301 and the data output from the memory B 4302 is output from the repeat memory 4110. Thus, the connections relevant to the respective memories A 4301 and B 4302 in the repeat memory 4110 are in turn switched between the connections shown with the broken lines and the connections shown with the solid lines alternately. Thus, the above-described simultaneous input/output operation is performed in turn.

By such an operation, as shown in FIG. 31, the data concerning each of the areas 1–12 to be used may be output 8 times. Thus, the construction allows the image data concerning each area to be output multiple times during a single image forming process in the image processing apparatus 4000. Thereby, the image data concerning each area, which is output repeatedly a multiple times can be processed a multiple number of similar or different processing ways.

Further, such a construction for the multiple-times output is not necessary to be limited to the example shown in FIGS. 30 and 31. The size of areas to be used in the relevant original image and the number of times of the output may be arbitrarily decided. Further, in one example, even though the image data concerning all of the n.n pixels is input, use of the same is not always necessary. It is also feasible that among the n.n pixels, same are extracted appropriately in a manner of thinning, and the extracted ones are input to the repeat memory 4110. Thereby, the input/storage amount per once may be reduced and as a result, increase in the number of times of output is possible. In one example, by thinning the reading data in each reading area into one fourth, it is possible to use the data concerning the reading area 4 times more frequency for the detecting operation and so forth before the start of the processing of the subsequent reading area.

Figure 32:
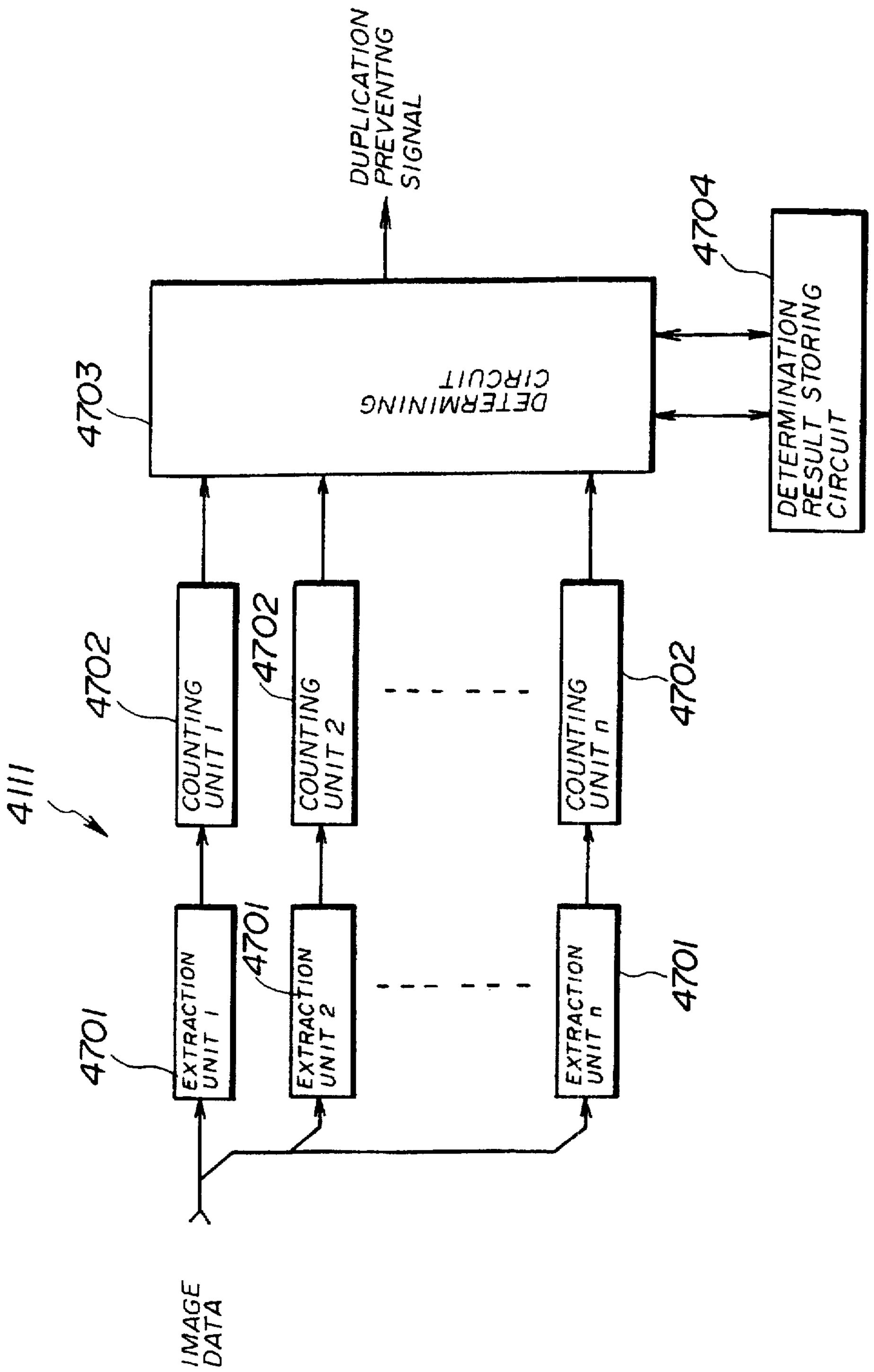
FIG. 32 shows a block diagram illustrating a construction of a detection circuit in the apparatus of FIG. 26.

The data delay occurring as a result of such use of the repeat memory 4110 is 2n lines accordingly. However, in a case where a determination unit in the image processing apparatus 4000, that is, a determining circuit 4703 in FIG. 32 is to function in real time, there is no problem if a condition described below is met. The delay 2n must be smaller than the maximum delay in the delay memory 4109. (The 2n lines corresponds to the fact that, in the example FIG. 31, reading in of the relevant area 1 is started from the original image OR at the time corresponding to the top-left position in FIG. 31, and 2n lines later, 8 times of readout for the relevant area 1 is completed.) There being no problem means that the above-mentioned delay due to the repeat memory 4110 does not adversely affect on the image forming processing speed in the entirety of the apparatus 4000.

Figure 29:
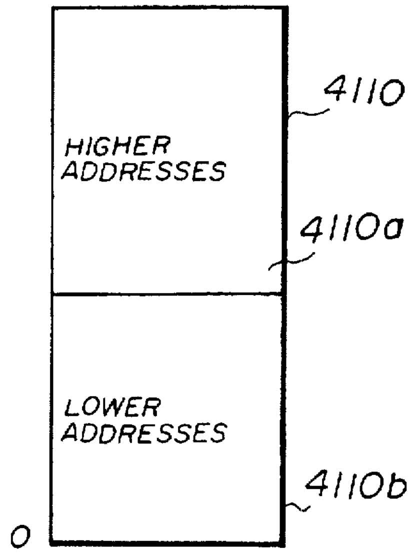
FIG. 29 shows an example of storing by means of the repeat memory in the apparatus of FIG. 26.

This data storing method in the repeat memory 4110 may use, as illustrated in FIG. 29 for example, a higher-address storing region 4110*a* and a lower-address storing region 4110*b*. The two storing regions are obtained as a result of dividing the relevant storing region. In this case, in one example, the higher-address 4110*a* is made to correspond to the odd-numbered reading areas and the lower-address 4110*b* is made to correspond to the even-numbered reading areas.

Next, the construction of the detection circuit 4111 will be described in detail with reference to FIG. 32.

The detection circuit has n extraction units 1 through n 4701. These extraction units 1 through n 4701 respectively comprise either of two kinds of constructions described below.

The first kind of construction is a specified color extraction circuit and this circuit has a construction such as a 'specific-original input/output determining apparatus' disclosed in Japanese Laid-Open Patent No. 2-55378. The construction extracts image data concerning a certain specific color from input image data. The specific color in this case comprises, for example, a color in predetermined allowable limits, such as sky-blue. That is, a color is considered to be the relevant specific color even if the shade thereof is different, however, a color is a different specific color if the R, G and B components constituting the relevant color are differently distributed.

The second kind of construction of the above-mentioned extraction units 1 through n 4701 is a special-color hue circuit. This circuit identifies inks referred to as so-called special-color inks used in printing of the majority of securities.

The basic concept of this special-color hue will be described with reference to FIGS. 33A, 33B and 33C. The special-color hue means a color other than inks of the four kinds, Y, M, C and K such as described above generally used in printing in a printer in an image processing apparatus. However, in this embodiment, with regard to use of this term special color, it is allowed that these colors Y, M, C and K are respectively considered a special color.

Figure 33A:
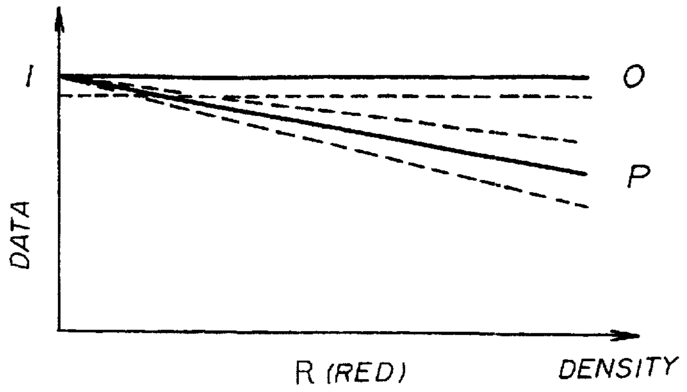
FIGS. 33A, 33B, and 33C show graphs for illustrating a concept of a specific-color hue used in the apparatus of FIG. 26.
Figure 33B:
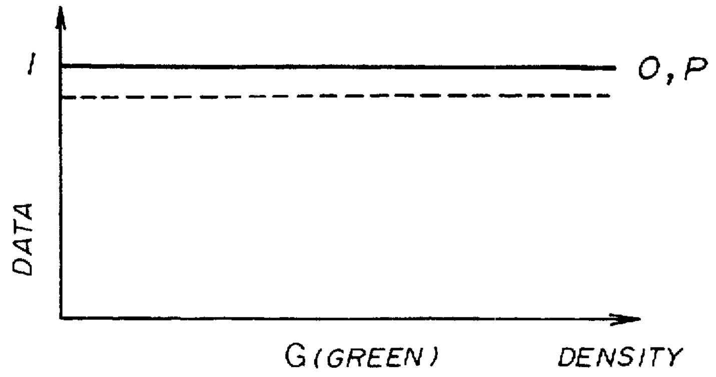
Figure 33C:
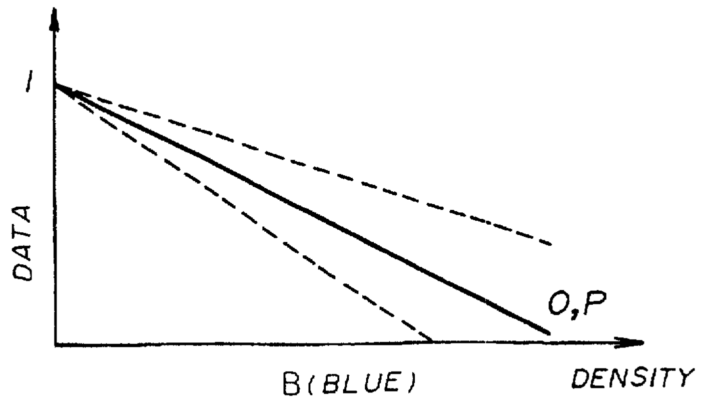

In an example, in the above Y (yellow), indicated by a reference letter 0 in FIGS. 33A, 33B and 33C, the R (red) and G (green) in the corresponding image data remain constant at a relatively high value if the relevant image is increased in its density. The B (blue) decreases in response to the increase in the image density. In contrast to this, in a yellow-green color (in a special color), as shown with a reference letter P in FIGS. 33A, 33B and 33C, the G (green) remains constant at a relatively high value independently from the increase in the density (similarly to the case for the above-mentioned yellow). In contrast, the B (blue) decreases in response to the increase in the density. Further, the R (red), similarly to the case for the B decreases in response to the increase in the density. However, the tendency in this decrease is small in comparison to the case for the B.

Thus, extracting of image data corresponding to the above-mentioned special-color hue may be achieved by using special-color hue information. This information may be obtained by previously storing information concerning the tendency, such as described above, in the hue particular to the special document previously set as the discrimination object. The hue is determined in accordance with the balance among the respective R, G and B colors or among the respective Y, M, C and K colors.

The broken lines shown in FIGS. 33A, 33B and 33C represent upper and/or lower allowable limits for the values indicated by the solid lines in a case where the hue information shown in these figures is used in the above-mentioned special-color hue extraction. The purpose of providing the allowable limits is to allow for variations such as from sampling errors or the like which may occur in inputting, with sampling technology, the image data concerning an original image to be processed.

Further, in such special-color hue extraction, it is difficult, due to the corresponding characteristics, to distinguish, with respect to hue, data concerning color at a low density near to white. Thus, extraction errors are likely. Such extraction errors may be prevented by using regions where the densities of the respective colors are high, that is, the right side in FIG. 33A–33C, for the discrimination resulting in the above-mentioned special-color hue extraction.

In an example, for each hue, the respective density ratios of the G and B to the R are predetermined. Therefore, determining in such use, as a criterion, of predetermined allowable limits provided for the G and B density ratios enables extraction of the relevant special-color hue. The G and B densities relative to the R value may be obtained as a previously memory stored value or the like, or may be calculated by means of a calculating device or the like. The extraction units 1 through n 4701 are provided with multi-value R, G, and B image data sets and output 1-bit data (extraction flag) acting as the determination results.

The operation performed by each of the extraction units 1 through n 4701 acting as the special-color hue circuits will be described with reference to FIG. 34.

In this operation, the parameters used are as follows:

(1) "THR": white-level threshold value for R data;

(2) "THR": white-level threshold value for B data;

(3) "THR": white-level threshold value for G data; (The corresponding color is white if each of the R, G and B data (reflectance) values is in the maximum value.)

(4) $K_C$: the fixed region in the allowable limits in color balance (that is, values shown in FIG. 33B);

(5) $TK_R$: the ratio of R in the special-color hue;

(6) $TK_G$: the ratio of G in the special-color hue; and (7) $TK_B$: the ratio of B in the special-color hue.

There, the allowable-limits variation amount in the color balance shown in FIGS. 33A–33C has been considered (the allowable limits may vary depending on the level in the color data).

Next, the operation performed by the extraction units 1 through n 4701 acting as the above-mentioned special-color hue circuits will be described, see FIG. 34. First, in S4901, the above-mentioned respective parameters are set before the commencement of the predetermined image forming processing in the image processing apparatus 4000.

Subsequently, in S4902, together with the commencement of the image forming processing, the determining described below is made for each pixel in the image data of the image to be processed:

(1) White-data determination (S4903): If the proposition '{(R data)>THR} and also {(G data)>THG} and also {(B data)>THB}' is true, then 'white-data determination' result meaning that the image data corresponding to the relevant pixel is white is delivered, and the procedure continues to the subsequent pixel. If the above proposition is false, a hue determination 1 is delivered for the image data in the relevant pixel (S4905).

(2) Hue determination 1 (S4905): If the proposition '(R value)$\cdot TK_G/TK_R+K_C$>(G value)>(R value)$\cdot TK_G/TK_R-K_C$' is true, the hue determination 2 (S4906) is delivered for the image data of the relevant pixel. If the proposition is false, a non-special-color hue determination result (S4907) meaning that 'the relevant pixel does not comprise the special-color hue' is delivered for the image data of the relevant pixel and S4902 is then performed for the subsequent pixel.

(3) Hue determination 2 (S4906): If the proposition '(R data)$\cdot TK_B/TK_R+K_C$>(B data)>(R data)$\cdot TK_B/TK_R-K_C$' is true, the special-color hue determination result (S4908) meaning that 'the relevant pixel comprises the special-color hue' is delivered for the image data of the relevant pixel. Then, S4902 is performed for the image data concerning the subsequent pixel. If the above proposition is false, a non-special-color hue determination result (S4907) meaning that 'the relevant pixel does not comprise the special-color hue' is delivered for the image data of the relevant pixel and S4902 is then performed for the subsequent pixel.

(The ratio for G is calculated in the above-mentioned S4905 and the ratio for B is calculated in S4906. The reason why the R is compared with the calculated ones is that as is well known, the R data contains G and B components which have not been removed by means of the optical filters.)

Each set of R, G and B data values in the above respective propositions represents a color level (reflectance data) for the respective color for each pixel. The operation shown in FIG. 34 shows an example of a case where the special-color hue extraction is executed by using the special-color hue so that the R value is the maximum one. A similar operation may be performed for a case where the special-color hue is used so that the G value or B value is the maximum one. That is, in one example where the G data is made to be the maximum one, in each of the above-mentioned propositions, the parts indicated as 'R' are replaced by 'G' and the parts indicated as 'G' are replaced by 'R'.

Figure 34:
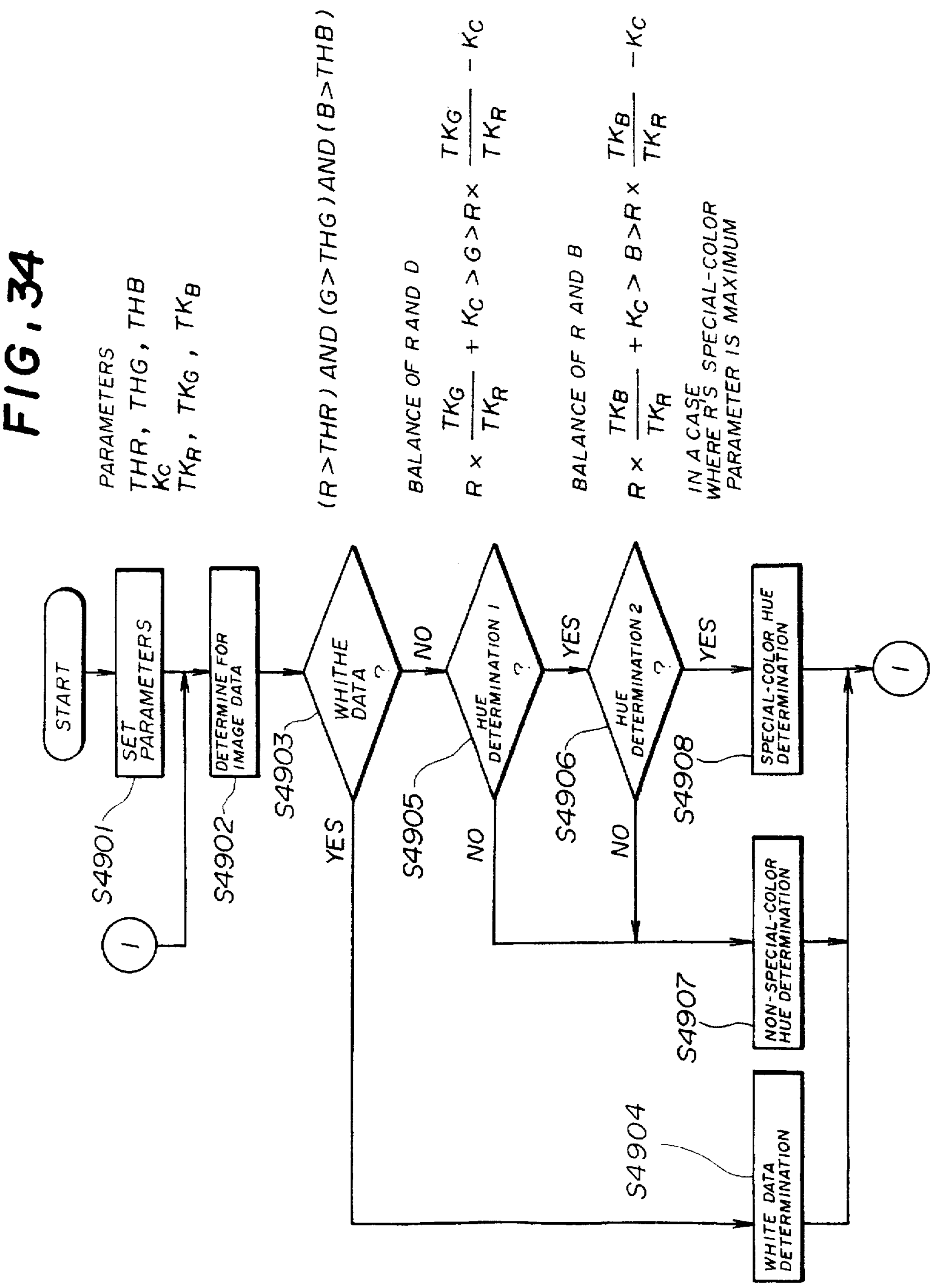
FIG. 34 shows a flow chart of an operation which the detection circuit in the apparatus of FIG. 26 carries out.

The operation shown in FIG. 34 is performed on all of the pixels in a predetermined region in the image to be processed by the image processing apparatus 4000.

Each of the n counting units 1 through n 4702 shown in FIG. 32 counts the number of pixels extracted by the corresponding one of the n extraction units 1 through n 4701. That is, the units count the numbers of pixels which have been determined to be specific-color pixels or special-color hue pixels in the extraction units 1 through n 4701.

The determining circuit in FIG. 32 performs the following operation:

(1) Calculation of (the extracted number)÷(the number of pixels in the predetermined region); and (2) calculation of (the extracted number i)÷(extracted number j).

In these calculation functions (1) and (2), (the extracted number) represents the number of special-color hue pixels extracted as described above by means of the respective extraction units 1 through n 4701. (The number of pixels in the predetermined region) represents the above-described number of pixels existing in the above-mentioned predetermined region in the relevant original image, that is, the number of pixels in each n×n area. (The extracted number i) and (the extracted number j) represent the respective numbers of pixels in two different special-color hues extracted as described above by means of the respective two different extraction units, that is, the extraction unit 1 and extraction unit 2 for example, among the n extraction units 1 through n 4701.

This determining unit 4703 further has the following functions:

(3) According to the result of the performance of the above-mentioned (1) and (2) calculation functions, it is determined whether or not the relevant original image is identical to the special document; and (4) Based on both the determination result in (3) and the information stored in a determination result storing circuit 4704 in FIG. 32, it is determined whether or not the original is the special document.

The determination result storing circuit 4704 may store information concerning the calculation result of the calculation functions in the above-mentioned determining circuit 4703, the calculation method used therein, a position associated with the above-mentioned predetermined region and so forth.

Next, a further concrete construction example of the information processing apparatus 4000 having such a construction will be described.

In this construction example, the vertical and horizontal size n×n of each 'used area' 1–12 (however, the entire region shown in the drawing is a very small part of the image to be processed by the image processing apparatus 4000) is 64×64. That is, if the pixel density is 400 dpi (dots per inch), the relevant size is 4 mm×4 mm.

In the construction in FIG. 32, the respective extraction units 1 through n 4701 comprise the respective extraction units 1–6 (4701). Among them, the extraction unit 1 extracts the image data concerning the pixels corresponding to a certain specific color (the magenta-like color in the pattern BE in the one-thousand-yen note in the Bank of Japan note shown in FIG. 35 for example). The extraction unit 2 extracts the image data concerning the pixels corresponding to another specific color (the cyan-like color in the pattern BE in the one-thousand-yen note shown in FIG. 35 for example). The extraction unit 3 extracts the image data concerning the pixels corresponding to a special-color hue (the hue in the human figure HF in one-thousand-yen note shown in FIG. 35 for example). The extraction unit 4 extracts the image data concerning the pixels corresponding to another special-color hue (the magenta-like hue in the pattern BE in the one-thousand-yen note in the Bank of Japan note shown in FIG. 35 for example). The extraction unit 5 extracts the image data concerning the pixels corresponding to another special-color hue (the cyan-like hue in the pattern BE in one-thousand-yen note in the Bank of Japan note shown in FIG. 35 for example). The extraction unit 6 extracts the image data concerning the pixels corresponding to another specific color (the background region such as described above for the one-thousand-yen note in the Bank of Japan note shown in FIG. 35 for example).

First, the reading operation of the original image to be processed by means of the scanner in the image processing apparatus 4000 is started. By this reading operation, the image data corresponding to the images associated with the preset plurality of predetermined areas (the respective 'areas to be used' 1–12 in FIG. 30, for example) is input and stored in the repeat memory 4110 in sequence as described above. Further, simultaneously, the stored data is repeatedly read and output.

The above-mentioned extraction units 1, 2, and 6 (4701) extract the image data concerning the images corresponding to the specific colors such as described above from the image data output from the repeat memory 4110. Simultaneously, the above-mentioned extraction units 3, 4, and 5 (4701) respectively extract the image data concerning the images corresponding to the special-color hue such as described above from the image data output from the repeat memory 4110. The image data sets extracted by means of these extraction units 1–6 are input to the counting units 1–6 corresponding to them and these counting units respectively count as described above the relevant numbers of pixels.

Subsequently, using the counted values in these counting units 1–6, the determining unit 4703 performs the following operation as described above:

A-1: The ratio of the number of pixels counted in the above-mentioned counting unit 1 for the first area in FIG. 30 for example, to the total number of pixels in the extraction object area (that is, the first area), that is, the ratio of the special-color hue pixels existing in the relevant area is calculated.

A-2: The ratio of the number of pixels counted in the above-mentioned counting unit 2, for the second area in FIG. 30 for example, to the total number of pixels in the corresponding extraction object area (that is, the second area), that is, the ratio of the special-color hue pixels existing in the relevant area is calculated.

A-3: The ratio between the numbers of pixels counted by the counting unit 1 and the counting unit 2 is calculated.

A-4: The ratio of the number of pixels counted in the above-mentioned counting unit 3 for the third area in FIG. 30 for example to the total number of pixels in the corresponding extraction object area (that is, the third area), that is, the ratio of the special-color hue pixels existing in the relevant third area is calculated.

A-5: The ratio of the number of pixels counted in the above-mentioned counting unit 4 for the fourth area in FIG. 30 for example to the total number of pixels in the corresponding extraction object area (that is, the fourth area), that is, the ratio of the special-color hue pixels existing in the relevant fourth area is calculated.

A-6: The ratio between the numbers of pixels counted by the counting unit 5 and the counting unit 6 is calculated.

A-7: The ratio between the numbers of pixels counted by the counting unit 3 and the counting unit 4 is calculated.

Finally, the determination result storing circuit 4704 stores the respective calculation results obtained in the above-mentioned A-1 through A-7. Then, the determining circuit 4703 delivers the determination as to whether or not the relevant original image is identical to the relevant predetermined special document, as a result outputting a duplication preventing signal if necessary.

A concrete operation result example of such an operation will be described.

In the example, a case will be described where a data processing operation such as described above is performed on the pattern region BE and human figure region HF. 'Pattern region' refers to a region other than a natural picture. Natural picture refers to a region, including the human figure region, in an image formed with light and shade represented. First, for the pattern region BE, the ratios resulting from the respective operation as indicated in the above-mentioned A-1 through -7 will be as follows: The result of A-1 is 1:10, the result of A-2 is 1:10, the result of A-3 is 1:1, the result of A-4 is 1:10, the result of A-5 is 1:10, the result of A-6 is 0:8, and the result of A-7 is 1:1.

In this case, these results of A-1 through A-7 represent the results of respectively counting of: the magenta specific color in the pattern region by means of the counter 1; the cyan specific color in the pattern region by means of the counter 2; the special-color hue in the human figure region by means of the counter 3; the magenta special-color hue in the pattern region by means of the counter 4; the cyan special-color hue in the pattern region by means of the counter 5; and the white-background specific color.

The respective results in the above-mentioned A-1 through A-5 and A-7 enables determining that the relevant original image is identical to the relevant special document. If an 'identical' result to the special document has been made, the determining circuit 4703 outputs the duplication preventing signal.

Next, for the human figure region HF, the ratios resulting from the respective operation as indicated in the above-mentioned A-1 through A-7 will be as follows. The result of A-1 is 0:10, the result of A-2 is 0:10, the result of A-3 is 0:0, the result of A-4 is 0:10, and the result of A-5 is 0:10. A-6 is 10 as a result of adding both, meaning that there exists only special-color hue. A-7 is 0:0. Among them, the above-mentioned result in A-6 enables determining that the relevant original image is identical to the special document. The determining circuit 4703, due to this determination result, outputs the duplication preventing signal.

Figure 35:
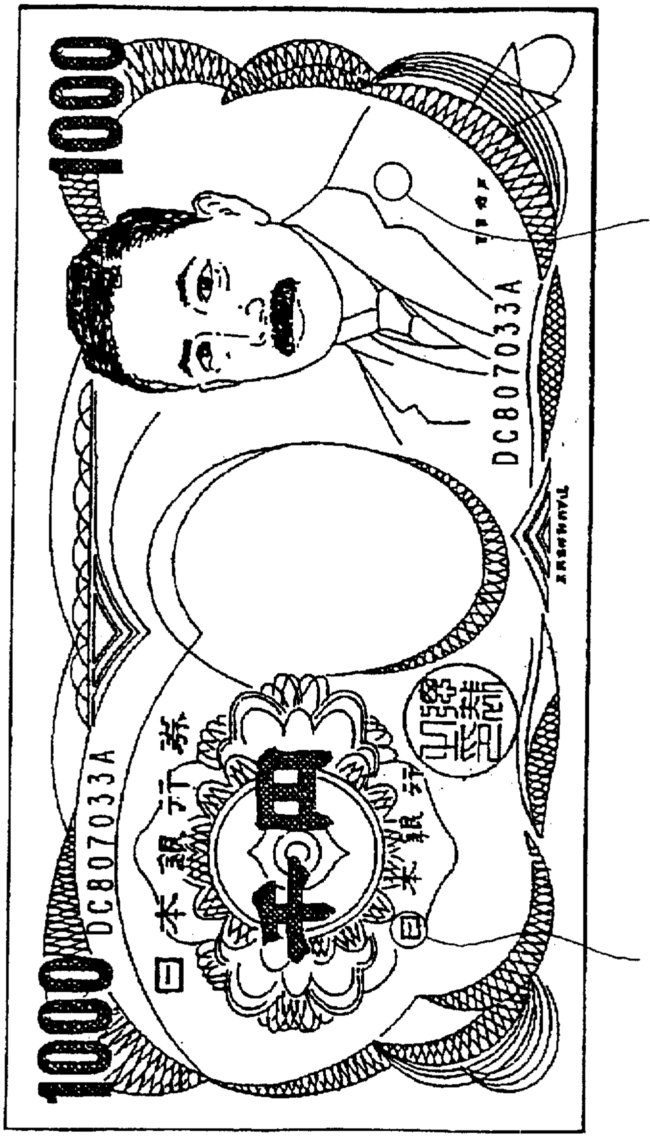
FIG. 35 shows a diagram of paper money in which a examples positions at which specific-color (pattern) is detected and a specific-color hue (human figure) is detected are illustrated.

If the determining processing for the human figure region HF in the paper money in FIG. 35 is performed after the determining processing for the pattern region BE is performed, it may be that the determining circuit 4703 reads, from the determination result storing circuit 4704, the detection result from the other detection region (the pattern region BE in the example of the paper money in FIG. 35). In this case, only if the result of 'identical to the special document' was obtained as a result, is the duplication preventing signal output. By such a procedure, the final decision is made as the result of the determining processing performed on both regions, the pattern region BE and human figure region HF. Thus, the determination result may be improved in its accuracy.

Further, thanks to the functions in the repeat memory 4110 as described above, the image data concerning the same predetermined region may be repeatedly used for the determining processing. Thus, it is possible that the same processing is repeated on the same image data or it is also possible to perform different determining processing as a result of altering parameters used in the relevant determining processing for example. Such a plurality of determining processing sets resulting from parameter alteration may comprise a way in which a parameter is gradually altered in the determining for the same special document, or may comprise a way in which the determining processing is performed for a plurality of different special documents resulting from altering the parameters in the determining processing.

This first embodiment consists of five kinds of first-fifth characteristics described below, in the sixth aspect of the present invention. However, it is possible to implement another embodiment which comprises only some (but at least one) of these five kinds of characteristics.

The characteristics of the first kind are that specific-color or special-color hue pixels are counted in a predetermined region. Then, if the ratio of the resulting number of pixels to the total number of pixels in the predetermined region is a predetermined reference value, it is determined that the relevant original image comprises the special document. If it is determined to comprise the special document, the image forming processing concerning the relevant original image is restricted.

The characteristics of the second kind are that the pixels of at least two different specific colors or special-color hues are counted for the predetermined region. Then, the ratio(s) among the plurality of numbers of pixels is(are) calculated. Then, if the ratio(s) is(are) a predetermined reference ratio, it is determined that the relevant original image is the special document. If it is determined to comprise the special document, the image forming processing concerning the relevant original image is restricted.

The characteristics of the third kind are that the pixels of at least one specific color or special-color hue and the pixels corresponding to the background region are respectively counted for the image in the predetermined region. Then, the ratio(s) among the plurality of numbers of pixels is(are) calculated. Then, if the ratio(s) is(are) a predetermined reference ratio, it is determined that the relevant original image is the special document. If it is determined to comprise the special document, the image forming processing concerning the relevant original image is restricted.

The characteristics of the fourth kind are that such determining processing is performed on at least two predetermined regions in the relevant predetermined region.

The characteristics of the fifth kind are that the R, G and B values concerning the corresponding reference image are previously stored. Then, these values are compared with the R, G and B values in the original image. The special-color hue ratio is examined among the pixels. Thus, such determining processing is performed.

Figure 36:
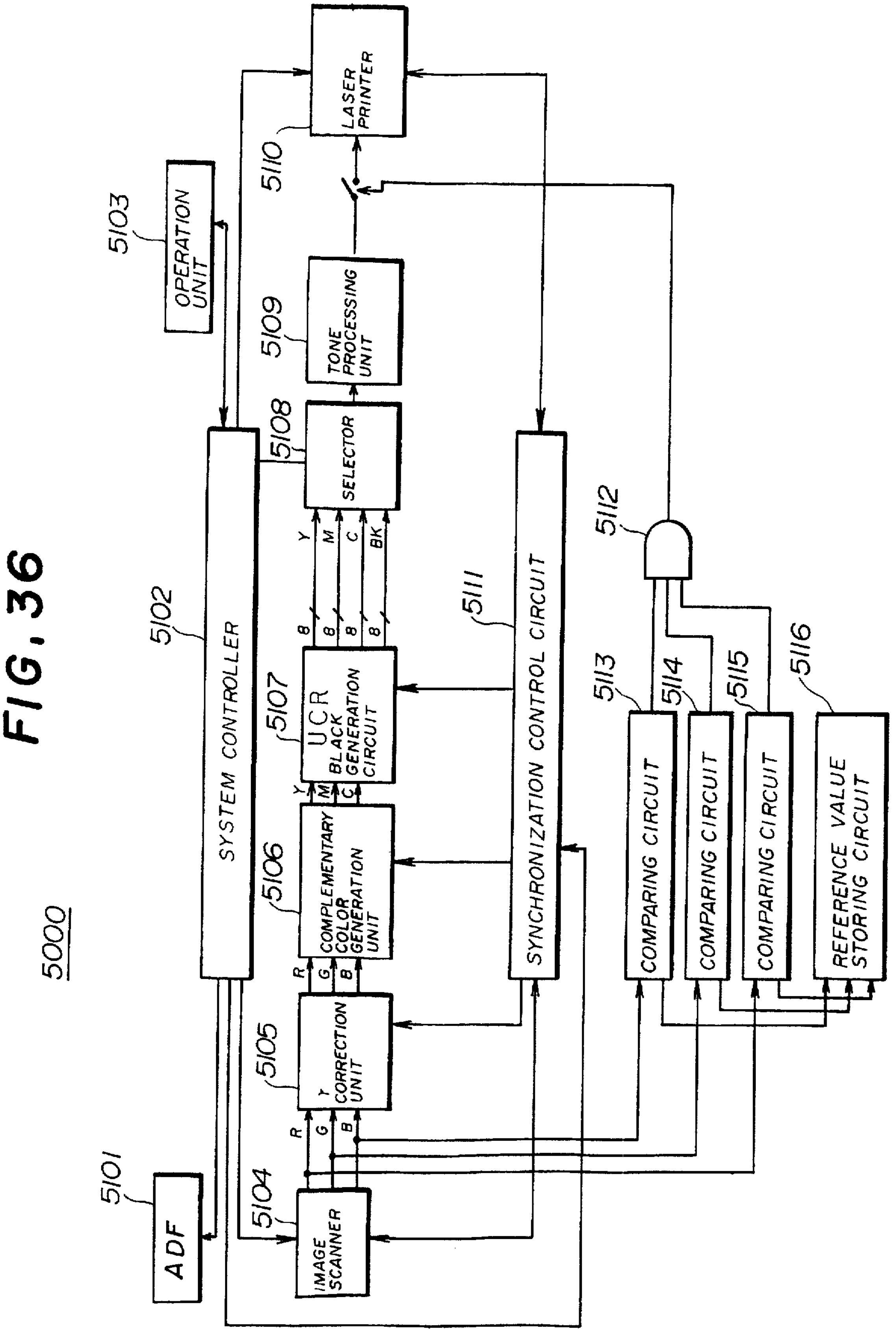
FIG. 36 shows a block diagram illustrating a general construction of an image processing apparatus in a second embodiment of the sixth aspect of the present invention.

Next, with reference to FIGS. 36–38, an image processing apparatus 5000 in a second embodiment in the sixth aspect of the present invention will be described.

In this embodiment, respective reference allowable limits for the RGB image data values corresponding to a predetermined special document are previously stored. Then, at the time of duplication of a color original image, it is determined whether or not each color image data set in the relevant original image is within the allowable limits. Thus, it is determined whether or not the relevant original image is identical to the relevant special document.

First, the general construction of the image processing apparatus 5000 in this embodiment will be described with reference to FIG. 36. This image processing apparatus 5000 comprises: system controller 5102 for controlling the entire apparatus; image scanner 5104 for inputting an original image to be processed; γ correction unit 5105 for performing γ correction such as described above on the thus input image data; complementary color generation unit 5106 for performing complementary color generation processing on the R, G and B image data on which the γ correction has been performed; UCR black generation circuit 5107 for performing a well-known UCR (under color removing) black generation processing on the Y, M and C image data which has been obtained as a result of the complementary color generation processing; selector 5108 for selectively outputting the Y, M, C and K respective image data sets which have been thus generated (in this embodiment, since only one photosensitive element for the development is provided and a color printer for sequentially developing Y, M, C and Bk is used, a method is employed in which the selector is thus provided for sequentially selecting the Y, M, C and Bk respective image data sets and outputting them accordingly); tone processing unit 5109 for performing tone processing such as described above on the image data which has been selectively output by the selector 5108; laser printer 5110 for printing the corresponding image on a recording paper sheet using the image data on which the tone processing has been thus performed; synchronization control circuit 5111 for establishing the synchronization in signal processing among the respective elements 5104-5107 and 5110; automatic original carrying unit (ADF, auto-draft feeder) 5101; control unit 5103 for an operator to specify various operations to the apparatus 5000 and for displaying information of various kinds relevant to the operation of the apparatus 5000; reference value storing circuit 5116 for previously storing reference R, G and B information concerning an image of special document such as paper money; comparing circuits 5113–5115 for comparing the R, G and B data concerning the original image to be processed with the above-mentioned previously stored reference R, G and B information; and AND gate 5112 for performing a logical AND operation on the output values of the respective comparing circuits 5113–5115.

Figure 37:
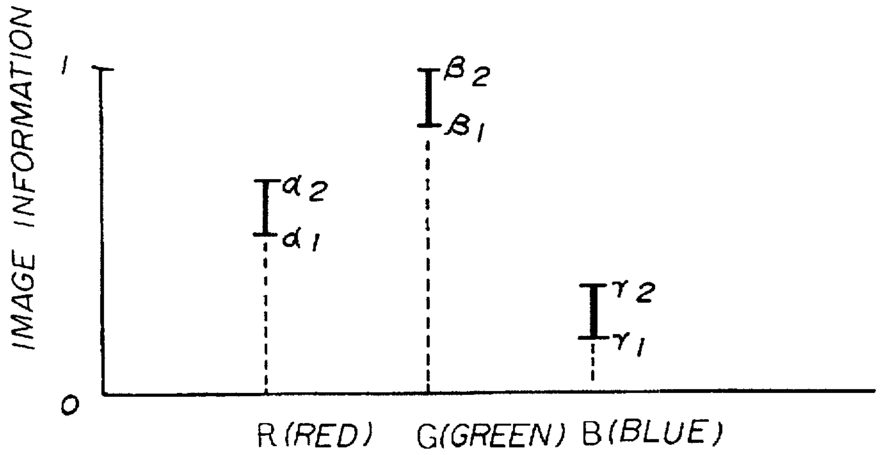
FIG. 37 shows a graph of the allowable extent (($\alpha_1-\alpha_2$), ($\beta_1-\beta_2$), and ($\gamma_1-\gamma_2$)) between upper limit and lower limit threshold values respectively for R, G and B used in the apparatus of FIG. 36.

In the above-mentioned reference value storing circuit 5116, the reference R, G and B information for the above-mentioned special document is stored, in the forms (R information ($\alpha_1$ to $\alpha_2$), G information ($\beta_1$ to $\beta_2$), and B information ($\gamma_1$ to $\gamma_2$)) as shown in FIG. 37 allowing for variations and errors which may occur in reading of the original image to be processed.

Figure 38:
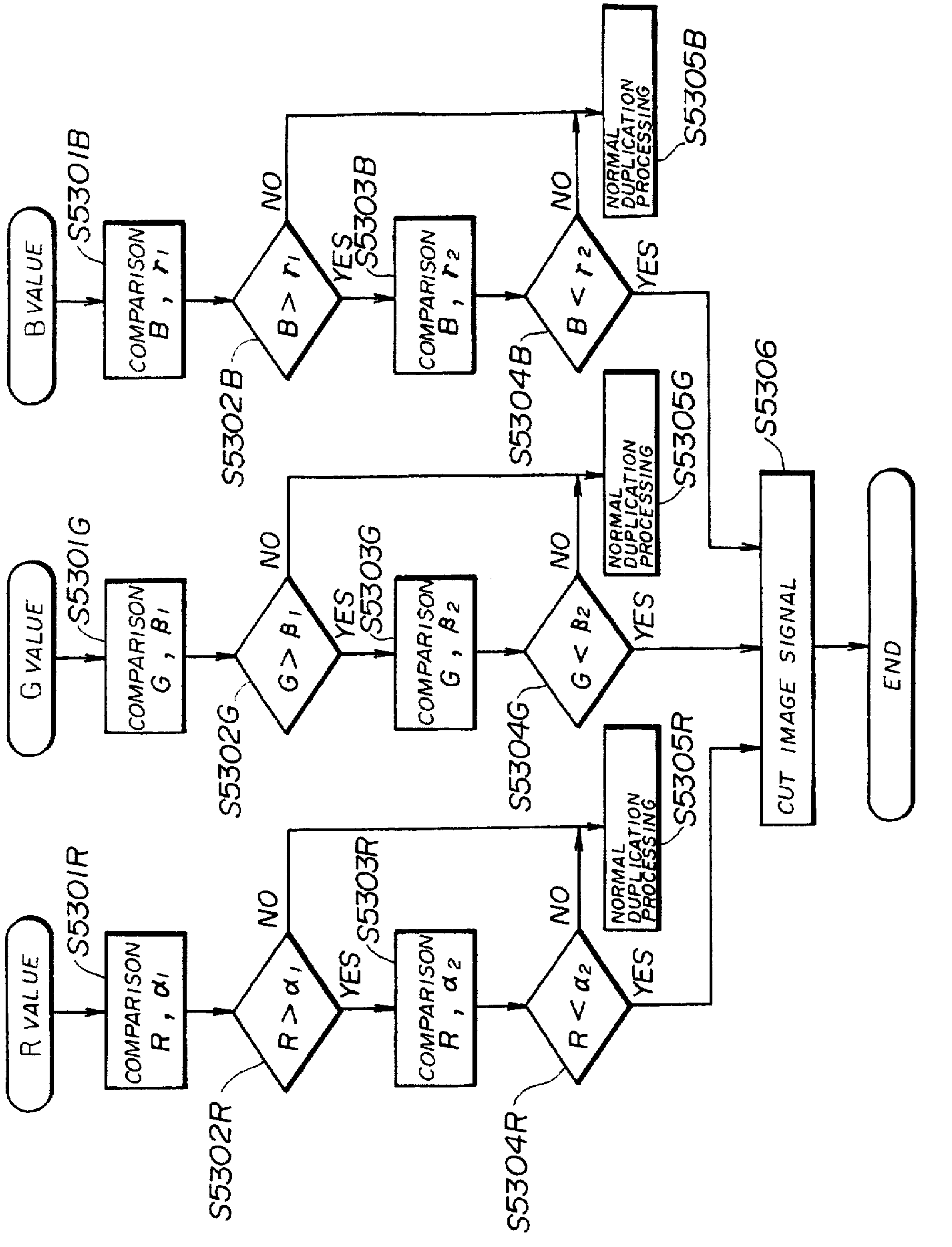
FIG. 38 shows a flow chart illustrating operations carried out by the apparatus of FIG. 36.

Through the above-mentioned comparing circuits 5113–5115, such R, G and B reference information sets are respectively compared with R, G and B data sets concerning the original image to be processed in accordance with a flow chart shown in FIG. 38.

That is, in one example, for R data, the R value is compared with the reference information upper limit value al in S5301R. If (R value)>$\alpha_1$, the execution flow goes from S5302R to S5303R. Subsequently, the R value is compared with the R reference information lower limit value $\alpha_2$. If (R data)<$\alpha_1$ in S5301R, the execution flow goes from S5302R to S5305R. Then, the normal duplication processing is performed.

If (R data)<$\alpha_2$ in S5304R comparison, the execution flow goes from S5304R to S5306R. Then, it is determined that the R data is between the reference allowable limits, $\alpha_1$ and $\alpha_2$. Then, the flow of the image data signal is cut. Further, if (R data)≦$\alpha_1$ as the result of the S5303R comparison, the execution goes from the S5304R to S5305R. Then, the normal duplication processing is performed. If the flow of the image data signal is cut as mentioned above, the R image data does not arrive at the laser printer 5110. Thus, the regular image forming is not performed and therefore the relevant special-document forgery can be prevented.

Processing similar to such processing by S5301R–S5305R relevant to the R image data set is performed on each of the G and B image data sets by the respective steps S5301G–S5305G and S5301B–S5305B, in parallel to the processing relevant to the R data set.

[EMBODIMENTS OF THE SEVENTH ASPECT]

Respective general constructions of image processing apparatuses in first and second embodiments in the seventh aspect of the present invention will be described.

The image processing apparatus in the first embodiment of the seventh aspect of the present invention comprises: data extracting means for extracting predetermined data from image data concerning an original image to be processed; storing means for storing the predetermined data extracted by means of the data extracting means; shape detecting means for detecting the shape in the image indicated by the above-mentioned predetermined data; determining means for determining whether or not the shape detected by the shape detecting means comprises a line and whether the width of the line is uniform along the longitudinal direction thereof; and line number detecting means for detecting as to whether or not the number of lines existing in the relevant original image is a predetermined number, which lines have been determined to have uniform widths by means of the determining means.

The image processing apparatus in the second embodiment of the seventh aspect of the present invention comprises: data extracting means for extracting predetermined data from image data concerning an original image to be processed; storing means for storing the predetermined data extracted by means of the data extracting means; shape detecting means for detecting the shape in the image indicated by the above-mentioned predetermined data; line determining means for determining whether or not the shape detected by the shape detecting means comprises a line; and line interval detecting means for detecting as to whether or not the distance(s) between a plurality of lines is(are) uniform along the longitudinal direction of the lines in a case where there exist the plurality of lines which have been determined to be lines by means of the line determining means.

Figure 39:
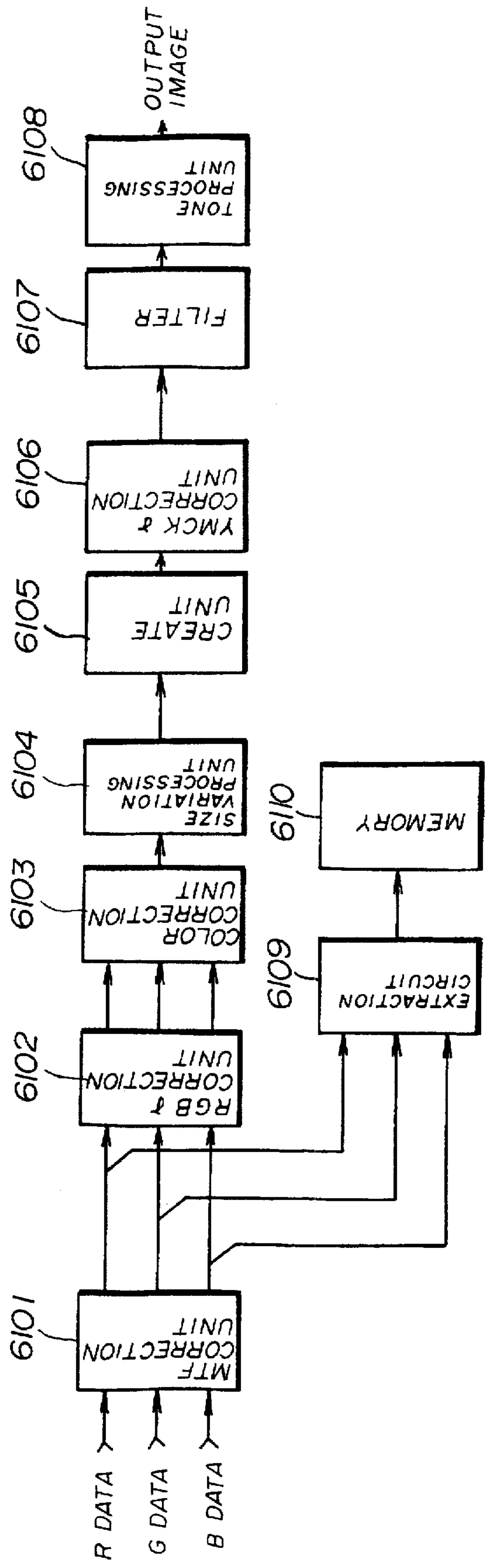
FIG. 39 shows a block diagram illustrating a general construction of an image processing apparatus in first and second embodiments of the seventh aspect of the present invention.

Next, the construction in the image processing apparatus 6000 in the first and second embodiments in the seventh aspect of the present invention will be described in detail with reference to FIG. 39. The construction shown in FIG. 39 is a construction common to the respective first and second embodiments in the seventh aspect of the present invention.

The well-known halftone-dot separating method (a detecting method by detecting pitches between halftone dots, that is, dots constituting an image) may be used for detecting as to whether or not an image to be used and processed comprises one which has been formed in the planographic printing method (a printing method using a halftone screen as an original plate for example). Similarly, in the image processing apparatus 6000 in the embodiments, line pattern extraction is performed for detecting as to whether or not an image comprises one formed in the intaglio printing method (different from the fact that an image formed in the planographic printing method comprises dots, an image formed in the intaglio printing method comprises continuous lines).

Normally in almost every case, the special document such as paper money, securities and so forth is produced by printing with the intaglio printing method. In the seventh aspect of the present invention, information particular to the line drawing formed in the intaglio printing method is used. Thereby, it is detected as to whether or not an original to be processed comprises the special document. Then, this detecting result is used for controlling the duplication operation in the image processing apparatus 6000.

Among lines used in the intaglio printing, there exist lines of three types, type-one lines, type-two lines and type-three lines (such lines may be referred to as picture lines) as described below.

(1) The type-one line: This is the boldest among the three types and is used for outlines, shades and so forth, in an object to be expressed by the relevant printing.

(2) The type-two line: This is a line having medium boldness among the three types and is used for adding lines having different angles from the outlines drawn with the above-mentioned first lines so as to give a perspective effect and/or texture in the relevant object.

(3) The type-three line: This is actually a 'point'. That is, this is used for adding small points so as to add realism.

By finding such picture lines in an image to be processed and by detecting the lengths of the picture lines, it can be determined whether or not the image is one formed by intaglio printing.

In the first embodiment of the seventh aspect of the present invention, the data concerning such picture lines is extracted from the image data concerning the image to be processed. Then, detection of widths, length and so forth in the picture lines is performed. Thus, it is determined whether or not the image to be processed comprises the special document such as paper money or so.

It can be seen that there are few general images, other than the special document such as paper money, securities and so forth, in which fine lines are used such as those used in such special documents. Therefore, a generally reliable discrimination of the special document such as paper money or so may be made by detecting such fine lines. There may be a case where such fine lines are used in drawings (fine mechanical drawings for example) or graphs (cross-ruled paper or the like). However, the first embodiment in the seventh aspect in the present invention, in order to ensure distinguishing of special document such as paper money from such drawings, graphs or the like, uses characteristics particular to the special document such as paper money. That is, the result of determining as to whether or not such fine lines exist in a predetermined region is used. Thus, the accuracy of the discrimination is further improved.

With reference to FIG. 39, the image processing apparatus 6000 comprises: MTF correction unit 6101, RGB γ correction unit 6102, color correction unit 6103, size variation unit 6104, create unit 6105, YMCK γ correction unit 6106, filter 6107 and tone correction unit 6108, respectively having constructions similar to the elements having the same names already described in the description with reference to FIG. 26 for the embodiment in the sixth aspect of the present invention.

The image processing apparatus 6000 further comprises an extraction circuit 6109. This circuit 6109 extracts the image data, corresponding to a predetermined region in the original image to be processed, from the respective R, G and B image data signals input from the above-mentioned MTF correction unit 6101. Further, the extraction unit 6109 converts the input multi-value image data indicating multi-tone into the corresponding black-and-white two-value image data. Then, the same circuit removes the image data, in the relevant original image, corresponding to unclear extremely fine lines and/or isolated points which are surrounded by a background region such as described above. Further, the extraction circuit 6109 performs the well-known outline tracing processing for tracing outlines comprising clear fine lines in accordance with the image data, which includes only necessary approximately clear fine lines as a result of the above removal of the unnecessary extremely fine lines and isolated points.

Further, the image processing apparatus 6000 comprises a memory 6110 for storing image data extracted by means of the extraction circuit 6109.

Next, the detailed construction and operation of the above-mentioned extraction circuit 6109 will be described. As described above, the extraction circuit 6109 extracts an image data signal corresponding to a region other than the white background in the corresponding original image, from the respective R, G, and B image data values, each having multiple values. A method in which the brightness signal is converted into a two-value signal may be used and also another method may be used such as that in which image-data of a specific color such as G color for example is extracted.

The above-mentioned 'converting the brightness signal into the two-value signal' means that the brightness signal obtained by performing an operation using the specific ratios of the R, G and B image data is converted into the binary signal. The operation may be to apply an operational unit such as (0.7·R+0.2·G+0.1·B) for example. Then, this operation result is converted into the binary signal.

The memory 6110 comprises a so-called bitmap memory and the binary image data output by the extraction circuit 6109 is written in the memory 6110 by the extraction circuit 6109. The extraction circuit 6110, which thus wrote the binary image data in the memory 6110, removes unnecessary extremely fine lines and isolated points such as described above from that written image data by performing the operation shown in FIG. 40.

Figure 40:
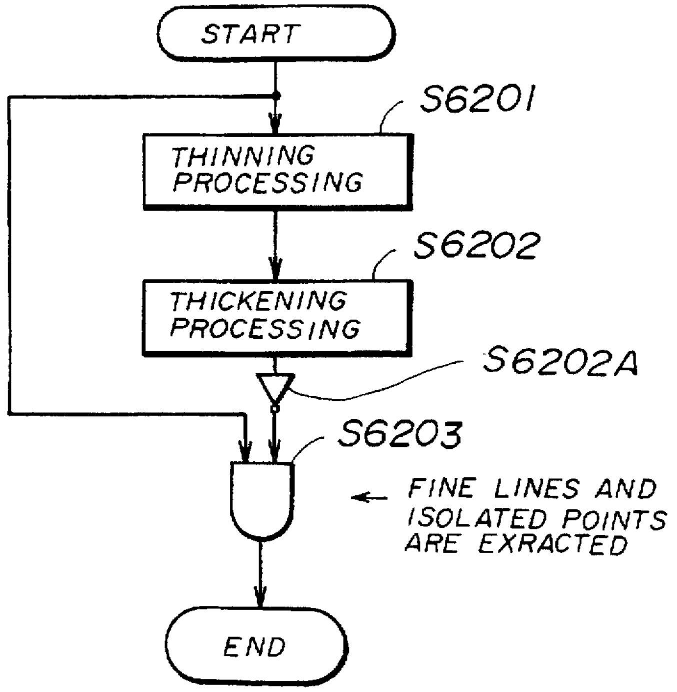
FIG. 40 shows an operation flow chart for thin-line and isolated-point extracting carried out by an extracting circuit in the image processing apparatus of FIG. 39.
Figure 41:
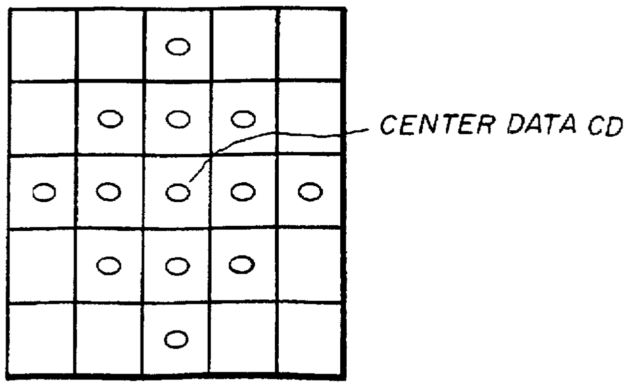
FIG. 41 shows a diagram illustrating a pattern used in thinning processing in the flow chart of FIG. 40.

First, in S6201 in FIG. 40, 'thinning' processing is performed. This 'thinning' processing means processing described below. In order to process image data corresponding to a certain pixel, this pixel is assumed to be the pixel corresponding to image data, having a value 1 , shown as center data CD in FIG. 41 (that is, representing 'black' of black and white). The pixels having circle marks correspond to image data values having values 1. In the case, where each of the 12 pixels such as shown in FIG. 41 containing circle marks comprises a pixel having value 1, (among the (vertical 5)×(horizontal 5), totaling 24 peripheral pixels excepting the relevant pixel CD), no processing is performed on the image data unit corresponding to the center pixel CD.

On the other hand, even if even one pixel having the value 0 (that is, representing 'white') is included in the 12 peripheral pixels containing circle marks, the data concerning the center pixel CD to be processed is altered to be the value 0.

Next, the 'thickening' processing in S6202 in FIG. 40 comprises processing as described below. A pixel to be currently processed is taken to comprise a center pixel CD in FIG. 42. If at least one pixel in the 24 pixels surrounding the relevant center pixel CD comprises a pixel having the value 1, the data concerning the center pixel CD is altered to be the value 1 even if the data has had the value 0.

Then, in S6202A in FIG. 40, the image data for the pixel processed in S6201 and S6202 is inverted.

Then, in S6203 in FIG. 40, the logical AND of the image data value in the thus reversed pixel and the value on which the processing in the above-mentioned S6201–S6202A is obtained. By such a procedure, unnecessary extremely fine lines and isolated points such as described above can be removed from the data written in the memory 6110.

Figure 42:
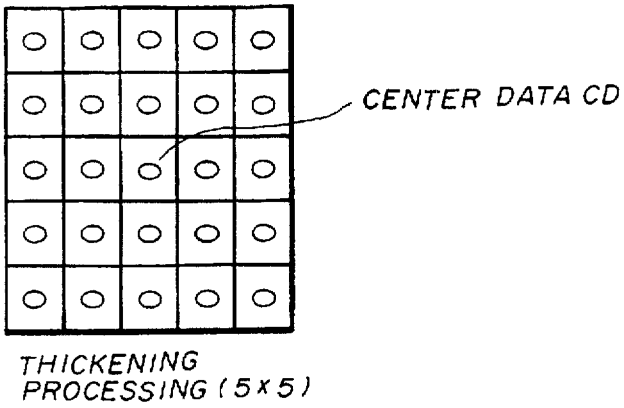
FIG. 42 shows a diagram illustrating a pattern used in thickening processing in the flow chart of FIG. 40.

The reason that the pattern shown in FIG. 41 used in the 'thinning' processing is made to be different from the pattern shown in FIG. 42 used in the 'thickening' processing is that, thereby, further appearing of unnecessary isolated points as a result of performing such 'thinning', 'thickening' processing can be prevented. However, the patterns for the 'thinning' and 'thickening' processing are not necessary to be limited to those such as shown in FIG. 41 and FIG. 42. They may be altered arbitrarily as is appropriate and both the patterns may be identical.

Next, the extraction circuit 6109 performs the above-mentioned outline tracing processing. Even if any isolated points are left as the result of the above-mentioned 'thinning' and 'thickening' processing, the remaining isolated points can be removed by the outline tracing processing. That is, in the outline tracing processing, the outline associated with the small isolated point is naturally small. Thus, the loop formed as a result of tracing the relevant outline is small. Image data corresponding to such a small loop can be removed.

As a result of such outline tracing processing, only image data concerning necessary clear fine lines remain. These clear fine lines comprise fine lines such as ones which correspond to the fine-line patterns in the image associated with the special document such as paper money or so. Since such fine lines have been formed in the intaglio printing, the relevant lines comprise clearer fine lines in than to those in other general images formed in the planographic printing.

Whether or not fine lines are contained in the image data remaining after the removal of unnecessary image data such as mentioned above may be determined by using the result of, determination whether or not the tracing result is obtained corresponding to the fine lines as a result of, performing the above outline tracing, such as mentioned above. Alternatively, the image data stored in memory 6110 a comprising bit map as described above may be used as follows. The above determination may be made based on the result of counting the number of successive bits in the image data.

Finally, it is determined whether or not more than a predetermined number of clear fine lines are contained in a predetermined region in the relevant original image. If the result of the determination is that more than the predetermined number of such file lines are present, it is determined that the relevant image has been formed in the intaglio printing. As a result, the operation in the image processing apparatus 6000 is controlled so that the regular image processing cannot be performed. By such control, image data may be intentionally replaced or data may be modified so that certain patterns are smudged and so forth. Thus, the normal duplication operation is prevented from being performed. Thus, the forgery of the special document such as paper money or so can be prevented.

In this first embodiment of the seventh aspect of the present invention, the above-mentioned unclear line which is to be removed is taken to comprise a line having a width equal to or less than two pixels. However, the width of the fine line to be removed may be freely set by altering various processing parameters used in the flow chart shown in FIG. 40.

In one example, if it is desired that a fine line to be removed comprises one having a width equal to or less than n pixels, it can be achieved by further performing isolated-point removal processing for an n-pixel width. Further, it is also possible to detect a fine line having an n-pixel width by using a pattern matching method.

Figure 43:
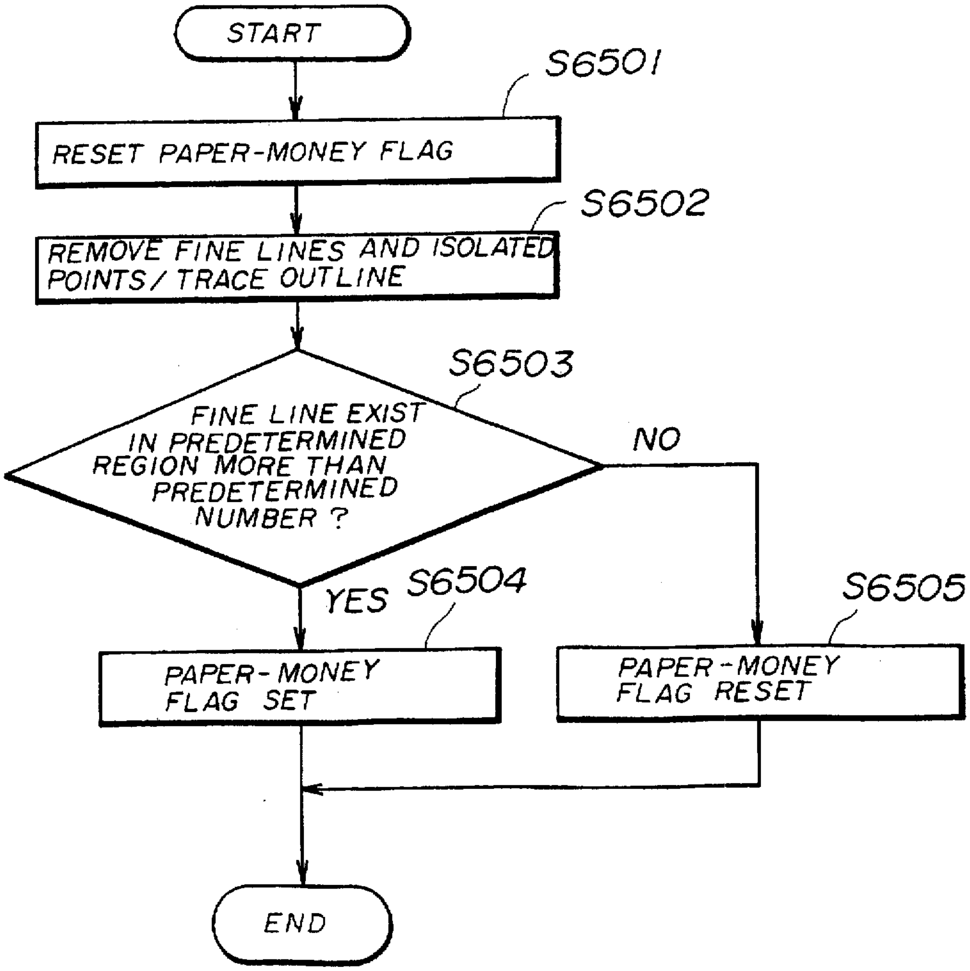
FIG. 43 shows a flow chart illustrating an outline of operations which the image processing apparatus in the above first embodiment of the first aspect of the present invention carries out.

A summary of the operation in the first embodiment of the seventh aspect of the present invention will be described with reference to FIG. 43. First, in S6501, a paper-money flag is reset. Then, in S6502, removal of extremely fine lines and isolated points and outline tracing are performed as described above. Then, in S6503, it is determined whether or not clear fine lines exist in the predetermined region in a number greater than a predetermined number. If it is determined as a result that more than the predetermined number of clear lines are present, it is determined in S6504 that the relevant original image comprises the special document such as paper money or so, the paper-money flag being thus set. By the paper-money flag being thus set, the image processing apparatus 6000 is controlled as described above so that the normal duplication operation is prevented from being performed on the relevant original image in the image processing apparatus 6000. Thus, the forgery of the special document such as paper money can be prevented.

On the other hand, if the determination in S6503 comprises one that clear fine lines do not exist in the predetermined region in a number greater than the predetermined number, it is determined in S6505 that the relevant original image does not comprise the special image such as paper money, the paper-money flag being thus reset. Thus, by the paper-money flag being reset, the normal duplication operation is performed on the relevant original image in the image processing apparatus 6000.

Figure 44:
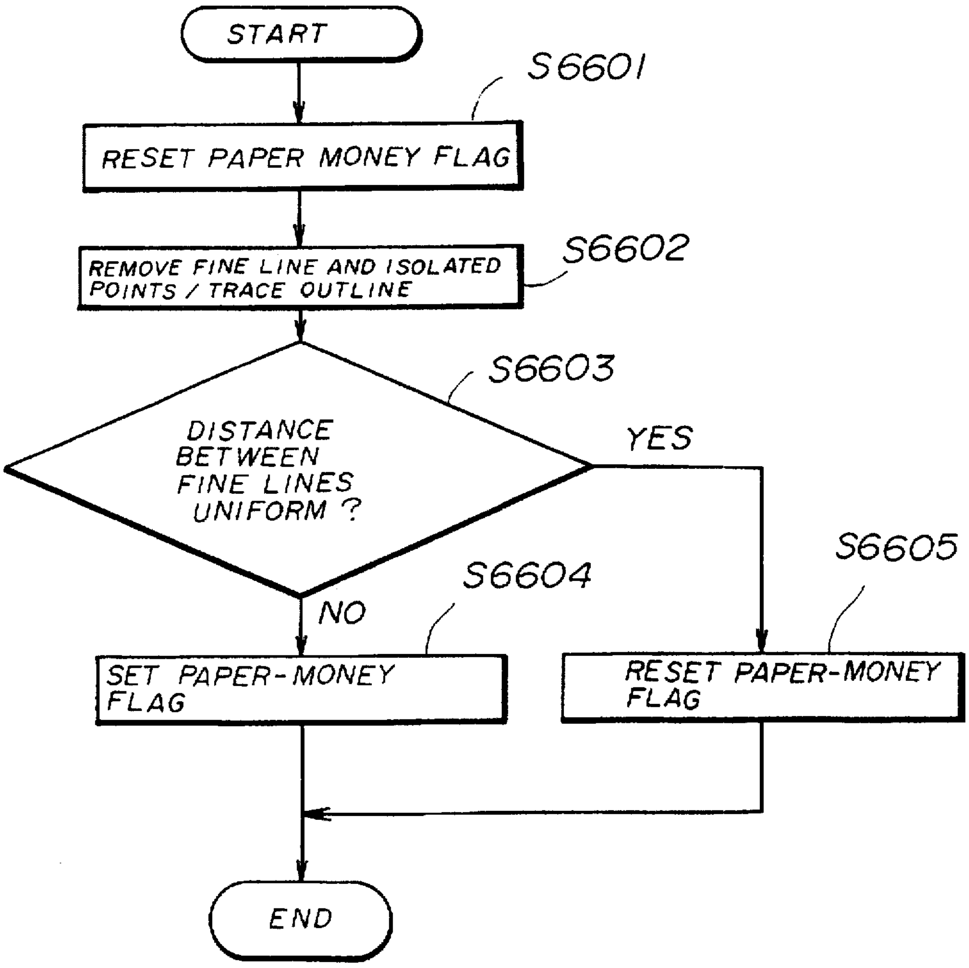
FIG. 44 shows a flow chart illustrating an outline of operations which the image processing apparatus in the above second embodiment of the first aspect of the present invention carries out.

A summary of the operation in the second embodiment of the seventh aspect of the present invention will be described with reference to FIG. 44. First, in S6601, a paper-money flag is reset. Then, in S6602, removal of extremely fine lines and isolated points and outline tracing are performed as described above. Then, in S6603, it is determined whether or not the distance between the above-mentioned clear fine lines is uniform along the longitudinal direction of the fine lines. If it is determined as a result that the distance is not uniform, it is determined in S6604 that the relevant original image comprises the special document such as paper money or the like, the paper-money flag being thus set. By the paper-money flag being thus set, the image processing apparatus 6000 is controlled as described above so that the normal duplication operation is prevented from being performed on the relevant original image in the image processing apparatus 6000. Thus, the forgery of the special document such as paper money can be prevented.

On the other hand, if the determination in S6603 comprises one that the distance is uniform, it is determined in S6605 that the relevant original image does not comprise the special image such as paper money, the paper-money flag being thus reset. Thus, by the paper-money flag being reset, the normal duplication operation is performed on the relevant original image in the image processing apparatus 6000.

[EMBODIMENTS IN THE EIGHTH ASPECT]

General constructions of relevant embodiments in the eighth aspect of the present invention will be described.

First, a duplicator in the first embodiment in the eighth aspect of the present invention comprises: a specific hue region extracting means for extracting, from input original image data, data concerning the shape of a specific hue region having a specific hue in the original image; pattern storing means for previously storing information concerning the shape of a specific hue region in a special document corresponding to the discrimination object; hue histogram storing means for previously storing a hue histogram concerning image information in the relevant specific hue region in the special document; pattern matching means for comparing, with use of a pattern matching method, the above-mentioned shape data of the specific hue region in the original image with the shape information for the special document stored in the pattern storing means; and discrimination means for discriminating as to whether or not the relevant original image is identical to the relevant special document as a result of comparing the hue histogram in the original image with the corresponding hue histogram in the special document if the result of comparison in the pattern matching method comprises 'agreement'.

The duplicator in the second embodiment in the eighth aspect of the present invention comprises: the specific hue region extracting means, pattern storing means and pattern matching means used in the above first embodiment; two-hue pixel number storing means for previously storing the ratio of the number of pixels of a predetermined hue to the number of another predetermined hue in the corresponding specific hue region in the relevant special document; and discrimination means for discriminating as to whether or not the relevant original image is identical to the relevant special document as a result of comparing the above-mentioned special document pixel number ratio stored in the two-hue pixel number storing means with the corresponding pixel number ratio obtained for the original image, if the result of comparison in the pattern matching method comprises 'agreement'.

The duplicator in the third embodiment in the eighth aspect of the present invention comprises: seal-mark region extracting means for extracting image data, corresponding to the seal-mark region in the relevant original image, from the input original image data; pattern storing means for previously storing the peripheral shape of the seal-mark region in the relevant special document; connecting number storing means for previously storing the number of lines at a point (referred to as a connecting point, hereinafter) at which a plurality of lines connect with one another, namely, the connecting number in the peripheral region of the seal-mark region in the special document; pattern matching means for comparing, using the pattern matching method, the peripheral shape of the seal-mark region in the original image with the stored peripheral shape of the seal-mark region in the special document; and discrimination means for discriminating as to whether or not the relevant original image is identical to the relevant special document as a result of comparing the connecting number in the peripheral region of the seal-mark region in the original image with the stored connecting number in the peripheral region of the seal-mark region in the special document if the result of pattern matching comparison comprises 'agreement'.

The duplicator in the fourth embodiment in the eighth aspect of the present invention comprises: the seal-mark region extracting means, pattern storing means and pattern matching means, used in the above-mentioned duplicator in the third embodiment; storing means for previously respectively storing the connecting number in the seal-mark region periphery as described above and the distance(s) among the plurality of connecting points in the image of the special document; agreement detecting means for detecting whether or not the stored connecting number agrees with the corresponding connecting number concerning the relevant original image if the result of the pattern matching comprises agreement; two-connecting-point distance calculating means for calculating the distance(s) among the plurality of connecting points in the seal-mark region periphery such as described above in the original image if the above-mentioned agreement detecting means determines that they agree with one another; and discrimination means for discriminating as to whether or not the original image comprises the special document as a result of comparing the calculated distance with the above-mentioned stored two-connecting-point distance.

The duplicator in the fifth embodiment in the eighth aspect of the present invention comprises: the seal-mark region extracting means, pattern storing means and pattern matching means used in the above-mentioned duplicator in the fourth embodiment; storing means for previously respectively storing the connecting number in the seal-mark region periphery in the special document image as described above and the below described determination number of pixels; agreement detecting means for detecting whether or not the stored connecting number agrees with the corresponding connecting number concerning the relevant original image if the result of the pattern matching comprises agreement; normal-line calculating means for calculating the normal line passing through the center point between the two connecting points in the seal-mark peripheral region such as described above in the original image; and discriminating means for counting the number of specific-hue pixels lying on the calculated normal line, said means comparing the counted number with the corresponding number (above-mentioned determination number of pixels) in the special image so as to discriminate as to whether or not the original image comprises the special document.

The duplicator in the sixth embodiment of the eighth aspect of the present invention comprises discriminating means for discriminating as to whether or not the relevant original image comprises the special document based on the determination as to whether or not the arrangement of letters or picture patterns in the original image comprises a predetermined arrangement.

The duplicator in the seventh embodiment in the eighth aspect of the present invention comprises: region separating means for separating the original image into a picture region and letter region; comparing and collating means for comparing the above separation result with the previously registered corresponding region separation result concerning the special document; and discriminating means for discriminating as to whether or not the original image comprises the special document based on the above comparing and collating result.

Next, each embodiment will be described in detail.

First, the duplicator 7000 in the first embodiment of the eighth aspect of the present invention will be described in detail with reference to FIG. 45.

The duplicator 7000 comprises scanner unit 7101 for inputting an original image to be processed; image processing unit 7102 for performing, on the thus input image data, shading correction processing, γ correction processing and tone correction processing or the like such as described previously; printer unit 7103 for printing, on a recording paper sheet, the thus image-processed image data; operation display unit 7104 for specifying the number of copies and/or the well-known various image modification processing modes; special-document discrimination unit to which the image data is input by the scanner unit 7101 and which discriminates as to whether or not the relevant original image comprises the special document such as paper money or so; and main control unit 7106 for controlling the above respective components.

Figure 46:
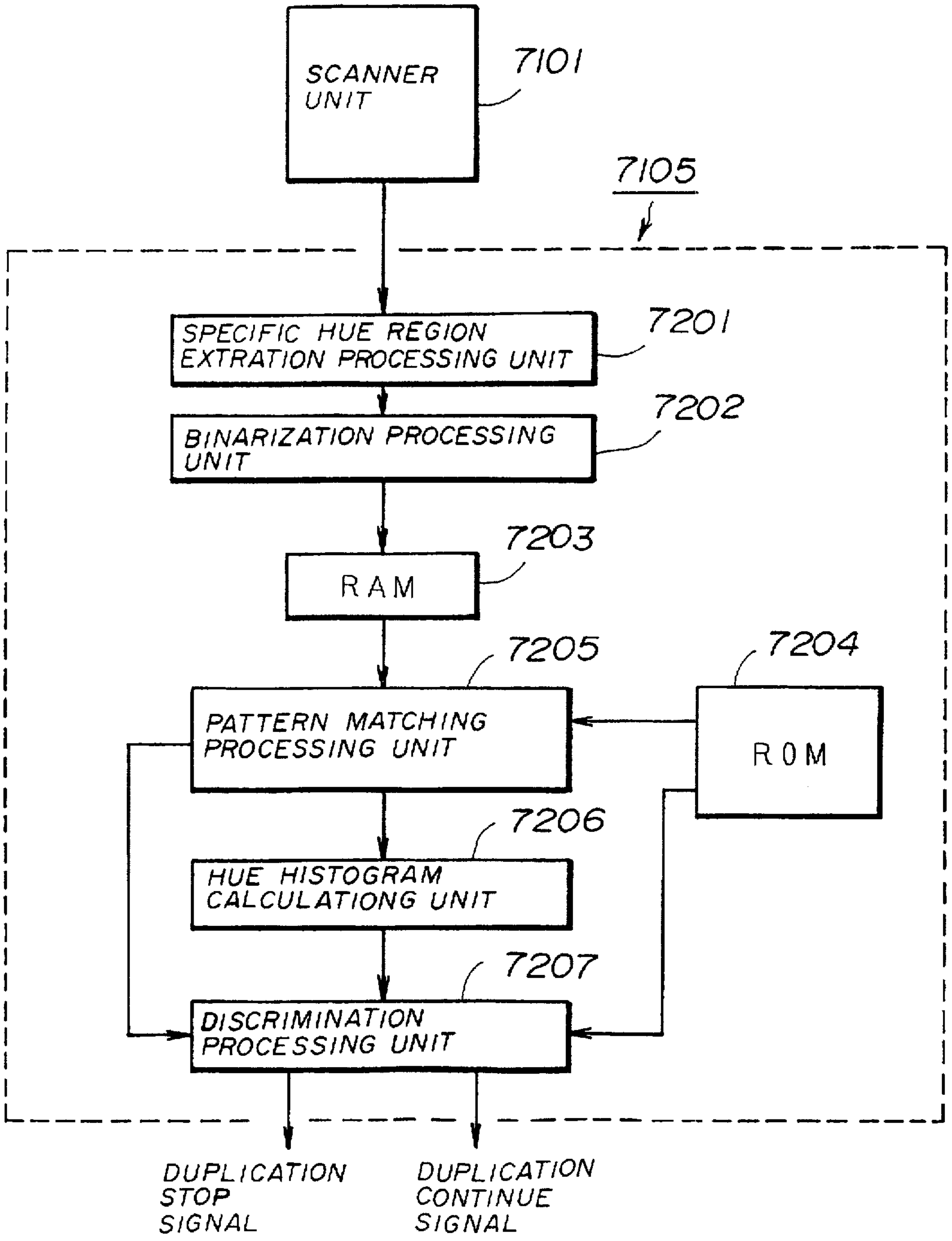
FIG. 46 shows a block diagram of a special-document discrimination unit of the duplicator of FIG. 45.

The construction of the above-mentioned special document discrimination unit 7105 will be described with reference to FIG. 46.

This unit 7105 comprises: specific hue region extraction processing unit 7201 for extracting, from the R, G and B image data input through the scanner unit 7101, the data corresponding to a region having a specific hue in the original image; binarization processing unit 7202 for converting into two-value data, as described above, the thus extracted data concerning the specific hue region; RAM (random access memory) 7203 for storing therein the thus two-value-data converted image data for use in pattern matching; ROM (read only memory) 7204 for previously storing therein the pattern information and hue histogram concerning the specific hue region such as described above in the special document image such as paper money to be used in discrimination by means of the discrimination unit; pattern matching processing unit 7205 for comparing, using a pattern matching method, the shape data, concerning the relevant region, stored in the RAM 7203 with the shape information stored in the ROM 7204; and hue histogram calculating unit 7206 for calculating the corresponding hue histogram from the image data concerning the specific hue region in the original image; and discrimination processing unit 7207. If the comparison result in the pattern matching processing unit 7205 comprises agreement, the discrimination processing unit 7207 compares the hue histogram, concerning the original image, calculated by the hue histogram calculating unit 7206 with the hue histogram, concerning the special document, stored in the ROM 7204. Then, the unit 7206 discriminates as to whether or not the original image is identical to the special document based on the comparison result.

Operation flow in the discrimination processing in the discrimination unit 7105 will be described with reference to FIG. 47.

In order to simplify the description, it is assumed that the special document to be used in the discrimination processing comprises paper money of the Bank of Japan note. Further, it is also assumed that the relevant specific hue region comprises the vermilion seal in the paper money and the specific hue comprises the hue in the background region such as described above located immediately inside the vermilion seal peripheral region. The vermilion seal means the region ST shown in FIGS. 11 and 12 with respect to the one-thousand-yen note for example. The background region located immediately inside of this peripheral region means the region IA.

First, in S7301, the specific region extraction processing unit 7201 extracts the data corresponding to the region having the specific hue in the original image from the R, G and B image data input through the scanner unit 7101. In this extraction of the specific hue region, the number of pixels having the image data meeting conditions (8-1) to (8-3) below is counted for each main scan line. A histogram is formed in which the counting result for each main scan line is arranged in the sub-scan line direction. By using the histogram, the vermilion seal region is found.

$$R\text{ data}=R_0\pm\alpha \qquad (8\text{-}1)$$

$$G\text{ data}=G_0\pm\alpha \qquad (8\text{-}2)$$

$$B\text{ data}=B_0\pm\alpha \qquad (8\text{-}3)$$

There, $R_0$, $G_0$, and $B_0$ respectively mean the center values in the predetermined hue. The $\alpha$ indicates the reference allowable limits about the center values in the above-mentioned extraction.

Thus, the image data has been obtained as the result of locating the sub-scan-direction region. The thus obtained image data is subsequently used in counting the pixels of the specific hue for each subscan line using the above-mentioned equations (8-1)–(8-3). A histogram is obtained by arranging the sub-scan line counting results in the main scan direction. The thus obtained histogram is used in locating the vermilion seal region in the main scan line direction.

Thus, the image data concerning the specific hue region, that is, the vermilion seal region, is extracted. The extracted data is converted into the two-value data as described above by means of the binarization processing unit 7202 in S7302. The two-value-data converted image data is stored in the RAM (random access memory) 7203 for use in pattern matching.

Subsequently the pattern matching processing unit 7205 compares, in S7303 and S7304, using pattern matching, the shape data in the relevant region obtained from the image data stored in the RAM 7203 with the shape pattern information stored in the ROM 7204. The comparison, that is, the determination as to whether or not the extracted region is identical to the seal mark in the paper money, may comprise pattern matching processing using only the circle shape in the peripheral region in the seal mark, for the purpose of simplification of the processing. The reason for such simplification is described below. In this embodiment, the comparison is to be performed in the presently described process for the discrimination as to whether or not the original image is identical to the special document. The above comparison comprises comparing the hue histogram in the image concerning the paper-money seal-mark with the hue histogram in the image concerning the seal-mark (vermilion seal) region in the original image. That is, it is attempted to improve the discrimination accuracy by two-stage discrimination processing.

If the determination result in S7303 is that 'the vermilion seal region in the original image is identical to the vermilion seal region in the paper money', the hue histogram calculating unit 7206 calculates the corresponding hue histogram from the image data concerning the seal-mark region in the original image in S7305. Subsequently, in S7306, the discrimination processing unit 7207 compares the hue histogram, concerning the original image, calculated by means of the hue histogram calculating unit 7206 with the hue histogram, concerning the special document, stored in the ROM 7204. If the comparison result comprises agreement, it is determined that the original image is identical to the special document. Accordingly, in S7307, a duplication stop signal is output.

Further, in S7364, if it is determined that the original image does not comprise the seal mark in the paper money, or if the hue histograms are determined not to agree in S7306, it is determined that the original image does not comprise the paper money. Accordingly, a duplication continuation signal is output in S7308.

Next, the second embodiment in the eighth aspect of the present invention will be described.

The construction of the duplicator in the second embodiment is similar to the above-described construction of the duplicator 7000 in the first embodiment in the basic construction. The description of the similar components is omitted and only the different components will be described.

Figure 48:
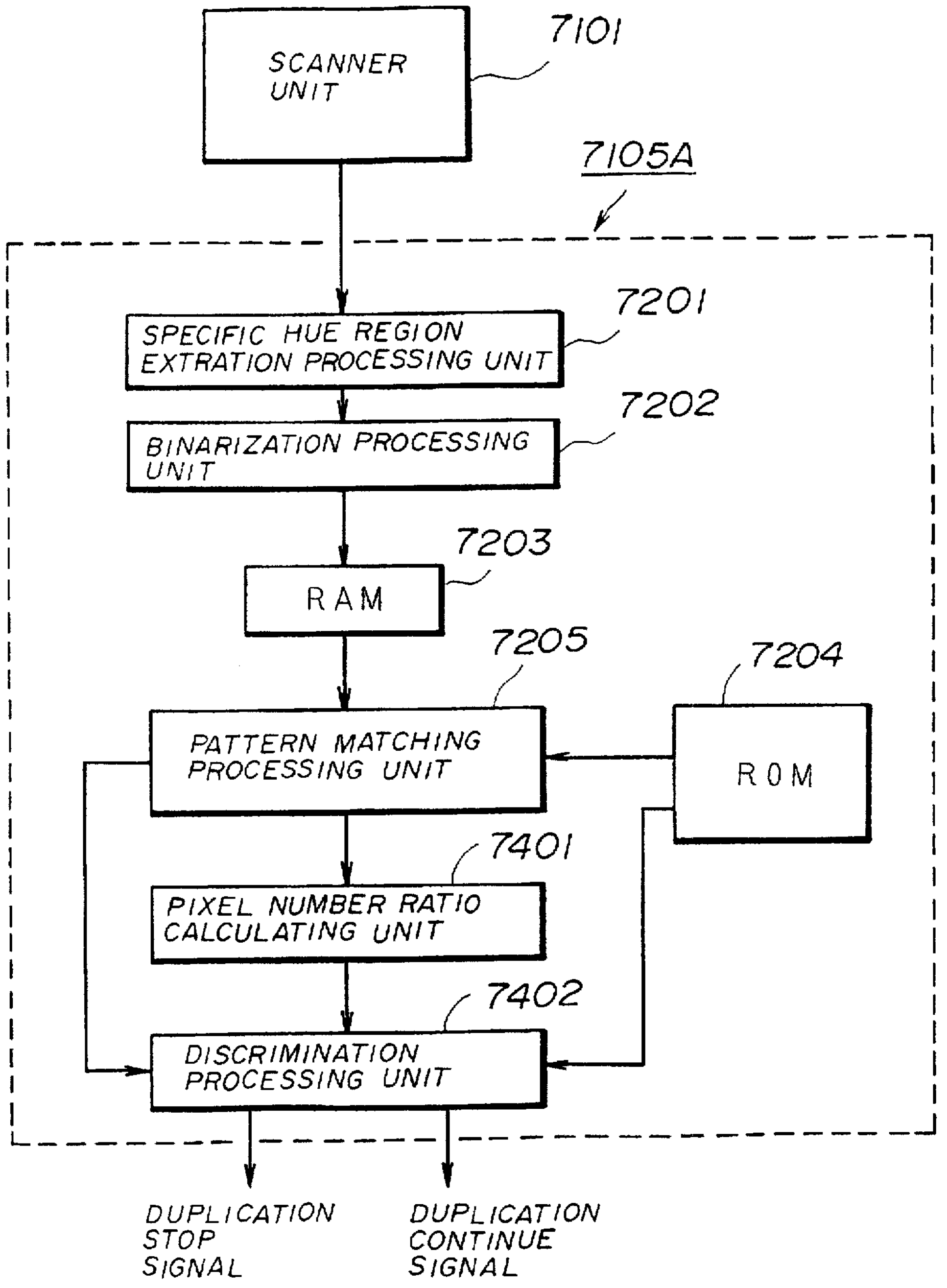
FIG. 48 shows a block diagram of a special-document discrimination unit in a second embodiment of the eighth aspect of the present invention.

The duplicator in the second embodiment comprises, instead of the special document discrimination unit 7205 in the above-mentioned first embodiment, a special document discrimination unit 7105A having a different construction. The construction thereof will be described with reference to FIG. 48.

The special document discrimination processing unit 7105A comprises a pixel number ratio calculating unit 7401 instead of the hue histogram calculating unit 7206 in the special document discrimination processing unit 7105 in the above-mentioned first embodiment. The pixel number ratio calculating unit 7401 calculates the ratio between the numbers of pixels, and each number of pixels comprises the number of pixels having respective hue of two different hues in the specific hue region, in the original image, such as described above. Further, the unit 7105A comprises, instead of the discrimination processing unit 7207 in the above-mentioned first embodiment, a discrimination processing unit 7402 having a different construction.

In the special document discrimination unit 7105A in the second embodiment having such a construction, the ROM 7204 stores therein the following information: the pattern information, in the image in the special document, comprising pixels having the specific hue such as described above; and the pixel number ratio of the pixels having the two different hues, in the special document image, as described above.

Figure 49:
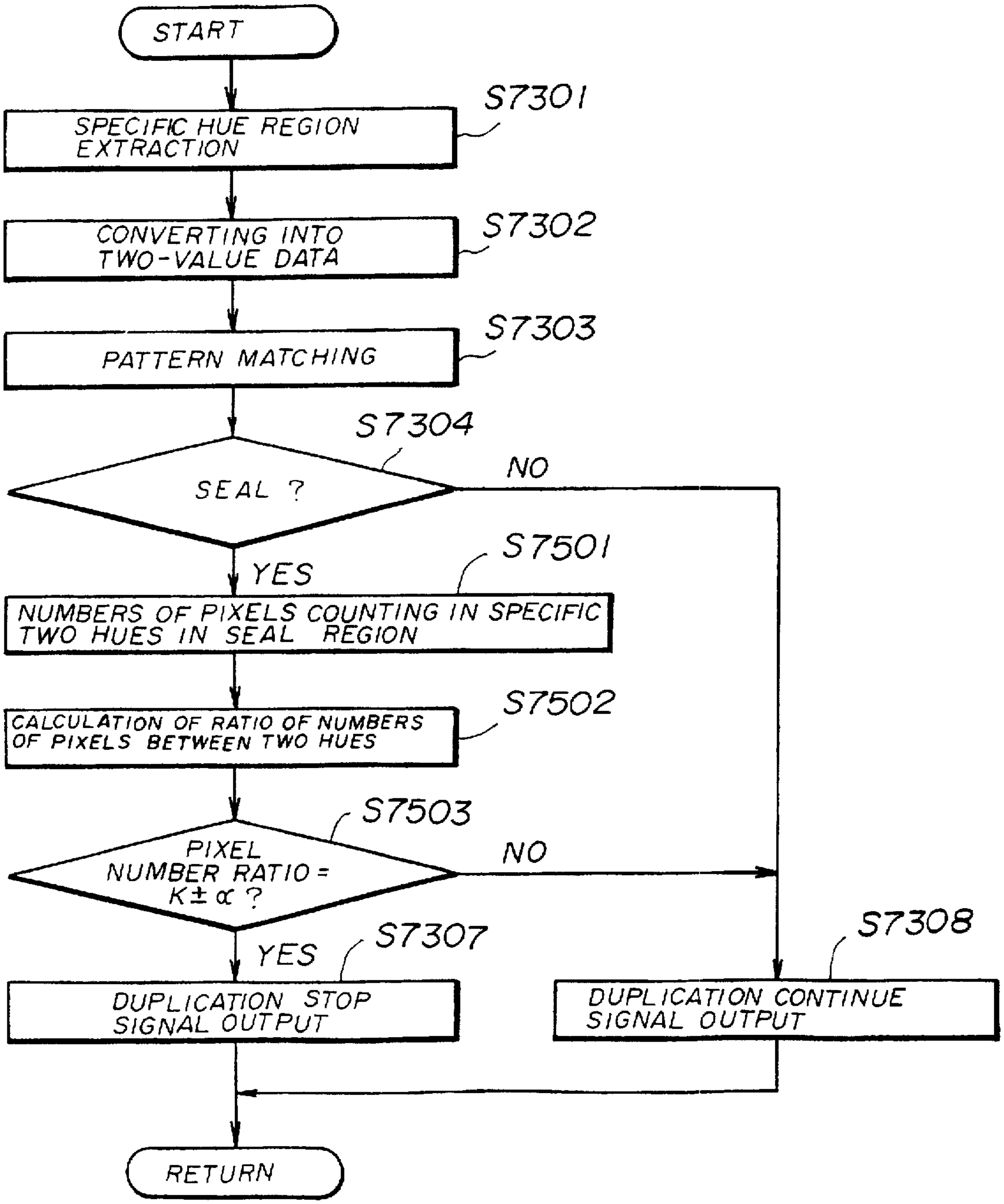
FIG. 49 shows a flow chart of discrimination processing carried out by the discrimination unit of FIG. 48.

The discrimination operation flow will be described with reference to FIG. 49, which operation is performed by the, special document discrimination unit 7105A in the second embodiment having such a construction.

Figure 47:
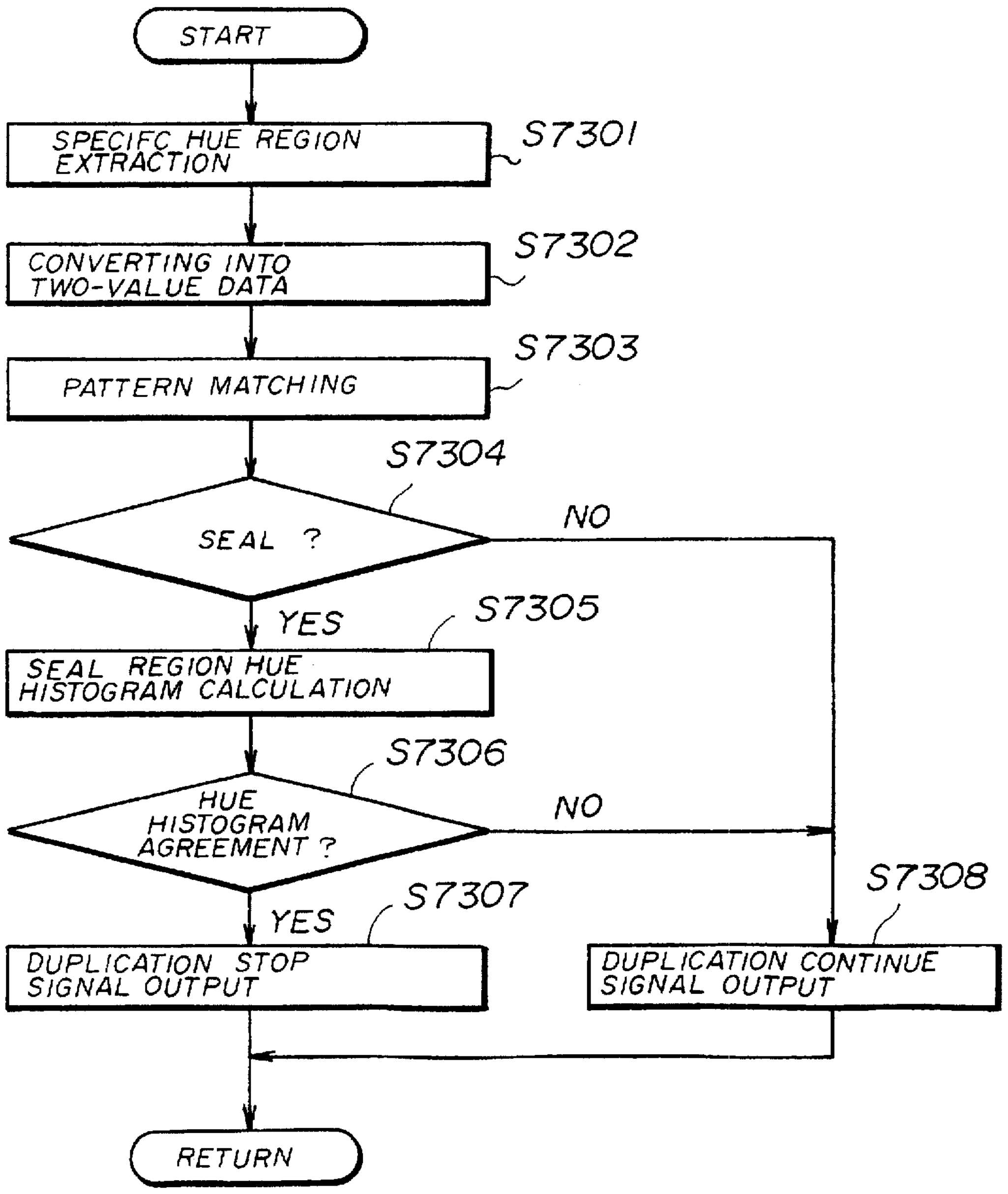
FIG. 47 shows a flow chart of discrimination processing carried out by the discrimination unit of FIG. 46.

The same step numerals are given to steps substantially identical to the steps in the flow chart shown in FIG. 47 and description thereof is omitted.

If it is determined in S7304 that the specific hue region such as described above in the original image agrees with the seal-mark region such as described above in the special document, the number of pixels of each the two different hues in the seal-mark region is counted in S7501. Subsequently, the counted numbers of pixels are used for calculating the ratio between the numbers, obtaining a two-hue pixel number ratio in S7502. At least one hue of the two different hues used there should be obtained as a result of selection of a hue particular to the relevant paper money in the seal-mark region.

Subsequently, in S7503, the discrimination processing unit 7402 compares the pixel number ratio obtained in S7502 with the reference two-hue pixel number ratio K which has been previously stored in the ROM 7204. (This comparison comprises the comparison as to whether or not the original two-hue pixel number ratio=K±α. There, a indicates allowable limits within which the compared value is considered to agree with the K.) This reference two-hue pixel number ratio may have been previously obtained corresponding to the image in the paper money similarly to a method whereby the above-mentioned original two-hue pixel number ratio has been obtained.

If the determination result in this S7503 is true, it is determined that the original image is identical to the paper money. Accordingly, a duplication stop signal is output in S7307.

On the other hand, either if it is determined that the seal-mark region in the original image is not identical to the seal mark in the paper money in S7304 or if it is determined in S7303 that the two-hue pixel number ratios do not agree, it is determined that the original image is not identical to the paper money. Accordingly, a duplication continuation signal is output in S7308.

Thus, in the second embodiment, the pattern consisting of the specific hue pixels in the specific hue region in the original image is used. Then, by using the pattern matching method, the pattern in the original image is compared with the corresponding pattern in the special document image. If the comparison result comprises agreement, the comparison is performed between the original image and the corresponding special document image using the two-hue pixel number ratio such as described above. Thus, the discrimination action is doubly performed, the discrimination accuracy being thus improved. Further, by limiting the calculating of the two-hue pixel number ratio to the above-mentioned special hue region, the hardware amount in the special document discrimination unit 7501A may be reduced.

Next, the third embodiment in the eighth aspect of the present invention will be described.

The construction in the duplicator in the third embodiment is similar, in basic construction, to the above described construction of the duplicator 7000 in the first embodiment. The description for the similar components is omitted and only different parts will be described.

Figure 50:
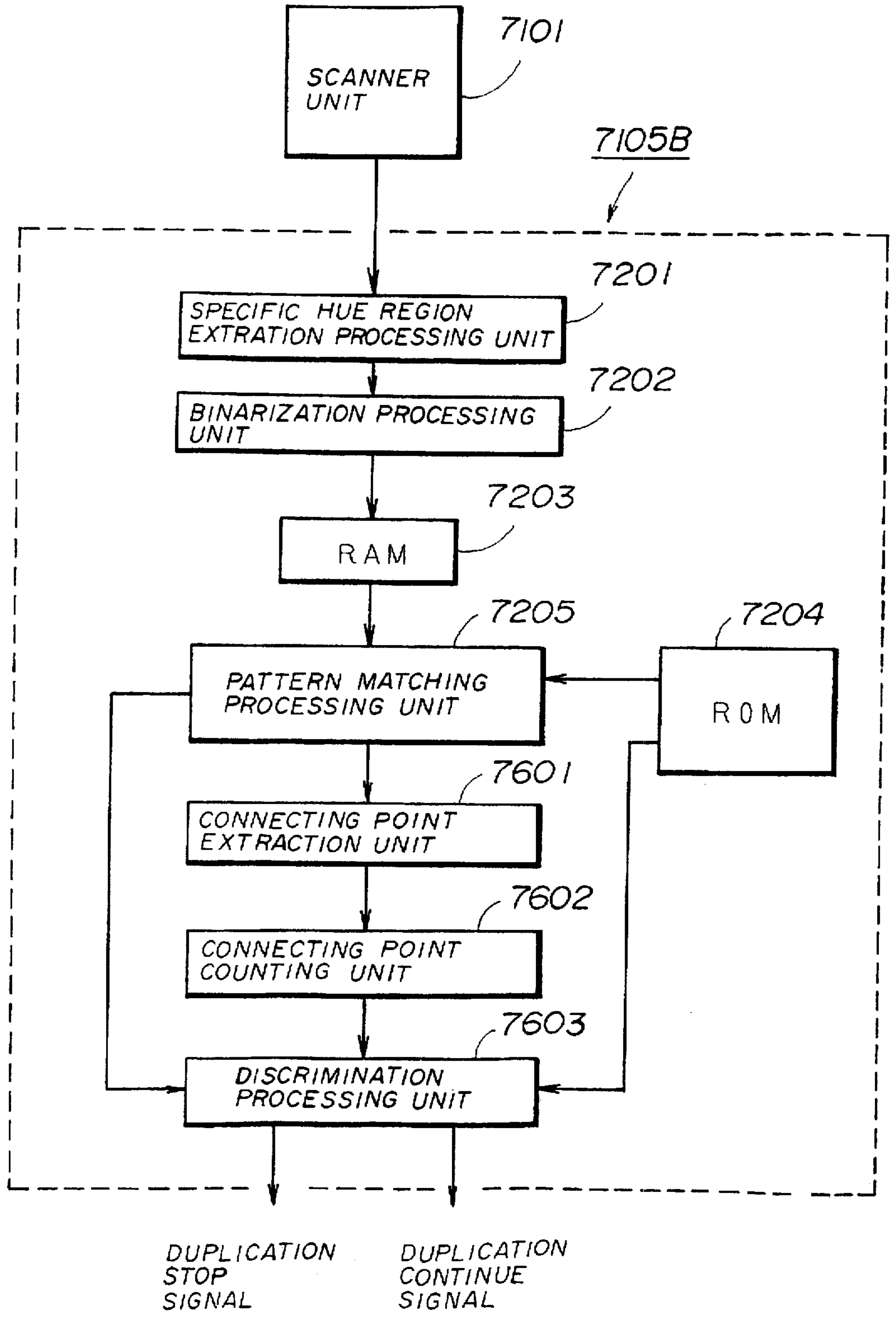
FIG. 50 shows a block diagram of a special-document discrimination unit in a third embodiment of the eighth aspect of the present invention.

The duplicator in the third embodiment comprises a special-document discrimination unit 7105B instead of the special document discrimination unit 7205 in the above-mentioned first embodiment. The construction thereof will be described with reference to FIG. 50.

The special document discrimination processing unit 7105B comprises connecting point extracting unit 7601 and connecting point counting unit 7602 instead of the hue histogram calculating unit 7206 in the special document discrimination processing unit 7105 in the above-mentioned first embodiment. Further, the unit 7105B comprises, instead of the discrimination processing unit 7207 in the above-mentioned first embodiment, a discrimination processing unit 7603 having a different construction.

In the special document discrimination unit 7105B in the third embodiment having such a construction, the ROM 7204 stores therein the following information: the pattern in the vermilion seal peripheral region having the specific hue as described above; and the connecting number such as described above in the peripheral region in the vermilion seal region.

Figure 51:
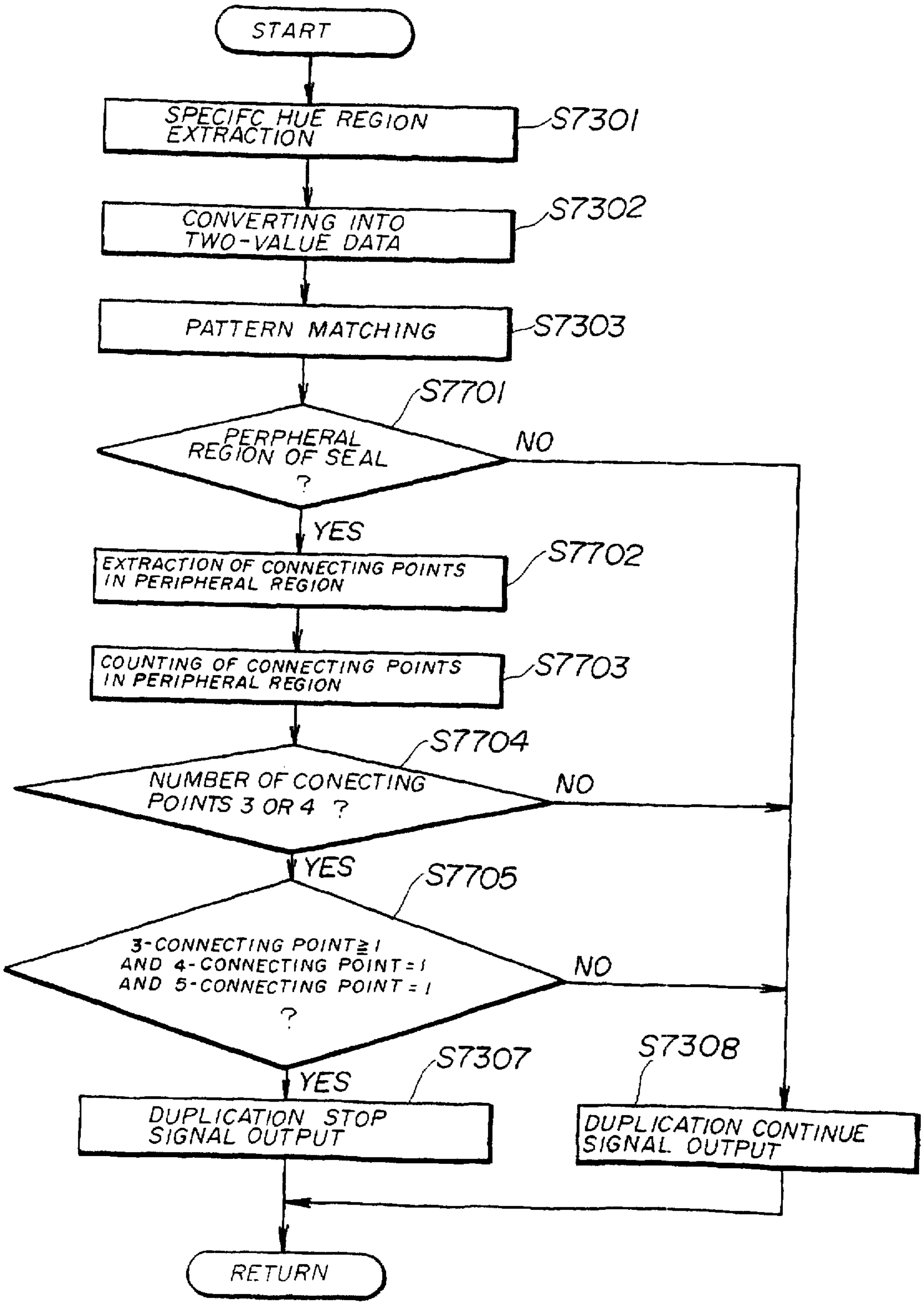
FIG. 51 shows a flow chart of discrimination processing carried out by the discrimination unit of FIG. 50.

The discrimination operation flow chart will be described with reference to FIG. 51, which operation is performed by the special document discrimination unit 7105B in the third embodiment having such a construction.

The same step numerals are given to steps substantially identical to the steps in the flow chart shown in FIG. 47 and description thereof is omitted.

If it is determined in S7701 that the specific hue region such as described above in the original image agrees with the seal-mark region such as described above in the special document, the connecting point counting unit 7601 extracts, in S7702, the connecting point data in the peripheral region in the region which has been determined to comprise the seal mark. Subsequently, in S7703, the number of the thus extracted connecting points is counted.

Subsequently, in S7704, it is determined whether or not the thus counted number, such as 3 or 4, of connecting points agrees with a reference number of connecting points. The reason why the reference number of connecting points in this example is taken to be 3 or 4 is described below. In this example, the vermilion seal region ST in the one-thousand-yen note shown in FIG. 12 is taken. In this case, there area 3 connecting points $CP_1$–$CP_3$ as shown in the drawing. However, a portion indicated by the reference letters $CP^1$ approximates a connecting point. Thus, there is high probability of erroneous extraction of the portion $CP^1$ as a connecting point. Under consideration of this fact, the reference number of connecting points is taken to comprise 3 or 4.

Next, in S7705, determination is made using the number of connecting lines in the plurality of connecting points extracted as described above. In the example of the vermilion seal region ST in the above-mentioned one-thousand-yen note, as shown in FIG. 12, the connecting point $CP_1$ is found to have lines three connecting thereto. Also, in the case of erroneous extraction, $CP^a$ is found to have the same form. That is, one or more of the connecting points of the above type are found. A connecting point having four lines connecting thereto referred to as a four-connecting point, and one such point, $CP_3$, is present. A connecting point having five lines connecting thereto referred to as a five-connecting point, and one such point, $CP_2$, is present. Such information is used as criteria in the determination processing.

If the determination result in this S7705 is true (YES), it is determined that the original image is identical to the paper money. Accordingly, a duplication stop signal is output in S7307. On the other hand, if the determination is false (NO) in either S7704 or S7705, it is determined that the original image is not identical to the paper money. Accordingly, a duplication continuation signal is output in S7308.

Thus, in the third embodiment, the pattern consisting of the specific hue pixels in the specific hue region in the original image is used. Then, by using the pattern matching method, the pattern in the original image is compared with the corresponding pattern in the special document image. If the comparison result comprises agreement, the following discrimination is performed. Using the previously stored corresponding information concerning the paper money as the criteria, the data concerning the connecting points in the peripheral region in the vermilion seal region in the original image is used in the discrimination. Thus, two discrimination actions are performed, the discrimination accuracy being thus improved.

Next, the fourth embodiment in the eighth aspect of the present invention will be described.

The construction of the duplicator in the fourth embodiment is similar, in basic construction, to the above described construction of the duplicator 7000 in the first embodiment. The description for the similar components is omitted and only different parts will be described.

Figure 52:
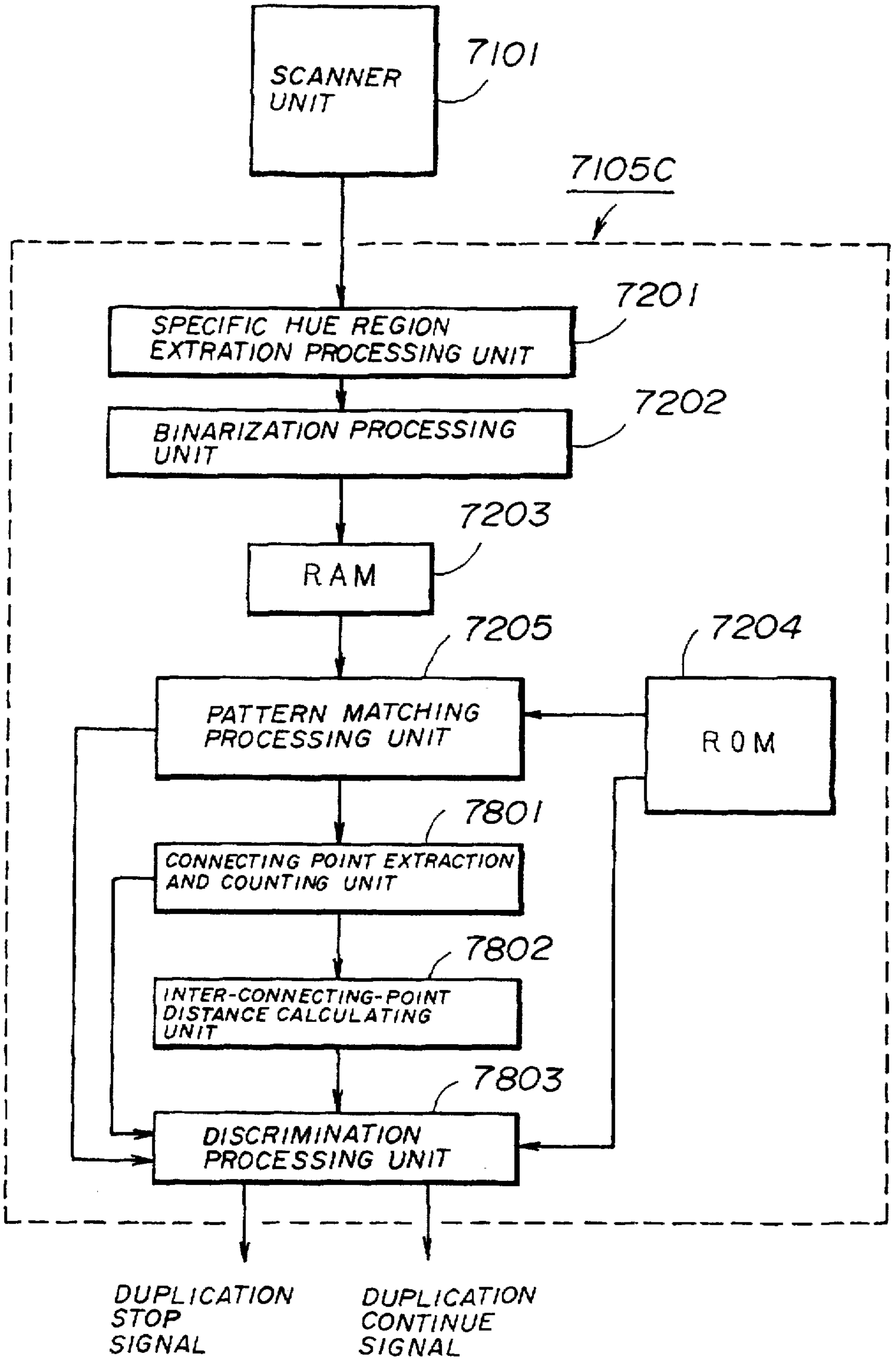
FIG. 52 shows a block diagram of a special-document discrimination unit in a fourth embodiment of the eighth aspect of the present invention.

The duplicator in the fourth embodiment comprises a special-document discrimination unit 7105C instead of the special document discrimination unit 7205 in the above-mentioned first embodiment. The construction thereof will be described with reference to FIG. 52.

The special document discrimination processing unit 7105C comprises connecting point extracting and counting unit 7801 and inter-connecting-point distance calculating unit 7802 instead of the hue histogram calculating unit 7206 in the special document discrimination processing unit 7105 in the above-mentioned first embodiment. Further, the unit 7105C comprises, instead of the discrimination processing unit 7207 in the above-mentioned first embodiment, a discrimination processing unit 7803 having a different construction.

In the special document discrimination unit 7105C in the fourth embodiment having such a construction, the ROM 7204 stores therein the following information: the pattern in the vermilion seal peripheral region having the specific hue as described above; and the connecting number such as described above and the distance(s) between the two connecting points, inter-two-connecting-point distance(s) in the peripheral region in the vermilion seal region.

Figure 53:
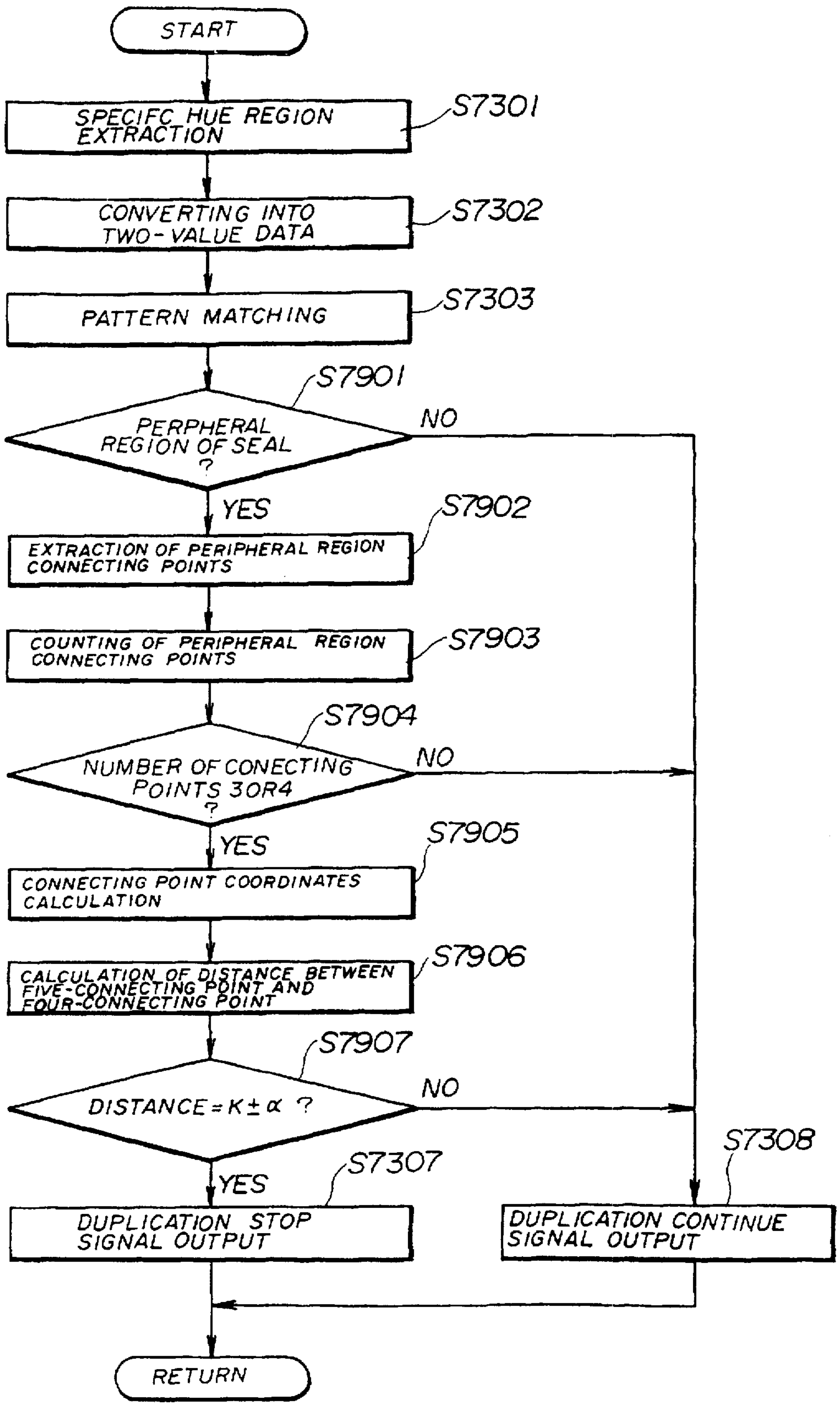
FIG. 53 shows a flow chart of discrimination processing carried out by the discrimination unit of FIG. 52.

The discrimination operation flow will be described with reference to FIG. 53, which operation is performed by the special document discrimination unit 7105C in the fourth embodiment having such a construction.

The same step numerals are given to steps substantially identical to the steps in the flow chart shown in FIG. 47 and description thereof is omitted.

If it is determined in S7901 that the specific hue region such as described above in the original image agrees with the seal-mark region such as described above in the special document, the connecting point extraction and counting unit 7801 extracts, in S7902, data concerning the connecting points in the peripheral region of the region which has been determined to comprise the seal mark.

Subsequently, in S7803, the number of the thus extracted connecting points are counted.

Subsequently in S7804, it is determined that the thus counted number of the connecting points agrees with the reference number of connecting points such as described above, 3 or 4 for example.

If the determination 'agreement' results from this, in S7905 the coordinates of the respective connecting points extracted in S7802 are obtained by means of the inter-connecting-point distance calculating unit 7802. Subsequently, in S7906, the inter-connecting-point distance calculating unit 7802 obtains the distance(s) between the above-mentioned four-connecting point(s) and five-connecting points among the plurality of connecting point(s) in the vermilion seal image. The coordinates of the above plurality of connecting points have been obtained in S7902 as described above.

Subsequently, in S7907, the thus calculated inter-two connecting-point distance(s) is (are) compared in the discrimination processing unit 7803 with the inter-two-connecting-point distance(s) K concerning the paper money. This distance(s) K is (are) used as the criterion(criteria) and has (have) been previously stored in the ROM 7204. If the relevant value(s) is(are) within the limits so that (the inter-two connecting point distance(s) in the original image)= K±α, where a represents an allowable error limit about the reference distance(s) K, (YES in S7907), it is determined that the original image is identical to the paper money. Accordingly, a duplication stop signal is output in S7307.

On the other hand, if the determination is the false (NO) in either S7904 or S7907, it is determined that the original image is not identical to the paper money. Accordingly, a duplication continuation signal is output in S7308.

Thus, in the fourth embodiment, the pattern consisting of the specific hue pixels in the specific hue region in the original image is used. Then, by using the pattern matching method, the pattern in the original image is compared with the corresponding pattern in the special document image. If the comparison result comprises agreement, the following discrimination is performed. Using the previously stored corresponding information concerning the paper money as the criteria, the data concerning the connecting points in the peripheral region in the vermilion seal region in the original image is used in the discrimination. Further in the latter discrimination, in addition to the comparison of the number of the plurality of connecting points, the comparison of the distances among the plurality of connecting points is performed. Thus, three discrimination actions are performed, the discrimination accuracy being thus improved.

Next, the fifth embodiment in the eighth aspect of the present invention will be described.

The construction of the duplicator in the fifth embodiment is similar, in basic construction, to the above described construction of the duplicator 7000 in the first embodiment. The description for the similar components is omitted and only different parts will be described.

Figure 54:
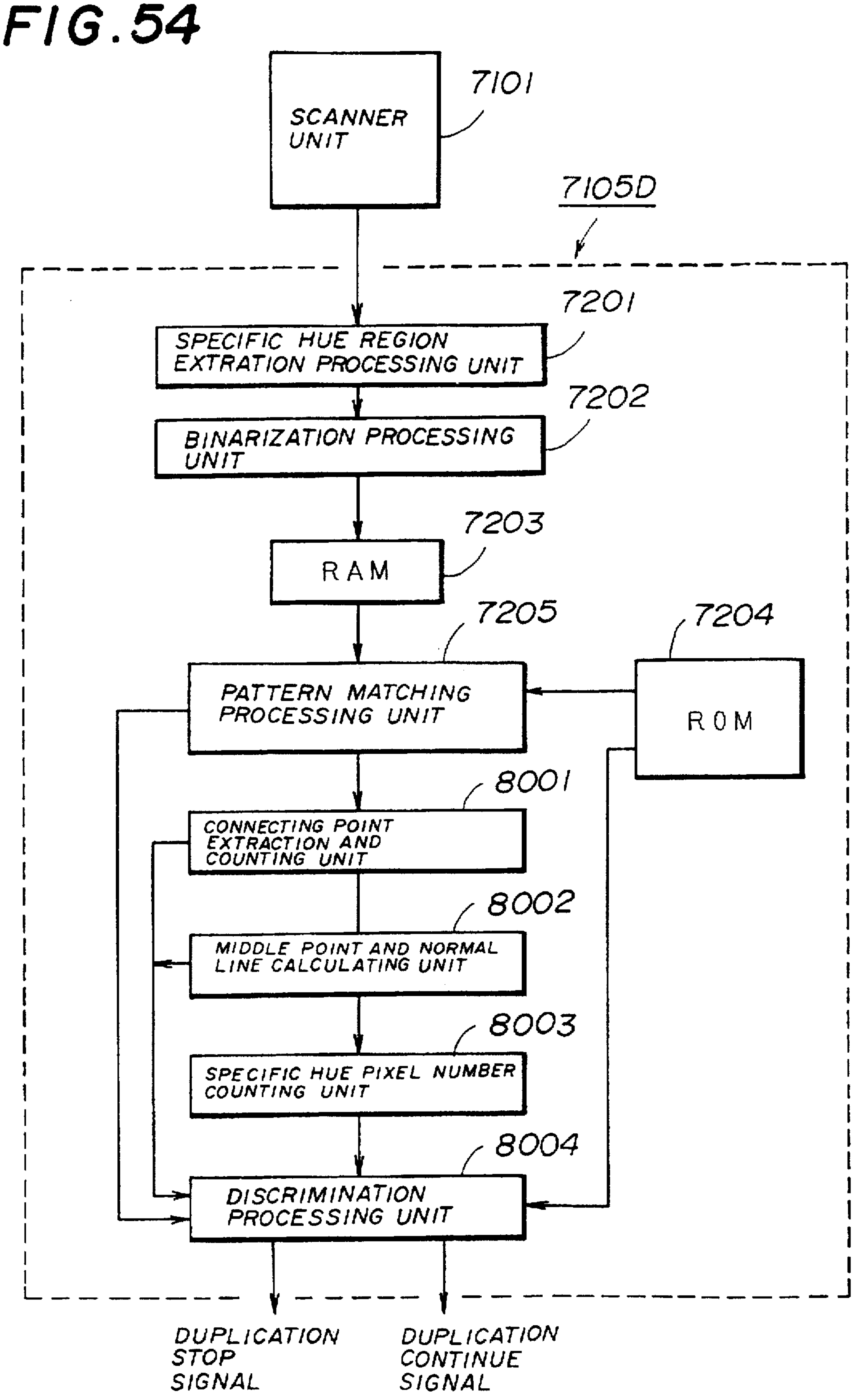
FIG. 54 shows a block diagram of a special-document discrimination unit in a fifth embodiment of the eighth aspect of the present invention.

The duplicator in the fifth embodiment comprises a special-document discrimination unit 7105D instead of the special document discrimination unit 7205 in the above-mentioned first embodiment. The construction thereof will be described with reference to FIG. 54.

The special document discrimination processing unit 7105D comprises connecting point extracting and counting unit 8001 and middle point and normal line calculating unit 8002 instead of the hue histogram calculating unit 7206 in the special document discrimination processing unit 7105 in the above-mentioned first embodiment. Further, the unit 7105D comprises, instead of the discrimination processing unit 7207 in the above-mentioned first embodiment, a discrimination processing unit 8004 having a different construction.

In the special document discrimination unit 7105D in the fifth embodiment having such a construction, the ROM 7204 stores therein the following information: the pattern in the vermilion seal peripheral region having the specific hue as described above; the connecting number such as described above in the peripheral region in the vermilion seal region; and determination reference pixel number as described above.

Figure 55A:
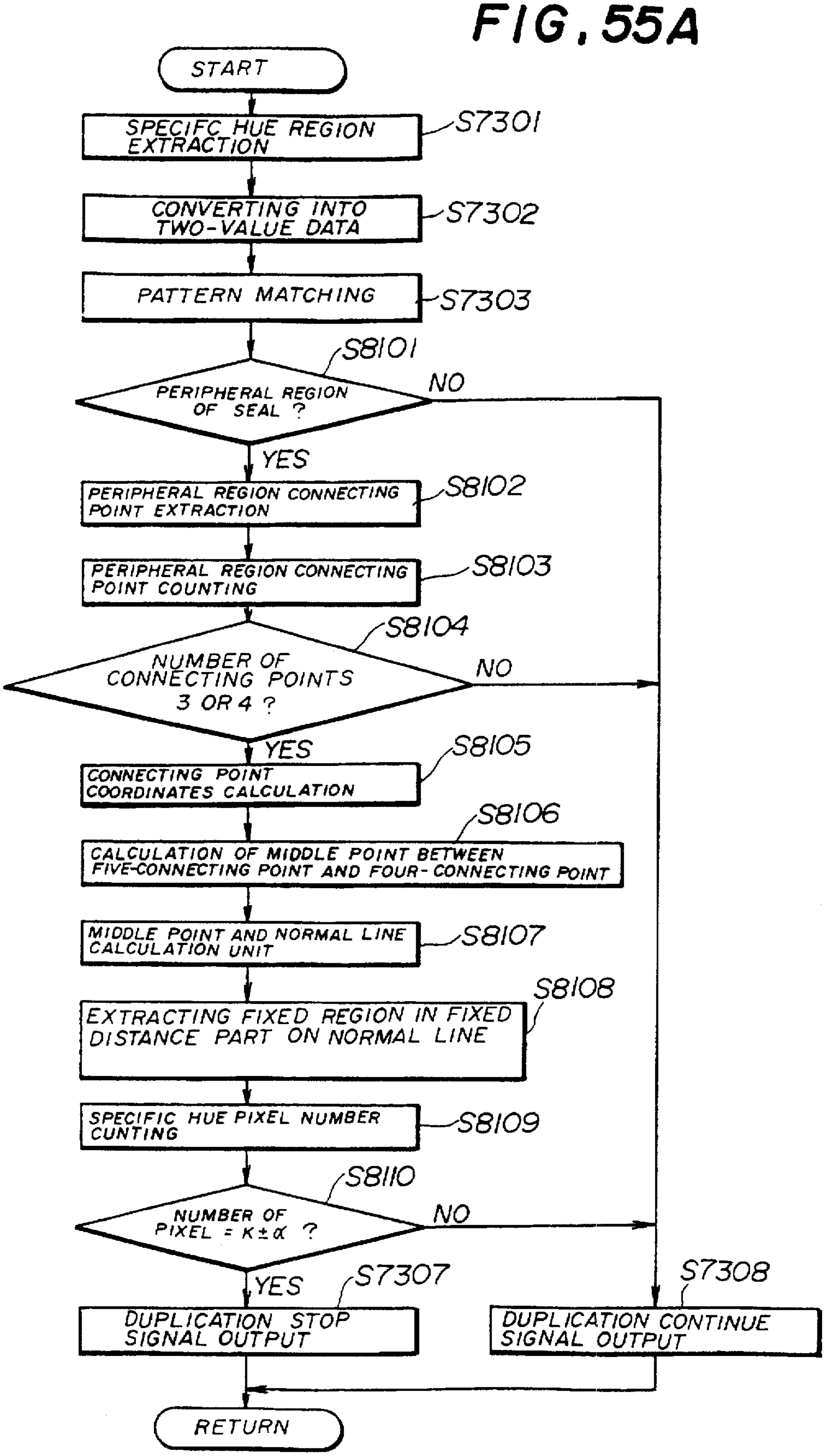
FIG. 55A shows a flow chart of discrimination processing carried out by the discrimination unit of FIG. 54.

The discrimination operation flow will be described with reference to FIG. 55A, which operation is performed by the special document discrimination unit 7105D in the fourth embodiment having such a construction.

The same step numerals are given to steps substantially identical to the steps in the flow chart shown in FIG. 47 and description thereof is omitted.

If it is determined in S8101 that the specific hue region such as described above in the original image agrees with the seal-mark region such as described above in the special document, the connecting point extraction and counting unit 7801 extracts, in S8102, the data concerning the connecting points in the peripheral region in the region which has been determined to comprise the seal mark. Subsequently, in S8103, the number of the thus extracted connecting points are counted.

Subsequently in S8104, it is determined that the thus counted number of the connecting points agrees with the reference number of connecting points such as described above, 3 or 4 for example.

Figure 55B:
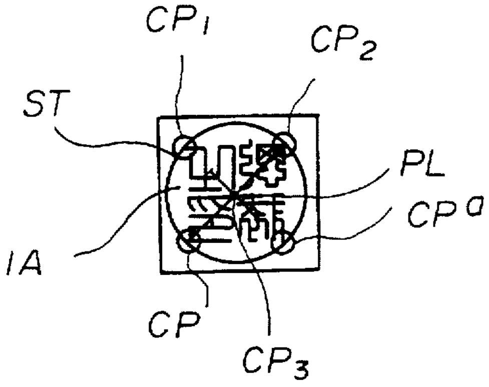
FIG. 55B shows a magnified schematic diagram of a vermilion-seal-mark region on a paper money bill for illustrating the flow chart of FIG. 55A.

If the determination 'agreement' results from this, in S8105 the coordinates of the respective connecting points extracted in S8102 are obtained by means of the middle point and normal line calculating unit 8002. Subsequently, in S8106, the middle point and normal line calculating unit 8002 obtains the middle point(s) (CP in FIG. 55B) among the above-mentioned four-connecting points and five-connecting points among the plurality of connecting points in the vermilion seal image. The coordinates of the above plurality of connecting points have been obtained in S8105 as described above. Further, in S8107, the normal line (CP in FIG. 55B) passing through the middle point and to the middle point is generated.

Subsequently, in S8108, the image data in the normal line is extracted concerning the extent in a predetermined distance amount starting from the middle point. In S8109, the number of pixels included in the thus extracted image data and each having the previously specified specific hue is extracted. The thus counted number of pixels is, in S8110, compared by means of the discrimination processing unit 8004. This comparison is with the determination pixel number K which has been previously stored in the ROM 7204 and may comprise the number of specified hue pixels on the normal line constructed at the middle point between the two connecting points as described above in the reference paper money.

In one example, the above-mentioned previously specified specific hue may comprise the color (vermilion) of the lines constituting the vermilion seal. In this case, the pixels counted would correspond to the region of intersection of the normal line PL and the line(s) constituting the vermilion seal ST in FIG. 55B.

That is, it is determined whether or not the relevant value is within the limits so that (the number of pixels counted concerning the original image)=K±α. This α comprises the allowable limits provided for the criterion K.

If the determination result in S8110 is YES, it is determined that the original image is identical to the paper money. Accordingly, a duplication stop signal is output in S7307.

On the other hand, if the determination is false (NO) or the falseness (NO) in either S8101 or S8104, it is determined that the original image is not identical to the paper money. Accordingly, a duplication continuation signal is output in S7308.

Thus, in the fifth embodiment, the pattern consisting of the specific hue pixels in the specific hue region in the original image is used. Then, by using the pattern matching method, the pattern in the original image is compared with the corresponding pattern in the special document image. If the comparison result comprises agreement, the following discrimination is performed. Using the previously stored corresponding information concerning the paper money as the criteria, the data concerning the connecting points in the peripheral region in the vermilion seal region in the original image is used in the discrimination. Further in the latter discrimination, in addition to the comparison of the number of the connecting points, the comparison of the number of specific hue pixels lying on the normal line passing through the middle point located between the plurality of connecting points is performed. Thus, three discrimination actions are performed and the discrimination accuracy is thus improved.

Next, a duplicator 7100 in the sixth embodiment in the eighth aspect of the present invention will be described.

Figure 56:
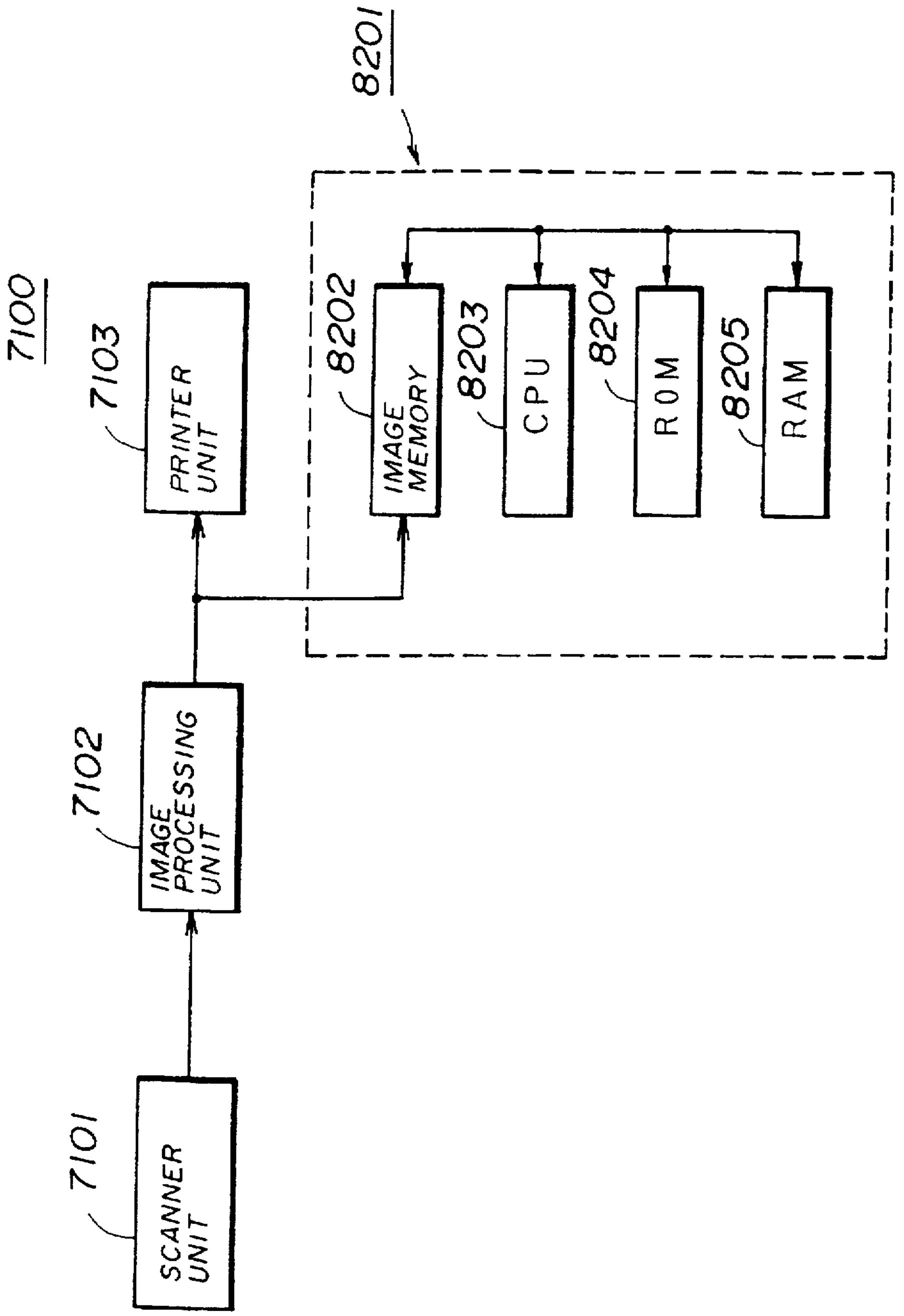
FIG. 56 shows a block diagram of a special-document discrimination unit in a sixth embodiment of the eighth aspect of the present invention.

As shown in FIG. 56, the duplicator 7100 comprises scanner unit 7101, image processing unit 7102, and printer unit 7103 having constructions respectively identical to the scanner unit 7101, image processing unit 7102, and printer unit 7103 in the above-mentioned first embodiment.

Figure 59:
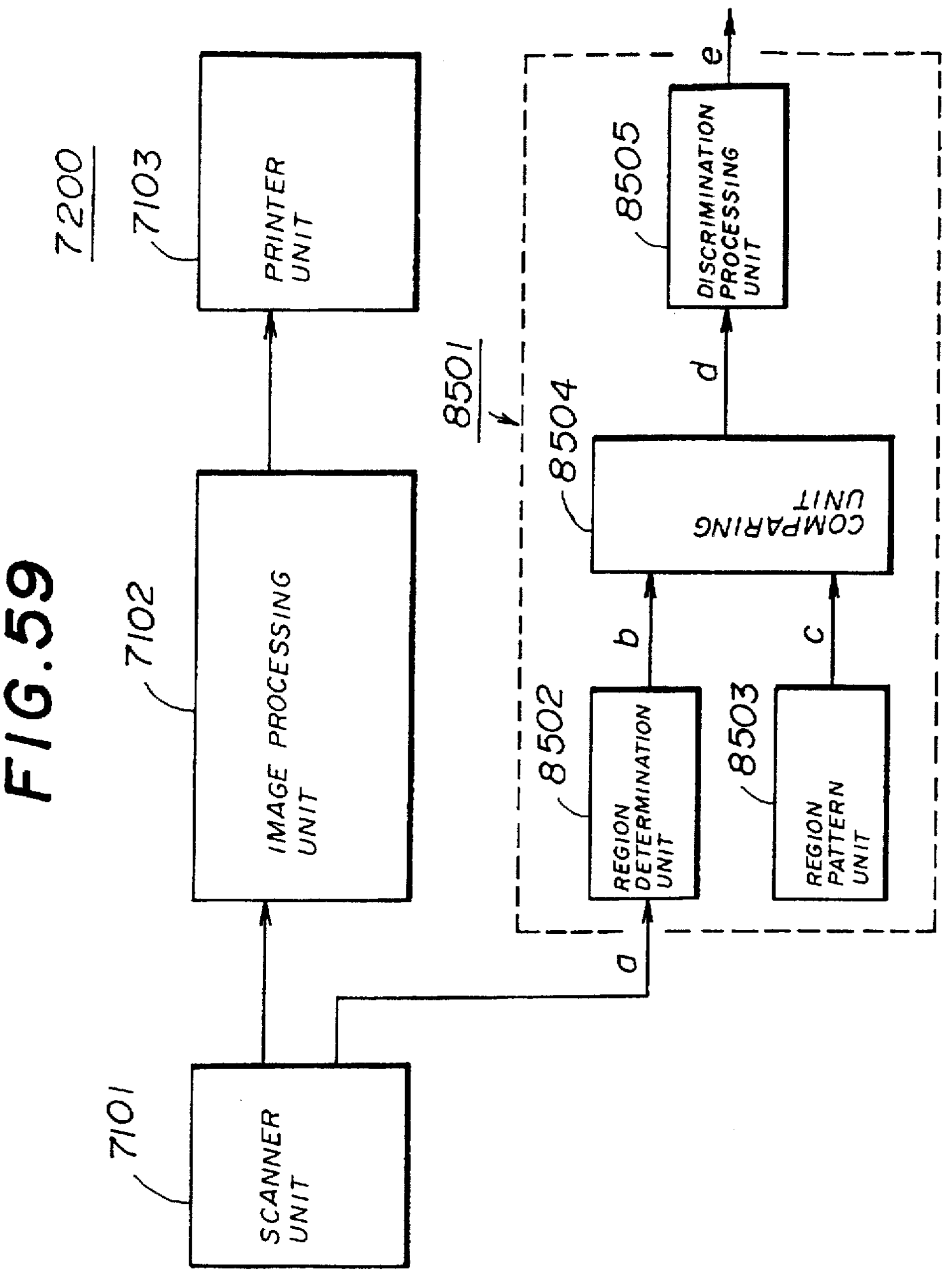
FIG. 59 shows a block diagram of a duplicator with special-document function in a seventh embodiment of the eighth aspect of the present invention.

The duplicator 7100 further comprises a special document discrimination unit 8201 for discriminating as to whether or not an original image to be processed comprises the special document such as paper money or so. The unit 8201 comprises, as shown in FIG. 59, image memory 8202, CPU (central processing unit) 8203, ROM 8204 and RAM 8205.

Figure 45:
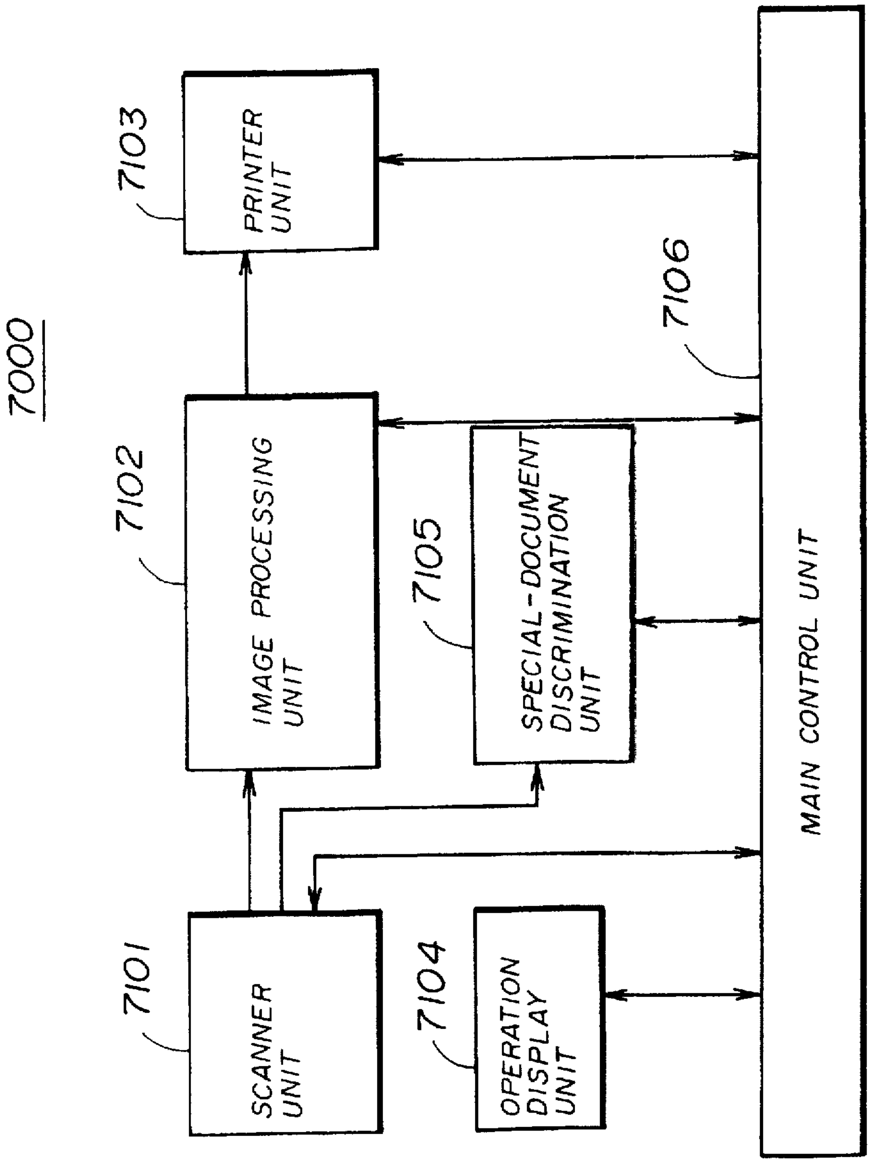
FIG. 45 shows a block diagram of a duplicator with a special-document discrimination function in a first embodiment of the eighth aspect of the present invention.

In this duplicator 7100, if the normal duplication mode is selected through the operation display unit such as that shown in FIG. 45 but not shown in FIG. 56, the original image input through the scanner unit 7101 as is well-known is properly processed in the image processing unit 7102. Then, the corresponding image is realized on a recording paper sheet through the printer unit.

On the other hand, if another image discrimination mode is selected through the operation display unit as described above, the image data properly processed in the image processing unit 7102 as described above is not realized on a recording paper sheet through the printer unit as it is but is processed as described below.

That is, the above image data is stored in the image memory 8202 in the special document discrimination unit 8201. The thus stored image data is used as described below. Respective software functions in the CPU 8203, ROM 8204 and RAM 8205 are applied to the stored image data. Thus, characters and character series in the original image are recognized; the pointer addresses associated with the character series are detected and the distance(s) between the character series are obtained.

Figure 57:
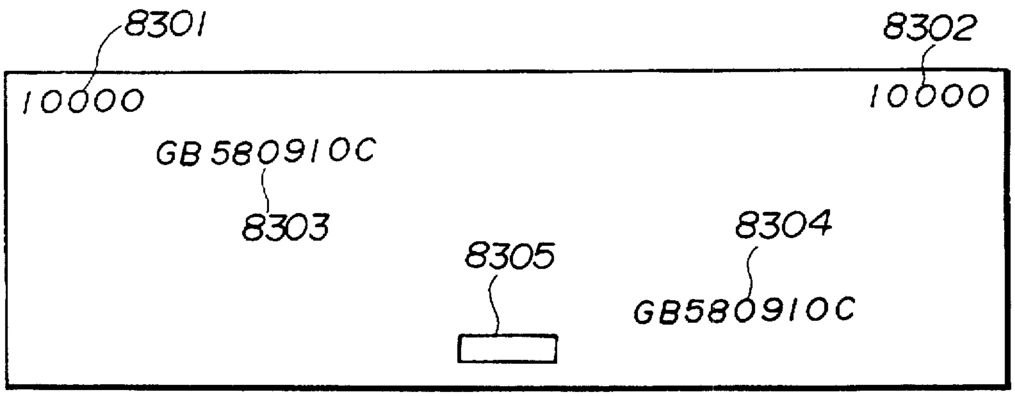
FIG. 57 shows a paper-money schematic diagram for illustrating an arrangement of character rows used in the discrimination processing of FIG. 56.

FIG. 57 typically shows the arrangement of the respective character series drawn on the front side (the side on which the human figure appears) of the ten-thousand-yen note of the Bank of Japan as an example.

In FIG. 57, in the image of the ten-thousand-yen note, only specific image regions are shown which are used in the sixth embodiment of the eighth aspect of the present invention.

In FIG. 57, the images in the regions indicated by the reference numerals 8301 and 8302 respectively represent the number 11100011 (ten thousand). The images indicated by the reference numerals 8303 and 8304 respectively comprise codes consisting of alphanumeric characters. Further, the image in the region indicated by the reference numeral 8305 comprises the Chinese characters 大蔵省印刷局製造. Recognition of the character series indicated by the regions 8301–8305 and detection of them are implemented with the use of the well-known OCR (optical character recognition) technology in the special document discrimination processing unit 7201.

After these character series are thus recognized and the positions thereof are detected, the spatial relationship (mutual distance(s))among these five sets of numeral series and letter series 8301–8305 is detected. The detection result is compared with a previously registered spatial relationship, acting as a criterion (criteria), concerning the paper money. If the comparison result comprises agreement, it is discriminated that the relevant original image is identical to the paper money.

Figure 58:
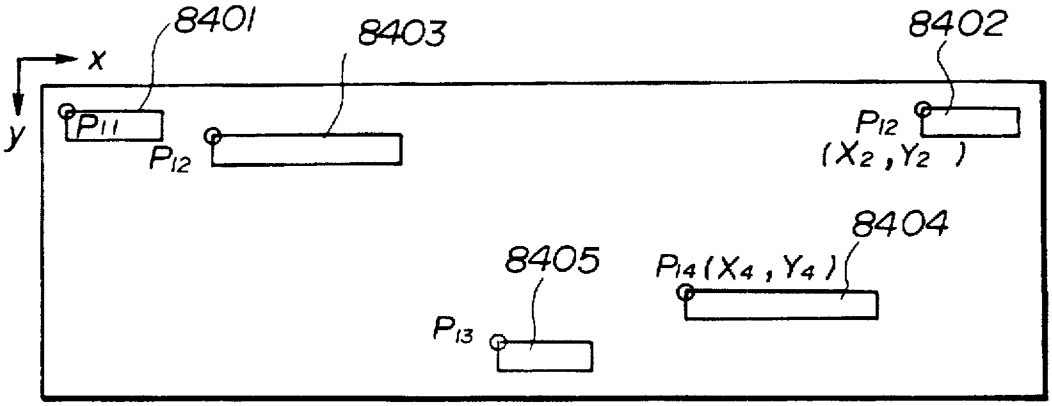
FIG. 58 shows a paper-money schematic diagram for illustrating recognition of character rows (8301–8305) and the recognition of the positions thereof, on the paper money bill, in the discrimination processing of FIG. 56.

With reference to FIG. 58, the recognition of these five character series and detection of the positions thereof will be described. The regions 8401–8405 in FIG. 58 respectively correspond to the regions 8301–8305 in FIG. 57. In FIG. 58, $P_{11}$–$P_{15}$ are respectively pointers typically indicating the positions of the regions 8401–8405. In one example, the address associated with the pointer P12 on the XY coordinate plane is ($X_2$, Y2) and the address associated with the pointer P14 is ($X_4$, $Y_4$). The X direction in the XY coordinates comprises the main scan line direction in which the original image is scanned and the Y direction comprises the sub-scan direction.

The distance $L_{24}$ between the character series region 8402 and the character series region 8404 can be obtained with the following equation (8-4):

$$L_{24}=\{(X_2-X_4)^2+(Y_2-Y_4)^2\}^{1/2} \quad (8\text{-}4)$$

Similarly, the other inter-character-series-region distances can be obtained.

Thus, by using the layout in the character series particular to the paper money, the detection of the layout enables discrimination as to whether or not the relevant original image is identical to the paper money. In this image discrimination mode, if the original image is not determined to comprise the paper money, the image data stored in the image memory 8202 is sent as is to the printer unit 7103. The printer unit 7103 then realizes the corresponding image on a recording paper sheet.

If the original image is determined to be paper money as the result of the discrimination, this fact is reported to a main control unit in the duplicator 7100 but not shown in the drawing. Thus, the printing action as described above by means of the printer unit 7103 is prevented. Simultaneously, through the operation display unit not shown in the drawing, the warning display concerning this fact is performed so that the operator can notice the fact.

Next, a duplicator 7200 in the seventh embodiment in the eighth aspect of the present invention will be described.

As shown in FIG. 59, the duplicator 7200 comprises scanner unit 7101, image processing unit 7102, and printer unit 7103 having constructions respectively substantially identical to the scanner unit 7101, image processing unit 7102, and printer unit 7103 in the above-mentioned duplicator 7100 in the sixth embodiment.

The duplicator 7200 further comprises a special document discrimination unit 8501 for discriminating as to whether or not an original image to be processed comprises the special document such as paper money or so. The unit 8501 comprises, as shown in FIG. 59, a region determination unit 8502 for discriminating as to whether or not the original image comprises a so-called half-tone image. Half-tone image region determination is previously performed on an image associated with the special document to be used as the criterion. As a result, the pattern information is obtained which is previously stored in a region pattern unit 8503. The unit 8501 further comprises a comparing unit 8504 for comparing the determination result obtained by means of the region determination unit 8502 with the reference pattern information previously stored in the region pattern unit. The unit 8501 further comprises a discrimination processing unit 8505 for discriminating as to whether or not the original image comprises the special document based on the comparison result in the comparing unit 8504.

Next, the operation in the special document discrimination processing unit 8501 will be described. The image data input through the scanner unit 8101 is sent to the region determination unit 8502. The image data input to the region determination unit 8502 will be referred to as image data a as shown in FIG. 59. In the region determination unit 8502, based on the image data, it is determined whether the corresponding image region in the original image comprises a halftone image region or comprises another type of image region (line image, for example).

Then, if the image data a is determined to comprise a half-tone image, the region determination unit 8502 outputs the value 1 as the output signal *b*. If the relevant image data a does not comprise a halftone image, the unit 8502 outputs b=0. Such a region determination method is well known and a description of the detail thereof is omitted.

Subsequently, the comparing unit 8504 reads, in synchronization with the relevant output signal b, the previously stored information concerning the pattern as the output signal c from the region pattern unit 8503. That is, if a certain position on the reference special-document image comprises a half-tone image, c=1 is output. There, the above certain position in the special-document image corresponds to the certain position in the original image which the image data a concerns. If not, c=0 is output.

The comparing unit 8504 compares the signal b with the signal c. If these agree, the unit 8504 outputs the output signal d=1 and if the same do not agree, the unit 8504 outputs the output signal d=0.

The discrimination processing unit 8505 detects how frequent the signals d=1 provided from the comparing unit 8504 are for the image data a corresponding to a predetermined area in the original image. If the frequency is greater than a predetermined threshold value, the unit 8505 determines that the original image is identical to the special document. In that case, the discrimination processing unit 8505 outputs e=1 as the output signal.

If the discrimination processing unit 8505 thus outputs the output signal e=1, a main control unit in the duplicator 7200 but not shown in the drawing receives the output signal. The main control unit, as a result, prevents the printer unit 7103 from carrying out the printing action for the relevant original image. Simultaneously, the main control unit emits a warning to the outside through the operation display unit in the duplicator 7200.

[EMBODIMENT IN THE NINTH ASPECT]

An image forming system 9000 in one embodiment of the ninth aspect of the present invention will be described in general.

Figure 60:
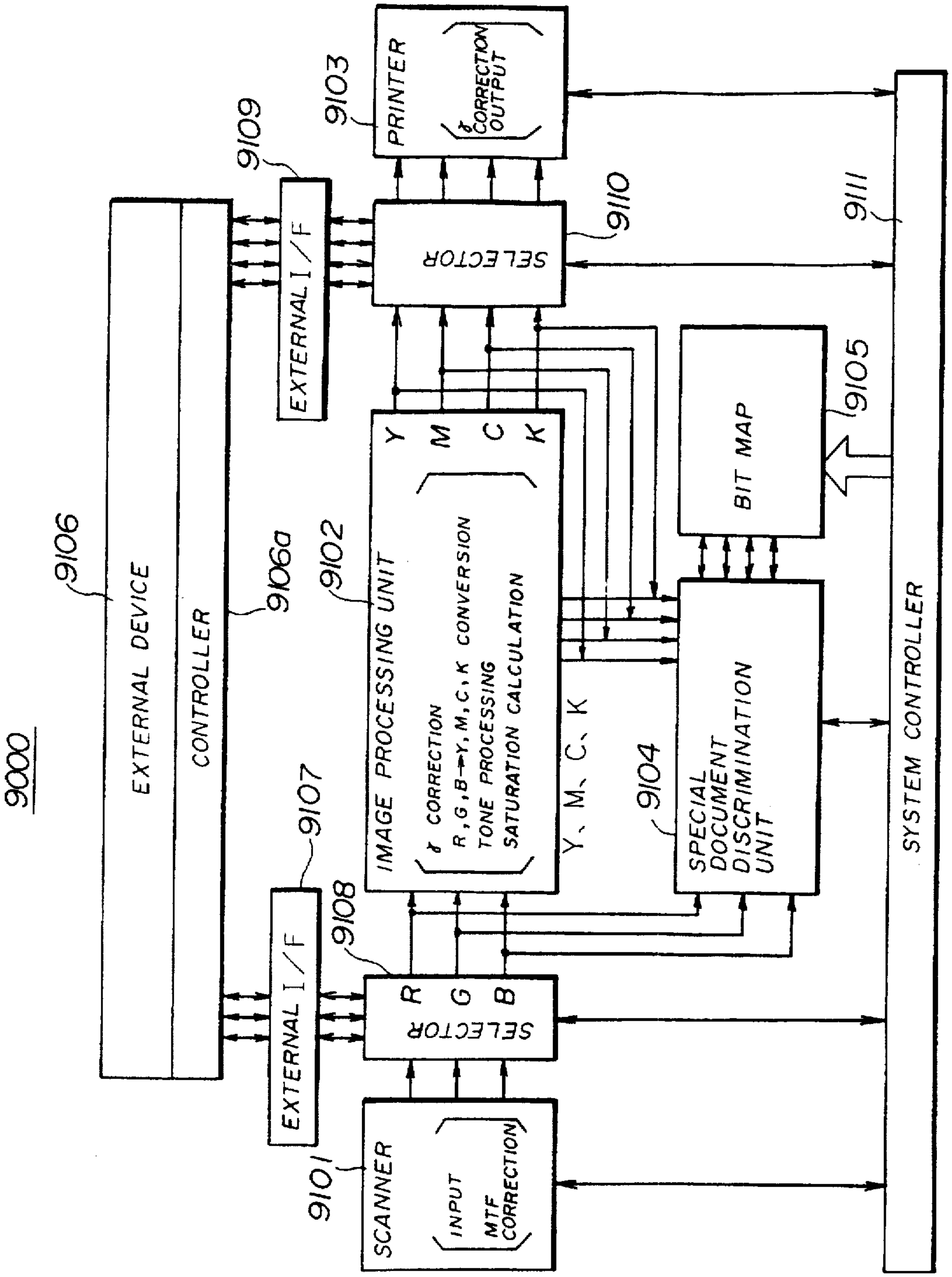
FIG. 60 shows a block diagram of an image forming system in one embodiment of the ninth aspect of the present invention.

This system 9000, see FIG. 60, comprises an image data input means. To this means, image data may be input comprising color-component combination of any type from among: R, G, and B three-color image data; Y, M, and C three-color image data; and Y, M, C and K four-color image data. The input format be any type from among: a format in which the image data in each color component is input in parallel; a format in which the image data in each color component is sequentially input in plane sequence, in line sequence or in point sequence.

The 'plane sequence' means a method in which the image is recorded separately in sequence on a single developing photosensitive element for each color and for each plane of picture (corresponding to once reading in) in sequence of Y, M, C and Bk. Thus, the relevant processing is performed for every plane of picture. The 'line sequence' means a method in which four photosensitive elements are used and Y, M, C and Bk are, simultaneously, recorded, that is, the image is recorded on each photosensitive element line by line. Thus, the relevant processing is performed for every line. The 'point sequence' means a method in which the relevant processing is performed for every pixel, as a color television displays the R, G and B signals by switching them for each dot.

Further, the system 9000 comprises: selecting means for selecting a desired one type from among such a plurality of types of image data and also selecting a desired one type from among the plurality of data input manners; background level extracting means for extracting, from the thus input image data, the data concerning the background region such as mentioned above in the corresponding image; storing means for storing therein, as the so-called bit map (storing as the corresponding image shape), the thus extracted background-region data; background shape determination means for determining whether or not the data stored in the storing means agrees with a previously set corresponding reference image shape; and discrimination means for discriminating so as to determine that the image data comprises the special document if the above determination in the background shape determination means comprises 'agreement'.

Further, the system 9000 properly selects information as the reference used in the above-mentioned discrimination corresponding to the various types of image data and various image-data input formats such as described above.

In this system 9000, image data to be input may be input through input means comprising any one among an internal scanner which the system includes, an external scanner which is attached outside the system, and an external device other than the scanner; or input means comprising combinations thereof. Further the image data, on which image processing is properly performed by means of the system 9000, may be output through output means comprising any one among an internal printer which the system includes, an external printer which is attached outside the system, and an external device other than the printer; or output means comprising combinations thereof. Further, if these various input means and output means are respectively combined, it is preferable to provide input/output selecting means for properly selecting desired means from among them.

Further, it is preferable to provide control processing means for performing processing such as controlling the timing at which image data is input/output in an external device.

Further, the system 9000 is provided with discrimination means for discriminating as to whether or not the image data to be processed comprises the special document such as paper money, securities or the like. The discrimination means performs a predetermined discrimination operation on the image data input as an electrical signal through a communication network or input as a magnetic signal through a file in a magnetic disc or so.

Further, the system 9000, provided with the above discriminating means, outputs the relevant image data as an electrical signal through a communication network or as a magnetic signal through a file on a magnetic disc or so if it is determined, in the discrimination, that the relevant object does not comprise such a special document.

With reference to FIG. 60, the image forming system 9000 in the example of the ninth aspect of the present invention will be described.

This system 9000 comprises a color digital duplicator and an external device which is provided peripheral to the duplicator. The necessary interface is laid between the external device and the duplicator.

As shown in FIG. 60, the system 9000 comprises: a scanner 9101 for inputting an original image to be processed; an image processing unit 9102 for performing on the thus input image data δ correction processing, tone processing and so forth such as described above; a printer 9103 for realizing the image data on a recording paper sheet, on which data various processing has been thus performed; a special document discrimination unit 9104 for discriminating as to whether or not the input image data comprises the special document such as paper money, securities or so; a bit map memory 9105; the above-mentioned external device 9106; a controller 9106 provided for the external device; an external interface (I/F) 9107 for performing proper processing so as to enable image data, input through the external device 9106, to be input to the image processing unit 9102; a selector 9108 for selecting any one from data input through the external I/F and data input through the scanner 9101; an external interface (I/F) 9109 for performing proper processing so as to enable image data, which the image processing unit 9102 has properly processed, to be input to the external device 9106; a selector 9110 for selecting any one output method from those of outputting image data through the external I/F and outputting the data through the printer 9103; a system controller 9111 for controlling the above-mentioned respective components in the system 9000 excepting the above-mentioned external device 9106 and external I/F 9107 and 9109.

Operation in this image forming system 9000 will be described.

If the normal duplication processing is to be performed, the scanner 9101 outputs R, G and B image data values. The output data values then properly undergo selection by the selector 9108 as described above. The image data thus output from the selector 9108 is converted into the density data by means of the image processing unit 9102 which performs the δ correction processing on the image data. Further, the image processing unit 9102 solves the so-called masking equation using the image data as the thus obtained density data. Thus, the unit 9102 converts the relevant image data into the Y, M, C and K image data. This conversion method is identical to the color conversion method using a matrix.

In a case where the printer 9103 comprises four sets of image forming units corresponding to the respective Y, M, C and K colors, the four types Y, M, C and K of image data values are sent to the selector 9110 in parallel. On the other hand, in a case where the printer 9103 comprises a single image forming unit, the R, G and B image data values are sequentially converted into the Y, M, C and K respective image data values. These respective image data values are one by one sent to the printer 9103 via the selector 9110.

It may be that, among the R, G and B image data values output from the input side selector 9108, only G data set is sent to the special document discrimination unit 9104. The G data is used in the discrimination processing and the discrimination result is sent to the system controller 9111. Further, it may be that the image data is converted into the corresponding saturation data in the image processing unit 9102. The thus obtained saturation data is used in the discrimination operation in the special document discrimination unit 9104. Alternatively, it may be that the R, G and B data is converted into the Y, M and C data or into the Y, M, C and K data. Then, the thus obtained data is used in the discrimination operation in the special document discrimination unit 9104.

If the thus obtained discrimination result is that 'the relevant image comprises the duplication- prohibited special document', the system controller 9111 halts the printing action concerning the relevant image data in the printer 9103 or performs processing such as intentionally altering the δ correction values in the printer 9103. Thus, the regular image forming using the relevant image data is prevented from being performed.

In a case where the image data is sent to the external device 9106 and is not output through the printer 9103 as described above, the relevant sending is controlled in correspondence with a predetermined mode in the external device 9106 acting as the destination for the image data. Further, in a case where the destination external device 9106 comprises a memory, if the above-mentioned discrimination result is that 'the image data comprises the duplication-prohibited special document', the relevant image data is deleted through the interface 9109 or the file contents comprising the relevant data are intentionally made to be changed. Thus, the relevant image data is prevented from being sent normally.

In a case where the external device 9106 to which the relevant image data is to be sent comprises an external printer having a memory, the image data is temporarily stored in the memory and then the memory stored data is used in the printing action, processing similar to that mentioned above being performed so as to prevent the image data determined to be the special document from being normally sent.

Generally in a method, other than the above-mentioned methods, in which image data is sent to the outside, the image data is sent in the so-called plane sequence (that is, a method in which the data is sent so that the Y data for one page is sent; then the M data for the same page is sent; then the C data for the same page is sent; the Y data for the subsequent page is sent; . . . ). In this case, the last-color data, the C data in the above example, may be intentionally modified so as to prevent the regular sending.

The cases where image data is input through the scanner 9101 have been described. However, such an operation may be implemented in a case where image data is input through the external device 9106 and the same is output through the printer 9103.

Further, it may be that a controller 9106*a* for the external device 9106 is provided with software for system control. The controller 9106*a* controls, as mentioned above, timing in which the image data is input from/output to the external device 9106.

With reference to FIGS. 61A–61D, operation performed by the special document discrimination unit 9104 will be described.

Figure 61A:
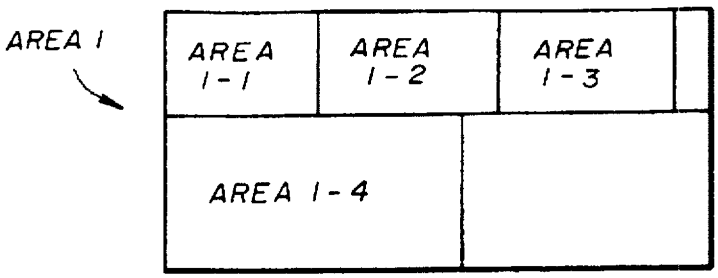
FIGS. 61A, 61B, 61C and 61D show diagrams for illustrating discrimination processing in the system of FIG. 60.

The bit map memory 9105 comprises an area 1 for previously storing, as shown in FIG. 61A, information concerning a plurality of special-document images. In a case of the FIG. 61A example, the information is stored as follows for example: information concerning the image on the front side of the ten-thousand-yen note in the Bank of Japan note; information concerning the image on the rear side of the ten-thousand-yen note; information concerning the image on the front side of the one-thousand-yen note; . . . are respectively stored in areas 1-1, 1-2; 1-3; . . . . Further, information concerning the image on predetermined securities notes is stored in an area 1-4.

Figure 61B:
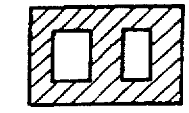
Figure 61C:
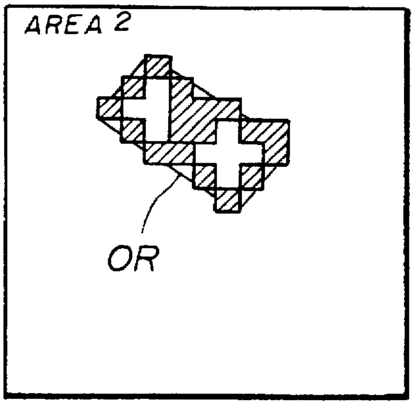
Figure 61D:
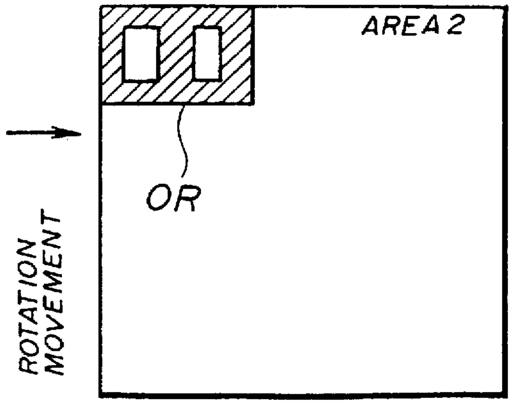

Further, the bit map memory 9105 comprises, as shown in FIGS. 61C and 61D, an area 2 for previously storing image data associated with an image resulting from extracting the background region such as described above (a region in which nothing is printed and the plain surface of the paper sheet is exposed) in the image corresponding to the image data input to the special document discrimination unit 9104.

The information concerning the respective special-document images stored in the above-mentioned area 1 may have the amount corresponding to the full sizes of the paper money and securities (that is, the amount for a case where the image is drawn at 400 dpi (dot per inch) pixel density for example and in two-value data). Alternatively, the same may have an amount corresponding to sizes which result from being properly reduced to a degree in which the objective discrimination accuracy will not be badly affected.

The above-mentioned area 2 has the capacity required for showing an image of A3 size in one color. It is also possible to have a capacity resulting from size reduction in a reduction ratio equivalent to the reduction ratio for the case of the area 1.

In the area 1-3 in the area 1, bit map information is stored such as that shown in FIG. 61B for example. FIG. 61B shows the contents which have been simplified. FIG. 61B corresponds to the image associated with the one-thousand-yen note shown in FIG. 11 for example. The shaded region therein corresponds to the above-mentioned background region, that is, with reference to FIG. 11, the shaded region at the peripheral 4 sides in FIG. 61B corresponds to the background region FR at the peripheral 4 sides in the one-thousand-yen note. The middle shaded region in FIG. 61B corresponds to the watermark region WM.

The system controller 9111 has stored, in a ROM not shown in the drawing, the background-region information concerning the special-document image previously set in the area 1 to be used as the discrimination reference in the above-mentioned bit map memory 9105. In a case where the special document discrimination unit 9104 is provided with a function of performing discrimination for the entirety of the respective Y, M, C and K color-component image data for example, if the data in each color undergoes the discrimination, the contents in the area 1 in the bit map memory 9105 are rewritten so that the corresponding above-mentioned background-region information as the discrimination reference comprises the background-region data in the relevant color. Such rewriting is performed by the system controller 6111 using the information stored in the above-mentioned ROM.

In a case where the special document discrimination unit 9104 use only one G-color image data in the discrimination operation in its function, it is sufficient that, at the time the system 9000 is powered up, the system controller 9111 performs one-time write into the area 1 in the bit map memory of the background-region information concerning the paper money or so as the above-mentioned discrimination reference corresponding to the relevant color.

The discrimination operation in the special document discrimination unit 9104 will be described. First, the image data corresponding to the above-mentioned background region in the image corresponding to the input image data is extracted. This extraction is carried out by a to-be-described background-region determination operation. The thus extracted background-region image data is expanded to a bit map in the area 2 in the bit map memory 6105 as shown in FIG. 61C. In the example of FIG. 61C, an example case is shown where the original image OR is obliquely example placed on the platen glass at the time of scanning.

Subsequently, on the data which has been expanded to be the bit map as shown in FIG. 61C, background-region outline tracing such as described above is performed. By this outline tracing, it is determined whether or not the original image corresponding to the image data has the outline common to the special document such as paper money. Further, it is also determined whether or not the outline on the background region generally corresponding to the 'watermark' in the special document corresponds to the paper money or so.

If it is determined that the outline of the original image OR comprises a rectangle, then only the OR-image region in the area 2 is rotated, reformed and shifted on the bit map. Thus, the image becomes as in FIG. 61D. By such an operation, the starting address and location of the bit map are respectively made to correspond to those associated with the reference-image background-region information stored in the area 1 shown in FIG. 61B. As a result, a comparison may be easily performed in which the corresponding background-region data in the input image data is compared with the reference background-region information stored in the area 1. By this comparison, it is determined whether or not the image data corresponds to the special document such as paper money or so which is the original of the reference background-region information.

Figure 62:
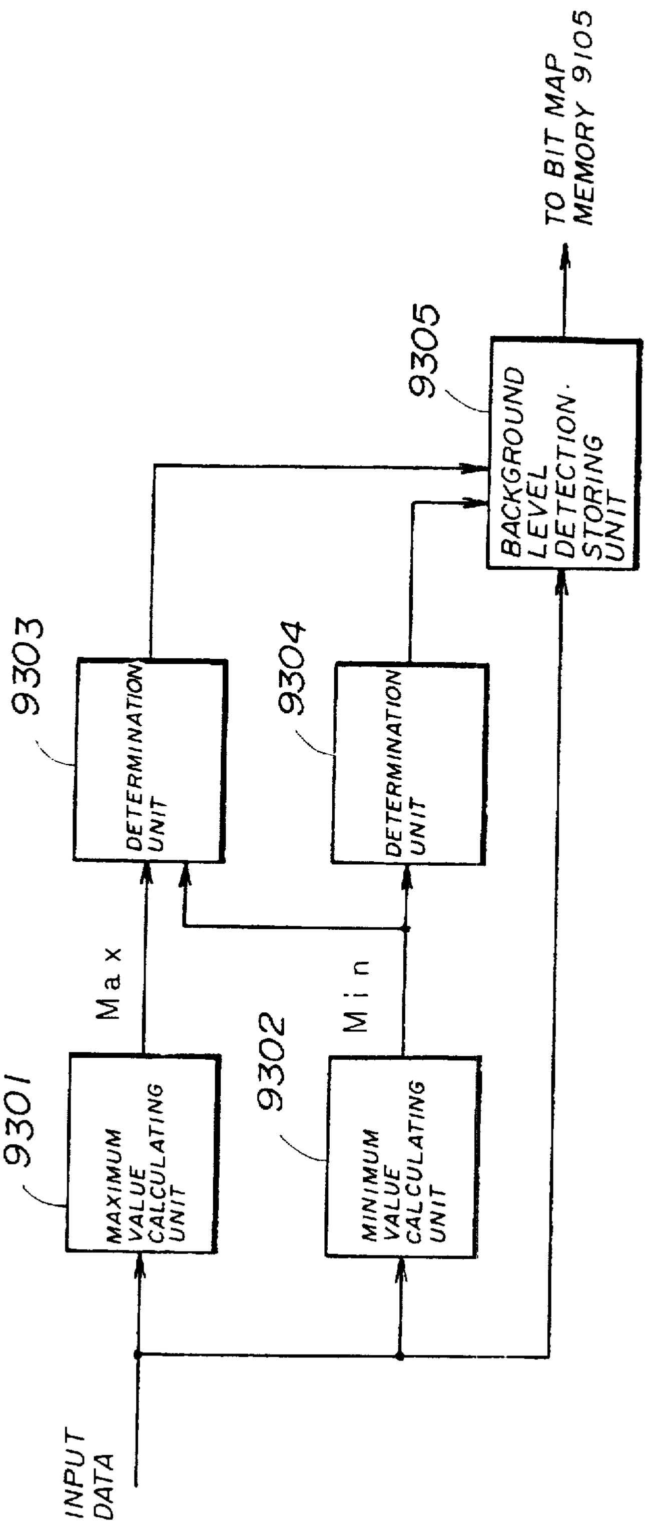
FIG. 62 shows a block diagram illustrating a plurality of elements for a background determination processing in the system of FIG. 60.

Next, the background-region determination operation for the above-mentioned extraction of the background-region data in the special document discrimination unit 9104 will be described with reference to FIG. 62.

The density level in the background region in the reference special document is previously stored and is taken to be a threshold value LThr. Further, it may be that the above threshold value is increased by approximately 10% (the density rises accordingly) so as to set another threshold value LThr having the increased value. Such an increase may be made as a result of considering variation which may be contained in the input image data.

The input image data is read for every pixel one by one. There, each time, 8 pixels are referred to, namely the pixels starting from the pixel ahead of the current pixel by 3 pixels to the pixel behind the current pixel by 4 pixels. A maximum value calculating unit 9301 obtains, as the maximum value Max, the image data associated with the pixel which has the maximum value (highest density) among the image data units respectively associated with the 8 pixels which have been thus referred to.

Subsequently, a minimum value calculating unit 9302 similarly obtains a minimum value Min (lowest density) from the image data units respectively associated with the 8 pixels. Then, in a determination unit 9302, it is determined whether or not the difference between the maximum value Max and minimum value Min is greater than a previously set threshold value RThr. Simultaneously, in a determination unit 9804, it is determined whether or not the minimum value Min is smaller than the above-mentioned threshold value LThr.

Further, a background level detecting and storing unit 9305 receives the respective determination results in the two determination units 9303 and 9304. If the proposition (RThr>Max-Min) and also (LThr>Min) is true, the unit 9305 detects the minimum value Min as a variable background level. The variable background level is updated successively each time the above-mentioned operation is performed for a current pixel.

Further, the final background region determination is made as follows: in a 3×3 (vertical)×(horizontal), total 9 pixels, a number of pixels exist each having image data the level of which is equal to or lower than the variable background level. If this number of pixels is more than a predetermined number, it is determined that the relevant area or the current pixel located at the center thereof corresponds to the background region. In such a method, it is preferable to appropriately change the above-mentioned 3×3, total 9 pixels to 9×9, total 81 pixels, for example, depending on the capacity of the bit map memory 9105.

Thus, in this embodiment, the information as the discrimination reference in the special document discrimination unit may be rewritten depending on the input image data types, input formats and so forth. Thus, these matters are handled as appropriate and suitable discrimination operation can thus always be achieved.

Further, since the background region which has a stable density level independent of printing conditions is used in the discrimination, accurate discrimination for the paper money or the like can be realized.

Further, the discrimination processing is performed on the relevant image data even if the image data is input as an electrical signal through an external device via a communication network, or even if the image data is input as a magnetic signal through a file and so forth. Further, the discrimination processing is performed on the relevant image data even if the image data is to be output as an electrical signal through an external device via a communication network, or even if the image data is to be output as a magnetic signal through a file and so forth. Thus, it is possible to effectively prevent forgery.

[EMBODIMENT IN TENTH ASPECT]

Duplicators in a plurality of embodiments in the tenth aspect of the present invention will be described.

These duplicators are duplicators having a special document discrimination function for discriminating as to whether or not image data associated with an input original image comprises a special document such as paper money, securities or so. One of these duplicators further comprises: Specifying means for selecting a desired duplication mode from among two duplication modes comprising a single color duplication mode and full color duplication mode; and control means for restricting the discrimination operation in the special document discrimination function if the single color duplication mode is selected through the specifying means.

The above-mentioned restriction of the discrimination operation comprises degrading the discrimination accuracy in the discrimination operation if the single color duplication mode is selected.

One of these duplicators further comprises: variation ratio specification means for changing the size of the original image; and control means for restricting the discrimination operation in the special document discrimination function if the size variation ratio for the original image specified by the size variation ratio specifying means comprises a size variation ratio other than unity.

The above-mentioned restriction of the discrimination operation comprises degrading the discrimination accuracy in the discrimination operation if the single-color duplication mode is selected.

One of these duplicators further comprises: automatic original carrying means for automatically carrying the paper sheet comprising the relevant original image in the duplication operation relevant to the original image; and control means for restricting the discrimination operation in the special document discrimination function if the duplication operation using the automatic original carrying means is performed.

The above-mentioned restriction of the discrimination operation comprises degrading the discrimination accuracy in the discrimination operation if the single-color duplication mode is selected.

One of these duplicators further comprises: duplication side determination means for determining whether or not, in a double sided duplication mode in which a plurality of images are respectively realized on the front side and rear side of a recording paper sheet, the duplication operation to be then performed comprises printing onto the rear side of the recording paper sheet; and control means for restricting the discrimination operation in the special document discrimination function if it is determined that the duplication operation to be then performed comprises printing onto the rear side of the recording paper sheet.

The above-mentioned restriction of the discrimination operation comprises degrading the discrimination accuracy in the discrimination operation if the single-color duplication mode is selected.

One of these duplicators further comprises: rear side image detecting means for determining whether or not, where the image corresponding to the data concerning the original image is realized on one side of a recording paper sheet, a certain image has been realized on the other side of the relevant recording paper sheet; and control means for restricting the discrimination operation in the special document discrimination function if, where one side of a recording paper sheet is used for the realization, a certain image has been realized on the other side of the relevant recording paper sheet.

The above-mentioned restriction of the discrimination operation comprises improving the discrimination accuracy in the discrimination operation if the single-color duplication mode is selected.

By provision of such constructions, the discrimination accuracy is restricted under the condition where there is little possibility of the illegal duplication being performed. Thus, it is possible to reduce, to the necessary minimum limit, degradation in the natural work efficiency relevant to the duplicator. Under such a duplication condition where the possibility of the illegal duplication being performed is low, that is, in the case of single color duplication mode for example, even if the illegal duplication is attempted, it is easy to distinguish the thus duplicated paper from the special document used as the original image therefor, such as paper money for example. That is, such a duplicated matter is seen to do no real harm.

These respective embodiments in the tenth aspect of the present invention will be described in detail.

First the first embodiment in the tenth aspect of the present invention will be described.

This embodiment, as described above, restricts the discrimination operation in the above-mentioned special document discrimination means (special document discrimination unit 10105 presently described) if the 'single color duplication mode' is specified, in which mode the possibility of the illegal duplication being performed is low.

Figure 63:
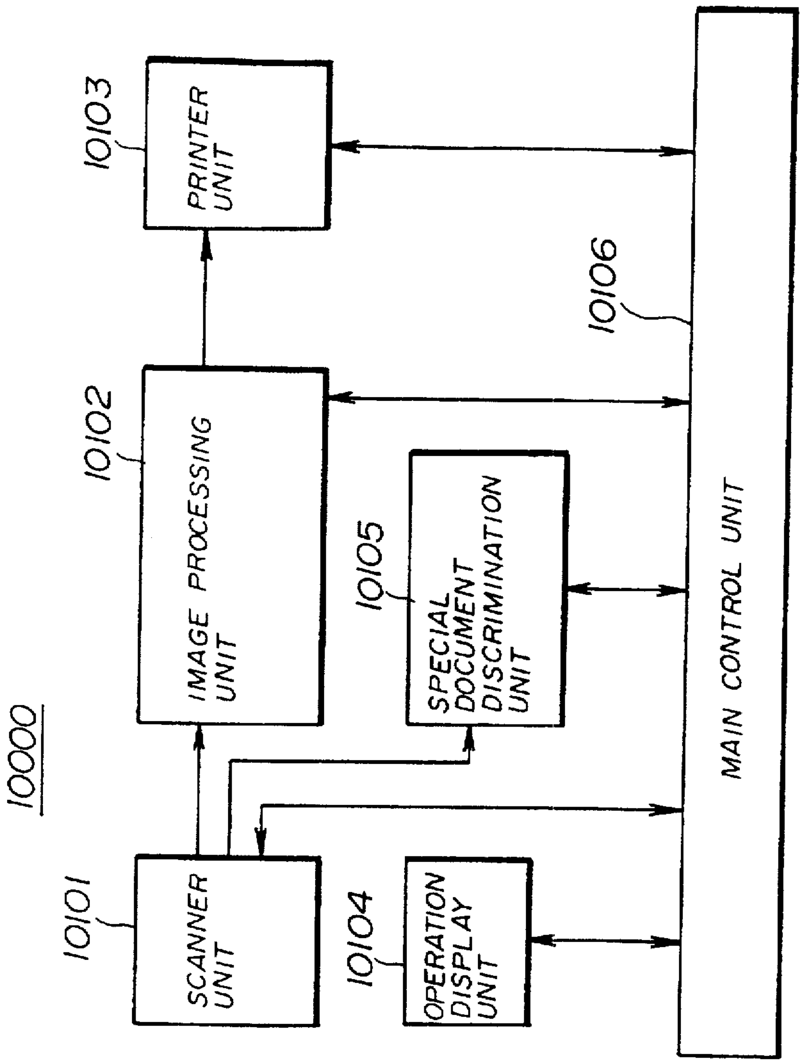
FIG. 63 shows a block diagram common to respective duplicators with special-document discrimination functions in the first through fourth embodiments of the tenth aspect of the present invention.

With reference to FIG. 63, the construction of a duplicator 10000 including the special document discrimination function in the first embodiment of the tenth aspect of the present invention will be described.

This duplicator 10000 comprises: scanner unit 10101 for inputting an original image; an image processing unit 10102 for performing on the thus input image data shading correction processing, δ correction processing, tone processing and so forth such as described above; a printer unit 10103 for realizing the corresponding image on a recording paper sheet in accordance with the image data, on which the various processing has been thus performed; operation display unit 10104 for setting various duplication modes such as described above, setting the number of duplicated sheets and so forth; a special document discrimination unit 10105 for discriminating, based on the contents in the image data input through the scanner unit 10101, as to whether or not the original image comprises the special document such as paper money, securities or so; a main control unit 10106 for controlling the above-mentioned respective components.

Figure 64:
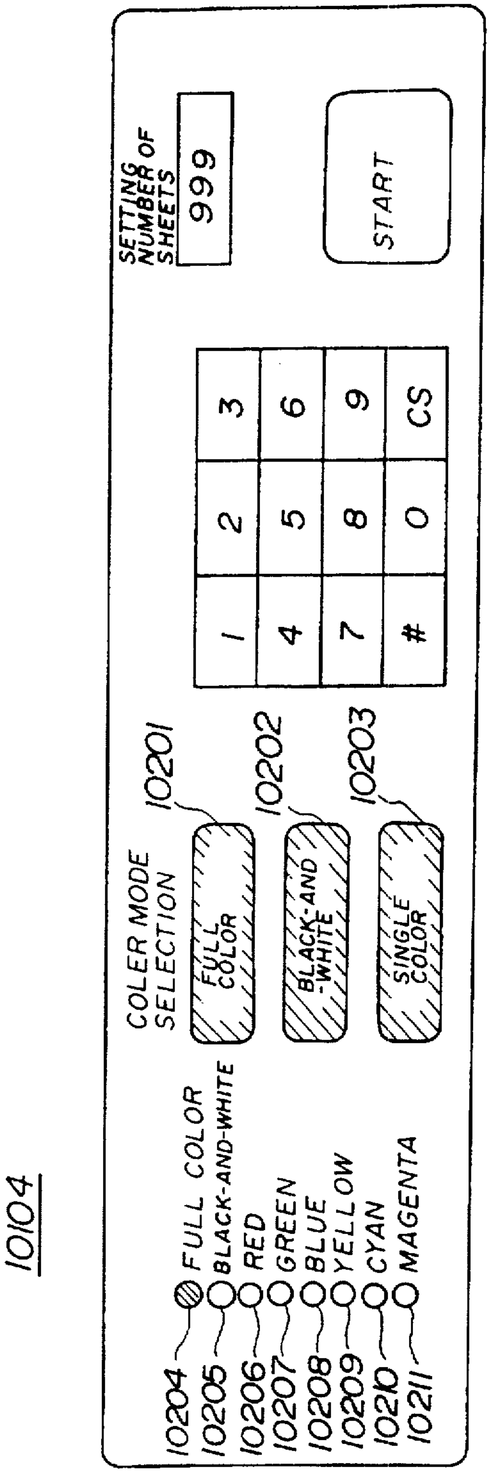
FIG. 64 shows a diagram illustrating a construction of an operation/display unit of the duplicator in the first embodiment among the four kinds of duplicators of FIG. 63.

With reference to FIG. 64, the operation associated with the operation display unit 10104 in the duplicator in the first embodiment having such a construction will be described.

FIG. 64 only shows parts relevant to the first embodiment in the control display unit 10104 in the duplicator 10000. Other provisions may be added thereto as appropriate.

In this embodiment, the operation display unit 10104 acts as the above-mentioned specifying means for switching between the single color duplication mode/full color duplication mode as described above. As shown in FIG. 64, the operation display unit 10104 comprises a full color key 10201 for specifying the full color duplication mode in a case where any color mode is to be specified; black-and-white key 10202 for specifying the white and black duplication mode in the same case; single color key 10202 for specifying the single color duplication mode in the same case; and indicators 10204-10211 for displaying the thus selected type of color mode so as to inform the operator of the mode.

Figure 65:
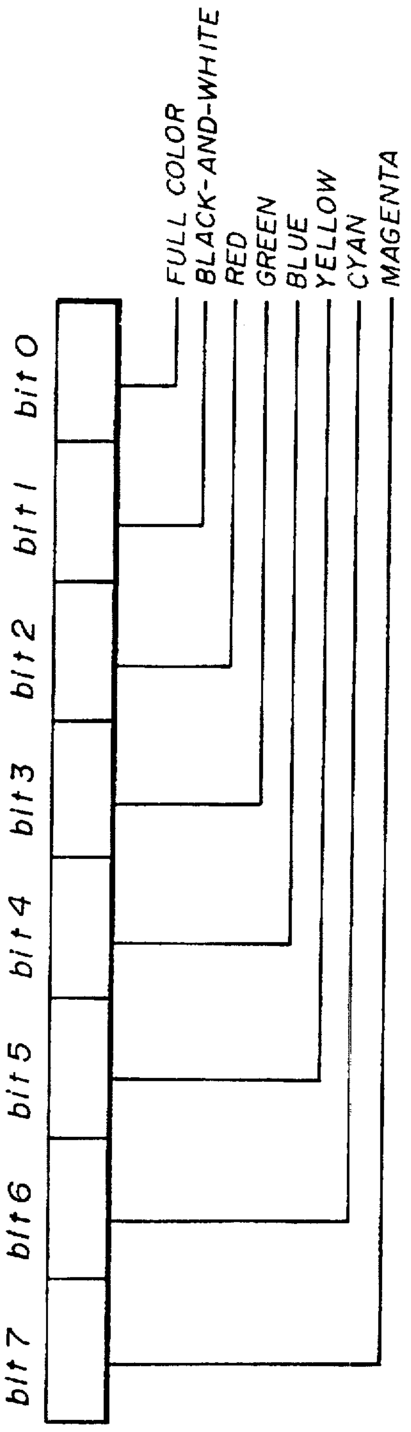
FIG. 65 shows a diagram illustrating a data construction used for controlling the display in the operation/display unit of FIG. 63.

Data to be used for determining the display of these indicators 10204-10211 is allocated as one byte in a RAM included in the operation display unit 10104 as shown in FIG. 65. Of the bits 0-7, '1' is set exclusively as a result of the respective color mode specifications. That is, '1' can be set in only one bit among the bits 0-7, total 8 bits.

Figure 66:
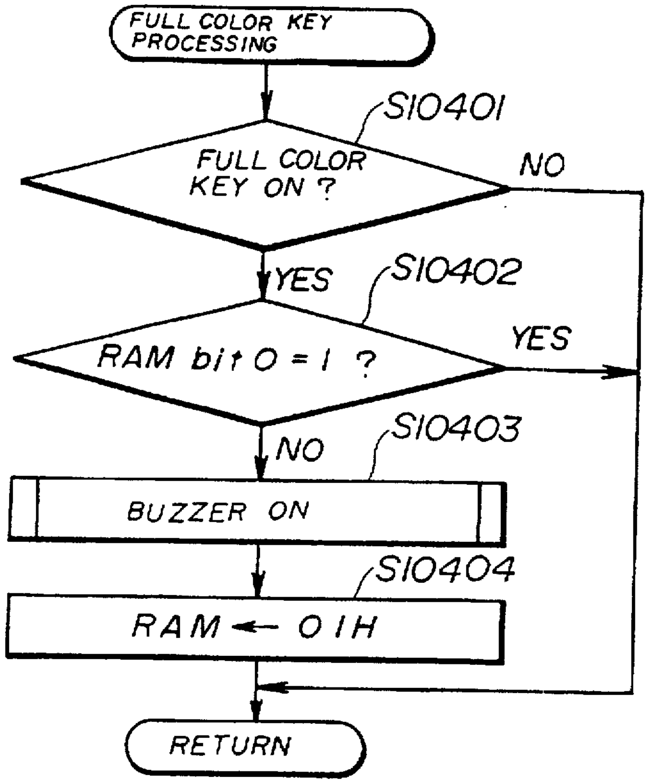
FIG. 66 shows a flow chart of processing selected by means of a full-color key on the operation/display unit of FIG. 64.
Figure 67:
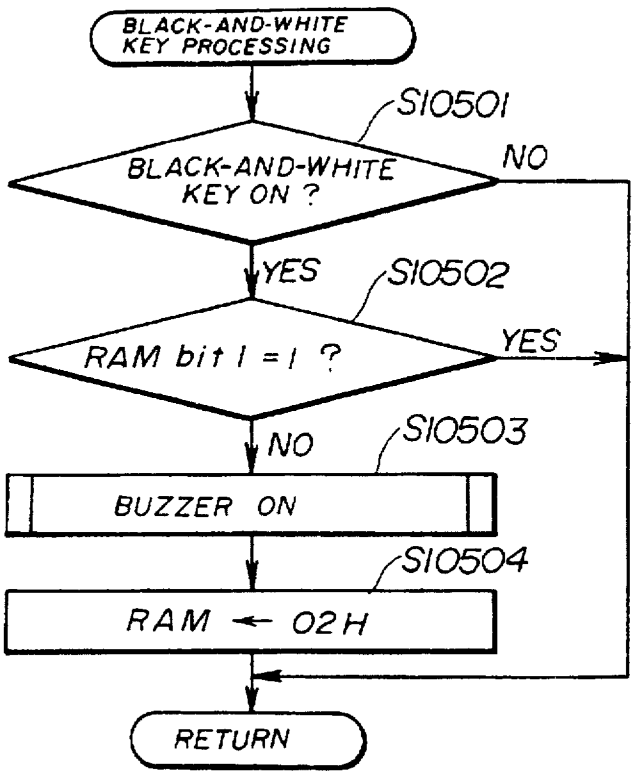
FIG. 67 shows a flow chart of processing selected by means of a white/black key on the operation/display unit of FIG. 64.
Figure 68:
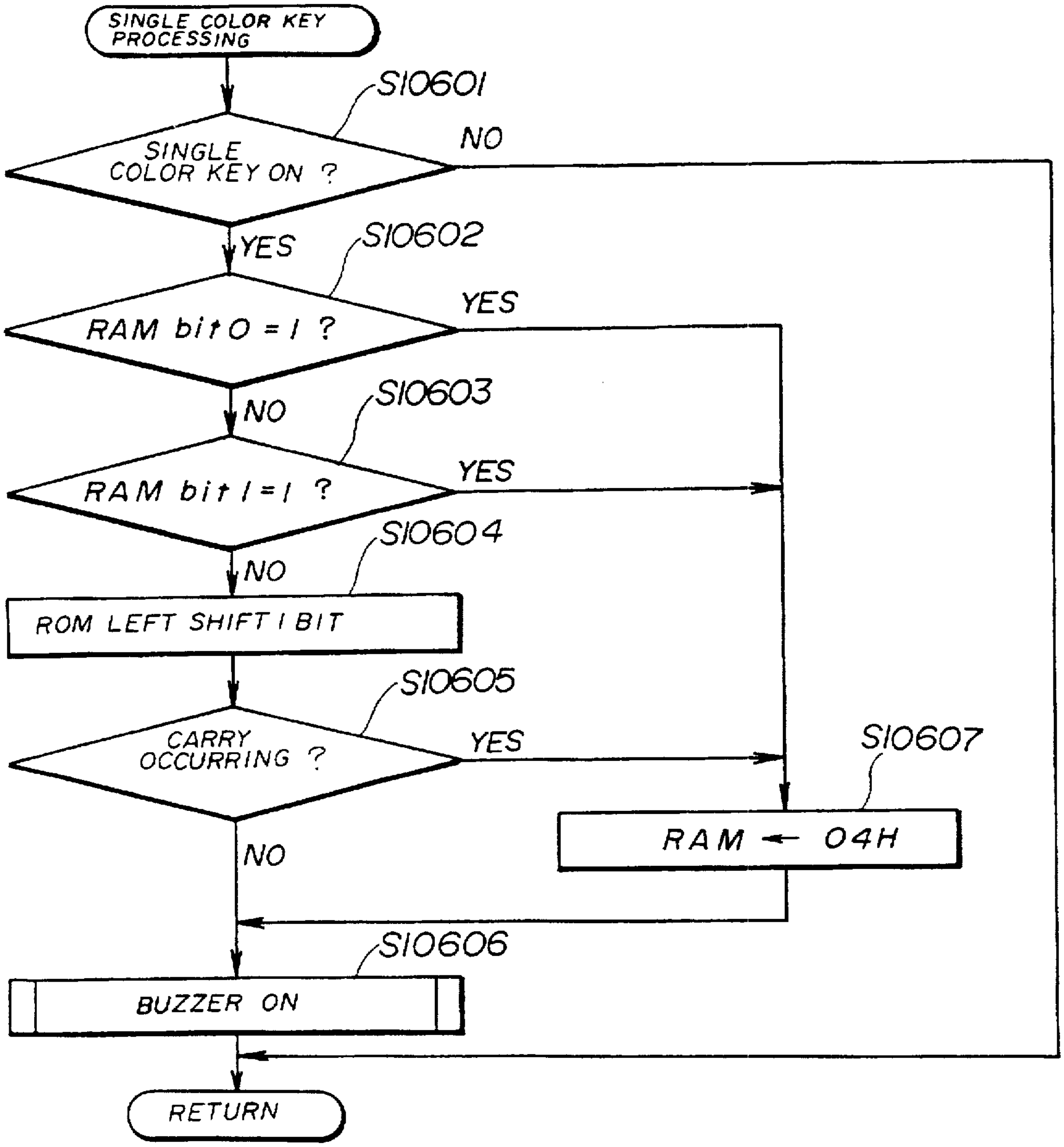
FIG. 68 shows a flow chart of processing selected by means of a single-color key on the operation/display unit of FIG. 64.

With reference to FIGS. 66-68, the key input processing in the case of the color mode selection and the above-mentioned RAM bit setting process in the duplicator 10000 in the first embodiment having such a construction will be described.

As shown in FIG. 66, if the full color key 10201 is pressed in S10401, the operation display unit 10104 determines in S10402 whether or not the current color mode already comprises the full color mode with reference to the bit 0 content in the RAM. Bit 0=1 means that the full color mode has been already set. Accordingly, no other operation is performed and the processing shown in FIG. 66 is terminated.

If it is not that bit 0=1, a buzzer sound is generated in S10403 so as to inform the operator that 'the mode is to be set at this time'. Then, in S10404, O1H (hexadecimal), that is, the bit series '00000001' in binary, is set in the RAM and the processing is terminated.

The processing to be performed if the black-and-white key 10202 is pressed is similar to this. As shown in FIG. 67, if the black-and-white key 10202 is pressed in S10501, the operation display unit 10104 determines in S10502 whether or not the current color mode already comprises the black-and-white mode with reference to the bit 1 content in the RAM. The bit 1=1 means that the black-and-white mode has been already set. Accordingly, no other operation is performed and the processing shown in FIG. 67 is terminated.

If it is not that bit 1=1, a buzzer sound is generated in S10503 so as to inform the operator that 'the black-and-white mode is to be set at this time'. Then, in S10504, 02H (hexadecimal), that is, the bit series '00000010' in the binary, is set in the RAM and the processing is terminated.

The processing to be performed if the single color key 10203 is pressed is as follows. As shown in FIG. 68, if the single color key 10203 is pressed in S10601, the operation display unit 10104 determines in S10602 and S10603 whether or not the current color mode already comprises the single color mode by referring to both bit 2 and bit 1 in the RAM. The bit 0=1 or bit 1=1 means that the single color mode is not currently set. Then, in S10607, 04H (that is, the bit series '00000100' in the binary) is set in the RAM so as to change the current mode into the single color mode. In S10606, the buzzer sound is generated in S10503 so as to inform the operator that 'the black-and-white mode is to be set at this time'.

On the other hand, if neither the bit 0=1 in S10602 nor the bit 1 =1 in S10603, the single color mode in a certain color has been already set. Thus, each bit in the RAM is left shifted by one bit in S10604. Thus, the currently set color in the single color mode is changed to another color, that is the subsequent color.

If YES in S10605, that is, if a carry occurs as the result of such bit shifting, 04H ('0000100') is set in the RAM in S10607. Then, in S10606, the buzzer sound is generated so as to inform the operator that 'either the single color mode is to be set or the color in the single color mode is changed, at this time'.

By the operation shown in FIG. 68, every pressing of the single color key 10103 causes the color in the single color mode to be changed to the subsequent color one by one. Thereby, the single color mode in a desired color is selected from among 6 colors, red, green, blue, yellow, cyan, and magenta in the respective indicators 10206-10211.

The construction in the above-mentioned special document discrimination unit 10105 and operation thereof will be described.

The construction and operation may be implemented by combining one or a plurality of technologies disclosed in other aspects of the present invention and/or the prior art. It is not necessary to limit them to a specific method in particular.

The special document discrimination unit 10105 in the first embodiment of the tenth aspect of the present invention performs, on the image data input through the scanner unit 10101, color filter processing such as the above described MTF or the like, the well-known picture/text separation processing, the well-known edge emphasizing processing (that is, the peripheral region of the display objects is emphasized so that the objects may be clearly distinguished) and so forth for example. Thereby, the image data in the image region corresponding to the vermilion seal region in the paper money for example is extracted from the relevant image data.

There is the possibility that the relevant original image does not comprise the paper money of the Bank of Japan. Thus, extracting the image region corresponding to the vermilion seal from the original image means extracting a circular region having a 4 mm radius for example.

Further, the image associated with the character lying inside of the thus extracted circular region is extracted. Then, the features of the extracted characters are recognized. In this case, there is a possibility that the original image is placed on the platen glass so that it is made inclined of various angles. Thus, there is a case where the thus extracted character image data corresponding to a character is rotated at a certain angle.

In order to recognize the features in the character based on such character image data, the relevant image-data is manipulated. Thus, the character image is rotated through various angles. Then, for each angle, the data is collated with a character image in a previously produced dictionary under the condition where the character is placed at a predetermined angle. The character image included in the dictionary comprises one or a plurality of images corresponding to the character drawn inside the vermilion seal region in the special document such as paper money which the special document discrimination unit 10105 takes as the reference discrimination object. If 'agreement'results from such comparison and collation, the discrimination unit 10105 determines that the original image comprises the special document.

Figure 69:
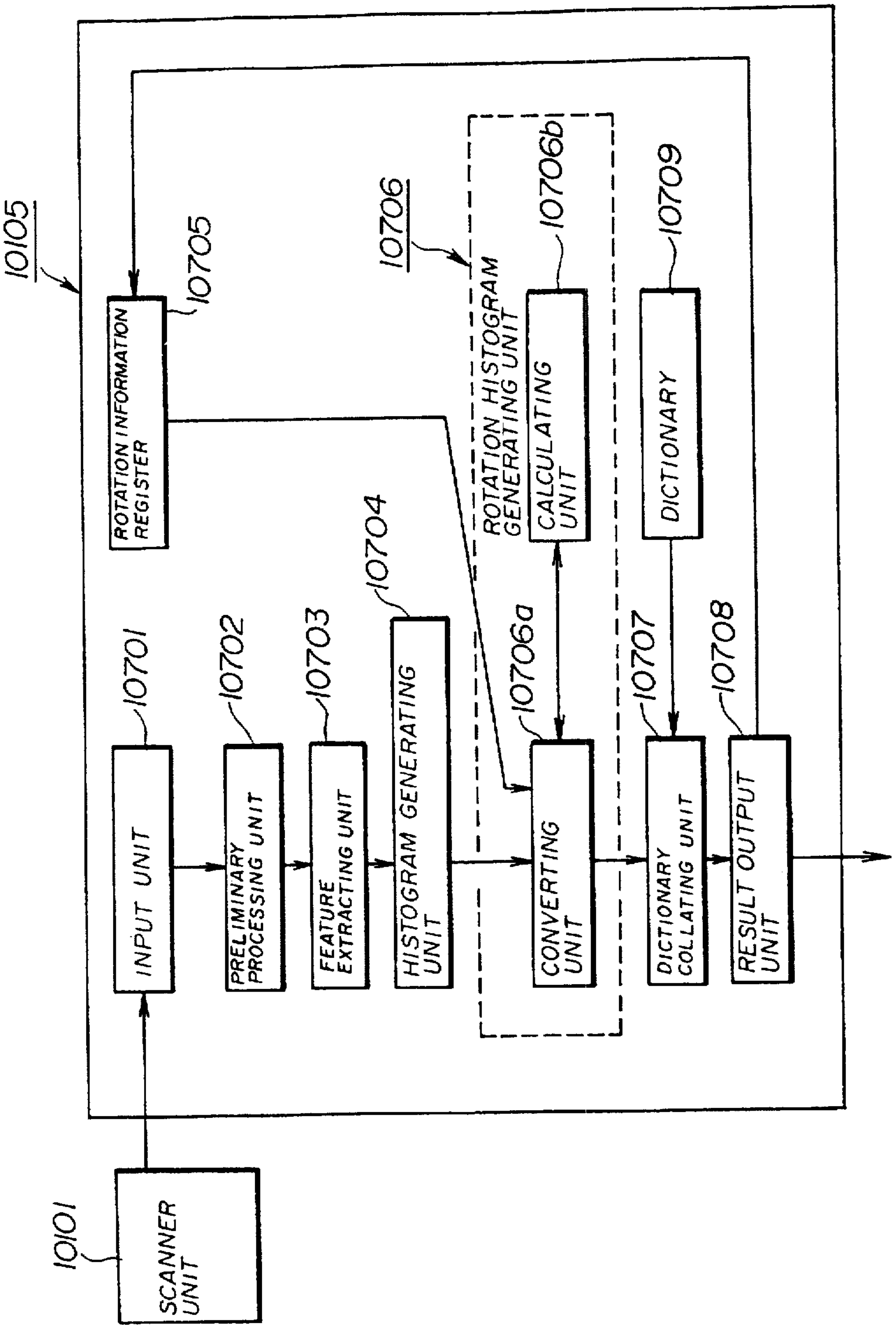
FIG. 69 shows a block diagram of a special-document discrimination unit of the duplicator in the first embodiment among the four kinds of duplicators of FIG. 63.

With reference to FIG. 69, the construction of the special document discrimination unit 10105 will be described.

This unit 10105 comprises: an input unit 10701 for receiving the binary original-image data from the scanner unit 10101; a preliminary processing unit 10702 for extracting the character-image data from the thus received binary image data and removing noise from the extracted image data; a characteristics extracting unit 10703 for extracting the characteristics in the character image from the thus noise-free image data; a histogram generating unit 10704 for generating the corresponding histogram based on the thus extracted characteristics; rotation information register 10705 for storing therein the rotation angle of the character image as described above; rotation histogram generating unit 10706 for rearranging the plurality of elements constituting the thus generated histogram depending on the rotation angle stored in the rotation information register 10705, thereby generating the rotation histogram; a dictionary collating unit 10707 for performing a dictionary collating as described above on the generated rotation histogram, thereby determining the candidate character; a result output unit 10708 for outputting the collation identifying result; and dictionary 10709 for previously storing therein reference histograms respectively concerning the images, such as described above and in the unrotated form, of one or a plurality of characters lying inside the vermilion seal region and so forth in the special document such as paper money which is used as the reference in the discrimination processing in the special document discrimination unit 10105.

The rotation histogram generating unit 10706 further comprises a converting unit 10706*a* and calculating unit 10706*b*.

An operation flow performed by means of the special document discrimination unit 10105 having such a construction will be described with reference to FIG. 70.

In S10801, the input unit 10701 receives the binary image data from the scanner unit 10101, the preliminary processing unit 10702 extracts the character-image data from the input image data and removes noise from the extracted data.

Then, in S10802, the characteristics in the character image are extracted from the thus noise-free character image data. This characteristics extraction is implemented so that the outline of the character image is extracted, and a direction code is assigned to each element constituting the extracted outline. The direction code corresponds to the direction perpendicular to the direction along the outline.

Figure 71A:
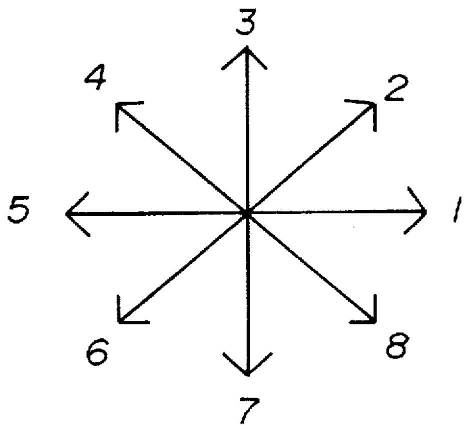
Figure 72:
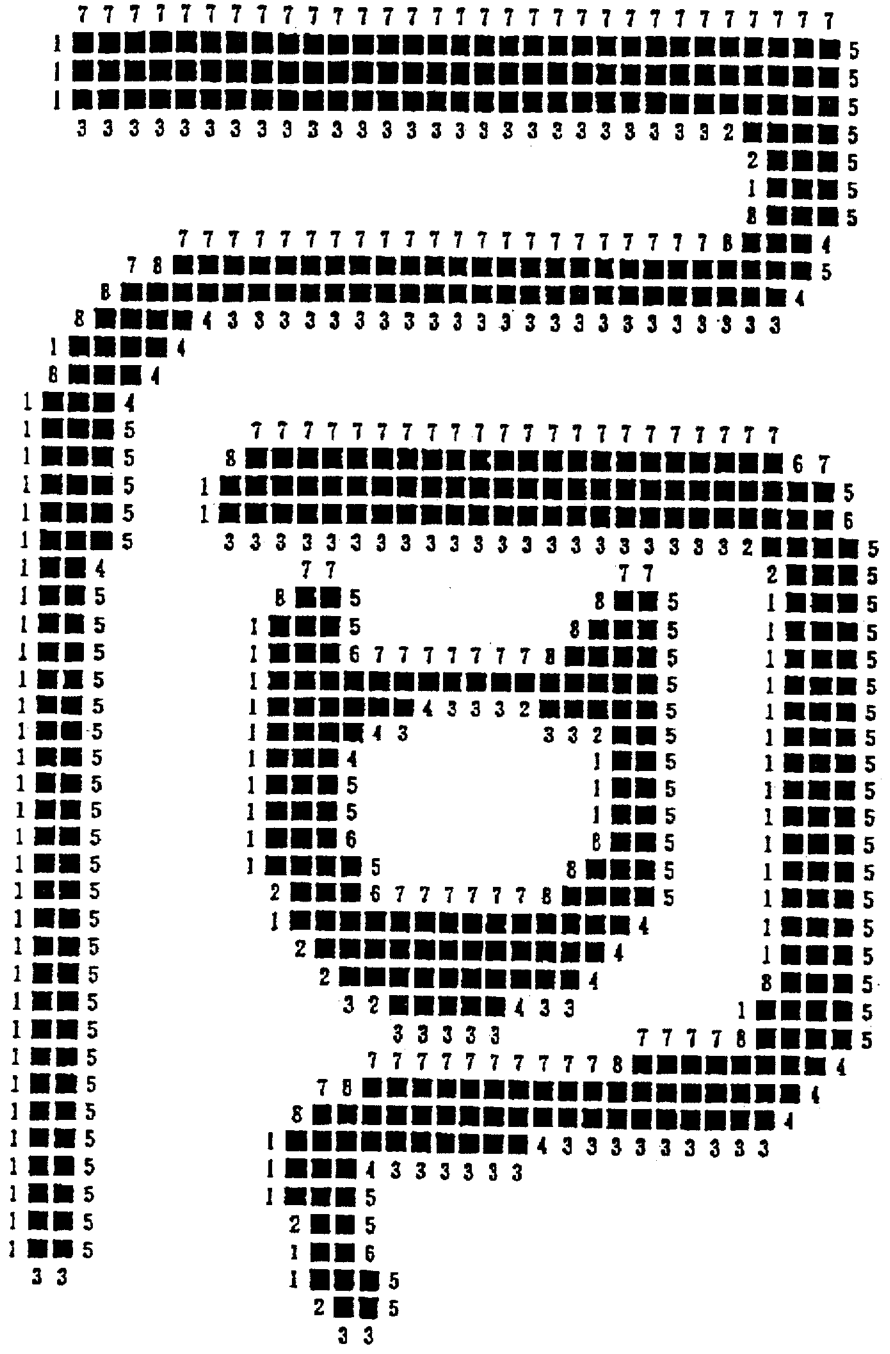
FIG. 72 shows a diagram illustrating an example in which a contour of a character image [illegible] at a rotation angle of 0 is extracted and then the direction codes are added in the processing in the unit of FIG. 69.

Such direction codes are prepared for a total 8 directions shown in FIG. 71A. FIG. 72 illustrates the result of the direction codes being assigned, as described above, to the outline of the character image of the character '卐' for example.

Subsequently, in S10803, the histogram generating unit 10704 uses the direction codes which have been thus assigned to the character image. Thereby, the unit 10704 generates the corresponding histogram for each extracted character. The histograms are referred to as character code histogram and illustrated in FIG. 71B for example. The thus generated character code histogram will be referred to as characteristics H.

In S10804, the thus generated histogram undergoes rearrangement as presently described according to the rotation angle stored in the rotation register 10705. Thereby, the rotation histogram is generated. Subsequently, the dictionary collating unit 10707 performs dictionary collating such as described above on the thus generated rotation histogram in S10805, and S10806.

If the collating result comprises 'the rotation histogram concerning the extracted character image agrees with the previously stored histogram concerning the character image in the special document', the determination is made in S10808 that the original image comprises the special document. Then, this fact is output as the discrimination result.

On the other hand, if the collating result is 'non-agreement', the rotation-angle value stored in the rotation information register 10705 is altered in S10807. Then, the rotation histogram further undergoes the rearrangement according to the altered rotation-angle value in S10804. Thus, the new rotation histogram is generated. Then, in S10805, the new rotation histogram undergoes further dictionary collating such as described above.

Thus, the register 10705 is rewritten by predetermined various rotation angles. Each time, the corresponding rotation histogram is generated and the generated rotation histogram undergoes the dictionary collating. During such an operation, if any one of the rotation histograms in the respective iterations agrees with the reference histogram in the dictionary 10709, the result that the original image comprises the special document is output in S10808. Then, the processing in FIG. 70 is terminated. If no rotation histogram agrees with the reference histogram during the operation, it is determined that the original image does not comprise the special document. This is output and the processing is terminated.

In one example of such an operation, a case where the character '卐' inside the vermilion seal on the rear side (side on which no human being's face is printed) of the Bank of Japan note is extracted will be concretely described with reference to FIGS. 72-75.

In FIGS. 72-75, the outline of the character '卐' is coded using the direction codes shown in FIG. 71A as described above.

Figure 73:
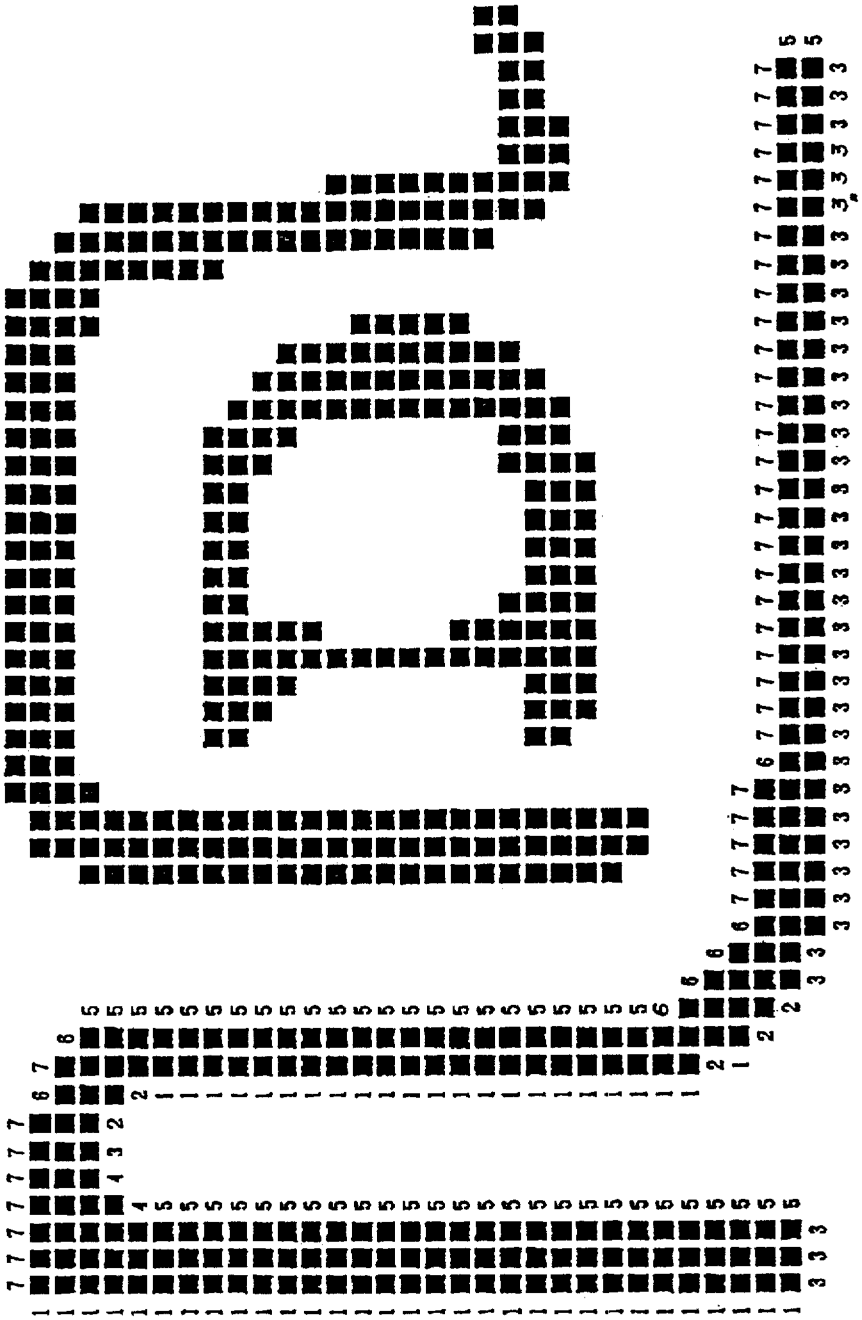
FIG. 73 shows a diagram illustrating an example in which a contour of a character image [illegible] at a 90-degree rotation angle is extracted and then the direction codes are added in the processing in the unit of FIG. 69.
Figure 74:
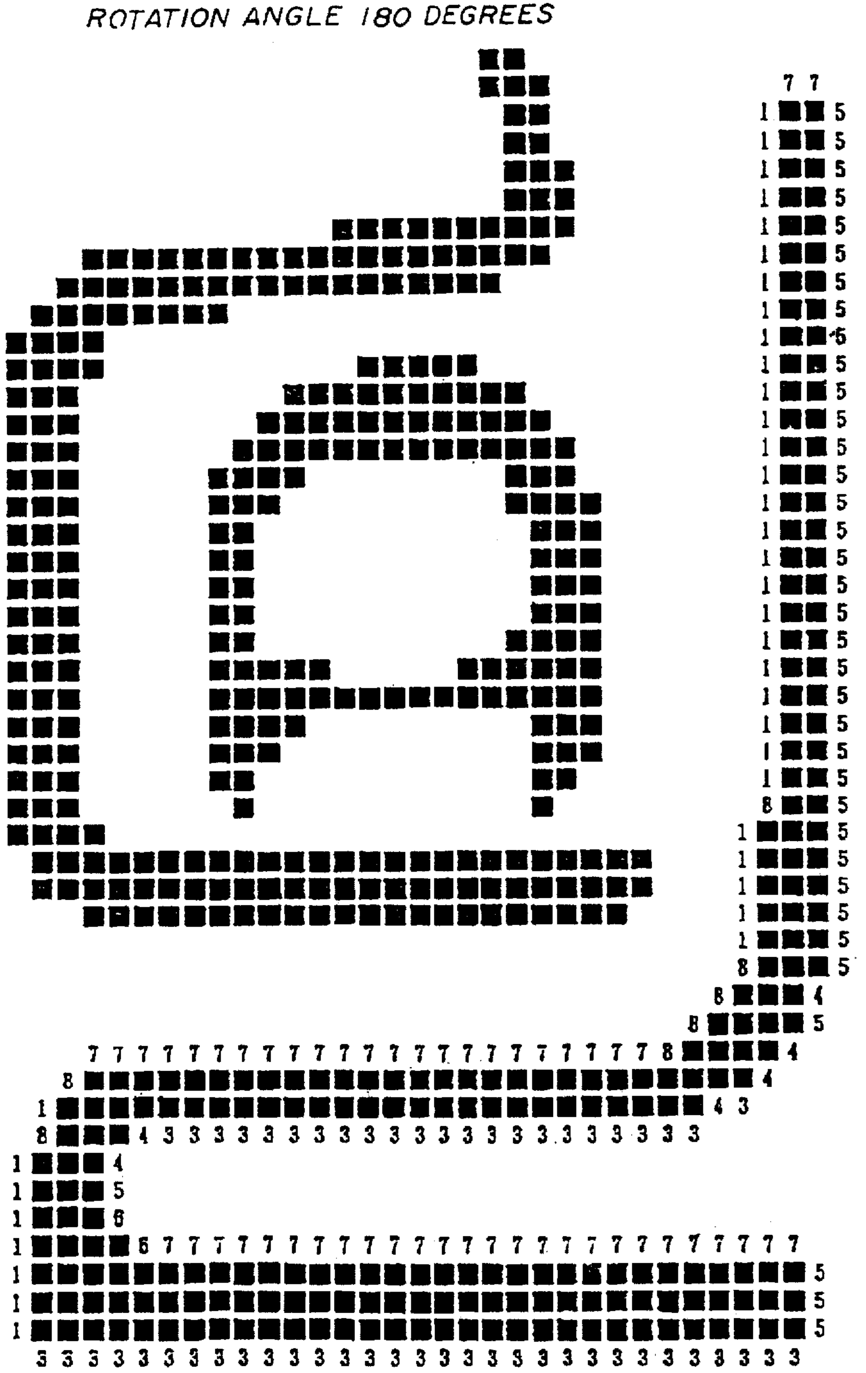
FIG. 74 shows a diagram illustrating an example in which a contour of a character image [illegible] at a 180-degree-rotation angle is extracted and then the direction codes are added in the processing in the unit of FIG. 69.
Figure 75:
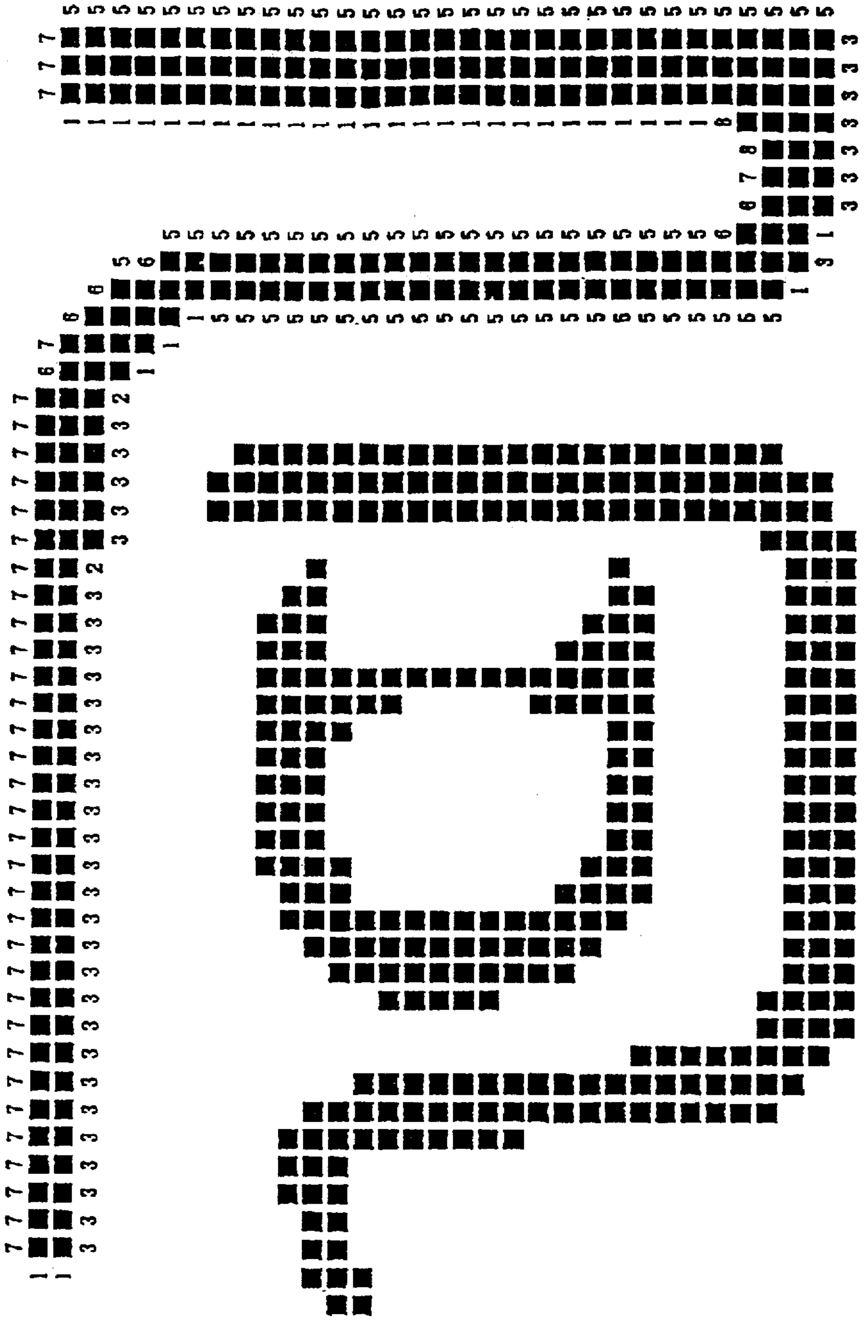
FIG. 75 shows a diagram illustrating an example in which a contour of a character image [illegible] at a 270-degree rotation angle is extracted and then the direction codes are added in the processing in the unit of FIG. 69.

If the paper money is placed on the platen glass in a manner in which the paper money has been rotated for 90 degrees at the time the scanner unit 10101 reads, the character image '卐' is extracted in S10801 as shown in FIG. 73. That is, in FIG. 73, this character is rotated rightward for 90 degrees.

The outline of this character image is direction-coded as shown in FIG. 73 in the characteristics extracting unit 10703 in accordance with the thus extracted character image data. The direction codes assigned as a result of the direction coding as described above are indicated in FIG. 73 for a part of the outline portion of the character.

These direction codes are converted into the histogram as described above in the histogram generating unit 10704. As of this time, '0 degrees' has been written as rotation angle information in the register 10705. Thus, a rearrangement, based on the rotation angle, of the histogram is not performed. Accordingly, the rotation histogram generating unit 10706 passes the input histogram data therethrough intact, outputting it.

The output histogram is compared with the reference histograms stored in the dictionary 10709. At present, the image data associated with the character image '卐' is the data corresponding to the state thereof where the character image has been rotated for degrees. Thus, the reference histogram concerning the unrotated character '卐' does not agree with the histogram concerning the relevant input character image.

In this case, the value in the register 10705 is the altered in S10807, that is, the initial value of '0 degrees' as described above is rewritten to '90 degrees'. Then, the histogram concerning the input character image is rearranged correspondingly to the relevant rotation angle as will be described. The thus obtained rotation histogram is compared with the reference histogram. Such an operation is repeated until the result of S10806 becomes YES, that is, until the relevant rotation histogram agrees with the reference histogram. However, if the result in S10806 does not become YES even if the input character image has been rotated for 270 degrees (subsequently to being rotated 90 degrees and then 180 degrees, for example), it is determined that the original image does not comprise the paper money.

Next, the method for generating, based on the value in the rotation information register 10705, the rotation histogram data from the with the histogram data output from the histogram generating unit 10704 will be described.

In one example, the data output from the histogram generating unit 10704 comprises a plurality of direction codes such as shown in FIG. 73. The rotation histogram generating unit 10706 performs an operation that rotates the above character image 90 degrees, thus the plurality of direction codes shown in FIG. 72 being obtained. That is, in this case, the character shown in FIG. 72 is generated as a result of rotating the character shown in FIG. 73 90 degrees clockwise .

The state in FIG. 72(, that is, where the rotated angle comprises 0 degree, where no rotation has been made), is compared with the state in FIG. 73(, that is, where the rotated angle comprises 90 degrees, that is, where the state in FIG. 72 has been rotated 90 degrees counterclockwise). As a result, in the example, the direction code "1" in FIG. 73 being altered into "7" then comes to agree with the corresponding direction code in FIG. 72. Similarly, the direction code "2" in FIG. 73 being altered into "8" then becomes in agreement with the corresponding direction code in FIG. 72. Thus, after "6" is added to each direction code in FIG. 73, the resulting value agrees with the respective direction code in FIG. 72.

Thus, by adding 6 to each code of the direction codes constituting the relevant histogram, the respective direction-code values are obtained. The values to be obtained, constituting the relevant rotation histogram, would be obtained after rotating the relevant character image 90 degrees clockwise. Thus, performing the operation 'add 6 to' results in the desired function in the rotation histogram generating unit 10706 being achieved.

However, in this processing, if the result exceeds 8 after adding 6 thereto, the value obtained by subtracting 8 from the result value is used as the output of the rotation histogram generating unit 10706.

Thus, the direction-code conversion by means of such numeral-value conversion may be implemented by the following equation (10-1):

$$D=(d+C)\text{MOD } 8; \qquad (10\text{-}1)$$

where d is the direction-code value before the conversion is performed;

c is a constant depending on the rotation angle (the constant comprising 0 for 0 degree; 6 for 90 degrees; 7 for 180 degrees; and 2 for 270 degrees, for example); and D is the direction-code value after the conversion is performed.

MOD indicates taking the remainder value obtained in dividing the integers, positioned before and after the MOD sign, by one another. In one example, (A MOD B) means the remainder value in (A÷B).

These rotation angles are not necessarily limited to the above four (0 degrees, 90 degrees, 180 degrees and 270 degrees). The differential value may comprise a smaller value than 90 degrees, 45 degrees (0 degree, 45 degrees, 90 degrees, . . . ). Using smaller differential angle improves the discrimination accuracy. That is, the discrimination becomes possible even if the original is placed on the duplicator after rotating it for 45 degrees.

Further, the number of pixels (the plurality of small squares in FIG. 72 for example) constituting the character image may be increased, thereby the number of direction codes to be assigned to the character outline being increased. Thereby, the discrimination accuracy can be further improved. That is, by increasing the number of pixels, discrimination errors can be reduced such as when the character '[illegible]' is provided, and is determined not to comprise the paper money, if the outline shape thereof is slightly different from the character outline shape in the paper money.

However, the discrimination processing speed tends to be lengthened if the differential angle in the rotation angle is thus made to be small and/or if the number of pixels constituting the character is increased. As a result, the natural work efficiency in the duplicator cannot be prevented from being degraded. Therefore, such a decision may be made after totally considering various factors. However, any results are in the scope of the tenth aspect of the present invention.

The response operation in the duplicator 10000 in the first embodiment of the tenth aspect of the present invention will be described with reference to FIG. 76, which response operation is performed for the signal output by the special document discrimination unit 10105 as a result of the above-mentioned operation.

The main control unit 10106 performs this response operation, for the output from the special document discrimination unit 10105, as a part of the duplication operation in the duplicator 10000.

In S11401, the duplication start key on the duplicator is operated. Thereby, the duplication operation is activated. In S11401, it is then determined whether or not the bit 0 in the above-mentioned RAM is '1'. The bit 0=1 means that the duplicator 1000 has been set to be in the full color mode. Therefore, the discrimination operation shown in FIG. 70 is performed (because there is a good possibility of forgery duplication in the full color mode).

Figure 70:
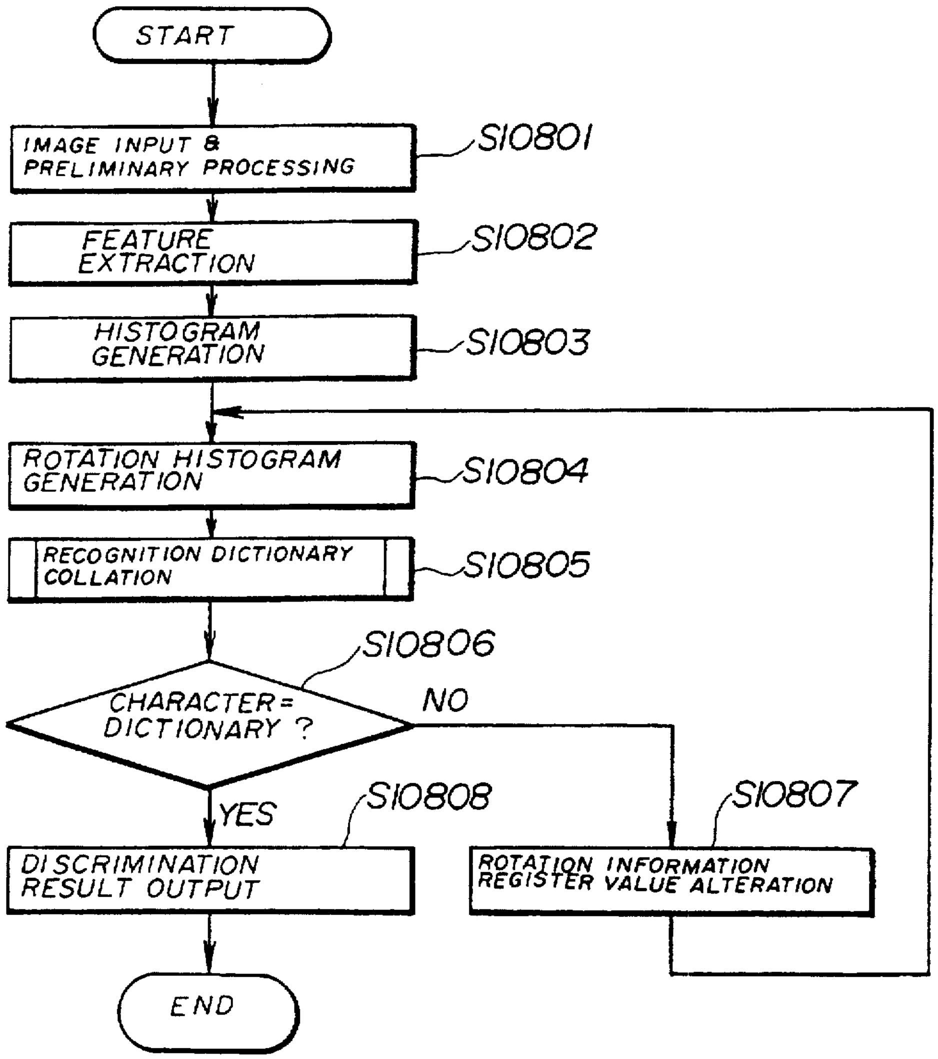
FIG. 70 shows a flow chart of operations performed by the unit of FIG. 69.
Figure 76:
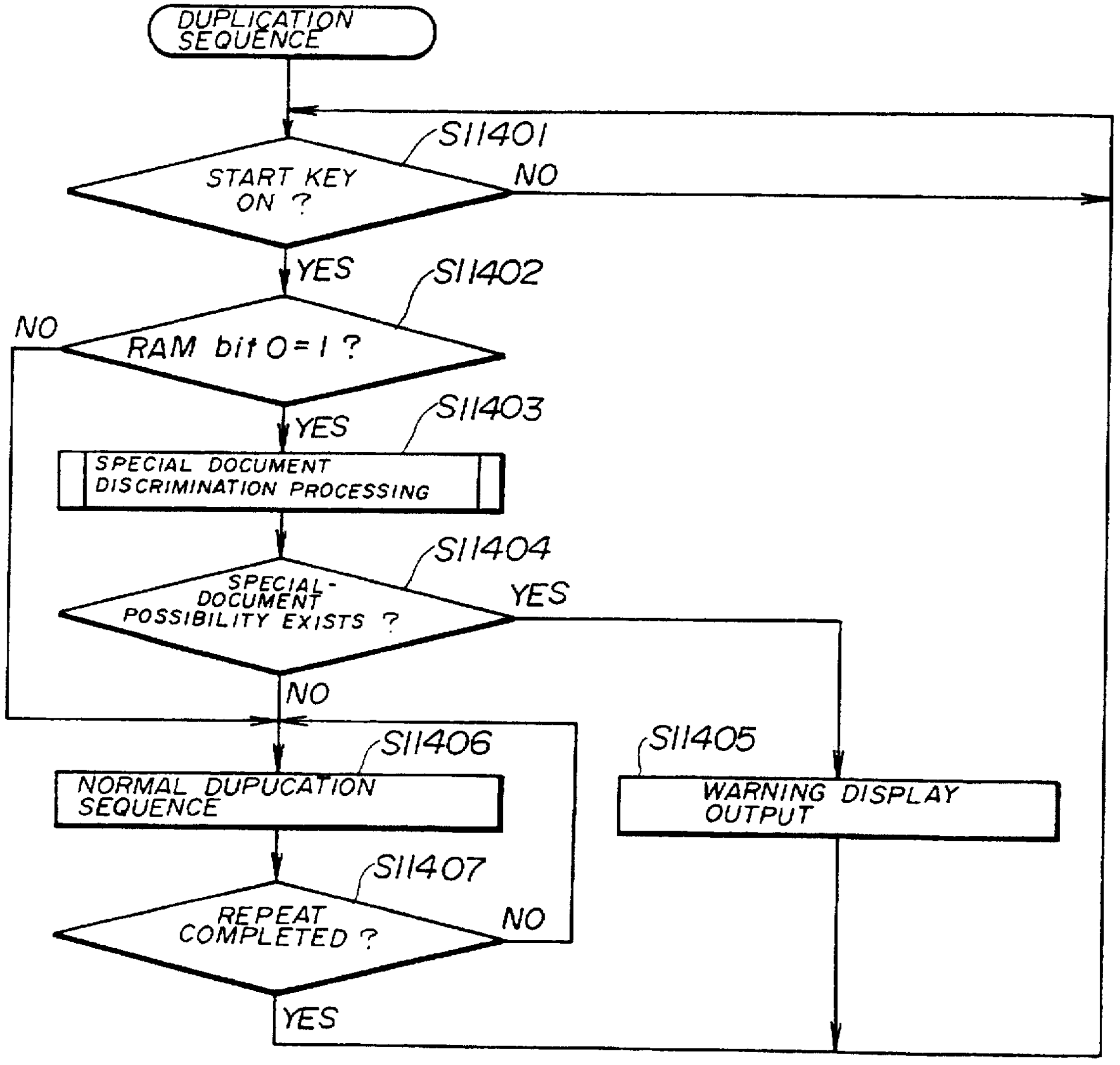
FIG. 76 shows a flow chart of a duplication sequence in the duplicator in the first embodiment of the tenth aspect of the present invention.

If the result of the operation of FIG. 70 which is represented by S11403 and S11404 in FIG. 76 is that 'the original image comprises the special document', this matter is displayed on the operation display unit 10104 in S11405, thereby warning the operator. Then, the normal duplication sequence will not be performed and the state returns to the state before the above-mentioned duplication start key has been pressed.

On the other hand, if the determination result in S11404 comprises 'the original image does not comprises the special document', the normal duplication sequence will be performed until the completion of repeating. Repeating means repeating duplication operation in a case where a plurality of copies of an original are specified, for example.

If it is not that the bit 0=1 in S11402 then the single-color duplication mode including the black-and-white duplication mode as described above has been set. Because there is little possibility of illegal duplication, and distinguishing from the true paper money or so is easy even if the illegal duplication has been made, no real harm is considered to occur, and the discrimination operation in S11403 and S11403 is not performed. Then, the normal duplication sequence is performed and the original image is duplicated.

Thus, in this first embodiment, the discrimination processing in the special document discrimination unit 10105 is omitted in the single-color duplication mode. In this mode, it is considered and that there is little possibility of illegal duplication and no real harm occurs even if it is performed. By this omission, duplication time reduction may be enabled in such a case. Further, the relevant discrimination processing is performed in the full color duplication mode in which there is good possibility of illegal duplication. Thus, degradation in the discrimination function is substantially little.

The second embodiment of the tenth aspect of the present invention will be described.

In contrast to the above-mentioned first embodiment in which the discrimination operation in the special document duplication unit 10105 is not performed if the single color duplication mode including the black-and-white duplication mode has been set, the duplication operation in the special document duplication unit 10105 is performed but in reduced discrimination accuracy in such a case of the duplication mode in which there is little possibility of illegal duplication, in the duplicator in the second embodiment.

In the description of the second embodiment, the parts already described in the description of the first embodiment is omitted. That is, excepting the contents to be now described, the construction and operation in the second embodiment are similar to those in the first embodiment.

The operation flow performed in the duplicator in the second embodiment will be described with reference to FIG. 77.

The main control unit 10106 performs, as a part of the duplication sequence, discrimination-accuracy alteration as mentioned above such that the discrimination accuracy in the discrimination operation in the special document discrimination unit 10105 is reduced or the thus reduced discrimination accuracy is returned to its original level, in the second embodiment.

Figure 77:
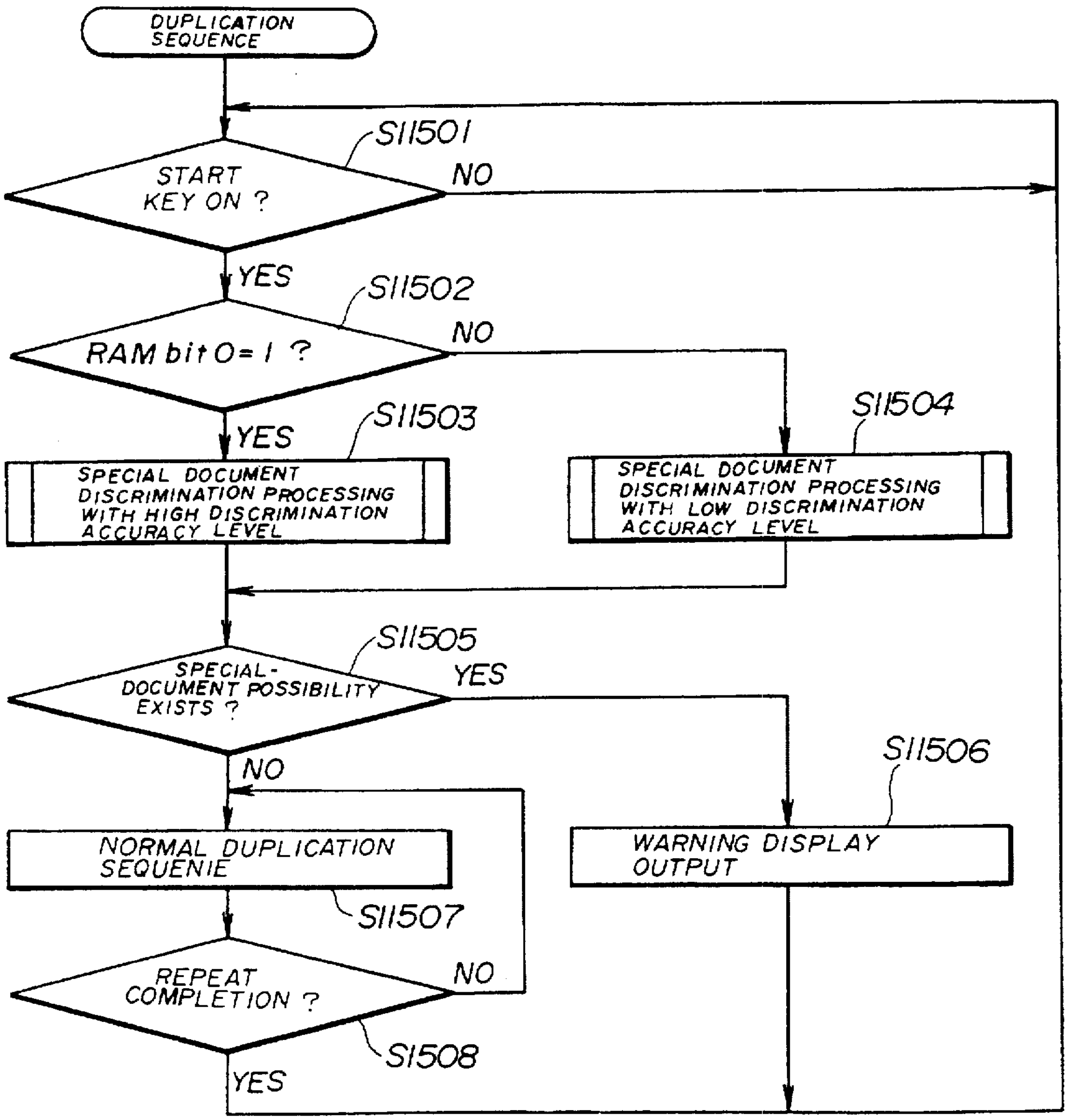
FIG. 77 shows a flow chart of a duplication sequence in the duplicator in the above second embodiment of the tenth aspect of the present invention.

The duplicator's operation in the second embodiment in FIG. 77 is substantially identical, except for the operation contents presently described, to the above-mentioned duplicator's operation in the first embodiment in the flow chart in FIG. 76, the relevant description being thus omitted.

If YES is obtained in S11502, that is, if it is determined that the relevant duplication mode comprises the full color duplication mode, the special document discrimination unit 10105 performs the duplication operation with a relatively high discrimination accuracy in S11503. On the other hand, if NO in S11052, that is, if it is determined that the relevant duplication mode does not comprise the full color duplication mode, the special document duplication unit 10105 performs the discrimination operation with a relatively low discrimination accuracy in S11053.

The discrimination operation with relatively high or low discrimination accuracy may be implemented by making the differential value small or great used in altering the value in the rotation information register 10705 in S10807 in FIG. 70. That is, the discrimination operation, in which the alteration of the value in the rotation information register 10705 is made with the 90-degrees differential value, giving 0 degrees, 90 degrees, 180 degrees and 270 degrees as described above, may be assigned to the above-mentioned low-discrimination-accuracy discrimination operation. The discrimination operation, in which the alteration of the value in the rotation information register 10705 is made with the 45-degrees differential value, giving 0 degrees, 45 degrees, 90 degrees, . . . as described above, may be assigned to the above-mentioned high-discrimination-accuracy discrimination operation.

Thus, in the second embodiment, the discrimination accuracy is reduced in the discrimination processing in the special document discrimination unit 10105 in the single color duplication mode. In this mode, it is considered that there is little possibility of the illegal duplication and no real harm occurs even if it is performed. By such discrimination accuracy reduction, duplication time reduction may be enabled in such a case. Further, the relevant discrimination processing is performed in the full color duplication mode in which there is a good possibility of illegal duplication. Thus, degradation in the discrimination function is less than in the case of the above-mentioned first embodiment of the tenth aspect of the present invention.

The third embodiment of the tenth aspect of the present invention will be described.

In the duplicator in this third embodiment, the discrimination operation in the special document discrimination unit 10105 is not performed if the 'size variation ratio'setting comprises the setting other than the 'unity'magnification, as described above.

In the description of this third embodiment, the parts already described in the description of the first embodiment is omitted. That is, excepting the contents to be now described, the construction and operation in this second embodiment are similar to those in the first embodiment.

Figure 78:
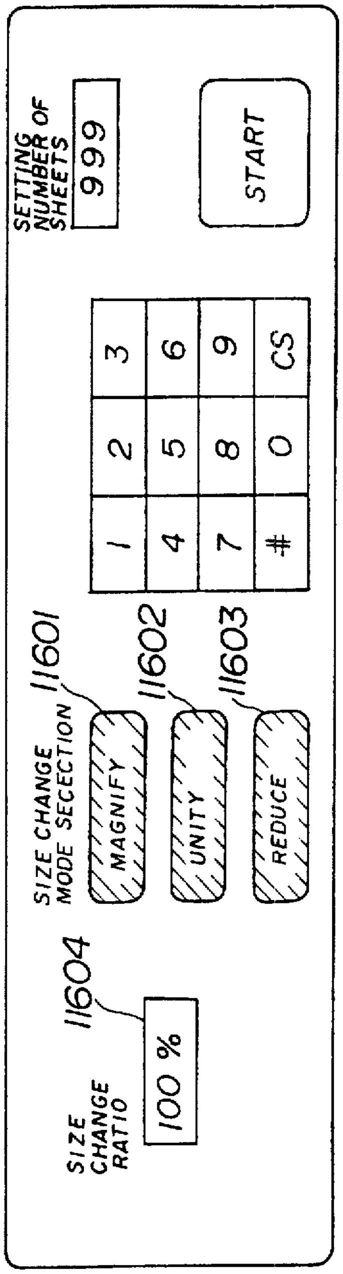
FIG. 78 shows.

With reference to FIG. 78, the construction of the operation display unit 10104 used in this embodiment will be described. However, FIG. 78 shows only the elements relevant to this embodiment for the convenience in the description. Any other elements may be added thereto naturally as appropriate.

In this embodiment, the operation display unit 10104 acts as the above-mentioned size-change ratio setting means for setting the above-mentioned size change ratio. This operation display unit 10104 comprises: a magnify key 11601 for specifying a desired magnifying size change ratio from among a plurality of (fixed) magnifying size change ratios which have been previously prepared in the size-change ratio selection for selecting the size change ratio; an unity key 10602 for specifying the 'unity'as the size change ratio; a reduce key 11603 for specifying a desired reducing size change ratio from among a plurality of (fixed) reducing size change ratios which have been previously prepared in the size-change ratio selection for selecting the size change ratio; and size change ratio display unit 11604 for indicating the thus specified size change ratio, thereby informing the operator of the relevant value.

Figures 79A, 79B:
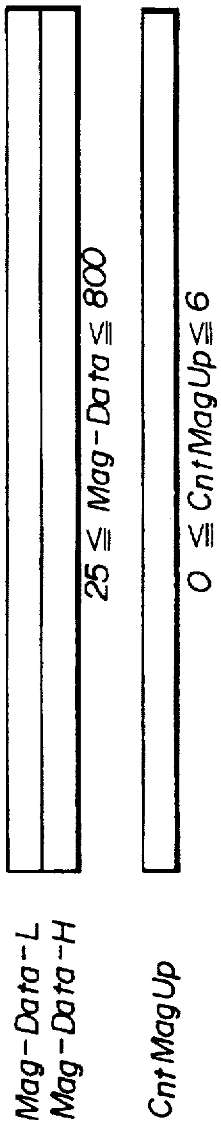
FIGS. 79A and 79B show respective data constructions displayed on the operation/display unit of FIG. 78.

The data to be displayed on the size change ratio display unit 11604 is allocated to two bytes as shown in FIG. 79A, in a RAM which the operation display unit 11604 has, as Mag-Data-L and Mag-Data-H. In this embodiment, the size change ratio may be set in the range 25%–800%.

In such a construction, the key input accepting procedure in the size change ratio selection and bit setting operation will be described with reference to FIG. 80.

When the magnify key 11601 is pressed in S11801, the operation display unit 10104 adds 1 to a magnifying magnification specification counter (referred to as CntMagUp, hereinafter) in S11802. Thus, the magnifying magnification specification is made. One byte such as that shown in FIG. 79B in the above-mentioned RAM is used in the CntMagUp specification. This specification may be made in the range 1–6. If the CntMagUp value becomes 7 in S11803 as a result of being incremented, then the same is returned to be 0. Then, a buzzer is sounded in S11805, thereby it being informed that the size change ratio has been thus set.

Subsequently in S11806 and S11809, the CntMagUp value and TB-M-Up (a data table shown in FIG. 81A) are used so that a fixed size change data is set on the above-mentioned Mag-Data-L/H. Concretely, the CntMagUp value is multiplied by 2. Then, the fixed magnification value in the TB-Mag-Up data table is referred to in a base index addressing method based on the TB-Mag-Up. Then, the thus referred-to fixed magnification is set on the Mag-Data-L/H. By such processing, the previously prepared plurality of magnifying fixed size change ratio values may be used in the alteration in sequence as follows: 115% to 121% to 141% to 200% to 300% to 400% to 800% to 115% to . . . . Thereby, specification of a desired fixed size change ratio is enabled.

Figure 80:
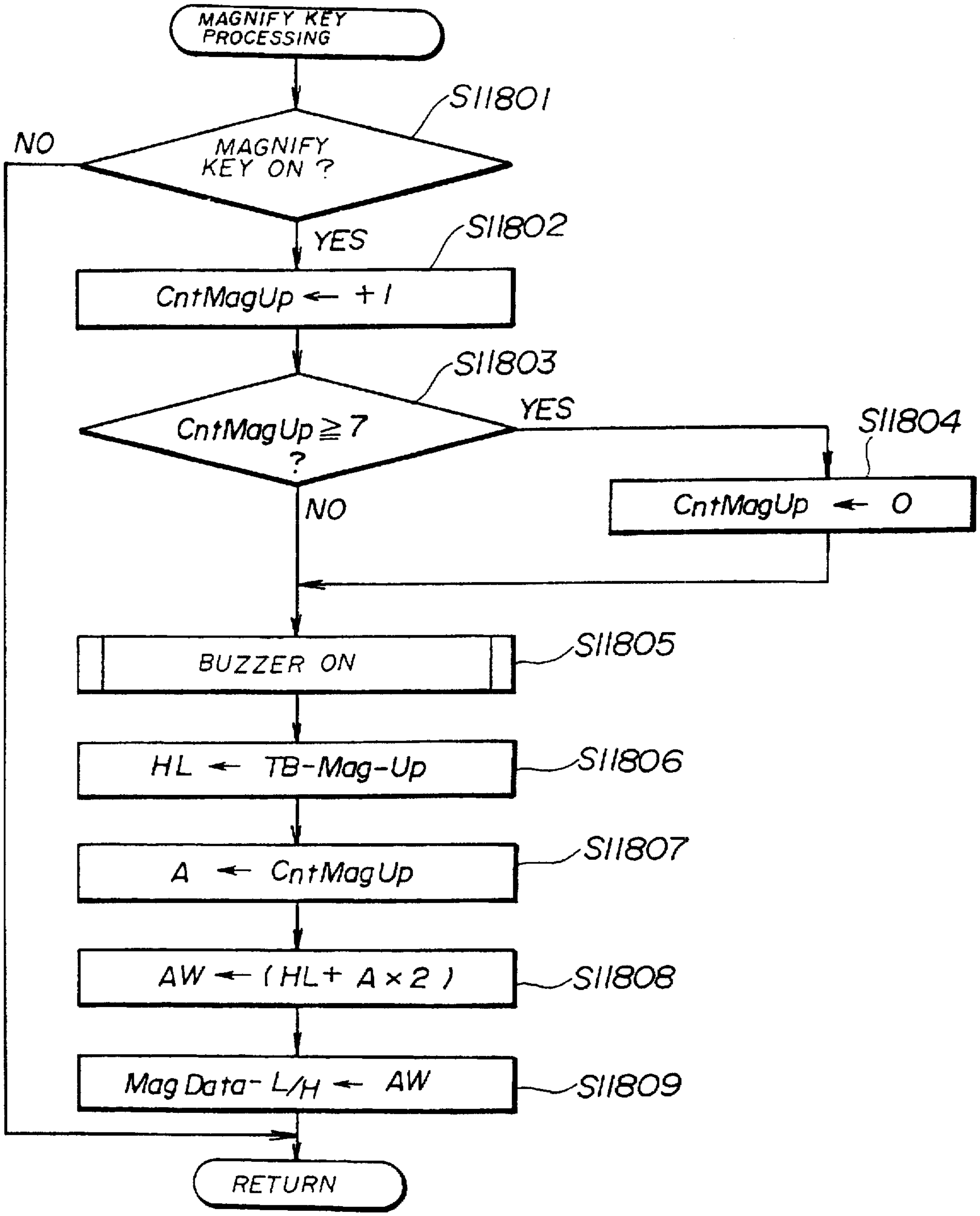
FIG. 80 shows a flow chart of an operation selected by means of a magnification key on the operation/display unit of FIG. 78.

The operation in FIG. 80 will be further described.

The initial state is taken to be that CntMagUp, indicating how many times the magnify key has been pressed, is '0'.

If the magnify key is pressed in S11801 under the condition where CntMagUp=0, then CntMagUp is incremented in S11802. Thus, CntMagUp becomes 1.

In S11803, the buzzer is sounded because CntMagUp is 1.

In S11806, the TBMagUp address is entered into a register which is referred to as an H register and is used to store therein an address in a CPU. This TBMagUp address comprises the start address at which the fixed magnification 115% in FIG. 81A is contained.

In an example, the number 8000 is taken as this start address. Since magnification data comprises 2 byte data, the contents in the successive two bytes, numbered 8000 and 8001, are 115, indicating 115%.

Data 121 for the 121% is written in successive two bytes, numbered 8002 and 8003.

In S11806, the contents in the HL register comprises 8000 in this example.

In S11807, the CntMagUp is entered into an accumulator. That is, A=1.

In S11808, the value obtained as a result of multiplying the accumulator A value by two is added to the HL register value. The address contents indicated by the resulting value is stored in register AW.

The reason for multiplying by 2 is that since the fixed magnification data comprises two-byte data, the address is taken in two byte skipping manner.

In S11808, 121 is used to substitute for the AW address, which 121 is the contents at the address 8002 resulting from 8000+1·2 in this example.

In S11809, the value 121 indicating 121% is stored in RAM at the address indicated by MagData (H/L) which is a container for a location storing the magnification.

By repeating such processing, the magnification data is altered from 121% to 141% to 200% to 300% to 400 to 800% to 115% to 121% to . . . .

Similarly to the magnify key processing with the use of the magnify key 11601, the reduce key processing using the reduce key 11603 is as follows. With the use of a data table TB-Mag-Down shown in FIG. 81B, the previously prepared plurality of reducing fixed size change ratio values may be used in the alteration in sequence: 93% to 82% to 71% to 62% to 50% to 25% to 93% to . . . Thereby, specification of a desired fixed size change ratio is enabled.

Next, an operation in the third embodiment of the tenth aspect of the present invention will be described with reference to FIG. 82, which operation is one for controlling (halting) the discrimination operation in the special document discrimination unit 10105.

The main control unit 10106 performs the process concerning the discrimination operation control, as part of the duplication sequence, concerning the duplication operation which is one as the duplicator's inherent use.

If a duplication start key is pressed in S12001, it is determined in S12002 whether or not the current size change setting comprises 'unity'. MagData-H/L=100 means that the relevant size change ratio comprises the 'unity'. Thus, the discrimination operation in FIG. 70 is executed which is represented by S12003.

If the discrimination processing result in S12004 is that 'the original image comprises the special document', the operation display unit 10104 performs the warning indication in S12005, thereby warning the operator of this fact. On the other hand, if the discrimination result in S12004 is 'the original image does not comprise the special document', the normal duplication sequence is executed in S12006. The relevant image is duplicated. Thus, the duplication sequence is executed until the repeating completion is determined in s12007.

If it is determined in S12002 Mag-Data-H/L is not zero, since this means that the current size change ratio setting is a size change ratio other than the 'unity', such discrimination processing in S12003 is not performed. Then, in S12006, the normal duplication sequence is executed until the repeating completion.

In the case where the size change ratio in the duplication is other than the 'unity', there is considered to be very little possibility of paper-money forgery or the like. Thus, in the third embodiment, in such a case, the discrimination operation in the special document discrimination unit 10105 is eliminated, which discrimination operation can require a time. By this elimination, it is possible to improve the work efficiency in the duplication processing as the duplicator's inherent use.

The fourth embodiment of the tenth aspect of the present invention will be described.

In contrast to the above-mentioned third embodiment in which the discrimination operation in the special document duplication unit 10105 is not performed if a size change ratio other than the 'unity' has been set, the duplication operation in the special document duplication unit 10105 is performed but with reduced discrimination accuracy, in such a case of the duplication mode in which there is little possibility of illegal duplication in the duplicator, in the fourth embodiment.

In the description of the fourth embodiment, the parts already described in the description of the third embodiment are omitted. That is, excepting the contents to be now described, the construction and operation in the fourth embodiment are similar to those in the third embodiment.

Operation flow performed by the duplicator in the fourth embodiment will be described with reference to FIG. 83.

In the fourth embodiment, the main control unit 10106 performs, as a partial process in the duplication sequence, discrimination-accuracy alteration as described above such that the discrimination accuracy in the discrimination operation in the special document discrimination unit 10105 is reduced or the thus reduced discrimination accuracy is returned to the original one.

Figure 82:
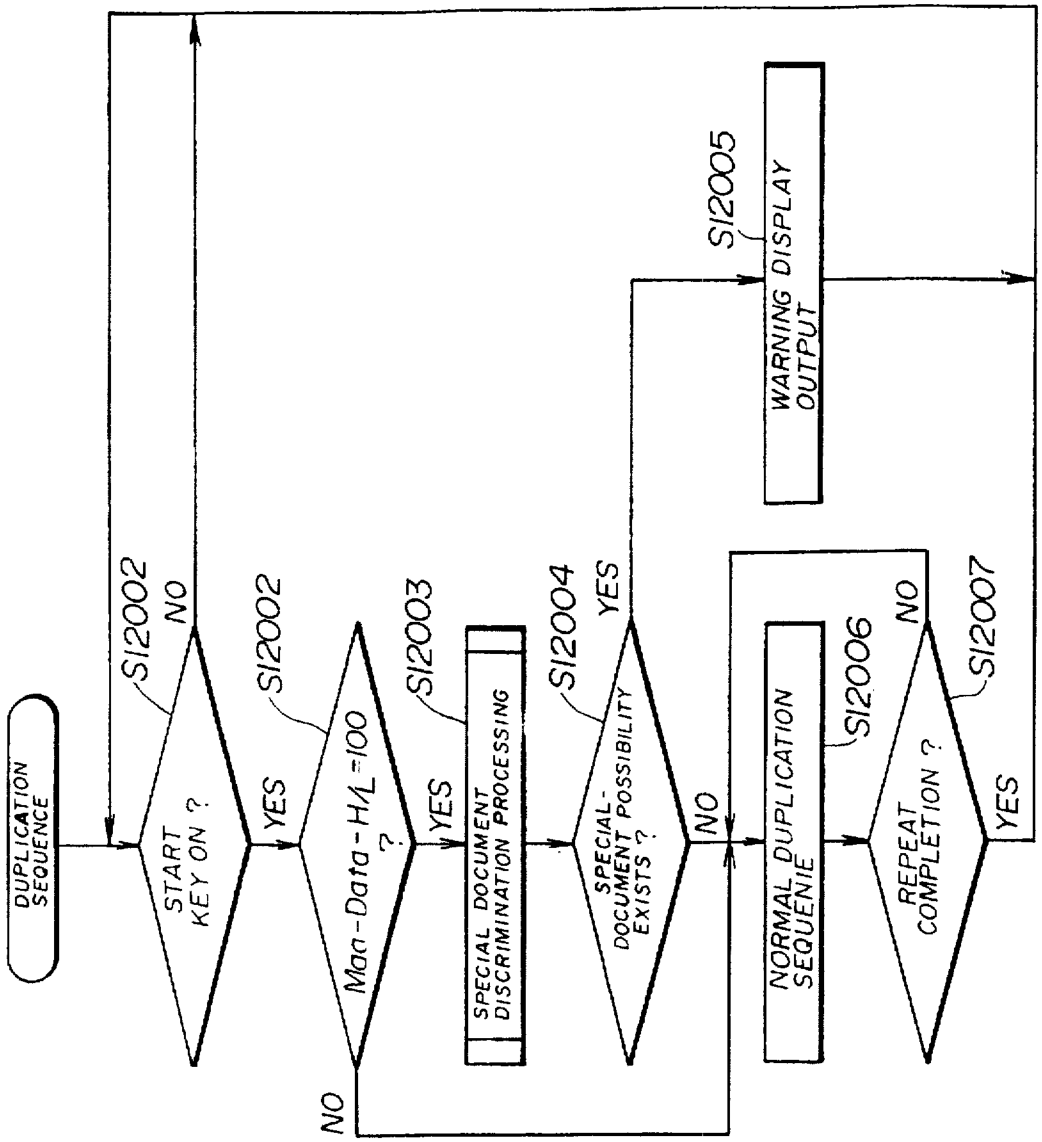
FIG. 82 shows a flow chart of a duplication sequence in the duplicator in the third embodiment of the tenth aspect of the present invention.
Figure 83:
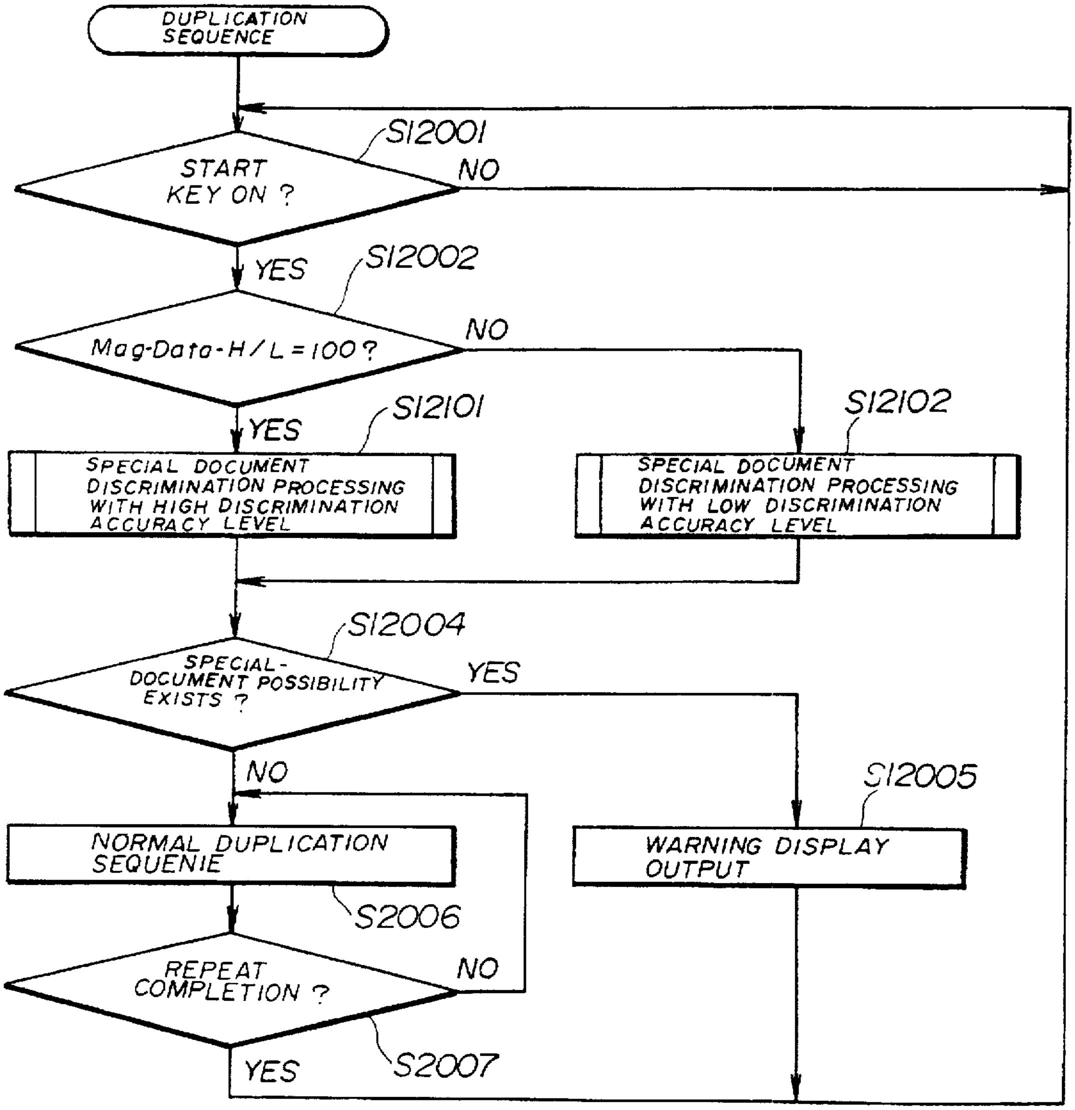
FIG. 83 shows a flow chart of a duplication sequence in the duplicator in the fourth embodiment of the tenth aspect of the present invention.

The duplicator's operation in the fourth embodiment in FIG. 83 is substantially identical, except for the operation contents presently described, to the above-mentioned duplicator's operation in the third embodiment in the flow chart in FIG. 82, the relevant description being thus omitted.

If YES in S12002, that is, if it is determined that the currently set size change ratio comprises the 'unity', the special document discrimination unit 10105 performs the discrimination operation with a relatively high discrimination accuracy in S12003. On the other hand, if NO in S12002, that is, if it is determined that the relevant size change ratio does not comprise the 'unity', the special document duplication unit 10105 performs the discrimination operation with a relatively low discrimination accuracy in S12102.

The discrimination operation with relatively high or low discrimination accuracy may be implemented by making small or great the differential value used in altering the value in the rotation information register 10705 in S10807 in FIG. 70. That is, the discrimination operation, in which the alteration of the value in the rotation information register 10705 is made with the 90-degrees differential value, giving 0 degrees, 90 degrees, 180 degrees and 270 degrees as described above, may be assigned to the above-mentioned low-discrimination-accuracy discrimination operation. The discrimination operation, in which the alteration of the value in the rotation information register 10705 is made with the 45-degrees differential value, giving 0 degrees, 45 degrees, 90 degrees, . . . as described above, may be assigned to the above-mentioned high-discrimination-accuracy discrimination operation.

Thus, in the fourth embodiment, the discrimination accuracy is reduced in the discrimination processing in the special document discrimination unit 10105 in the duplication operation with a size change ratio other than the 'unity'. In this mode, it is considered that there is little possibility of the illegal duplication and no real harm occurs even if it is performed. By such discrimination accuracy reduction, duplication time reduction may be enabled in such a case. Further, the relevant discrimination processing is performed in the full color duplication mode in which there is good possibility of illegal duplication. Thus, degradation in the discrimination function is less than in the case of the above-mentioned third embodiment of the tenth aspect of the present invention.

The fifth embodiment in the tenth aspect of the present invention will be described.

In a duplicator in this fifth embodiment, the discrimination operation in the special document discrimination unit 10105 is eliminated in the duplication operation in 'automatic original carrying mode' where there is little possibility of illegal duplication being executed.

Figure 84:
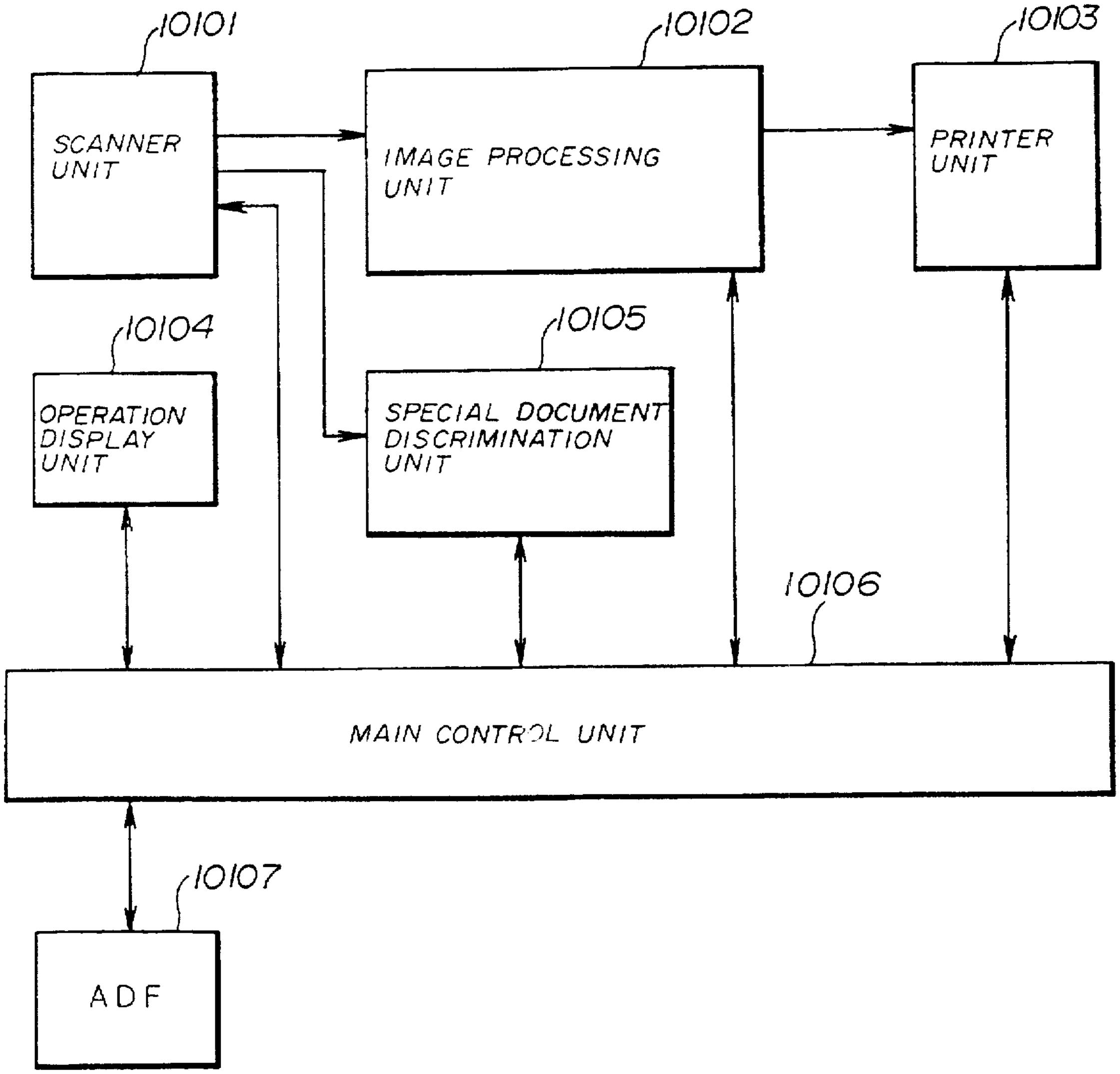
FIG. 84 shows a block diagram common to respective duplicators with special-document discrimination functions in fifth and sixth embodiments of the tenth aspect of the present invention.

As shown in FIG. 84, the construction of the duplicator in this fifth embodiment is similar to the construction common to the duplicators in the first-fourth embodiments as shown in FIG. 63, excepting that an ADF (auto-draft feeder, automatic original carrying system) 10107 is included there. By adding the ADF 10107, the construction in the main control unit 10106 is modified. As a result of the modification, a duplication sequence is executed as will be described. In the description concerning the fifth embodiment, the description is omitted except for the parts concerning this ADF 10106, accordingly. This ADF 10107 has a function of automatically transferring a paper sheet to a predetermined position in the scanner unit 10101. This paper sheet comprises an original image and has been placed on a predetermined position on the duplicator by the operator. The former above-mentioned predetermined position in the scanner unit is a position appropriate to the duplication operation.

Figure 85:
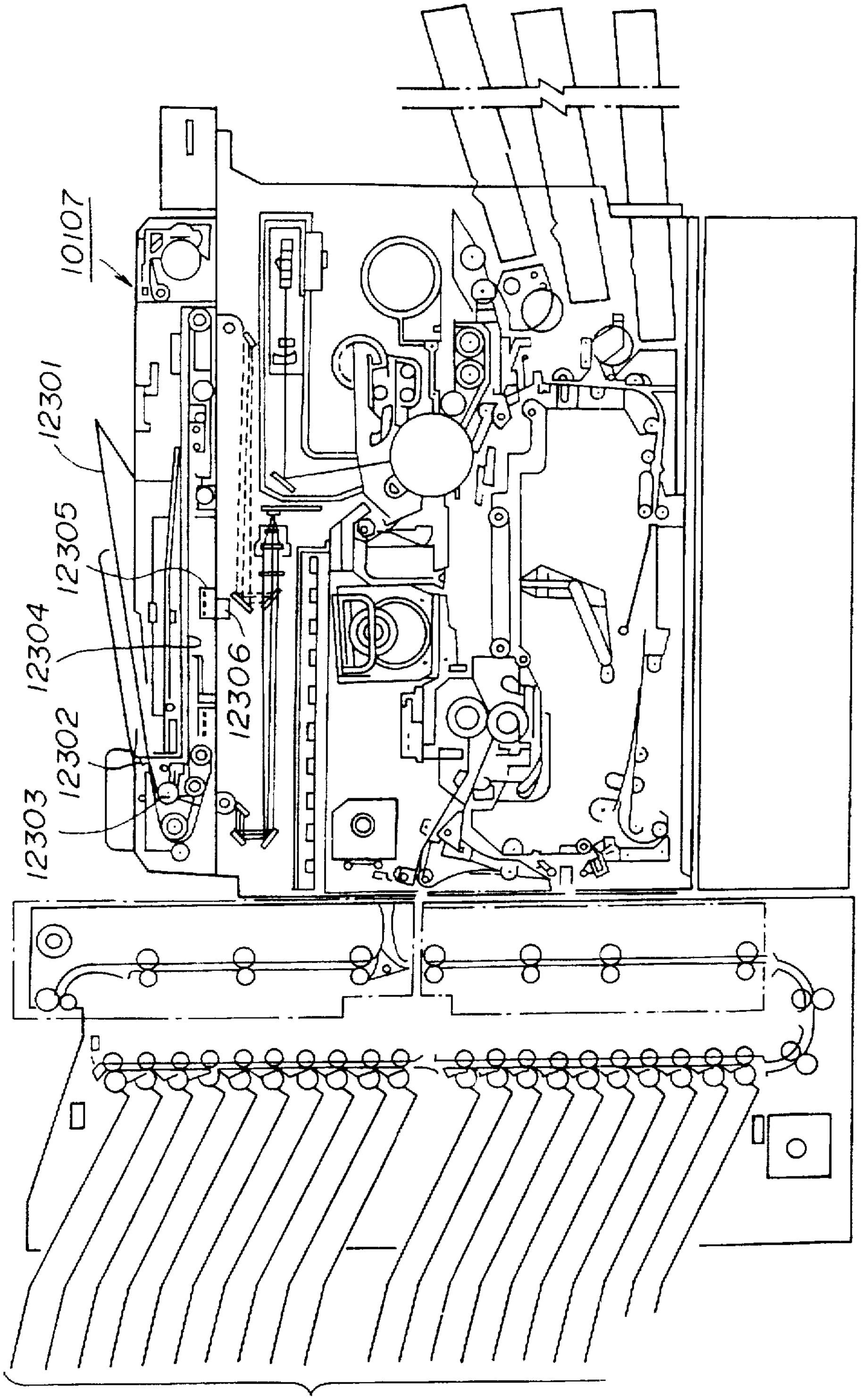
FIG. 85 shows an internal side elevation view illustrating a construction of an ADF (automatic draft feeder) of the duplicator of FIG. 84.

With reference to FIG. 85, the ADF 10107's function will be described.

The existence of a paper sheet (not shown in the drawing) comprising an original image placed on a original table 12301 is detected by an original detecting sensor 12302. This detection causes a calling roller 12303 to transfer the paper sheet into a position where a carrying belt 12304 is located. The carrying belt 12304 carries the thus transferred paper sheet into a position on a contact glass (also referred to as a platen glass), which position is one experiencing a predetermined exposure. A magnet 12305 is provided at the ADF side and a lift-up sensor 12306 is provided at the duplicator body side, in the ADF 10107 for detecting the open/closed state of the ADF. By such a construction, the open/close state of the ADF 10107 can be detected.

The ADF 10107 is normally in the closed state. The operator places an original image paper sheet on the original table 12301, in this ADF closed state. If the operator desires to place an original image paper sheet on a desired position on the contact glass, the ADF 10107 may be opened, the contact glass being thus exposed. Then, the operator may place the paper sheet on the contact glass and then close the ADF 10107, the duplication operation being thus started.

An operation in the duplicator in the fifth embodiment, in the tenth aspect of the present invention, having such a construction will be described with reference to FIG. 86.

The main control unit 10106 performs such discrimination-operation control processing as one step in the duplication sequence concerning the duplication operation as the duplicator's inherent use.

In a duplication waiting state (that is, a state before the duplication start key is pressed as described above), the main control unit 10106 performs the following processing. In S12401, it is determined whether or not the ADF 10107 is in the lifted-up state (that is, the open state). If it is determined as a result to be the lifted-up state, an 'ADF original set flag' is unconditionally reset to 0 in S12402. This 'ADF original set flag' is a flag indicating that the original image paper sheet has been transferred and positioned on the contact glass by means of the original image paper sheet carrying processing (also referred to as feed-in processing, hereinafter) in the ADF 10107 such as described above.

When this flag has the value 1 it indicates that the ADF 10107, by means of the above-mentioned feed-in processing, sets the original image paper sheet on the contact glass. When this flag has the value 0 it indicates that the original image paper sheet has been set on the contact glass as a result of processing other than such feed-in processing.

That is, the fact that the ADF original set flag has the value 0 indicates any one of the following two cases or other similar ones. In the first case, the original image paper sheet has been set with a pressing plate. (That is, normally, a plate referred to as the pressing plate covers the platen glass. In the relevant case, this pressing plate is temporarily lifted. In this lifted state, the original image paper sheet is placed on the platen glass. Then, the pressing plate is let down on the platen glass. Thus, the paper sheet is set.) In the second case, after the ADF 10107's above-mentioned feed-in processing, the operator lifts the ADF 10107 so as to correct the position of the paper sheet. In both cases, the original image paper sheet has not been set automatically by means of the ADF.

After such processing in the duplication waiting state, if the duplication start key is pressed in S12403, it is determined in S12404 whether or not the current state comprises a state where 'due to a certain reason, after the duplication operation is once halted, the duplication start key has been pressed again', that is, 'duplication re-starting after interruption'. In one example, the number of copies previously specified by the operator comprises initially 10 sheets. However, after the duplication of six sheets has been completed, the duplication operation has been interrupted due to occurrence of 'paper blockage' in the duplicator or so. Conditions such as mentioned above are determined to comprise 'duplication re-starting after interruption'. Such determination causes S12408 to be performed.

If the determination in S12404 does not comprise 'duplication re-starting after interruption', it is determined in S12405 whether or not the original detecting sensor 12302 detects existence of an original image paper on the table 12301. If the paper sheet exists on the table 12301, the feed-in processing such as described above is performed in S12406 by means of the ADF 10107. Then, the ADF original set flag is set to the value 1 in S12407. Thus, it is indicated that the paper sheet currently placed on the contact glass is one which has been set by means of the ADF 10107 with the feed-in processing.

Then, the normal duplication sequence is performed in S124111. However, even during the sequence performance, the determination in S12412 as to whether or not the ADF 10107 is lifted is always made. If it is lifted, the ADF original set flag is immediately reset to 0 in S12414. The reason for this is that the fact that the ADF has been thus lifted means the possibility occurring that, at this time, the original image paper sheet has been replaced by the special document which is prohibited to be duplicated.

If the ADF 10107 is not lifted in the determination result in S12412, S12411 and S12412 is repeated. Thus, the duplication sequence is repeated until the repeating completion is determined in S12413.

On the other hand, if 'duplication restarting after interruption' is determined in S12404, it is determined in S12408 whether or not the ADF original set flag has the value 1. If the flag has the value 1 (that is, ON) as a result, the normal sequence is performed in S12411 as described above. If it is determined in S12408 that the flag has the value 0 (that is, not ON), the discrimination processing such as described above in the special document discrimination unit 10105 is performed in S12409.

In S12409, the processing in FIG. 70 is performed. If the processing result in S12410 comprises that 'the original image comprises the special document', warning indication is performed in S12415 as described above. Then, in this case, the normal sequence such as described above is not performed and the state is returned to the above-mentioned duplication waiting state. On the other hand, if the determination in S12410 comprises 'the original image does not comprise the special document', the normal duplication sequence is performed as described above in S12411.

Thus, in the fifth embodiment, the discrimination processing in the special document discrimination unit 10105 requiring extra time is not to performed in the duplication operation using the feed-in processing as described above in the ADF 10107. Thereby, the work efficiency in the duplication operation may be improved. There is considered to be little possibility of paper-money forgery perpetration in the duplication operation using the feed-in processing in the ADF 10107. (That is, if a person attempts to perpetrate the paper money forgery, the person may be worried that the paper money note may be injured by accident during the feeding processing, for example if the person will use the feed-in processing in the ADF 1010 for the paper money note. Thus, the person attempts to avoid such handling.) Thus, little real harm is considered to occur as a result of even eliminating the discrimination processing.

The sixth embodiment of the tenth aspect of the present invention will be described.

In contrast to the above-mentioned fifth embodiment in which the discrimination operation in the special document duplication unit 10105 is not performed in the case of the duplication operation using the feed-in processing by means of the ADF 10107, the duplication operation in the special document duplication unit 10105 is performed but in reduced discrimination accuracy in such a case of the duplication mode in which the possibility of illegal duplication is little in the duplicator in the sixth embodiment.

In the description of the sixth embodiment, description of the parts already described in the description of the fifth embodiment is omitted. That is, excepting the contents to be now described, the construction and operation in the sixth embodiment are similar to those in the fifth embodiment.

Operation flow performed by the duplicator in the sixth embodiment will be described with reference to FIG. 87.

The main control unit 10106 performs, as a part of the duplication sequence, discrimination-accuracy alteration as described above such that the discrimination accuracy in the discrimination operation in the special document discrimination unit 10105 is reduced or the thus reduced discrimination accuracy is returned to the original one, in the sixth embodiment.

Figure 86:
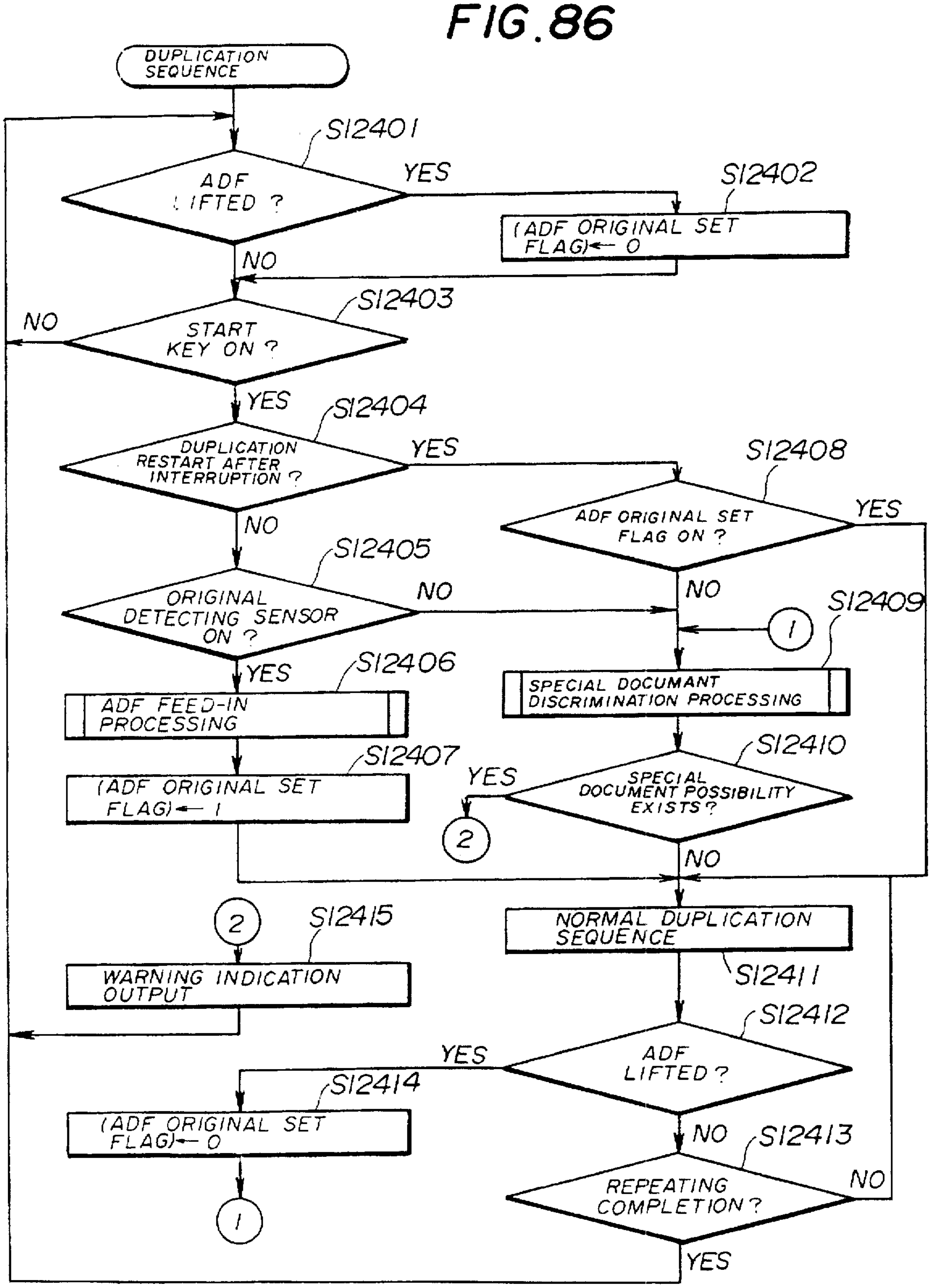
FIG. 86 shows a flow chart of a duplication sequence in the duplicator in the fifth embodiment of the tenth aspect of the present invention.
Figure 87:
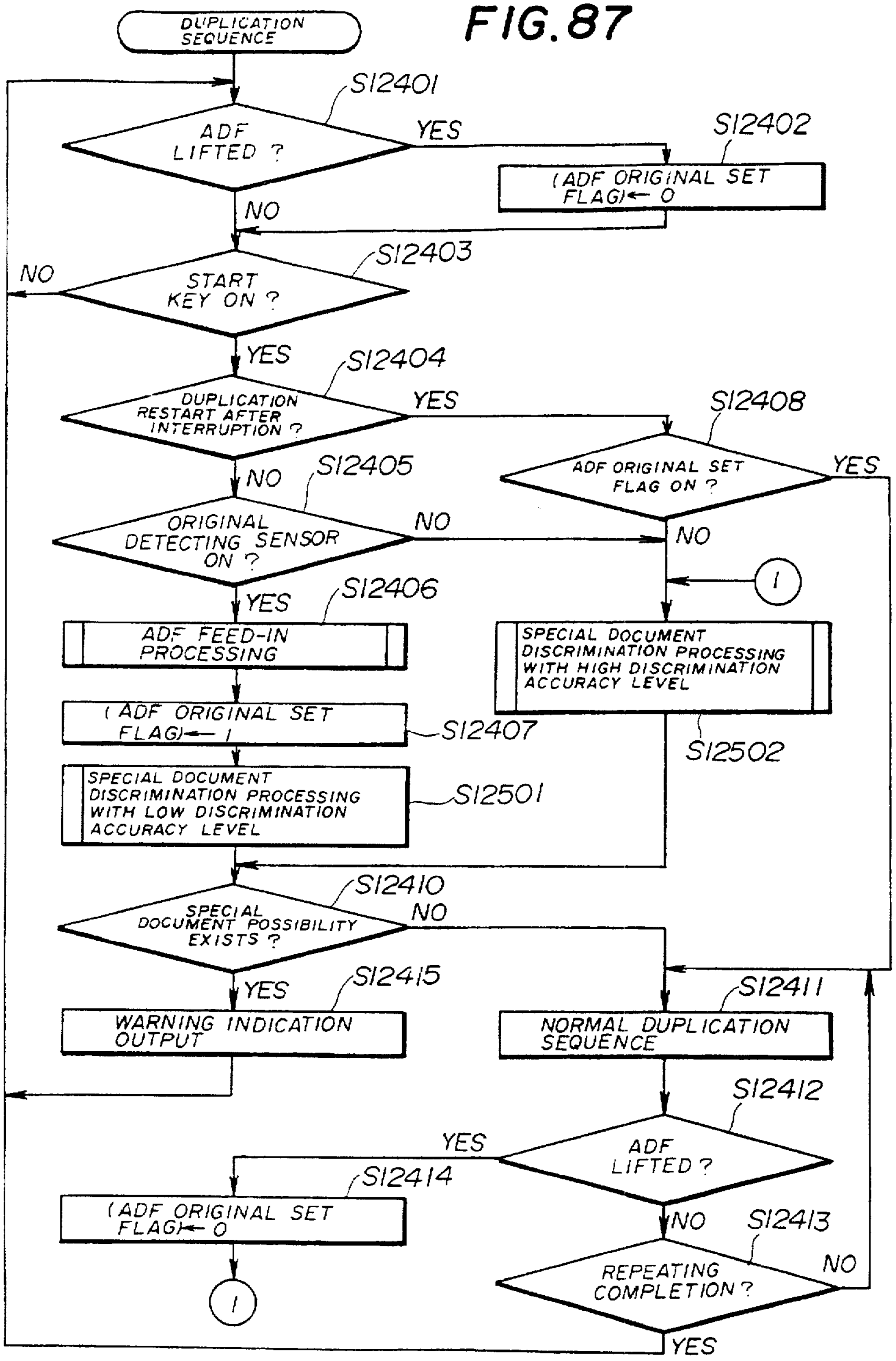
FIG. 87 shows a flow chart of a duplication sequence in the duplicator in the sixth embodiment of the tenth aspect of the present invention.

The duplicator's operation in the sixth embodiment in FIG. 87 is substantially identical, except for the operation to be described, to the above-mentioned duplicator's operation in the fifth embodiment in the flow chart in FIG. 86, the relevant description being thus omitted.

If YES in S12405, that is, if it is determined that an original image paper sheet exists on the table in the ADF 10107, the ADF 10107 performs the feed-in processing such as described above in S12406. In S12407, the ADF original set flag is set to the value 1. As a result, it is indicated that the paper sheet existing on the contact glass at present comprises one which has been set through the feed-in processing.

In this case, since it is the duplication operation with little forgery-duplication possibility, the special document discrimination unit 10105 performs the duplication operation with a relatively low discrimination accuracy in S12501. On the other hand, either if the original detecting sensor is not in the ON state in S12405 (no original image sheet paper exists on the above-mentioned table 12401), or if the ADF original flag is not the ON state in S12408 (the original image sheet paper has not been set by means of the above-mentioned feed-in processing), the special document duplication unit 10105 performs the discrimination operation with a relatively high discrimination accuracy in S12502.

The discrimination operation with relatively high or low discrimination accuracy may be implemented by making small or great the differential value used in altering the value in the rotation information register 10705 in S10807 in FIG. 70. That is, the discrimination operation, in which the alteration of the value in the rotation information register 10705 is made with the 90-degrees differential value, giving 0 degrees, 90 degrees, 180 degrees and 270 degrees as described above, may be assigned to the above-mentioned low-discrimination-accuracy discrimination operation. The discrimination operation, in which the alteration of the value in the rotation information register 10705 is made with the 45-degrees differential value, giving 0 degrees, 45 degrees, 90 degrees, . . . as described above, may be assigned to the above-mentioned high-discrimination-accuracy discrimination operation.

Thus, in the sixth embodiment, the discrimination accuracy is reduced in the discrimination processing in the special document discrimination unit 10105 in the duplication operation using the feed-in processing in the ADF 10107. In this duplication operation, it is considered that there is little possibility of the illegal duplication. By such determination accuracy reduction, duplication time reduction may be enabled in such a case. Further, the discrimination processing is performed with increased discrimination accuracy when the above-mentioned feed-in processing is not used, since there is a possibility of the illegal duplication. As a result, illegal duplication of the special document such as paper money can be surely identified.

The seventh embodiment in the tenth aspect of the present invention will be described.

Images are respectively printed on both the front and rear sides of a recording paper sheet in a double-sided duplication mode. In this mode, if the image is printed on the rear side of the recording paper sheet, the discrimination operation in the special document discrimination unit 10105 is performed in a duplicator in this seventh embodiment. This is because of the possibility of illegal duplication being executed there. An image is printed on only one side of a recording paper sheet in a single-sided duplication mode. In this mode, it can be seen that there is little possibility of illegal duplication being executed. In this case, the discrimination operation in the special document discrimination unit 10105 is eliminated.

Figure 88:
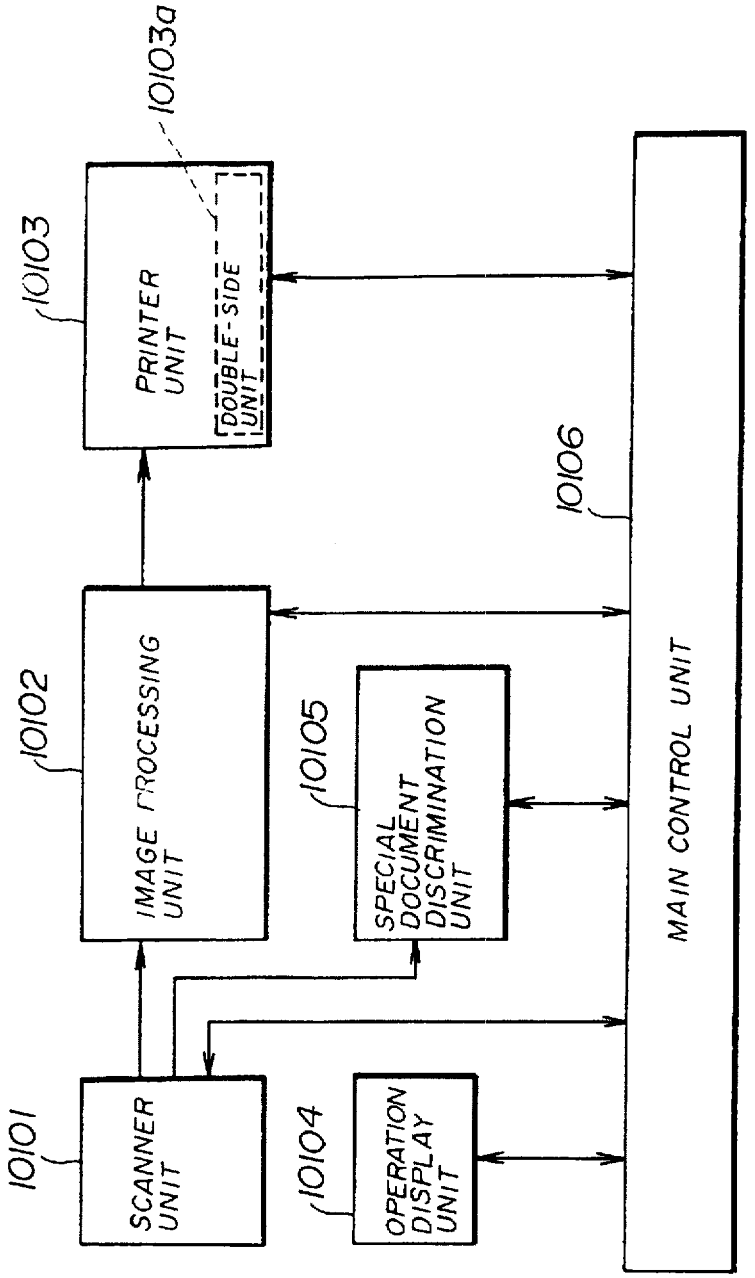
FIG. 88 shows a block diagram common to respective duplicators with special-document discrimination functions in seventh through tenth embodiments of the tenth aspect of the present invention.

As shown in FIG. 88, the construction of the duplicator in this seventh embodiment is similar to the construction common to the duplicators in the first-fourth embodiments as shown in FIG. 63, except that a double-side unit **10103*a* is included there. By adding the double-side unit 10103*a*, the construction in the main control unit 10106 is modified. As a result of the modification, a duplication sequence is executed as presently described. In the description concerning the seventh embodiment, the description is omitted except for that concerning this double-side unit 10103*a***, accordingly.

Operation in the duplicator of the seventh embodiment, in the tenth aspect of the present invention, having such a construction will be described with reference to FIG. 89.

The main control unit 10106 performs such discrimination-operation control processing as one step in the duplication sequence concerning the duplication operation as the duplicator's inherent use.

If the duplication start key is pressed in S12701, it is determined in S12702 whether or not the above-mentioned double-sided duplication mode is set at the present time in the duplicator. If the double-sided duplication mode has not been set, the normal duplication sequence in the duplicator is performed in S12712 repeatedly until the repeating completion is determined in S12723.

On the other hand, if the double-sided duplication mode is determined to have been set at the present time in the determination in S12702, it is determined in S12703 whether or not a 'rear side flag' is ON (that is, the value in the flag is the value 1). The ON state of the 'rear side flag' indicates that the duplicator is in the process of printing on the rear side of a recording paper sheet at present, in the double-sided duplication mode.

If the result in S12703 is that the 'rear side flag' is not ON, since this state means that the duplicator is in the process where an image is printed on the front side of a recording paper sheet at present in the double-sided duplication mode, the relevant process, that is the front side duplication sequence is performed in S12709 accordingly.

This front side duplication mode in S12709 is repeated until the repeating completion is determined in S12709. Then, after the repeating completion determination is made, the 'rear side flag' is set to the value 1 in S12711 and the machine returns to the duplication waiting state.

If the determination in S12703 comprises that the 'rear side flag' is ON, the discrimination processing shown in FIG. 70 in the special document discrimination unit 10105 is performed in S12704. In S12705, if the processing result comprises that 'the original image comprises the special document', a warning indication is performed in S12714 through the operation display unit 10104 as described above. Then, in this case, the normal sequence such as described above is not performed and the state is returned to the above-mentioned duplication waiting state.

On the other hand, if the determination in S12705 is 'the original image does not comprise the special document', the rear side duplication sequence is repeated in S12706 until the repeating completion is determined in S12707, which rear side duplication sequence is one in which an image is printed on the rear side of a recording paper sheet in the above-mentioned double-sided duplication mode. Then, after the duplication operation for the repeating amount has been completed, the repeating completion being thus determined in S12707, the rear side flag is reset to 0, the machine returning to the above-mentioned duplication waiting state.

The double-side unit 10103 in the printer unit 10103 has the function of executing the above-mentioned double-sided duplication sequence.

Thus, in the seventh embodiment, the discrimination processing in the special document discrimination unit 10105 requiring extra time is made not to be performed in a case other than in the process in which the rear side duplication sequence is executed in the above-mentioned double-sided duplication mode. Thereby, the work efficiency in the duplication operation may be improved. There is considered to be little possibility of paper-money forgery perpetration except in such a rear side duplication sequence. (The paper money is normally made with the double-sided printing. Forged paper-money with printing on only one side thereof can be easily identified.) Thus, little real harm may be considered to occur as a result of eliminating the discrimination processing.

The eighth embodiment of the tenth aspect of the present invention will be described.

In contrast to the above-mentioned seventh embodiment in which the discrimination operation in the special document duplication unit 10105 is not performed in the case other than the rear side duplication sequence in the above-mentioned double-sided duplication mode, the duplication operation in the special document duplication unit 10105 is performed in high discrimination accuracy in the case of the rear side duplication sequence in the double-sided duplication mode, that is, the case where there is a good possibility of illegal duplication, in the duplicator in the eighth embodiment.

In the description of the eighth embodiment, description of the parts already described in the description of the seventh embodiment is omitted. That is, excepting the contents to be now described, the construction and operation in the eighth embodiment are similar to those in the seventh embodiment.

Operation flow performed by the duplicator in the eighth embodiment will be described with reference to FIG. 90.

The main control unit 10106 performs, as a part of the duplication sequence, discrimination-accuracy alteration as described above such that the discrimination accuracy in the discrimination operation in the special document discrimination unit 10105 is reduced or the thus reduced discrimination accuracy is returned to the original level, in the eighth embodiment.

Figure 89:
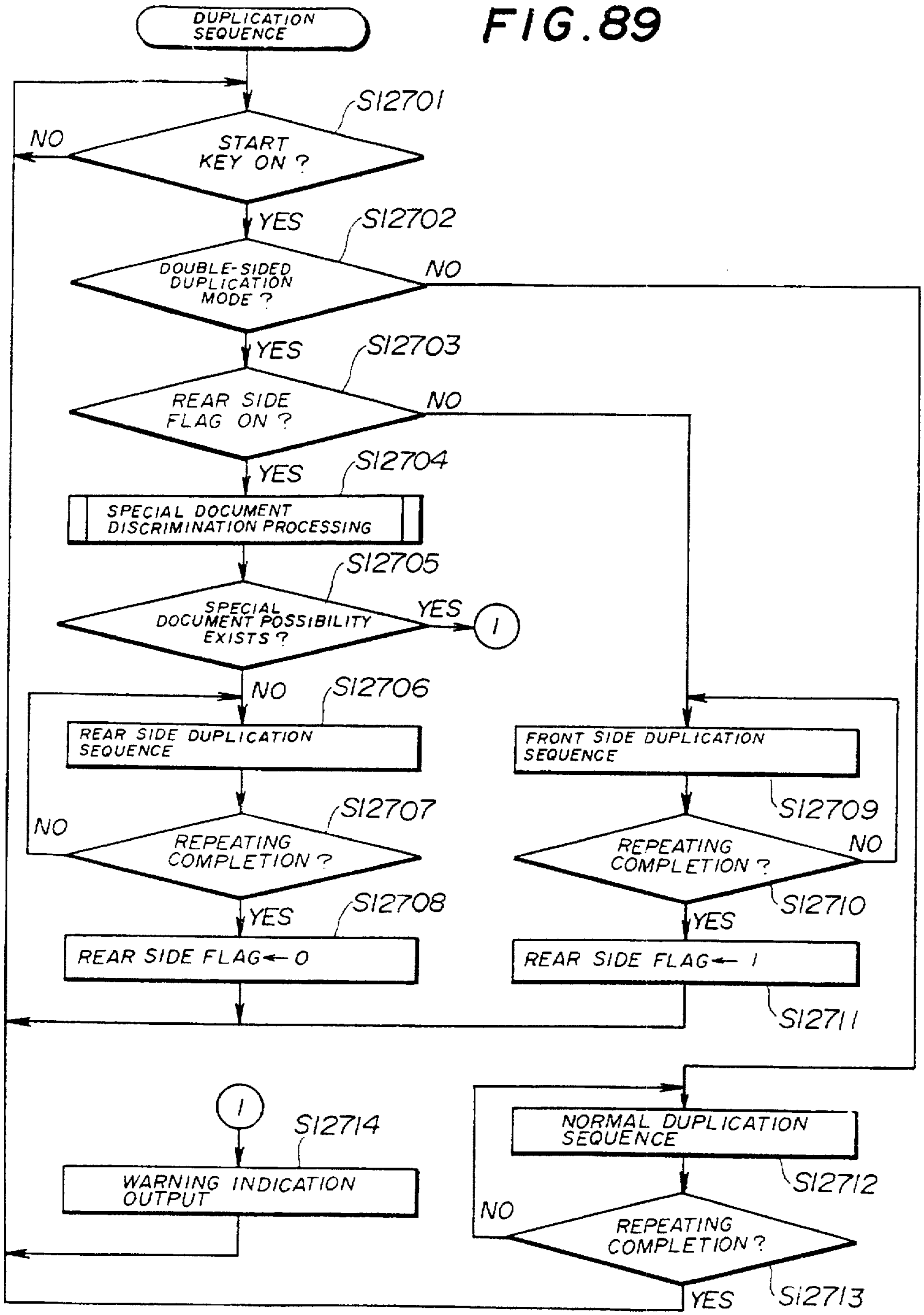
FIG. 89 shows a flow chart of a duplication sequence in the duplicator in the seventh embodiment of the tenth aspect of the present invention.
Figure 90:
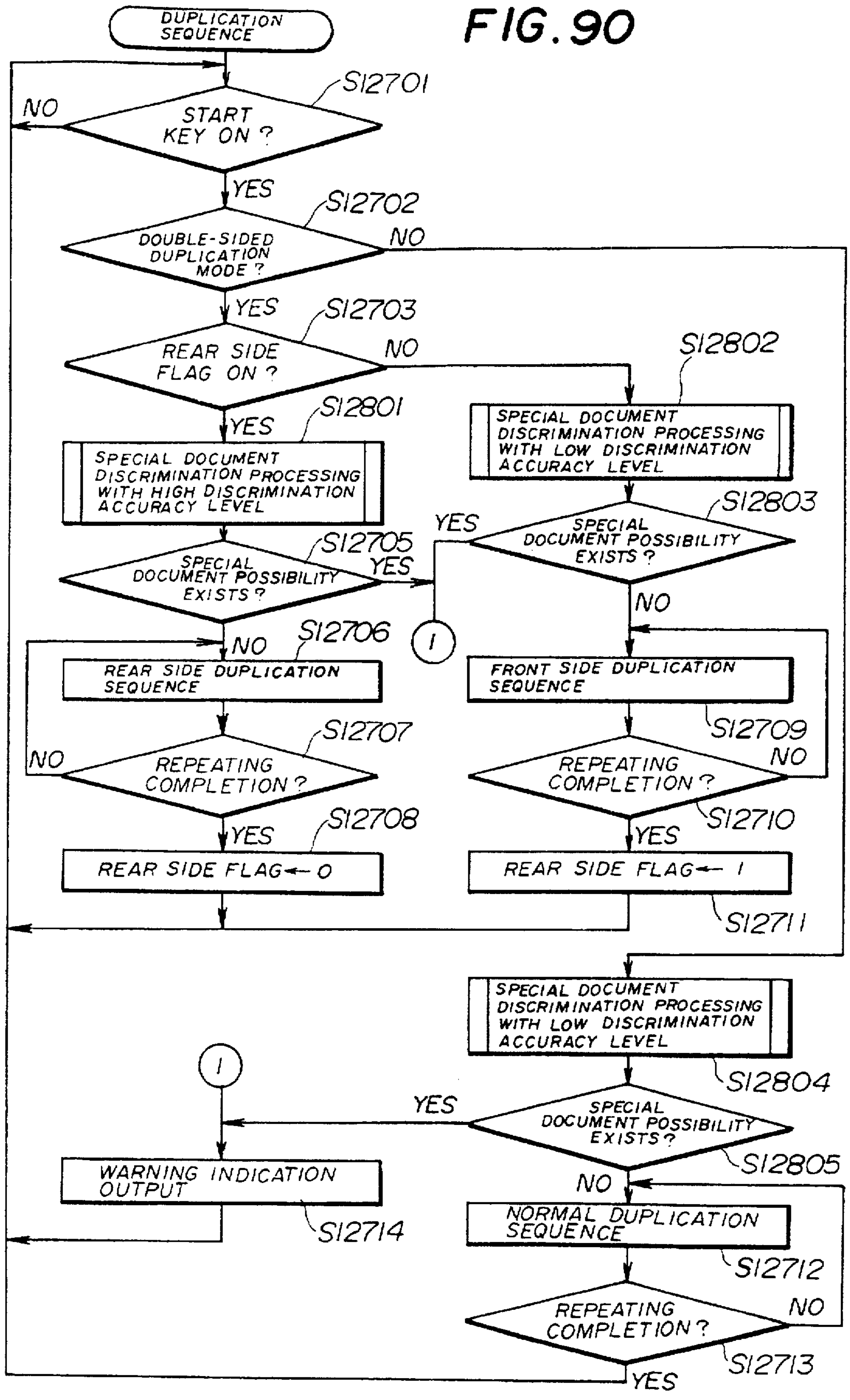
FIG. 90 shows a flow chart of a duplication sequence in the duplicator in the eighth embodiment of the tenth aspect of the present invention.

The duplicator's operation in the eighth embodiment in FIG. 90 is substantially identical, except for the operation to be described, to the above-mentioned duplicator's operation in the seventh embodiment in the flow chart in FIG. 89, the relevant description being thus omitted.

If YES in S12703, that is, if the above-mentioned rear side flag is ON, since the current process corresponds to the rear side duplication sequence in the double-sided duplication mode and thus comprises the duplication operation with a forgery duplication possibility as described above, the special document discrimination unit 10105 performs the duplication operation with a relatively high discrimination accuracy in the discrimination operation shown in FIG. 70, in S12801. On the other hand, if NO in S12703, that is, if the above-mentioned rear side flag is not ON, the special document duplication unit 10105 performs, in S12802, the discrimination operation with a relatively low discrimination accuracy in the discrimination operation shown in FIG. 70.

The discrimination operation with relatively high or low discrimination accuracy may be implemented by making the differential value small or great used in altering the value in the rotation information register 10705 in S10807 in FIG. 70. That is, the discrimination operation, in which the alteration of the value in the rotation information register 10705 is made with the 90-degrees differential value, giving 0 degrees, 90 degrees, 180 degrees and 270 degrees as described above, may be assigned to the above-mentioned low-discrimination-accuracy discrimination operation. The discrimination operation, in which the alteration of the value in the rotation information register 10705 is made with the 45-degrees differential value, giving 0 degrees, 45 degrees, 90 degrees, . . . as described above, may be assigned to the above-mentioned high-discrimination-accuracy discrimination operation.

Thus, in the eighth embodiment, the discrimination accuracy is reduced in the discrimination processing in the special document discrimination unit 10105 in a case other than the rear side duplication sequence process in the double-sided duplication mode. In the case other than the rear side duplication sequence process, it is considered that there is little possibility of illegal duplication. By such determination accuracy reduction, duplication time reduction may be enabled in such a case. Further, the discrimination processing is performed under the condition that the discrimination accuracy is increased in the rear side duplication sequence process in the double-sided duplication mode, in which process there is a possibility of illegal duplication. As a result, illegal duplication of the special document such as paper money can be surely identified.

The ninth embodiment in the tenth aspect of the present invention will be described.

Images are respectively printed on both the front and rear sides of a recording paper sheet in a double-sided duplication mode. In this mode, if the image has been already printed on the rear side of the recording paper sheet which is one to be used for printing an image thereon, the discrimination operation in the special document discrimination unit 10105 is performed in a duplicator in this ninth embodiment. This is because the possibility of illegal duplication being executed exists there. In the above double-sided duplication mode, if no image has been printed on the recording paper sheet which is one to be used for printing an image thereon, it can be seen as follows: If the image is printed on the front side of the recording paper sheet, the paper-money forgery for example will not yet be complete anyway. (That is, this is because the forgery paper-money with printing on only one side thereof can be easily identified.) Thus, in this case, the discrimination operation in the special document discrimination unit 10105 is eliminated.

Figure 91:
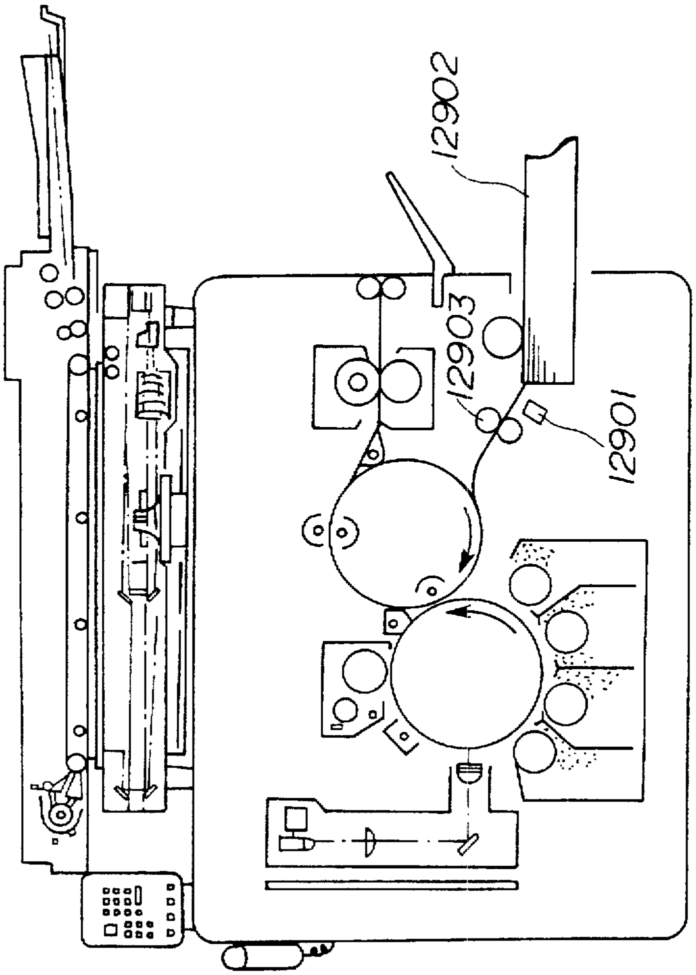
FIG. 91 shows an internal side elevation view of the duplicator in the ninth embodiment of the tenth aspect of the present invention, illustrating the position, in the duplicator, of a back-surface image detecting sensor for detecting whether or not an image has been already printed on the back surface of a recording sheet of paper.

As shown in FIG. 91, in the duplicator in the ninth embodiment, a rear side image detecting sensor 12901 is provided for detecting whether or not an image has been already printed on the rear side of the recording paper sheet which is used for printing an image thereto as described above in the double-sided duplication mode. This sensor 12901 is located between a paper supply cassette 12902 and a registration unit 12903. The paper supply cassette 12902 is used for providing a recording paper sheet to the photosensitive drum in the printer unit in the duplicator. The registration unit 12903 is used for performing the registration matching between the recording paper sheet and the toner image formed on the photosensitive drum. The sensor 12901 comprises a photosensor comprising a light emitting element and photosensitive element. Excepting this construction, the construction of the duplicator is substantially similar to the construction of the above-mentioned duplicator in the first embodiment in the tenth aspect of the present invention, the description being thus omitted for the similar parts.

Figure 92:
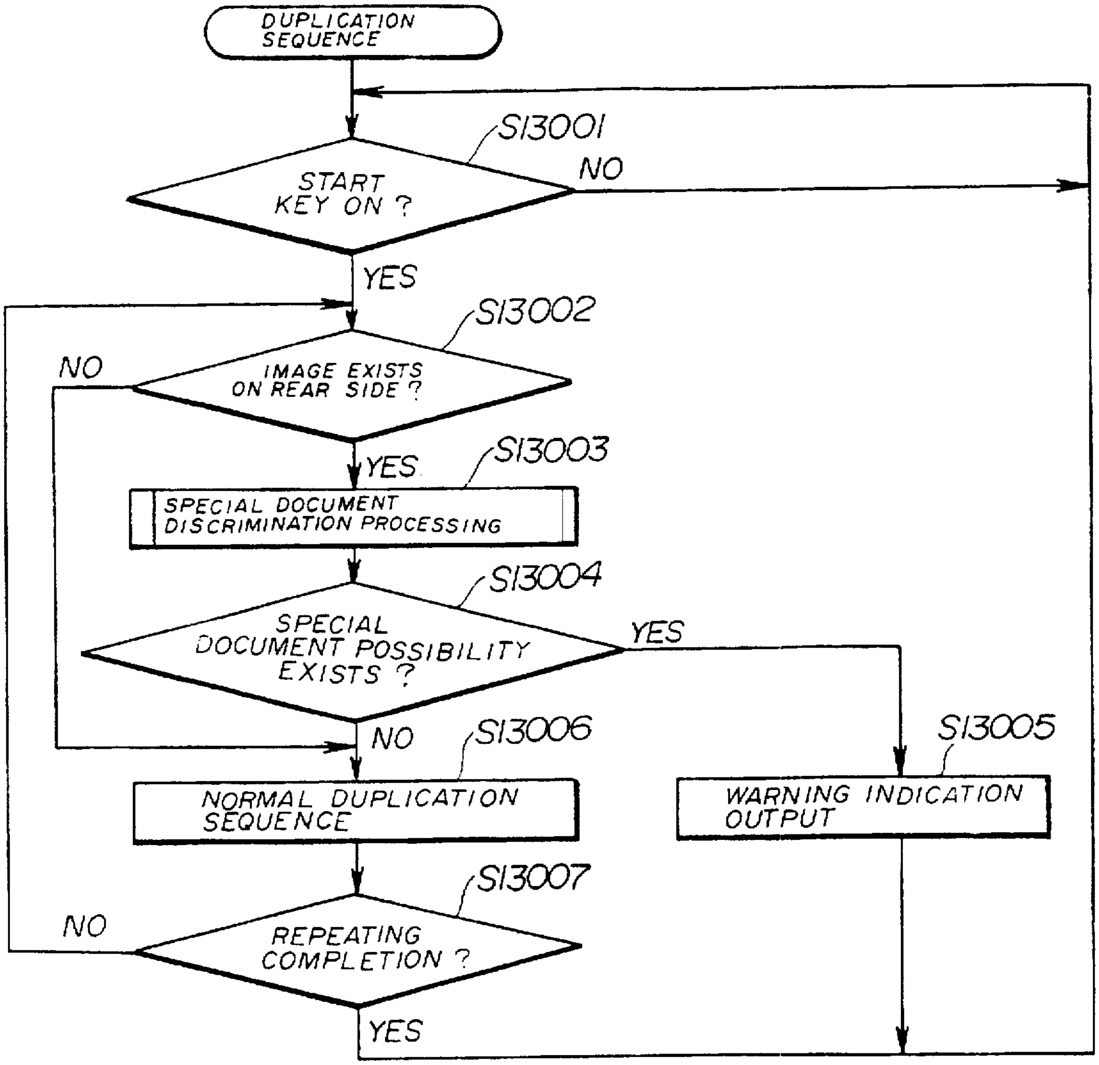
FIG. 92 shows a flow chart of a duplication sequence in the duplicator in the ninth embodiment of the tenth aspect of the present invention.

Operation in the duplicator in the ninth embodiment, in the tenth aspect of the present invention, having such a construction will be described with reference to FIG. 92.

The main control unit 10106 performs such discrimination-operation control processing as one step in the duplication sequence.

If the duplication start key is pressed in S13001, a recording paper sheet is supplied from the above-mentioned paper supply cassette 12902 in S13002. Then, it is detected whether or not any image has been already printed on the rear side with respect to the front side of the thus supplied recording paper sheet, which front side is used for the present printing. If the detection result is that 'an image exists on the rear side', the discrimination processing shown in FIG. 70 in the special document discrimination unit 10105 is performed in S13003.

If the processing result is that 'the original image comprises the special document' in S13004, warning indication is performed in S13005 through the operation display unit 10104 as described above. Then, in this case, the normal sequence such as described above is not performed and the state is returned to the above-mentioned duplication waiting state.

On the other hand, if the determination in S13004 is 'the original image does not comprise the special document', a rear side duplication sequence is repeated in S13006 until the repeating completion is determined in S13007, which rear side duplication sequence is one in which an image is printed on the rear side of a recording paper sheet in the above-mentioned double-sided duplication mode.

On the other hand, if the detection result in S13002 comprises 'no image exists on the rear side', the above-mentioned discrimination processing by the special document duplication unit 10105 is not performed and the normal duplication sequence is immediately performed in S13006 as described above.

Thus, in the ninth embodiment, the discrimination processing in the special document discrimination unit 10105 requiring extra time is not performed in a case other than the case where an image has been already printed on the rear side of the recording paper sheet. Thereby, the work efficiency in the duplication operation may be improved.

The tenth embodiment of the tenth aspect of the present invention will be described.

In contrast to the above-mentioned ninth embodiment in which the discrimination operation in the special document duplication unit 10105 is not performed in the case other than the case where an image has been already printed on the rear side of the recording paper sheet, the duplication operation in the special document duplication unit 10105 is performed with a high discrimination accuracy in the case where an image has been already printed on the rear side of the recording paper sheet, that is, the case where the possibility of illegal duplication exists, in the duplicator in the tenth embodiment.

In the description of the tenth embodiment, description of the parts already described in the description of the ninth embodiment is omitted. That is, excepting the contents to be now described, the construction and operation in the tenth embodiment are similar to those in the ninth embodiment.

Figure 93:
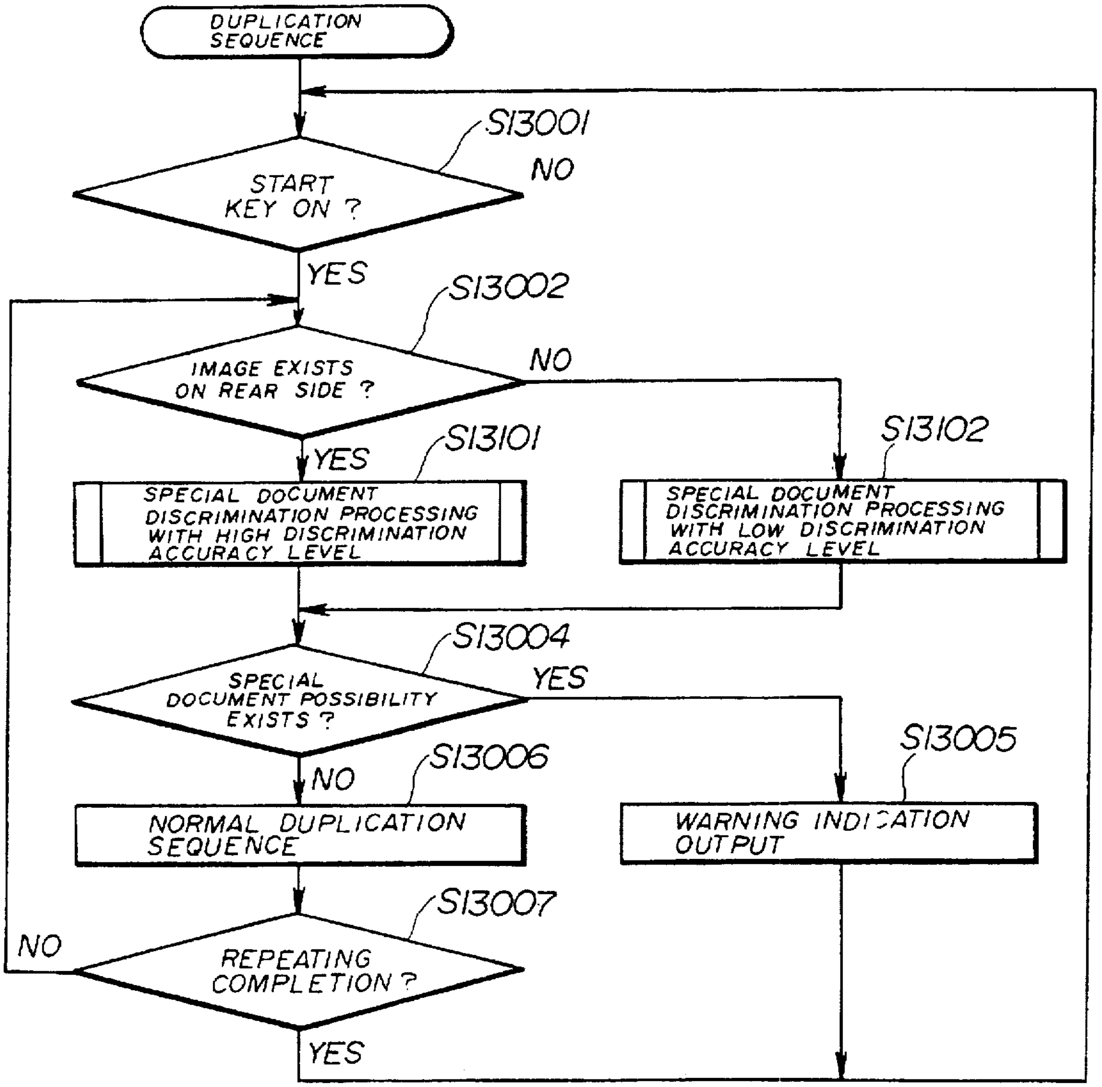
FIG. 93 shows a flow chart of a duplication sequence in the duplicator in the tenth embodiment of the tenth aspect of the present invention.

Operation flow performed by the duplicator in the tenth embodiment will be described with reference to FIG. 93.

The main control unit 10106 performs, as a partial process in the duplication sequence, discrimination-accuracy alteration as described above such that the discrimination accuracy in the discrimination operation in the special document discrimination unit 10105 is reduced or the thus reduced discrimination accuracy is returned to the original level, in the tenth embodiment.

The duplicator's operation in the eighth embodiment in FIG. 90 is substantially identical, except for the operation to be described, to the above-mentioned duplicator's operation in the seventh embodiment in the flow chart in FIG. 89, the relevant description being thus omitted.

If YES in S13002, that is, if 'an image exists on the rear side', then since the current process corresponds to the duplication operation having a forgery duplication possibility as described above, the special document discrimination unit 10105 performs duplication operation with a relatively high discrimination accuracy in the discrimination operation shown in FIG. 70, in S13110. On the other hand, if NO in S13002, that is, if 'no image exists on the rear side', the special document duplication unit 10105 performs, in S13102, discrimination operation with a relatively low discrimination accuracy in the discrimination operation shown in FIG. 70.

The discrimination operation with relatively high or low discrimination accuracy may be implemented by making the differential value small or great used in altering the value in the rotation information register 10705 in S10807 in FIG. 70. That is, the discrimination operation, in which the alteration of the value in the rotation information register 10705 is made with the 90-degrees differential value, giving 0 degrees, 90 degrees, 180 degrees and 270 degrees as described above, may be assigned to the above-mentioned low-discrimination-accuracy discrimination operation. The discrimination operation, in which the alteration of the value in the rotation information register 10705 is made with the 45-degrees differential value, giving 0 degrees, 45 degrees, 90 degrees, . . . as described above, may be assigned to the above-mentioned high-discrimination-accuracy discrimination operation.

Thus, in the tenth embodiment, the discrimination accuracy is reduced in the discrimination processing in the special document discrimination unit 10105 in a case other than the case where an image has been already printed on the rear side of the recording paper sheet. In the case other than the case where an image has been already printed on the rear side of the recording paper sheet, it is considered that there is little possibility of illegal duplication. By such determination accuracy reduction, duplication time reduction may be enabled in such a case. Further, the discrimination processing is performed under the condition that the discrimination accuracy is increased in the case where 'an image exists on the rear side', where the illegal duplication possibility exists. As a result, illegal duplication of the special document such as paper money can be surely identified.

[EMBODIMENTS OF ELEVENTH ASPECT]

Respective embodiments in the eleventh aspect of the present invention will be described.

In the eleventh aspect of the present invention, a below described digital filter is used in the illegal duplication discrimination as described above for the special document such as paper money. If the illegal duplication is determined, a so-called moire is intentionally made to appear on the printed image, that is, the duplicated matter corresponding to the relevant image data.

If the duplicated matter on which the moire is thus made to appear is attempted to be used as the forgery paper money, it may be easily distinguished due to the moire from the true paper money. Thus, the use of the forgery paper money can be prevented.

This moire means undesired patterns which appear in general when a halftone is formed using a halftone printed as the original artwork. Such patterns occur due to interference between halftone dots in the original halftone and the halftone dots in the ruled halftone screen which has been used to be overlaid on the original halftone.

However, in the present invention, the spatial frequency in line-drawing patterns existing on the image associated with the special document such as paper money is emphasized. This emphasis is made by a filter processing performed on the relevant image data, which processing is by means of the digital filter having a spatial frequency corresponding to the relevant image data. Thereby, the moire corresponding to such a spatial frequency is intentionally made to appear especially for the special-document-image image data. (The term spatial frequency has been explained in this specification. That is, this means a repeating frequency in density variation existing on an image for a unit length.) That is, in the case of the eleventh aspect of the present invention, interference is intentionally made to occur between the spatial frequency existing in the image in the special document or so and the spatial frequency which the digital filter has. Thus, the moire is made to generate.

Next, a summary of image forming apparatuses in respective embodiments in the eleventh aspect of the present invention will be described.

An image forming apparatus in a first embodiment in the eleventh aspect of the present invention comprises: means for filtering image data so as to emphasize the predetermined spatial frequency on the original image, which image data has been input by reading the original image and comprises multi-value digital data obtained by performing a predetermined processing thereon; and duplication means for discriminating as to whether or not the original image comprises the special document such as paper money by detecting periodicity existing in the image corresponding to the thus filtered image data.

An image forming apparatus in a second embodiment in the eleventh aspect of the present invention comprises: means for filtering image data as described above, which image data comprises multi-value digital data obtained as described above; and image processing means for outputting the image corresponding to the thus filtered image data.

An image forming apparatus in a third embodiment in the eleventh aspect of the present invention comprises: means for discriminating whether or not an original image comprises the special document such as described above; means for filtering as described above the corresponding image data if the above discrimination result is that it does comprise special document; and image processing means for outputting the image corresponding to the thus filtered image data.

Further, in these respective embodiments, it is preferable that the above-mentioned filtering means comprises a band pass filter having a peak frequency: 100 lines/inch or 70 lines /inch.

Next, the image forming apparatus 14000 in the first embodiment in the eleventh aspect of the present invention will be described.

This image forming apparatus 14000 comprises a CCD color image-pickup element (simply referred to as CCD, hereinafter) 14101. This CCD 14101 comprises: R (red) image-pickup unit in which elements corresponding to 4752 pixels are covered by a red filter and one-dimensionally arranged; B (green) image-pickup unit in which elements corresponding to 4752 pixels are covered by a green filter and one-dimensionally arranged; and R (blue) image-pickup unit in which elements corresponding to 4752 pixels are covered by a blue filter and one-dimensionally arranged. These image-pickup units are arranged in parallel to one another in three rows.

Further, the image forming apparatus 14000 comprises an amplifier (simply referred to as an AMP, hereinafter) 14103 for amplifying the respective R, G and B image data signals in the CCD 14101; A/D converter 14103 for respectively converting the thus amplified analog R, G, and B image data signals into 8-bit multi-tone digital data values; an image processing unit (simply referred to as IPU, hereinafter) for generating image data for printing by performing predetermined image processing on the multi-tone digital image data; a laser diode (simply referred to as LD, hereinafter) 14105 for printing the corresponding image on a recording paper sheet by outputting a laser beam in accordance with a signal modulated in a manner in which so-called ON/OFF modulation (in which the LD is switched ON so as to expose the photosensitive matter and OFF so as not to expose the photosensitive matter; or in which the time for which the LD is ON is controlled by means of pulse-width modulation in a case of halftone printing) is performed on the thus generated printing image data.

The image forming apparatus 14000 further comprises a filter 14106. This filter 14106 performs filtering processing, so as to emphasize a predetermined spatial frequency in an original image, on the image data concerning the original image input through the CCD 14101. The construction of the filter 14106 will be presently described with reference to FIG. 97 and 98.

The image forming apparatus 14000 further comprises discrimination means 14107 for detecting periodicity, existing in the original image, from the image data on which the above-mentioned filtering processing has been performed. This discrimination means 14107 comprises, for such a purpose, a memory, comparing circuit and so forth. When processing for every pixel is to be performed on the image data, the memory samples image data units respectively corresponding to the plurality of pixels (simply referred to as peripheral pixels, hereinafter) surrounding the relevant pixel (simply referred to as current pixel, hereinafter) to be processed in the relevant original image and stores them. From the thus stored image data, the comparing circuit detects the periodicity existing in the original image. Further, the discrimination means 14107 discriminates as to whether or not the original image comprises the special document such as paper money, securities or so by thus detecting the periodicity existing in the original image.

Operation in the image forming apparatus 14000 having such a construction will be described.

The CCD 14101 receives the light reflected by the original image and outputs an analog voltage for every pixel and for every color, R, G and B. These analog signals are amplified by the AMP 14102. The thus amplified image signals as analog voltage signals are respectively converted into the corresponding 8-bit multi-tone digital data by means of the A/D converter 14103.

The filtering processing is performed on the image data which thus have been converted into the multi-tone digital data, the processing being performed by means of the filter 14106 as described above where the predetermined spatial frequency is emphasized. Then, the duplication means 14107 detects the periodicity, existing in the original image, from the image data on which the filtering processing has been thus performed.

The above-mentioned predetermined spatial frequency (in this case, corresponding to a density-variation frequency in the line-drawing patterns) corresponds to a spatial frequency in particular peculiar to line-drawing patterns existing in the special document such as paper money acting as the reference discrimination object which the relevant discrimination means 14107 is used to identify.. Accordingly, if the relevant original image comprises the special document such as paper money, such effect should be applied to the image data as to emphasize the periodicity corresponding to the spatial frequency in the original image. Such effect is achieved by performing the above-mentioned filtering processing on the image data, the processing emphasizing the peculiar spatial frequency. By such periodicity emphasis, it becomes easy to detect the periodicity from the thus obtained image data. Thereby, it becomes easy to perform the discrimination using the obtained image data.

It thus becomes possible to say that the image data comprises the special document such as paper money if such periodicity is detected from the image data by means of the operation of the discrimination means 14107 as described above. The discrimination signal as the result of the discrimination thus performed by the discrimination means 14107 is input to the IPU 14104. The IPU 14104 receives the discrimination signal and does not output the relevant image data to the LD 14105 if the discrimination result is that 'the image data comprises the special document'. If the discrimination result is 'the image data does not comprise the special document', the same outputs the relevant image data to the LD 14105. Thus, the forgery duplication can be prevented.

The above-mentioned discrimination means 14107 may individually respectively perform such discrimination operation on the respective R, G, and B color respective image data sets in the periodicity detection for the original image. Alternatively, such discrimination operation may be performed on the image data resulting from first combining these R, G and B image data sets.

Further, in such discrimination operation, methods for detecting the periodicity, existing in the original image, from the image data are as follows. The relevant image data comprises density data for example. The frequency of density variation is obtained, which density variation depends on position variation in the relevant original image. For this purpose, the density-value inter-peak distance, that is, the pitch, may be obtained. Alternatively, the density gradient may be obtained from the differences between a plurality of adjacent pixels.

Figure 95:
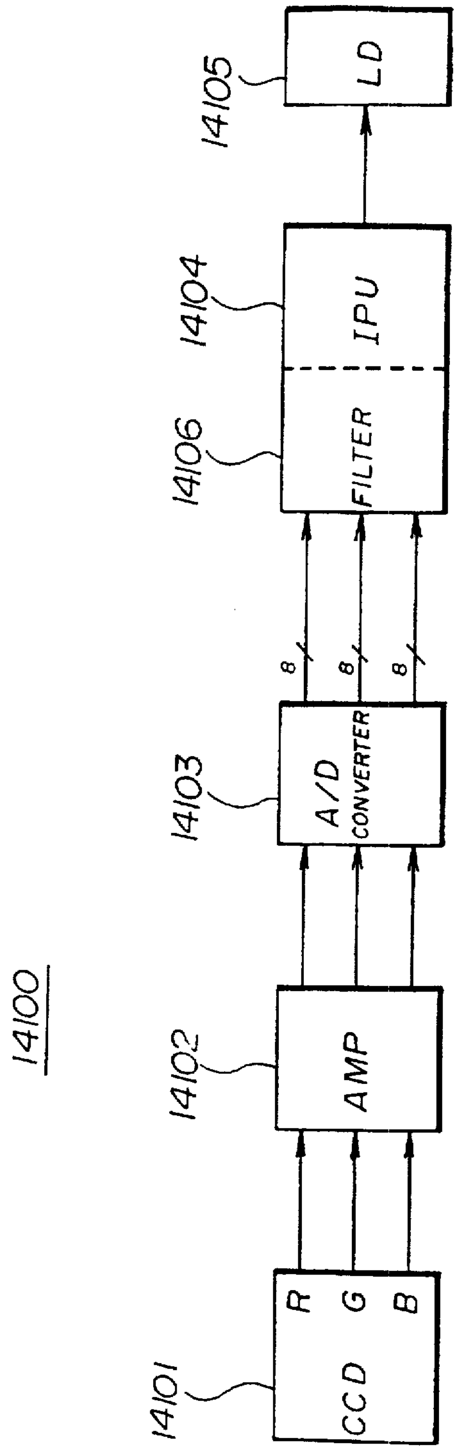
FIG. 95 shows a general block diagram of an image forming apparatus in a second embodiment of the eleventh aspect of the present invention.

Next, with reference to FIG. 95, the image forming apparatus 14100 in the second embodiment in the eleventh aspect of the present invention will be described.

Figure 94:
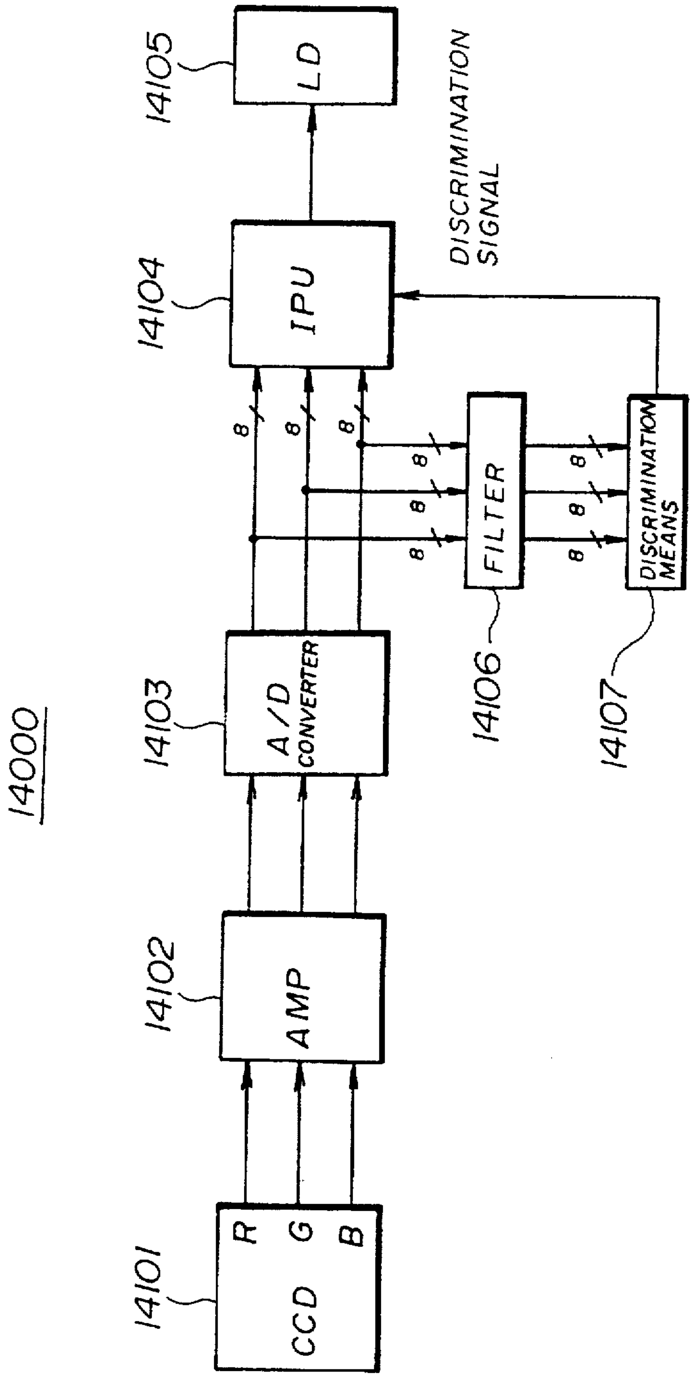
FIG. 94 shows a general block diagram of an image forming apparatus in a first embodiment of the eleventh aspect of the present invention.

In the image forming apparatus 14100 in this embodiment, the filter 14106 and IPU 14107 such as described above are combined in series and integrated with one another. In FIG. 95, the same reference numerals are given to block components having functions similar to those in the above-mentioned respective block components described in FIG. 94. The description concerning the constructions and operation relevant to them is omitted. Parts different from the constructions and operation in the image forming apparatus 14000 in the first embodiment of the eleventh aspect of the present invention will be described.

The filtering processing such as described above is performed, by means of the filter 14106, on the image data, being the multi-tone digital data corresponding to the original image, which has been output from the A/D converter 14103. The image data in which the predetermined spatial frequency has been emphasized through the filtering processing being thus performed is input to the IPU 14104.

That is, this image forming apparatus 14100 does not perform the above-mentioned discrimination operation performed by the discrimination means 14107. The IPU 14104 generates the printing image data using the image data in which the predetermined spatial frequency has been thus emphasized. The thus generated printing data is input to the LD 14105 which prints it onto a recording paper sheet as described above.

Assuming that the original image comprises the special document such as paper money acting as the reference discrimination object, the above-mentioned filtering processing emphasizes the above-mentioned predetermined spatial frequency as described above. The duplicated image formed with the use of such image data in which the predetermined spatial frequency has been emphasized comprises one having moire patterns as described above. Such moire-pattern existence enables easy distinguishing of the relevant duplicated matter from the corresponding special document. Accordingly, such a duplicated matter cannot be used as the forgery paper money for example.

On the other hand, if the original image does not comprise the special document, since the predetermined spatial frequency such as described above peculiar to the special document should not exist in the original image accordingly, the predetermined spatial frequency which should not exist in the original image cannot be emphasized accordingly. Thus, the above-mentioned filtering processing should apply no image modification to the image data not comprising the special document. Accordingly, the image data output from the A/D converter 14103 pass through the filter 14106 substantially unaltered and is input to the IPU 14104. Then, the same data is converted into the printing data as described above and the LD 14105 prints the corresponding image. The image in the duplicated matter obtained in this case, to which image no image modification should be applied, should comprise regular duplicated image.

A case may be considered in which a spatial frequency close to the spatial frequency peculiar to the special document exists in a relevant original image even though the relevant original image does not comprise the special document such as paper money. In such a case, the above-mentioned filtering processing emphasizes the spatial frequency in the image data. The final the image corresponding to the image data in which the spatial frequency has been thus emphasized, that is, the moire-formed image, is printed. However, the resulting image is not necessarily completely unusable, and is considered to be sufficiently usable to a certain extent.

Figure 96:
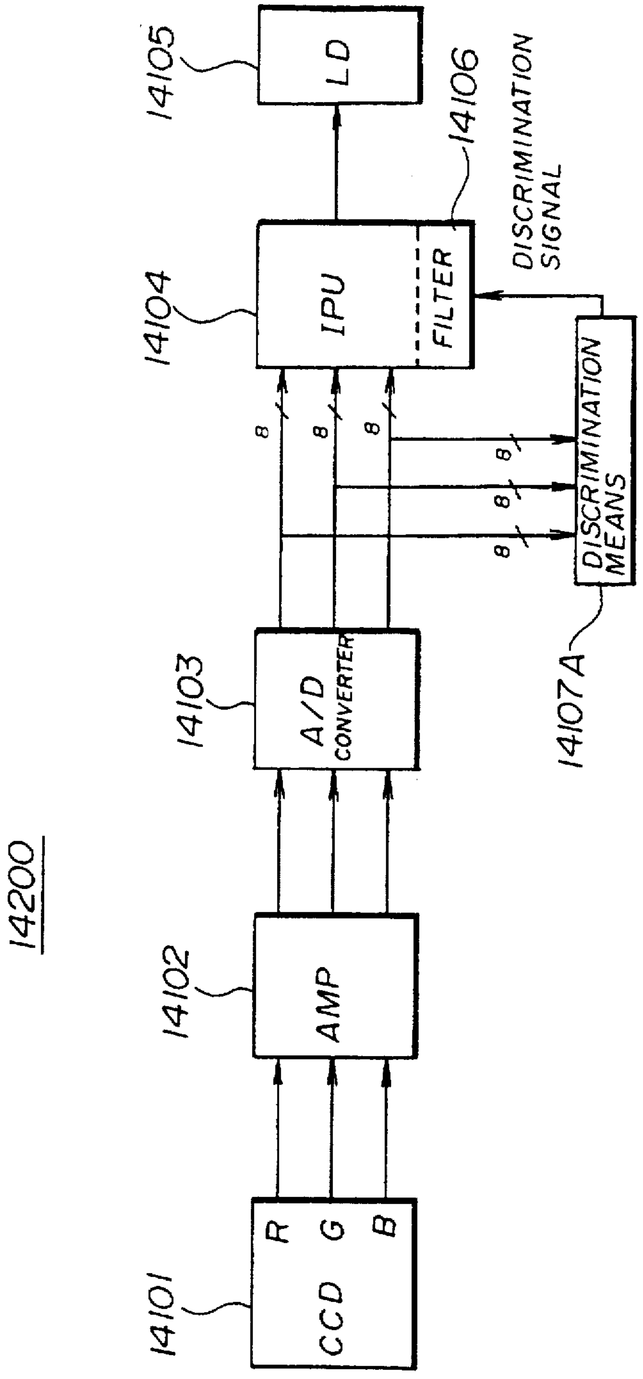
FIG. 96 shows a general block diagram of an image forming apparatus in a third embodiment of the eleventh aspect of the present invention.

Next, with reference to FIG. 96, the image forming apparatus 14200 in the third embodiment in the eleventh aspect of the present invention will be described.

In the image forming apparatus 14200 in this embodiment, the filter 14106 and IPU 14107 such as described above are combined and integrated with one another. There, the filter 14106 is a part of the IPU 14107. In FIG. 96, the same reference numerals are given to block components having functions similar to those in the above-mentioned respective block components described in FIG. 94. The description concerning the constructions and operation relevant to them is omitted. Parts different from the constructions and operation in the image forming apparatus 14000 in the first embodiment of the eleventh aspect of the present invention will be described.

The image data, being the multi-tone digital data, output from the A/D converter 14103 is provided to the respective discrimination means 14107A and the IPU 14104. The discrimination means 14107A may comprise any one of the respective embodiments in the plurality of aspects of the present invention. Alternatively, the same may comprise a construction in another well-known technology.

By means of such a discrimination means 14107, it is determined whether or not the original comprises the special document. The discrimination signal as the result is input to the IPU 14104. If the discrimination signal is 'the original image comprises special document', the filter 14106 performs the filtering processing such as described above on the image data input to the IPU 14104 from the A/D converter 14103. The IPU 14104 performs the above-described operation, inherent to the IPU 14104, on the image data in which the predetermined spatial frequency such as described above has been emphasized due to the filtering processing being performed thereon. Thus, the corresponding printing image data is generated. The thus generated printing data is input to the LD 14105 and the LD 14105 prints the same on a recording paper sheet.

The duplicated image formed with the use of such image data in which the predetermined spatial frequency has been emphasized comprises one having moire patterns as described above. Such moire-pattern existence enables easy distinguishing of the relevant duplicated matter from the corresponding special document. Accordingly, such a duplicated matter cannot be used as forged paper money for example.

On the other hand, if the result in the discrimination means 143107A is that 'the original image does not comprise the special document, the discrimination means indicating the result is input to the IPU 14104 from the discrimination means 14107A. In this case, the filtering processing by the filter 14106 is not performed on the image data input to the IPU 14104 from the A/D converter 14103. Then, the IPU 14104 converts the same into the corresponding printing data as described above and the LD 14105 prints the corresponding image. The duplicated image obtained in this case, to which image no image modification by means of the filter 14106 has been applied as described above, comprises a regular duplicated image accordingly.

A case may be considered in which a spatial frequency close to the spatial frequency peculiar to the special document exists in a relevant original image even though the relevant original image does not comprise the special document such as paper money. In such a case, there is possibility that the discrimination means 14107A functions erroneously. In this case, the determination signal due to the erroneous determination causes the filter 14106 to perform the filtering processing such as described above on the image data. Thus, the spatial frequency is emphasized through the filtering processing as described above in the image data. Finally, the image, corresponding to the image data in which the spatial frequency has been thus emphasized, that is, the moire-formed image, is printed. However, the resulting image is not necessarily completely unusable, and is considered to be sufficiently usable to a certain extent.

Constructions of the filter 14106 used in the first to third embodiments in the eleventh aspect in the present invention will be described with reference to FIGS. 97 and 98.

These filters respectively comprise digital matrixes. A case is taken where input image data has a pixel density of 400 dpi (16 dots/inch). In this case, FIG. 97 shows a 7×7 matrix band-pass filter which processes so that the image data having a spatial frequency of 100 lines/inch (corresponding to 4 lines/mm) is relatively emphasized (so that magnitude becomes greater, that is, the density differential becomes greater in the image data). FIG. 98 shows a 7×7 matrix band-pass filter which processes so that the image data having a 70 lines/inch (corresponding to 2.8 lines/mm) special frequency is relatively emphasized (so that magnitude becomes greater, that is, the density differential becomes greater in the image data).

These band-pass filters are detailed in an article 'Digital filter in image processing' in 'Ricoh technical report, No.13, Man, 1985. Such band-pass filters are filters suitable for a case where a certain construction is detected from image data, a certain waveform height (peak in density value, for example) is detected for example. These filters are formed by combining 3×3 matrix low-pass filter(s) and 3×3 matrix high-pass filter(s).

In order to increase the value of the spatial frequency, in value, which frequency may be detected by means of such band-pass filters, it is necessary to increase the number of such 3×3 matrix filters constituting the relevant band-pass filter. In one example, three-times repeated performance of filtering by means of the 3×3 matrix substantially equals performance of filtering by means of the 7×7 matrix filter. Thus substantially increasing the number of lines and the number of rows in the matrix can result in increasing the spatial frequency which can be emphasized through the band-pass filter constituted by the relevant matrixes.

By means of such a filter 14106, in the above-mentioned filtering processing, the current-pixel image data obtained as a result of the relevant filtering processing is determined with use of the respective remark-pixel image data and the image data concerning the plurality of peripheral pixels thereabout. That is, in the image data determination, a sum-of-products operation is performed on the matrix shown in FIG. 97 or 98 and the matrix constituting the relevant remark pixel and the peripheral pixels thereabout. Thus, the image data, for the relevant remark pixel, after undergoing the above-mentioned filtering processing can be obtained.

Thus, in the eleventh aspect of the present invention, a relatively simple construction is sufficient for the achievement of an image forming apparatus which has fast processing speed and highly accurate discrimination function, and in which apparatus either the illegal duplication or illegal use of the forgery paper money or so obtained as a result of the illegal duplication can be effectively prevented. Further, it is possible to implement an image forming apparatus which can limit to a minimum the influence of erroneous discrimination, thus limiting to a minimum the wastage of recording paper sheets or work time.

[EMBODIMENTS IN TWELFTH ASPECT]

The twelfth aspect of the present invention will be described.

In general, images in general documents, picture patterns and so forth, other than the special document such as paper money, securities or so, are formed with the use of printing method such as the planographic or halftone methods described above. A halftone screen is formed of mesh having fixed intervals or pitch or spatial frequency. Accordingly, it can be said that the image printed part, formed as a result of printing with the use of a plate having such a construction, has a fixed spatial frequency.

In contrast to this, the above-mentioned special document is in general printed using the intaglio method as described above. Therefore, the same does not have such a fixed spatial frequency as that existing in the halftone printing and due to the processing in the printing process.

The twelfth aspect of the present invention is based on the concept in which, as a result of detecting of a fixed spatial frequency which should exist in documents, picture patterns and so forth other than the above-mentioned special document, it can be seen that likelihood that the corresponding original image comprises the above-mentioned special document is extremely small if the fixed spatial frequency is not detected.

More concretely, in the twelfth aspect of the present invention, in a region determined to comprise a halftone-dot region in a relevant original image, distances between peaks in density-variation waves are measured. Then, it is discriminated as to whether or not the original image comprises the special document such as paper money by determining whether or not the above-mentioned inter-peak distances are constant.

A general construction in an image forming apparatus 15000 in an embodiment of the twelfth aspect of the present invention will be described.

This image forming apparatus 15000 comprises: halftone-dot region determination means (15105) for collecting pixel image data units for a plurality of (vertical)×(horizontal), n×m (n and m respectively comprise arbitrary natural numbers) pixels so as to form a region thereof, this means then determining whether or not the thus obtained region comprises a halftone-dot region in which the density variation is repeated in a predetermined manner; spatial-frequency calculating means (15106) for obtaining the density-variation spatial frequency in the region which has been thus determined to comprise the halftone-dot region; and determination means (15107) for determining whether or not the thus obtained spatial frequency is constant throughout the region determined to comprise the halftone-dot region, the fact that this determination result does not comprise 'constant' causing this means to determine that the relevant input image data corresponds to the special document.

It is preferred that the above-mentioned special document comprises paper money and/or securities.

The construction in this image forming apparatus 15000 will be described further in detail with reference to FIG. 99.

Figure 99:
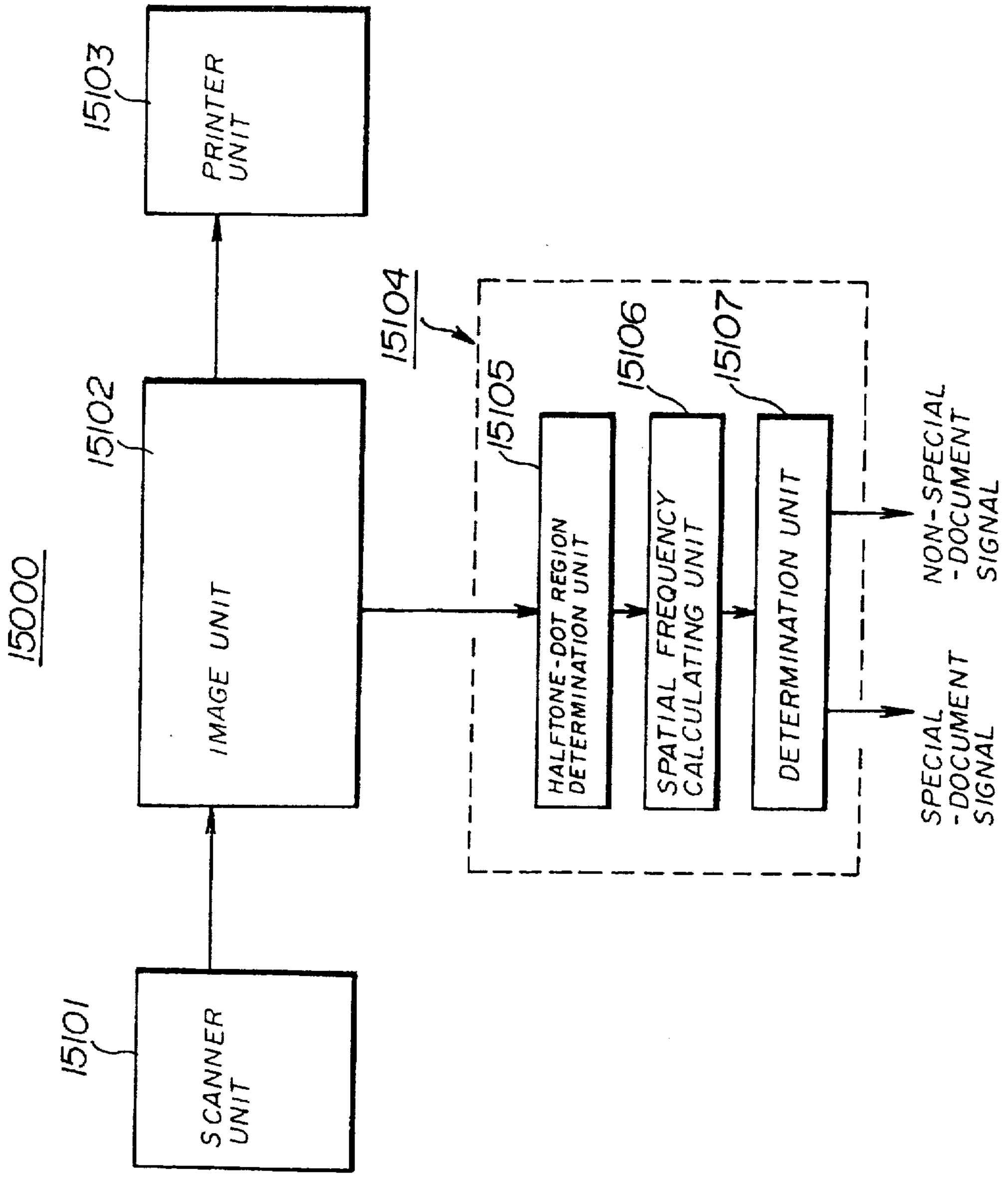
FIG. 99 shows a block diagram of a duplicator with special-document discrimination function in one embodiment of the twelfth aspect of the present invention.

With reference to FIG. 99, the image forming apparatus 15000 comprises: scanner unit 15101 for reading an original image; image processing unit 15102 for performing shading correction processing, δ correction processing, tone processing such as described above on the thus input image data (referred to as input image data, hereinafter); printer unit 15103 for printing the thus image-processed input image data on a recording paper sheet; and special document determination unit 15104 which receives the input image data from the image processing unit 15102 for determining whether or not the original image corresponds to the special document such as paper money, securities or so.

The special document determination unit 15104 comprises: halftone-dot region determination unit 15105 which acts as the above-mentioned halftone-dot region determination means: spatial-frequency calculating unit 15106 which acts as the above-mentioned spatial-frequency calculating means; and determination unit 15107 which acts as the above-mentioned determination means.

Figure 100:
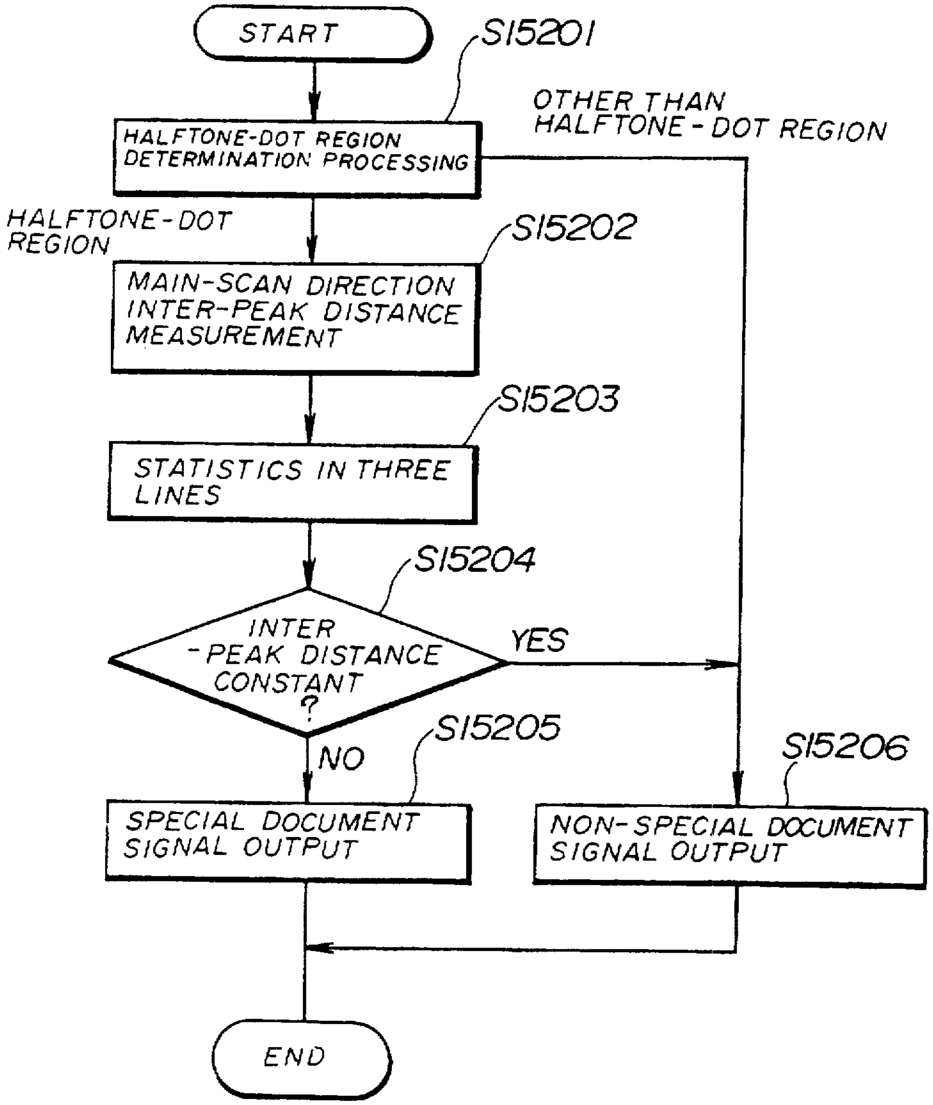
FIG. 100 shows a flow chart of operation carried out by a special-document discrimination unit in the duplicator of FIG. 99.

With reference to FIG. 100, the operation of the above-mentioned special document discrimination unit 15104 will be described.

Receiving input image data input through the scanner unit 15101, the halftone-dot region determination unit 15105 determines in S15201 whether or not the received input image data comprises the halftone-dot region. Subsequently, the input image data which has been determined, as a result of the determination, to comprise the halftone-dot region is used as follows. In S15202, the spatial-frequency calculating unit 15106 collects the input image data corresponding to a plurality of adjacent pixels and thus determined to comprise the halftone-dot region. Thereby, the halftone-dot pixel region image data is produced. The thus extracted halftone-dot pixel region image data is used in the spatial-frequency calculating unit 15106 to detect the density-variation inter-peak distances along the main scan direction in the relevant halftone-dot pixel region. Then, in S15203, the spatial-frequency calculating unit 15106 takes the statistics, along the sub-scan direction, of the thus detected inter-peak distances, on respective three main scan lines in this embodiment for example.

Then, in S15204, the determination unit 15106, with reference to the thus obtained inter-peak distance statistics, determines whether or not the inter-peak distances are constant throughout the relevant halftone-dot pixel region. The fact that the inter-peak distances are constant substantially means that the spatial frequency is fixed. If the determination result comprises 'constant', the determination unit 15106 outputs, in S15206, a non-special document signal indicating that 'the original image does not correspond to the special document'. If the determination result does not comprise 'constant', the determination unit 15106 outputs, in S15205, a special document signal indicating that 'the original image corresponds to the special document'.

If the special document signal is thus output, the printing processing for the relevant original image by means of the printer unit 15103 is stopped so that the forgery in the paper money, securities and so forth can be prevented.

Figure 101:
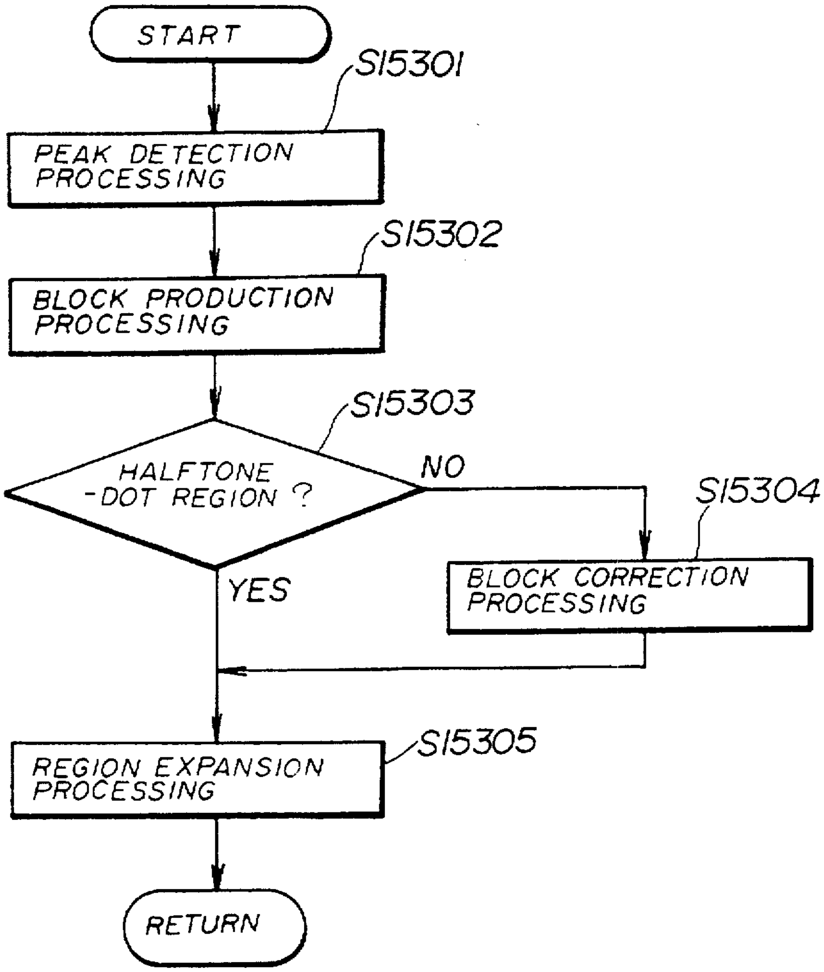
FIG. 101 shows a flow chart of operation of a halftone-dot determination unit in the special-document discrimination unit of the duplicator of FIG. 99.

Next, with FIG. 101, the basic operation of the above-mentioned halftone-dot region determination unit 15105 is described.

Figure 102:
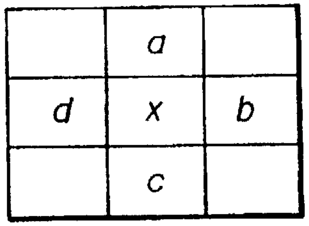
FIG. 102 shows a pixel disposition diagram for illustrating a peak-pixel detecting method in the flow chart of FIG. 101.

In S15301, it is determined whether or not the pixel corresponding to the relevant image data comprises a pixel (simply referred to as a peak pixel, hereinafter) corresponding to the top peak or bottom peak in the density-variation waveform in the relevant original image. This discrimination as to whether or not it is a peak pixel is implemented by comparing, in density values, the current pixel x such as described above with the plurality of peripheral pixels a, b, c and d as described above, as shown in FIG. 102. That is, the pixel x is determined to comprise the peak pixel either if the density in the pixel x is higher than that in every one of the other pixels a, b, c and d or if the density in the pixel x is lower than that in every one of the other pixels a, b, c and d.

Such a determination of the peak pixels is carried out in this embodiment individually for each of the R, G, and B color image data units in the input image data. Then, an AND operation is performed on the three results. That is, only if determination for every one of the R, G and B respective colors is true, is the relevant pixel determined to comprise the peak pixel. If not, the pixel is determined not to comprise the peak pixel.

Subsequently, block production processing is performed in S15302 on the plurality of pixels which have respectively undergone determination in S15301. In the block production processing in S15301, one block is produced as a result of collecting (n·m) (9, in an example case) pixels constituting vertical n-horizontal m (3·3, in the relevant example) region. A plurality of thus obtained blocks are then used in determining whether or not each block in the entirety comprises the halftone-dot region. In this determination as to whether or not each block comprises the halftone-dot region, the relevant block is determined to comprise the halftone-dot region if one or more peak pixels exist in the block..

In such a determination result for every block, a case may be considered in which a relevant block is determined, looking only at this block, not to comprise the halftone-dot region. However, the relevant block may be inherently determined to comprise the halftone-dot region with a wider view, that is, looking at a set of blocks including and surrounding the relevant block.

Figure 103:
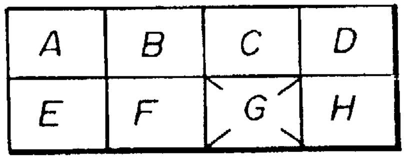
FIG. 103 shows a pixel-block disposition diagram for illustrating one example of block correction processing in the flow chart of FIG. 101.

In order to correct the determination delivered for the block which should be inherently determined to be included in the halftone-dot region but has been determined not to be, block correction processing is carried out in S15304 by means of the halftone-dot region determination unit 15105. This block correction processing is as described below. In one example shown in FIG. 103, FIG. 103 shows (vertical 2)×(horizontal 4), totaling 8 blocks produced by the block production processing such as mentioned above. Among them, the block G is taken as an object of the block correction processing performed if necessary. Correction is made so that the relevant block G is determined to comprise the halftone-dot region if blocks, each having at least one peak pixel, are included with a number of blocks being more than a predetermined number (threshold value number) in the 8 blocks A-H. That is, even if S15303 provides the determination result 'not a halftone-dot region', the relevant result is changed. Thus, the result 'halftone-dot region' is given.

Figure 104:
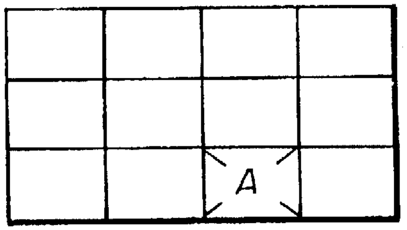
FIG. 104 shows a pixel-block disposition diagram for illustrating one example of expansion processing in the flow chart of FIG. 101.

Subsequently, in S15305, the halftone-dot region determination unit 15105 executes region expansion processing. This region expansion processing is implemented as below for example. FIG. 104 shows (vertical 3)×(horizontal 4), totaling 12 blocks formed in S15303 as described above. Among them, the block A is taken as the object of the region expansion processing if necessary. The block A is determined to belong to the halftone-dot region if at least one block exists in the relevant 12 blocks, which one block has been determined to comprise the halftone-dot region in a process prior to S15305 in the flowchart of FIG. 101, even if the relevant block A does not comprise a block which has been thus determined to comprise the halftone-dot region for example.

Thus, the region expansion processing causes a plurality of blocks belonging to the halftone-dot region to be collected, thereby further larging the halftone-dot region block being formed.

S15202 in FIG. 100 is performed on the thus formed halftone-dot region block described above by means of the spatial-frequency calculating unit 15106.

Figure 105:
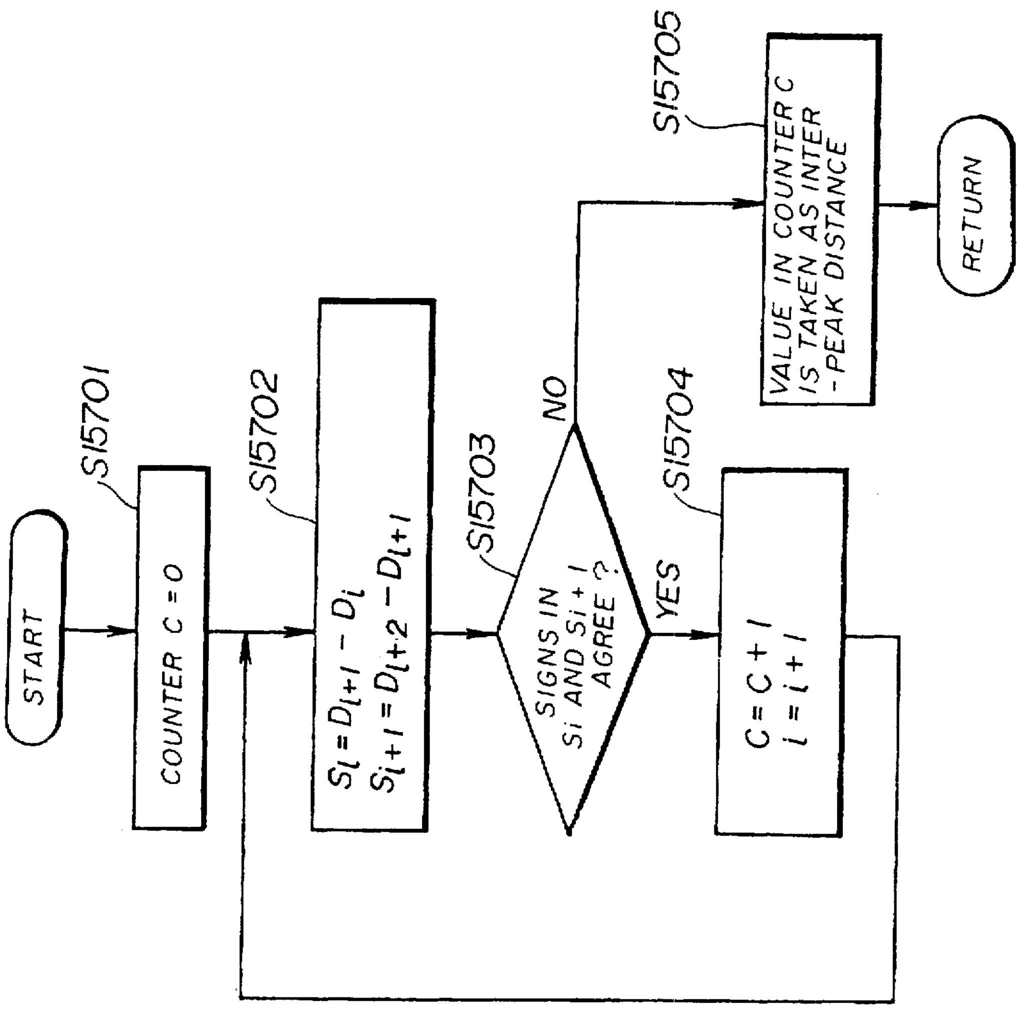
FIG. 105 shows a flow chart of operation of a spatial-frequency operation unit in the special-document discrimination unit in the duplicator of FIG. 99.

With reference to FIG. 105, the main scan line direction inter-peak distance detecting action in S15202 will be described.

In FIG. 105, a variable $D_i$ indicates the density value in input image data in each pixel for example. A variable C indicates the counted value in a sign counting counter. A variable $S_i$ indicates a presently described differential value.

First, in S15701, the value in the counter is reset to 0. Then, in S15702, respective density values $D_i$, $D_{i+1}$, and $D_{i+2}$ for three pixels arranged in sequence and adjacent to one another in the relevant original image are used. Respective density-value differences between the adjacent pixels, $S_i=(D_{i+1}-D_i)$ and $S_{i+1}=(D_{i+2}-D_{i+1})$ are respectively obtained. Then, in S15703, it is determined whether the respective signs of $S_i$ and $S_{i+1}$ agree or differ. As a result of the determination, if the respective signs differ, this means that the gradient in the density-variation waveform in the original image change direction. That is, an upward slope is changed into a downward slope or a downward slope is changed into an upward slope. In other words, the relevant region corresponds to a peak in the density-variation wave.

The sign in the above-mentioned $S_i$ being 'positive' means that the relevant density-variation wave gradient is 'positive'. The sign in the above-mentioned $S_i$ being 'negative' means that the relevant density-variation wave gradient is 'negative'.

If the result in S15703 comprises YES, that is, signs do not change in Si and Si+, since a peak in the density variation has not yet been arrived at, the value in C is incremented by one in S15704. Simultaneously, the i value is incremented by 1 in S15704. Every time the i value is incremented one by one, the pixels respectively corresponding to density values $D_i$, $D_{i+1}$, and $D_{i+2}$ are shifted one by one to the subsequent pixels in S15702 and S15703. Accordingly, the C value which is thus incremented corresponds to the number of pixels, density values of which pixels are used during this time.

Thus, the C value is incremented until the density wave gradient changes, the number of the pixels processed during the relevant interval being thus counted.

If the result in S15703 is NOS, that is, the signs change between $S_i$ and $S_{i+1}$, then since it is the state where the peak in the density variation is arrived at, the number of pixels thus counted as the C value is taken as the inter-peak distance.

Then, the C value is again reset to 0 in S15701 and the counting of the number of pixels lying between peaks in the relevant density-variation wave is started similarly to the above described process.

In the case where the inter-peak distance is thus calculated, the initially obtained C value in the processing shown in FIG. 105 should be removed from the discrimination as to 'whether or not to comprise the special document'. This is because it is indeterminate whether or not C is initially reset to 0 in S15701 at precisely a peak pixel position.

Further, the embodiments in the present invention are not necessarily limited to the above-mentioned respective embodiments. Variations and modifications of the present invention are possible without departing from the scope and spirit claimed in the claims of the present invention. All these are included in the scope of the present invention.

What is claimed is:

1. An original-discrimination system for determining whether or not an original image is identical to a predetermined reference image in response to data concerning said original image being input comprising:

means for determining whether or not data of each of a plurality of color components is greater than a predetermined value to determine whether the predetermined region of the original image is white means for measuring at least one hue of a ratio of a kind of colors in a predetermined region of the original image only when the predetermined region of the original image is determined to be not white:

means for counting instances of the at least one measured hue:

means for comparing the counted instances of the at least one measured hue with a reference value: and determining means for determining if the original image is identical to the predetermined reference image based on an output of the means for counting.

2. The original-discrimination system according to claim 1, wherein the means for counting further counts at least one of specific color pixels and specific color hue pixels.

3. An original-discrimination system for determining whether or not an original image is identical to a predetermined reference in response to data concerning said original image being input. comprising:

a determining circuit to determine whether or not data of each of a plurality of color components is greater than a predetermined value to determine whether the predetermined region of the original image is white a measuring circuit measuring at least one hue of a ratio of a kind of colors in a predetermined region of the original image only when the predetermined region of the original image is determined to be not white:

a counter counting instances of the at least one measured hue:

a comparator comparing the counted instances of the at least one measured hue with a reference value: and a determining circuit determining if the original image is identical to the predetermined reference image based on an output of the means for counting.

4. The original-discrimination system according to claim 3, wherein the counter further counts at least one of specific color pixels and specific color hue pixels.

* * * * *